(12) United States Patent
Kitayama et al.

(10) Patent No.: US 8,698,724 B2
(45) Date of Patent: Apr. 15, 2014

(54) LIQUID CRYSTAL DISPLAY DEVICE, SCAN SIGNAL DRIVE DEVICE, LIQUID CRYSTAL DISPLAY DEVICE DRIVE METHOD, SCAN SIGNAL DRIVE METHOD, AND TELEVISION RECEIVER

(71) Applicant: Sharp Kabushiki Kaisha, Osaka (JP)

(72) Inventors: Masae Kitayama, Osaka (JP); Kentaro Irie, Osaka (JP); Fumikazu Shimoshikiryoh, Osaka (JP); Toshihide Tsubata, Osaka (JP); Naoshi Yamada, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 13/849,702

(22) Filed: Mar. 25, 2013

(65) Prior Publication Data

US 2013/0235025 A1 Sep. 12, 2013

Related U.S. Application Data

(62) Division of application No. 12/451,957, filed as application No. PCT/JP2008/055968 on Mar. 27, 2008, now Pat. No. 8,427,413.

(30) Foreign Application Priority Data

Jun. 12, 2007 (JP) ................................. 2007-155652
Nov. 29, 2007 (JP) ................................. 2007-309529

(51) Int. Cl.
*G09G 3/36* (2006.01)

(52) U.S. Cl.
USPC .................. 345/94; 345/92; 345/99; 345/100

(58) Field of Classification Search
None
See application file for complete search history.

(56) References Cited

U.S. PATENT DOCUMENTS 4,345,249 A 8/1982 Togashi
6,191,769 B1 2/2001 Fujiwara et al.
(Continued)

FOREIGN PATENT DOCUMENTS

JP 10-4529 1/1998
JP 11-352938 12/1999
(Continued)

OTHER PUBLICATIONS

European Search Report dated Sep. 17, 2012.
(Continued)

*Primary Examiner* — Kenneth Bukowski
(74) *Attorney, Agent, or Firm* — Harness, Dickey & Pierce, P.L.C.

(57) ABSTRACT

In one embodiment, a liquid crystal display device is disclosed in which a gate driver applies a gate-on pulse so that a second period is longer than a first period. Among gate-on pulses applied before the moment of polarity inversion of a data signal, the last end of the gate-on pulse nearest to the moment of the polarity inversion is earlier than the end time of the horizontal period during which the gate-on pulse is applied. The first period starts at the last end of the gate-on pulse and ends at the end time of the horizontal period during which the gate-on pulse is applied. The second period starts at the moment of the polarity inversion and ends at the moment of the application start of the gate-on pulse nearest to the moment of the polarity inversion among the gate-on pulses applied after the polarity inversion.

7 Claims, 89 Drawing Sheets

(56) References Cited

U.S. PATENT DOCUMENTS

| | | |
|---|---|---|
| 6,661,488 B1 | 12/2003 | Takeda et al. |
| 6,724,452 B1 | 4/2004 | Takeda et al. |
| 7,167,224 B1 | 1/2007 | Takeda et al. |
| 7,224,421 B1 | 5/2007 | Takeda et al. |
| 7,304,703 B1 | 12/2007 | Takeda et al. |
| 2001/0043178 A1 | 11/2001 | Okuzono et al. |
| 2002/0093473 A1 | 7/2002 | Tanaka et al. |
| 2003/0038766 A1 | 2/2003 | Lee et al. |
| 2003/0227429 A1 | 12/2003 | Shimoshikiryo |
| 2004/0119924 A1 | 6/2004 | Takeda et al. |
| 2004/0150604 A1 | 8/2004 | Okuzono et al. |
| 2004/0150612 A1 | 8/2004 | Okuzono et al. |
| 2005/0122441 A1 | 6/2005 | Shimoshikiryoh |
| 2005/0162448 A1 | 7/2005 | Aoki |
| 2005/0206608 A1* | 9/2005 | Murade .......... 345/103 |
| 2005/0213015 A1 | 9/2005 | Shimoshikiryo |
| 2006/0041805 A1* | 2/2006 | Song .......... 714/724 |
| 2006/0176265 A1 | 8/2006 | Kim et al. |
| 2006/0180813 A1 | 8/2006 | Kim et al. |
| 2006/0232538 A1 | 10/2006 | Kobashi et al. |
| 2006/0256271 A1 | 11/2006 | Shimoshikiryo |
| 2007/0046609 A1 | 3/2007 | Lee |
| 2007/0063952 A1* | 3/2007 | Oku et al. .......... 345/96 |
| 2007/0064187 A1 | 3/2007 | Takeda et al. |
| 2007/0262941 A1 | 11/2007 | Jan et al. |
| 2008/0106660 A1 | 5/2008 | Kitayama et al. |
| 2008/0165314 A1 | 7/2008 | Takeda et al. |
| 2008/0278649 A1* | 11/2008 | Koike et al. .......... 349/42 |
| 2008/0303997 A1 | 12/2008 | Takeda et al. |
| 2009/0046048 A1 | 2/2009 | Shimoshikiryoh |

FOREIGN PATENT DOCUMENTS

| | | |
|---|---|---|
| JP | 2000-250496 | 9/2000 |
| JP | 2001-051252 | 2/2001 |
| JP | 2005-242313 | 9/2005 |
| JP | 3730159 | 10/2005 |
| JP | 2006-295588 | 10/2006 |
| JP | 2007-0065657 | 3/2007 |
| WO | WO 2008/139693 | 11/2008 |
| WO | WO 2008/139695 | 11/2008 |
| WO | WO 2009/047941 | 4/2009 |

OTHER PUBLICATIONS

Restriction Requirement dated Mar. 30, 2012 for corresponding U.S. Appl. No. 12/451,957.

Office Action mailed Sep. 11, 2012 for corresponding U.S. Appl. No. 12/451,957.

Notice of Allowance mailed Jan. 16, 2013 for corresponding U.S. Appl. No. 12/451,957.

English version of International Search Report dated Jun. 24, 2008.

* cited by examiner

FIG. 38

INPUT SIDE : HtotalX=2200, HdispX=1920, HblankX=280

| NUMBER OF VIDEO DATA IN ONE SET (NUMBER OF LINES) | WHOLE INPUT CLOCKS IN ONE SET (2200×20) | NUMBER OF DUMMY SCANNING PERIODS IN ONE SET | HORIZONTAL SCANNING PERIOD | | DUMMY SCANNING PERIOD | |
|---|---|---|---|---|---|---|
| | | | HdispY | HblankY | DdispY | DblankY |
| 20 | 44000 | 1 | 1920 | 1 | 1920 | 3660 |
| 20 | 44000 | 1 | 1920 | 2 | 1920 | 3640 |
| 20 | 44000 | 1 | 1920 | 3 | 1920 | 3620 |
| 20 | 44000 | 1 | 1920 | 100 | 1920 | 1680 |
| 20 | 44000 | 1 | 1920 | 101 | 1920 | 1660 |
| 20 | 44000 | 1 | 1920 | 102 | 1920 | 1640 |
| 20 | 44000 | 1 | 1920 | 150 | 1920 | 680 |
| 20 | 44000 | 1 | 1920 | 151 | 1920 | 660 |
| 20 | 44000 | 1 | 1920 | 152 | 1920 | 640 |
| 20 | 44000 | 1 | 1920 | 174 | 1920 | 200 |
| 20 | 44000 | 1 | 1920 | 175 | 1920 | 180 |
| 20 | 44000 | 1 | 1920 | 176 | 1920 | 160 |
| 20 | 44000 | 1 | 1920 | 180 | 1920 | 80 |
| 20 | 44000 | 1 | 1920 | 181 | 1920 | 60 |
| 20 | 44000 | 1 | 1920 | 182 | 1920 | 40 |
| 20 | 44000 | 1 | 1920 | 183 | 1920 | 20 |
| 20 | 44000 | 1 | 1920 | 184 | 1920 | 0 |

FIG. 43

HtotalX(INPUT SIDE)=2200, HdispY(OUTPUT SIDE)=1920

| M | a = NUMBER OF DUMMY SCANNING PERIODS | B' | D=HtotalY | E | F | D+F=DtotalY |
|---|---|---|---|---|---|---|
| 30 | 1 | 2129.03 | 2129 | 65999 | 1 | 2130 |
| 30 | 2 | 2062.5 | 2062 | 65984 | 8 | 2070 |
| 30 | 3 | 2000 | 2000 | 66000 | 0 | 2000 |
| 30 | 5 | 1885.7 | | | | NOT PERMITTED |

HtotalX(INPUT SIDE)=2200, HdispY(OUTPUT SIDE)=1920

| M | a = NUMBER OF DUMMY SCANNING PERIODS | B' | D=HtotalY | E | F | D+F=DtotalY |
|---|---|---|---|---|---|---|
| 40 | 1 | 2146.3 | 2146 | 87986 | 14 | 2160 |
| 40 | 2 | 2095.2 | 2095 | 87990 | 5 | 2100 |
| 40 | 4 | 2000 | 2000 | 88000 | 0 | 2000 |
| 40 | 5 | 1955.5 | 1955 | 87975 | 5 | 1960 |
| 40 | 6 | 1913.04 | | | | NOT PERMITTED |

FIG. 44

INPUT SIDE: HtotalX=2200, HdispX=1920, HblankX=280

| NUMBER M OF VIDEO DATA IN ONE SET (NUMBER OF LINES) | WHOLE INPUT CLOCKS IN ONE SET (2200×40) | NUMBER OF DUMMY SCANNING PERIODS IN ONE SET | HORIZONTAL SCANNING PERIOD ||| DUMMY SCANNING PERIOD |||
|---|---|---|---|---|---|---|---|---|
| | | | HdispY | HblankY | | DdispY | DblankY |
| 40 | 88000 | 3 | 1920 | 100 | | 1920 | 480 |
| 40 | 88000 | 3 | 1920 | 106 | | 1920 | 400 |
| 40 | 88000 | 3 | 1920 | 112 | | 1920 | 320 |
| 40 | 88000 | 3 | 1920 | 118 | | 1920 | 240 |
| 40 | 88000 | 3 | 1920 | 124 | | 1920 | 160 |
| 40 | 88000 | 3 | 1920 | 130 | | 1920 | 80 |
| 40 | 88000 | 3 | 1920 | 136 | | 1920 | 0 |

FIG. 50
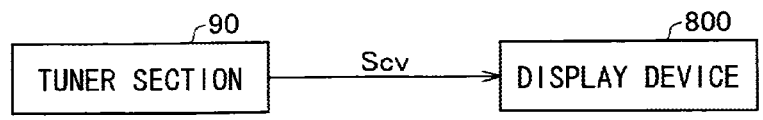
FIG. 51
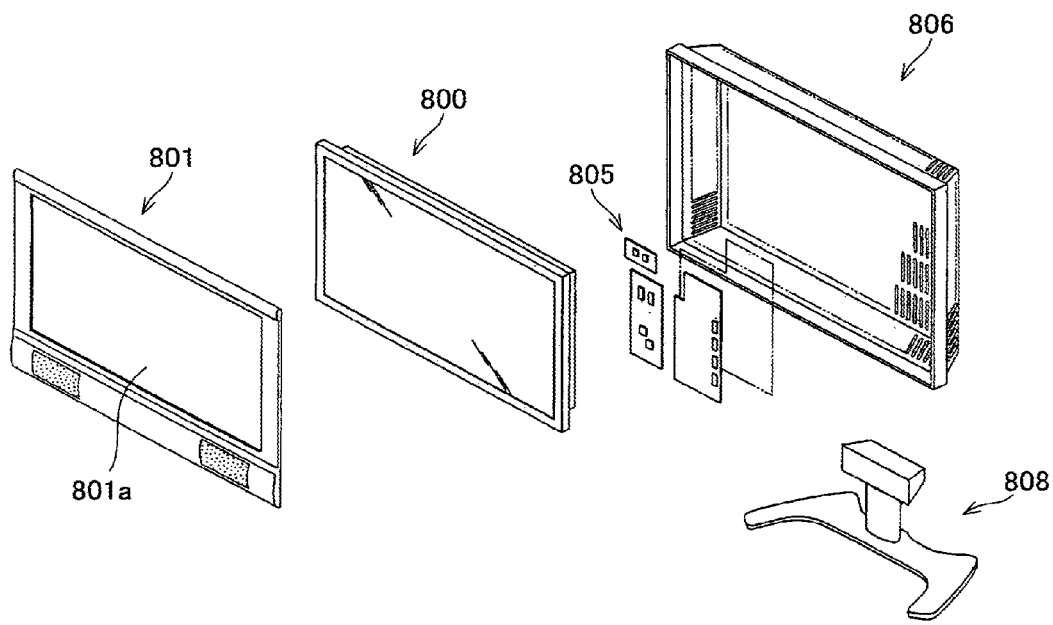
FIG. 52
| DUMMY INSERTION PERIOD H | 540 | 270 | 135 | 100 | 80 | 60 | 55 | 50 | 40 |
|---|---|---|---|---|---|---|---|---|---|
| TIME : Ta($\mu$ s) | 8000 | 4000 | 2000 | 1481 | 1185 | 889 | 815 | 741 | 593 |
| DETERMINATION | × | × | × | × | △ | △ | ○ | ○ | ○ |
(×VERY POOR LEVEL, △A LITTLE NOTICEABLE LEVEL, ○HARDLY NOTICEABLE LEVEL)

FIG. 89

| NUMBER OF SCANNING LINES | DIFFERENCE | RATIO | UNEVENNESS (VISUAL EVALUATION) |
|---|---|---|---|
| 768 | 0 | 0 | ◎ |
| 768 | 0.5H | 0.07% | ◎ |
| 768 | 1H | 0.13% | ○ |
| 768 | 2H | 0.26% | × |
| 1080 | 0 | 0 | ◎ |
| 1080 | 0.5H | 0.05% | ◎ |
| 1080 | 1H | 0.09% | ◎ |
| 1080 | 2H | 0.19% | △ |

US 8,698,724 B2

LIQUID CRYSTAL DISPLAY DEVICE, SCAN SIGNAL DRIVE DEVICE, LIQUID CRYSTAL DISPLAY DEVICE DRIVE METHOD, SCAN SIGNAL DRIVE METHOD, AND TELEVISION RECEIVER

This application is a divisional application of and claims priority under 35 U.S.C. §120/121 to U.S. application Ser. No. 12/451,957 filed Dec. 9, 2009, which is a National Phase of PCT Patent Application No. PCT/JP2008/055968, filed on Mar. 27, 2008, which claims priority under 35 U.S.C. §119 to Japanese Application Nos. 155652/2007, filed Jun. 12, 2007 and 309529/2007, filed Nov. 29, 2007, the contents of each of which are hereby incorporated herein by reference in their entirety and for all purposes.

TECHNICAL FIELD

The present invention relates to a liquid crystal display device for displaying an image by applying a voltage to liquid crystal, a method for driving the liquid crystal display device, and a television receiver.

BACKGROUND ART

A liquid crystal display device is a flat display device having excellent properties such as high definition, a flat shape, light weight, and low power consumption. Recently, due to an increase in display ability, an increase in production ability, and an increase in price competitiveness against other display devices, the market of the liquid crystal display device has spread rapidly.

If a current voltage continues to be applied to a liquid crystal layer of such liquid crystal display device for a long time, elements get deteriorated. Therefore, in order to secure a long life of such liquid crystal display device, it is necessary to perform alternating driving (inversion driving) in which the polarity of a voltage to be applied is inverted periodically. However, in a case where an active matrix liquid crystal display device employs frame inversion driving in which the polarity of a voltage is inverted with respect to each frame, it is inevitable that some unbalance is seen in a plus/minus voltage to be applied to liquid crystal due to anisotropy of liquid crystal dielectric constant, variation in pixel potential that is caused by parasitic capacitance between a gate and a source of a pixel TFT, and a slip of a center value of a counter electrode signal. Consequently, a minor variation in luminance occurs at a frequency that is a half of a frame frequency, making a user see flickers. In order to solve this problem, there is generally employed inversion driving in which pixel signals have opposite polarities between adjacent lines or adjacent pixels as well as voltages are inverted with respect to each frame.

When dot inversion in which the polarity of a voltage is inverted with respect to each pixel is performed, a charging rate of a pixel drops due to signal delay in a data signal line. In order to solve this problem, there is proposed a technique for inverting the polarity of a data signal voltage with respect to a plurality of horizontal periods (a plurality of rows). However, this technique still raises a problem that a charging rate of a pixel drops at a row where the polarity of a data signal voltage is inverted.

In order to solve this problem, Patent Literature 1 discloses a technique in which a dummy horizontal period is provided after inversion of the polarity of a data signal and gate-on pulses whose pulse width corresponds to a plurality of horizontal periods are applied to all scanning signal lines in such a manner that the gate-on pulses have the same pulse width. FIG. 92 is a voltage waveform chart showing driving by this technique. In FIG. 92, (2) represents a latch pulse LP1, (3) represents image data D to be latched by a signal-side drive circuit and output to a signal line SL with respect to each horizontal scanning period, (4) represents a polarity signal P of an image signal voltage, and (5)-(12) represent scanning signal voltages of individual scanning lines. This technique improves display unevenness due to the difference in a charging property.

Further, Patent Literature 2 discloses a technique in which the width of a gate-on pulse after inversion of the polarity of a data signal is made larger than the width of a gate-on pulse with no inversion of the polarity of a data signal so as to increase a charging rate of a first row where the polarity of the data signal is inverted. FIG. 93 is a voltage waveform chart showing driving by this technique. FIG. 93 shows gate signals at $4i^{th}$ to $[4(i+1)+1]^{th}$ rows and a data signal.

CITATION LIST

Patent Literature 1
Japanese Patent Application Publication, Tokukai, No. 2001-51252 A (Publication Date: Feb. 23, 2001)
Patent Literature 2
Japanese Patent Application Publication, Tokukai, No. 2003-66928 A (Publication Date: Mar. 5, 2003)

SUMMARY OF INVENTION

Technical Problem

However, the technique disclosed in Patent Literature 1 is problematic in that since a pixel charged when the polarity of a data signal is inverted is charged during a period when rounding of a data signal waveform is great, it is impossible to completely improve a difference in charging rate between the pixel charged when the polarity of a data signal is inverted and a pixel charged during the same gate-on time when the polarity of a data signal is not inverted.

Further, in the technique disclosed in Patent Literature 2, a pixel charged when the polarity of a data signal is inverted is charged during a period when rounding of a data signal waveform is great. Besides, since the amount of delay of a data signal differs according to positions of a display area, rounding of a waveform of a data signal also differs depending on positions of the display area. Consequently, even if a gate-on pulse is lengthened after the polarity of a data signal is inverted, it is impossible to evenly improve display unevenness in the display area due to the difference in a charging property. This problem is particularly evident in a large liquid crystal display device with high definition, and further particularly evident in a case where image writing frequency is made higher (e.g. 120 Hz) in order to increase visibility of a moving image.

Solution to Problem

The present invention is made in view of the foregoing problems. An object of the present invention is to provide a liquid crystal display device, a liquid crystal display device drive method, and a television receiver capable of displaying a high-quality image with subdued display unevenness, even if a waveform of a data signal is rounded when the polarity of the data signal is inverted.

In order to solve the problem, the liquid crystal display device of the present invention is an active-matrix liquid crystal display device, including scanning signal lines extending in a row direction, data signal lines extending in a column direction, and pixels provided so as to respectively correspond to intersections of the scanning signal lines and the data signal lines, the liquid crystal display device comprising: a scanning signal driving section for sequentially applying gate-on pulses on the scanning signal lines, each of the gate-on pulses causing a scanning signal line to be in a selected state; and a data signal driving section for applying data signals on the data signal lines such that a polarity of a data signal is inverted with respect to predetermined plural number of horizontal periods in one frame period, the scanning signal driving section applying the gate-on pulses such that a second period is longer than a first period, the first period and the second period being defined in such a manner that among gate-on pulses applied before a moment of polarity inversion of a data signal, when a last end of a gate-on pulse nearest to the moment of the polarity inversion is earlier than an end time of a horizontal period during which the gate-on pulse is applied, the first period starts at the last end of the gate-on pulse and ends at the end time of the horizontal period, and the second period starts at the moment of the polarity inversion and ends at a moment of an application start of a gate-on pulse nearest to the moment of the polarity inversion among gate-on pulses applied after the polarity inversion.

A method for driving an active-matrix liquid crystal display device, including scanning signal lines extending in a row direction, data signal lines extending in a column direction, and pixels provided so as to respectively correspond to intersections of the scanning signal lines and the data signal lines, the method comprising the steps of: (i) sequentially applying gate-on pulses on the scanning signal lines, each of the gate-on pulses causing a scanning signal line to be in a selected state; and (ii) applying data signals on the data signal lines such that a polarity of a data signal is inverted with respect to predetermined plural number of horizontal periods in one frame period, in the step (i), the gate-on pulses being applied such that a second period is longer than a first period, the first period and the second period being defined in such a manner that among gate-on pulses applied before a moment of polarity inversion of a data signal, when a last end of a gate-on pulse nearest to the moment of the polarity inversion is earlier than an end time of a horizontal period during which the gate-on pulse is applied, the first period starts at the last end of the gate-on pulse and ends at the end time of the horizontal period, and the second period starts at the moment of the polarity inversion and ends at a moment of an application start of a gate-on pulse nearest to the moment of the polarity inversion among gate-on pulses applied after the polarity inversion.

With the arrangement or the method, among gate-on pulses applied before the moment of polarity inversion, the gate-on pulse nearest to the moment of polarity inversion is gated off before the end time of the horizontal period during which the gate-on pulse is applied. Further, among gate-on pulses applied after the moment of polarity inversion, the gate-on pulse nearest to the moment of polarity inversion is gated on after the moment of polarity inversion. Consequently, a gate-on pulse is not applied at the moment of polarity inversion. This prevents data signals having opposite polarities from being simultaneously applied on adjacent two scanning signal lines to which gate-on pulses are applied before and after the polarity inversion. This prevents image display from being disturbed at the moment of the polarity inversion.

Further, among gate-on pulses applied after the moment of polarity inversion, the gate-on pulse nearest to the moment of polarity inversion is gated on after a period longer than the first period has elapsed from the moment of polarity inversion. Consequently, a pixel is not charged during a period in which the rounding of a data signal waveform due to polarity inversion is great, allowing a high-quality display with subdued display unevenness etc. Further, since the second period is longer than the first period, the second period is secured to be long enough to prevent the influence of rounding of a data signal and at the same time the first period is short enough to secure that the length of a gate-on pulse before polarity inversion is sufficiently long for charging a pixel, provided that the first period keeps the minimum length which allows preventing data after the polarity inversion from being written while a rounded waveform of a gate-on pulse before the polarity inversion still remains. Consequently, it is possible to allocate the periods efficiently.

Further, in order to solve the foregoing problem, the liquid crystal display device of the present invention is an active-matrix liquid crystal display device, including scanning signal lines extending in a row direction, data signal lines extending in a column direction, and pixels provided so as to respectively correspond to intersections of the scanning signal lines and the data signal lines, the liquid crystal display device comprising: a scanning signal driving section for sequentially applying gate-on pulses on the scanning signal lines, each of the gate-on pulses causing a scanning signal line to be in a selected state; and a data signal driving section for applying data signals on the data signal lines such that a polarity of a data signal is inverted with respect to predetermined plural number of horizontal periods in one frame period, the scanning signal line driving section applying gate-on pulses such that a period from a moment of polarity inversion of a data signal to a moment of an application start of a gate-on pulse nearest to the moment of the polarity inversion among gate-on pulses applied after the polarity inversion is equal to or longer than a horizontal display period obtained by subtracting a horizontal blanking period from a horizontal period.

Further, in order to solve the foregoing problem, the method of the present invention for driving a liquid crystal display device is a method for driving an active-matrix liquid crystal display device, including scanning signal lines extending in a row direction, data signal lines extending in a column direction, and pixels provided so as to respectively correspond to intersections of the scanning signal lines and the data signal lines, the method comprising the steps of: (i) sequentially applying gate-on pulses on the scanning signal lines, each of the gate-on pulses causing a scanning signal line to be in a selected state; and (ii) applying data signals on the data signal lines such that a polarity of a data signal is inverted with respect to predetermined plural number of horizontal periods in one frame period, in the step (i), gate-on pulses being applied such that a period from a moment of polarity inversion of a data signal to a moment of an application start of a gate-on pulse nearest to the moment of the polarity inversion among gate-on pulses applied after the polarity inversion is equal to or longer than a horizontal display period obtained by subtracting a horizontal blanking period from a horizontal period.

With the arrangement or the method, among gate-on pulses applied after the moment of polarity inversion, the gate-on pulse nearest to the moment of polarity inversion is gated on after not less than one horizontal display period has elapsed from the moment of polarity inversion. A data signal to be applied on a data signal line is normally designed to have a signal waveform that allows a pixel to be charged within one horizontal display period. Consequently, at a moment after not less than one horizontal display period has elapsed, the influence of rounding of a data signal waveform that is caused at the moment of polarity inversion is subdued. This prevents a pixel from being charged during a period in which rounding of a data signal waveform that is caused at the moment of polarity inversion is great. This allows a high-quality display with subdued display unevenness.

The liquid crystal display device of the present invention may be arranged so that the scanning signal driving section applies gate-on pulses such that a period from a moment of polarity inversion of a data signal to a moment of an application start of a gate-on pulse nearest to the moment of the polarity inversion among gate-on pulses applied after the polarity inversion is equal to or less than 0.8 msec.

With the arrangement, a gate-on pulse nearest to the moment of the polarity inversion among gate-on pulses applied after the polarity inversion is gated on after a predetermined time has elapsed from the moment of polarity inversion. In this case, discrepancy in display timing occurs between a pixel on a scanning signal line at which display is performed before polarity inversion and a pixel on a scanning signal line at which display is performed after polarity inversion. If the discrepancy is more than 0.8 msec, tearing is likely to be seen as shown in the later-mentioned sensory evaluation. Therefore, if a period from a moment of polarity inversion of a data signal to a moment of an application start of a gate-on pulse nearest to the moment of the polarity inversion among gate-on pulses applied after the polarity inversion is equal to or less than 0.8 msec as described above, it is possible to display excellently without the problem of tearing.

The liquid crystal display device of the present invention may be arranged so that the scanning signal driving section applies gate-on pulses on all of the scanning signal lines such that each of the gate-on pulses has a same pulse width.

With the arrangement, gate-on pulses having the same pulse are applied on individual scanning signal lines, and consequently conditions under which individual pixels are charged get equal. This allows more even display throughout the display screen, resulting in higher display quality.

The liquid crystal display device of the present invention may be arranged so that the scanning signal lines are divided into one or more blocks, and scanning signal lines included in each block are divided into plural groups, the scanning signal driving section sequentially scans blocks of scanning signal lines and sequentially scans groups of scanning signal lines in each block such that the scanning signal lines in each block are interlace-scanned, and the data signal driving section applies data signals on the data signal lines such that a polarity of a data signal is inverted at a moment of switching groups of scanning signal lines to be scanned.

With the arrangement, since the interlace scan is designed such that the polarity of a voltage applied on a pixel appears to be inverted with respect to each one line, the interlace scan allows reducing flickers compared with the progressive scan, and allows reducing display unevenness due to coupling capacitance of adjacent pixels in longitudinal direction. By subduing such problems, the length of a polarity inversion cycle can be made longer in the interlace scan than in the progressive scan. This makes it easier to reduce power consumption and to prevent a data signal driving section from being heated.

The liquid crystal display device of the present invention may be arranged so that the number of the blocks of scanning signal lines is one.

With the arrangement, it is possible to realize driving in which the polarity of a data signal is inverted with respect to each data signal line. Further, since a row at which the polarity is inverted is positioned at an edge of a screen, display unevenness is less likely to be noticed. Further, it is easier to reduce power consumption and to prevent a data signal driving section from being heated.

The liquid crystal display device of the present invention may be arranged so that the number of the blocks of scanning signal lines is two or more.

With the arrangement, the scanning signal lines are divided into plural blocks, and scanning signal lines in each block are interlace-scanned. This configuration allows reducing a difference in scanning timing between groups in each block, compared with a configuration in which whole scanning signal lines are interlace-scanned. This allows preventing generation of combing, resulting in further higher display quality.

The liquid crystal display device of the present invention may be arranged so that scanning signal lines included in each block are divided into a first group including odd scanning signal lines and a second group including even scanning signal lines, the scanning signal driving section scans such that when a secondly scanned group of scanning signal lines in a firstly scanned block of adjacent two blocks of scanning signal lines is the first group, a firstly scanned group of scanning signal lines in a secondly scanned block of the adjacent two blocks is the first group, and when a secondly scanned group of scanning signal lines in a firstly scanned block of adjacent two blocks of scanning signal lines is the second group, a firstly scanned group of scanning signal lines in a secondly scanned block of the adjacent two blocks is the second group, and the data signal driving section inverts a polarity of a data signal when groups of scanning signal lines to be scanned in each block are switched, and does not invert a polarity of a data signal when adjacent two blocks of scanning signal lines to be scanned are switched.

With the arrangement, scanning signal lines belonging to the first group or the second group are successively scanned between one block and an adjacent block, and meanwhile the polarity inversion is not performed. This configuration allows reducing the number of polarity inversion compared with a configuration in which polarity inversion is performed when blocks of scanning signal lines are switched between adjacent two blocks. This allows reducing power consumption.

The liquid crystal display device of the present invention may be arranged so as to further include a display control circuit for supplying, to the data signal driving section, a data signal and a data signal application control signal for controlling timing with which the data signal driving section applies the data signal on a data signal line, the display control circuit not supplying the data signal application control signal to the data signal driving section during a period from a moment of polarity inversion of a data signal to a moment of an application start of a gate-on pulse nearest to the moment of the polarity inversion among gate-on pulses applied after the moment of the polarity inversion.

With the arrangement, a data signal to be written during a period from the moment of polarity inversion to the moment of an application start of a gate-on pulse nearest to the moment of the polarity inversion among gate-on pulses applied after the moment of the polarity inversion is applied during a period in which the gate-on pulse enables writing. This allows appropriate display without omitting data to be displayed.

The liquid crystal display device of the present invention may be arranged so as to further include a display control circuit for supplying, to the scanning signal driving section, a gate start pulse signal serving as a signal to be asserted only for a predetermined period with respect to each one frame period, a gate clock signal generated based on a horizontal sync signal, and a scanning signal output control signal for controlling application of a gate-on pulse, when receiving the gate start pulse signal, the scanning signal driving section sequentially applying gate-on pulses on the scanning signal lines in accordance with clocks of the gate clock signal during a period in which the scanning signal output control signal permits application of the gate-on pulses, and the display control circuit supplying the gate start pulse signal, the gate clock signal, and the scanning signal output control signal such that the gate start pulse signal, the gate clock signal, and the scanning signal output control signal correspond to individual groups of scanning signal lines.

With the arrangement, the gate start pulse signal, the gate clock signal, and the scanning signal output control signal are independently supplied, as signals corresponding to individual groups of scanning signal lines, to the scanning signal driving section. This allows setting application of a gate-on pulse with respect to each group.

The liquid crystal display device of the present invention may be arranged so that at individual moments, the display control circuit sets a scanning signal output control signal corresponding to a group to be scanned to be a state that permits application of gate-on pulses, and sets a scanning signal output control signal corresponding to a group not to be scanned to be a state that does not permit application of gate-on pulses, so as to cause the scanning signal driving section to perform driving by the interlace scan.

With the arrangement, by controlling scanning signal output control signals corresponding to individual groups so as to perform driving by interlace scan, it is possible to realize interlace scan.

The liquid crystal display device of the present invention may be arranged so that at the moment of the polarity inversion of a data signal, the display control circuit keeps, at a predetermined value, a gate clock signal corresponding to a group not to be scanned after the moment of the polarity inversion.

With the arrangement, the scanning signal driving section does not scans scanning signal lines corresponding to a group not to be scanned after the moment of the polarity inversion of a data signal. This realizes appropriate interlace scan. When keeping a gate clock signal at a predetermined value, the gate clock signal may be set to the value while the gate clock signal is asserted (H level), or the gate clock signal may be set to the value while the gate clock signal is negated (L level) (which will be mentioned later).

The liquid crystal display device of the present invention may be arranged so that during a predetermined period after the moment of the polarity inversion, the display control circuit keeps, at a predetermined value, a gate clock signal corresponding to a group to be scanned after the moment of the polarity inversion, so as to secure a period from the moment of the polarity inversion to a moment of an application start of a gate-on pulse nearest to the moment of the polarity inversion.

With the arrangement, by stopping a clock of a gate clock signal, a period from the moment of the polarity inversion to a moment of an application start of a gate-on pulse nearest to the moment of the polarity inversion among gate-on pulses applied after the moment of the polarity inversion is secured. This allows controlling application of a gate-on pulse appropriately with respect to each group.

The liquid crystal display device of the present invention may be arranged so that the scanning signal driving section includes shift registers respectively corresponding to individual groups of scanning signal lines and AND logic operation sections respectively corresponding to scanning signal lines, each of the shift registers receive a gate start pulse signal and a gate clock signal that correspond to a group of scanning signal lines, and the AND logic operation section performs AND logic operation of an output of said each of the shift registers and logic inversion of the scanning signal output control signal, and supplies a result of the AND logic operation as a gate-on pulse to the scanning signal lines.

With the arrangement, using relatively simple configurations of the shift registers and the AND logic operation sections, it is possible to appropriately perform driving by interlace scan.

The liquid crystal display device of the present invention may be arranged so that the scanning signal driving section applies gate-on pulses such that in each of the blocks of scanning signal lines, a time from a moment of application of a gate-on pulse on a scanning signal line that is one of adjacent scanning signal lines and that belongs to one group to a moment of application of a gate-on pulse on a scanning signal line that is the other of the adjacent scanning signal lines and that belongs to a group other than said one group is equal to or less than 0.8 Msec.

With the arrangement, when scanning individual blocks, individual groups in each block are sequentially scanned so as to perform driving by interlace scan. In this case, a certain blanking period occurs from a moment of application of a gate-on pulse on a scanning signal line that is one of adjacent scanning signal lines and that belongs to one group to a moment of application of a gate-on pulse on a scanning signal line that is the other of the adjacent scanning signal lines and that belongs to a group other than said one group. If the blanking period is longer than 0.8 msec, combing is likely to be seen as shown in the later-mentioned sensory analysis. Therefore, setting the blanking period to be 0.8 msec or less as in the above arrangement enables excellent display with little combing.

The liquid crystal display device of the present invention may be arranged so as to further include a display control circuit for supplying, to the data signal driving section, a data signal and a data signal application control signal for controlling timing with which the data signal driving section applies the data signal on a data signal line, a plurality of video data that respectively correspond to data signal lines being sequentially supplied from an external signal source to the display control circuit with an interval between the plurality of video data, and the display control circuit regards certain number of video data as a set in accordance with polarity inversion, inserts dummy data at a predetermined position of the set, assigns a dummy insertion period to an output of a signal potential corresponding to the dummy data, and assigns a horizontal period shorter than the interval to an output of a signal potential corresponding to each video data.

By setting one horizontal period during which a signal potential corresponding to individual video data is output to be shorter than an interval for inputting individual video data (horizontal period set to input data sequence) as described above, it is possible to create, from the sum total of times resulting from the shortening, a dummy insertion period for outputting dummy data. This allows inserting dummy data to input video data and assigning a dummy insertion period to the dummy data, without increasing a vertical display period. Further, it is also possible to prevent an increase in difference of time between data input and data output, allowing reduction of memory (buffer) usage.

The liquid crystal display device of the present invention may be arranged so that a product of the number of video data in a set and the interval is equal to a sum of a whole dummy insertion period assigned to dummy data in the set and a whole horizontal period assigned to the video data in the set.

This allows providing (inserting) a dummy insertion period without changing a vertical display period (without reducing a vertical blanking period). Further, since difference of time between data input and data output does not increase, it is possible to further reduce memory (buffer) usage.

The liquid crystal display device of the present invention may be arranged so that the display control circuit inserts dummy data at a head of each set.

This enables accurate display without skip of data, even when the liquid crystal display device is designed such that a pixel is not charged during a period in which the rounding of a data signal waveform due to polarity inversion is great.

The liquid crystal display device of the present invention may be arranged so as to further include a display control circuit for supplying, to the data signal driving section, a data signal and a data signal application control signal for controlling timing with which the data signal driving section applies the data signal on a data signal line, a plurality of video data that respectively correspond to data signal lines being sequentially supplied from an external signal source to the display control circuit with an interval between the plurality of video data, and the display control circuit regards certain number of video data as a set in accordance with polarity inversion, assigns one or more dummy insertion periods as well as one horizontal period to an output of a signal potential corresponding to predetermined video data in each set, and assigns a horizontal period shorter than the interval to outputs of signal potentials respectively corresponding to individual video data other than the predetermined video data in each set.

By setting one horizontal period in an actual output to be shorter than an interval for inputting individual video data (horizontal period set to input data sequence) as described above, it is possible to create, from the sum total of times resulting from the shortening, a time for a dummy insertion period. This allows providing a dummy insertion period, without increasing a vertical display period. Further, it is also possible to prevent an increase in difference of time between data input and data output, allowing reduction of memory (buffer) usage.

The liquid crystal display device of the present invention may be arranged so that a product of the number of video data in each set and the interval is equal to a sum of a whole horizontal period assigned to the predetermined video data in each set, a whole dummy insertion period assigned to the predetermined video data in each set, and a whole horizontal period assigned to the individual video data other than the predetermined video data in each set.

This allows providing a dummy scanning period without changing a vertical display period (without reducing a vertical blanking period). Further, since difference of time between data input and data output does not increase, it is possible to further reduce memory (buffer) usage.

The liquid crystal display device of the present invention may be arranged so that the predetermined video data in each set is first data in each set.

This enables accurate display without skip of data, even when the liquid crystal display device is designed such that a pixel is not charged during a period in which the rounding of a data signal waveform due to polarity inversion is great.

The liquid crystal display device of the present invention may be arranged so that the dummy insertion period is shorter than the interval.

The liquid crystal display device of the present invention may be arranged so that the dummy insertion period is equal to one horizontal period. This makes individual scanning periods (dummy insertion period, horizontal period) equal with one another, simplifying a signal process or a configuration for the signal process.

The liquid crystal display device of the present invention may be arranged so that the dummy insertion period is shorter than one horizontal period. This allows a horizontal period to be longer, resulting in a higher charging ratio of a pixel.

The liquid crystal display device of the present invention may be arranged so that the dummy insertion period is longer than one horizontal period. Consequently, in a configuration in which the polarity of a signal potential is inverted with respect to each set, it is possible to increase a charging ratio of a data signal line right after polarity inversion.

The liquid crystal display device of the present invention may be arranged so that the scanning signal driving section provides: a main charging period in which the scanning signal driving section causes one of the scanning signal lines to be in a selected state such that the data signal lines apply voltages on individual pixels; and a pre-charging period in which the scanning signal driving section causes said one of the scanning signal lines to be in a selected state before the main charging period.

In a case where it is necessary to set a horizontal scanning period to be shorter in order to increase a scanning frequency for example, a pulse width of a gate-on pulse is also shortened, which shortens a time for charging individual pixels, resulting in insufficient charge. On the other hand, with the arrangement of the present invention, a pixel is charged during the pre-charging period and the main charging period, and therefore it is possible to further increase a charging ratio of a pixel.

The liquid crystal display device of the present invention may be arranged so that the scanning signal driving section provides the pre-charging period and the main charging period such that the pre-charging period is equal among all of the scanning signal lines and the main charging period is equal among all of the scanning signal lines.

With the arrangement, the length of a charging period is equal among all of the scanning signal lines, and therefore it is possible to prevent display unevenness caused when charging periods are different among scanning signal lines.

The liquid crystal display device of the present invention may be arranged so as to further include a display control circuit for supplying, to the scanning signal driving section, a gate start pulse signal serving as a signal to be asserted only for a predetermined period with respect to each one frame period, a gate clock signal generated based on a horizontal sync signal, and a scanning signal output control signal for controlling application of a gate-on pulse, when receiving the gate start pulse signal, the scanning signal driving section sequentially applies gate-on pulses on the scanning signal lines in accordance with clocks of the gate clock signal during the pre-charging period that is a period in which the scanning signal output control signal permits application of the gate-on pulses, and the scanning signal driving section sequentially applies gate-on pulses on the scanning signal lines in accordance with clocks of the gate clock signal during the main charging period.

A scanning signal driving device of an active-matrix liquid crystal display device including scanning signal lines extending in a row direction, data signal lines extending in a column direction, pixels provided so as to respectively correspond to intersections of the scanning signal lines and the data signal lines, and a data signal driving section for applying data signals on the data signal lines such that a polarity of a data signal is inverted with respect to predetermined plural number of horizontal periods in one frame period, the scanning signal driving device sequentially applying gate-on pulses on the scanning signal lines, each of the gate-on pulses causing a scanning signal line to be in a selected state, the scanning signal driving device providing: a main charging period in which the scanning signal driving device causes one of the scanning signal lines to be in a selected state such that the data signal lines apply voltages on individual pixels; and a pre-charging period in which the scanning signal driving device causes said one of the scanning signal lines to be in a selected state before the main charging period, the scanning signal driving device receiving, from outside, a gate start pulse signal serving as a signal to be asserted only for a predetermined period with respect to each one frame period, a gate clock signal generated based on a horizontal sync signal, and a scanning signal output control signal for controlling application of a gate-on pulse, when receiving the gate start pulse signal, the scanning signal driving section sequentially applies gate-on pulses on the scanning signal lines in accordance with clocks of the gate clock signal during the pre-charging period that is a period in which the scanning signal output control signal permits application of the gate-on pulses, and the scanning signal driving section sequentially applies gate-on pulses on the scanning signal lines in accordance with clocks of the gate clock signal during the main charging period.

In a case where it is necessary to set a horizontal scanning period to be shorter in order to increase a scanning frequency for example, a pulse width of a gate-on pulse is also shortened, which shortens a time for charging individual pixels, resulting in insufficient charge. On the other hand, with the arrangement of the present invention, a pixel is charged during the pre-charging period and the main charging period, and therefore it is possible to further increase a charging ratio of a pixel.

The pre-charging period is set in accordance with the scanning signal output control signal, whereas the main charging period is set in accordance with the gate clock signal, without being influenced by the scanning signal output control signal. By configuring the present invention such that the pre-charging period is set in one scanning signal line and the main charging period is set in the other scanning signal line, it is possible to drive the liquid crystal display device so that the pre-charging period and the main charging period overlaps and the pre-charging period and the main charging period can be independently set.

The liquid crystal display device of the present invention may be arranged so that the display control circuit further supplies to the scanning signal driving section a selection signal for selecting one of two states, when the scanning signal driving section receives the gate start pulse signal, if one of the two states is selected in response to the selection signal, the scanning signal driving section sequentially applies gate-on pulses on the scanning signal lines in accordance with clocks of the gate clock signal during the pre-charging period that is a period in which the scanning signal output control signal permits application of the gate-on pulses, and if the other of the two states is selected in response to the selection signal, the scanning signal driving section sequentially applies gate-on pulses on the scanning signal lines in accordance with clocks of the gate clock signal during the main charging period.

The scanning signal driving device of the present invention may be arranged so that the scanning signal driving device further receives, from an outside, a selection signal for selecting one of two states, when the scanning signal driving device receives the gate start pulse signal, if one of the two states is selected in response to the selection signal, the scanning signal driving section sequentially applies gate-on pulses on the scanning signal lines in accordance with clocks of the gate clock signal during the pre-charging period that is a period in which the scanning signal output control signal permits application of the gate-on pulses, and if the other of the two states is selected in response to the selection signal, the scanning signal driving section sequentially applies gate-on pulses on the scanning signal lines in accordance with clocks of the gate clock signal during the main charging period.

With the arrangement, the pre-charging period and the main charging period are switched in accordance with a state of the selection signal. By configuring the present invention such that the pre-charging period is set in one scanning signal line and the main charging period is set in the other scanning signal line when the selection signal is in one state, it is possible to drive the liquid crystal display device so that the pre-charging period and the main charging period overlaps and the pre-charging period and the main charging period can be independently set.

The liquid crystal display device of the present invention may be arranged so that the scanning signal driving section includes shift registers and sets of a first AND logic operation section, a second AND logic operation section, a third AND logic operation section, and a first OR logic operation section, said sets respectively corresponding to individual stages of the shift registers, the gate start pulse signal, the gate clock signal, the scanning signal output control signal, and the selection signal are supplied to each of the registers, in an odd stage of the shift registers, the first AND logic operation section receives the scanning signal output control signal and a logic inversion signal of the selection signal, the second AND logic operation section receives the gate clock signal and the selection signal, the first OR logic operation section receives outputs of the first AND logic operation section and the second AND logic operation section, the third AND logic operation section receives a logic inversion signal of an output of the first OR logic operation section and an output signal from an odd stage of the shift registers, and a result of this operation is supplied as a gate-on pulse to individual scanning signal lines, and in an even stage of the shift registers, the first AND logic operation section receives the scanning signal output control signal and the selection signal, the second AND logic operation section receives the gate clock signal and a logic inversion signal of the selection signal, the first OR logic operation section receives outputs of the first AND logic operation section and the second AND logic operation section, the third AND logic operation section receives a logic inversion signal of an output of the first OR logic operation section and an output signal from an even stage of the shift registers, and a result of this operation is supplied as a gate-on pulse to individual scanning signal lines.

The scanning signal driving device of the present invention may be arranged so that the scanning signal driving device includes shift registers and sets of a first AND logic operation section, a second AND logic operation section, a third AND logic operation section, and a first OR logic operation section, said sets respectively corresponding to individual stages of the shift registers, the gate start pulse signal, the gate clock signal, the scanning signal output control signal, and the selection signal are supplied to each of the registers, in an odd stage of the shift registers, the first AND logic operation section receives the scanning signal output control signal and a logic inversion signal of the selection signal, the second AND logic operation section receives the gate clock signal and the selection signal, the first OR logic operation section receives outputs of the first AND logic operation section and the second AND logic operation section, the third AND logic operation section receives a logic inversion signal of an output of the first OR logic operation section and an output signal from an odd stage of the shift registers, and a result of this operation is supplied as a gate-on pulse to individual scanning signal lines, and in an even stage of the shift registers, the first AND logic operation section receives the scanning signal output control signal and the selection signal, the second AND logic operation section receives the gate clock signal and a logic inversion signal of the selection signal, the first OR logic operation section receives outputs of the first AND logic operation section and the second AND logic operation section, the third AND logic operation section receives a logic inversion signal of an output of the first OR logic operation section and an output signal from an even stage of the shift registers, and a result of this operation is supplied as a gate-on pulse to individual scanning signal lines.

With the arrangement, it is possible to appropriately perform the aforementioned driving using relatively simple configurations of the shift register, the AND logic operation section, and the OR logic operation section.

The liquid crystal display device of the present invention may be arranged so that the scanning signal driving section includes a first flip-flop, a second flip-flop, a first output mask, a second output mask, and an OR logic operation section, the first flip-flop receives the gate start pulse signal and outputs a first output signal based on the gate clock signal, the second flip-flop receives the first output signal and outputs a second output signal based on the gate clock signal, the first output mask outputs a signal obtained by masking the first output signal with use of the scanning signal output control signal, the second output mask outputs the second output signal only during a period in which the gate clock signal is in L level, and the OR logic operation section outputs, as a gate-on pulse, a result of OR logic operation of the signal from the first output mask and the signal from the second output mask to individual scanning signal lines.

The scanning signal driving device of the present invention may be arranged so that the scanning signal driving device includes a first flip-flop, a second flip-flop, a first output mask, a second output mask, and an OR logic operation section, the first flip-flop receives the gate start pulse signal and outputs a first output signal based on the gate clock signal, the second flip-flop receives the first output signal and outputs a second output signal based on the gate clock signal, the first output mask outputs a signal obtained by masking the first output signal with use of the scanning signal output control signal, the second output mask outputs the second output signal only during a period in which the gate clock signal is in L level, and the OR logic operation section outputs, as a gate-on pulse, a result of OR logic operation of the signal from the first output mask and the signal from the second output mask to individual scanning signal lines.

With the arrangement, it is possible to appropriately perform the aforementioned driving using relatively simple configurations of the flip-flop, the mask, and the OR logic operation section.

Further, it is possible to produce a television receiver including the liquid crystal display device of the present invention and a tuner section for receiving television broadcasting.

BRIEF DESCRIPTION OF DRAWINGS

FIG. 1 is a block diagram showing a configuration of a liquid crystal display device in accordance with one embodiment of the present invention and an equivalent circuit of a display section of the liquid crystal display device.

FIG. 2 is a timing chart showing a data signal waveform, a data signal, a latch strobe signal, and a gate-on pulse in driving by progressive scan where the polarity of a data signal voltage is inverted with respect to every 10 rows and where one horizontal period right after the polarity inversion is regarded as a dummy insertion period.

FIG. 3 is a timing chart showing a data signal waveform, a data signal, a latch strobe signal, and a gate-on pulse in driving by progressive scan where the polarity of a data signal voltage is inverted with respect to every 10 rows and where two horizontal periods right after the polarity inversion are regarded as a dummy insertion period.

FIG. 4 is a timing chart showing a data signal waveform, a data signal, a latch strobe signal, and a gate-on pulse in driving by progressive scan where the polarity of a data signal voltage is inverted with respect to every 10 rows and where three horizontal periods right after the polarity inversion are regarded as a dummy insertion period.

FIG. 5 is a timing chart showing a data signal waveform, a data signal, a latch strobe signal, and a gate-on pulse in driving by interlace scan where the polarity of a data signal voltage is inverted with respect to every 10 rows and where one horizontal period right after the polarity inversion is regarded as a dummy insertion period.

FIG. 6 is a drawing showing frame numbers of data signals to be applied to individual lines of the gate lines in interlace scan.

Figure 7:
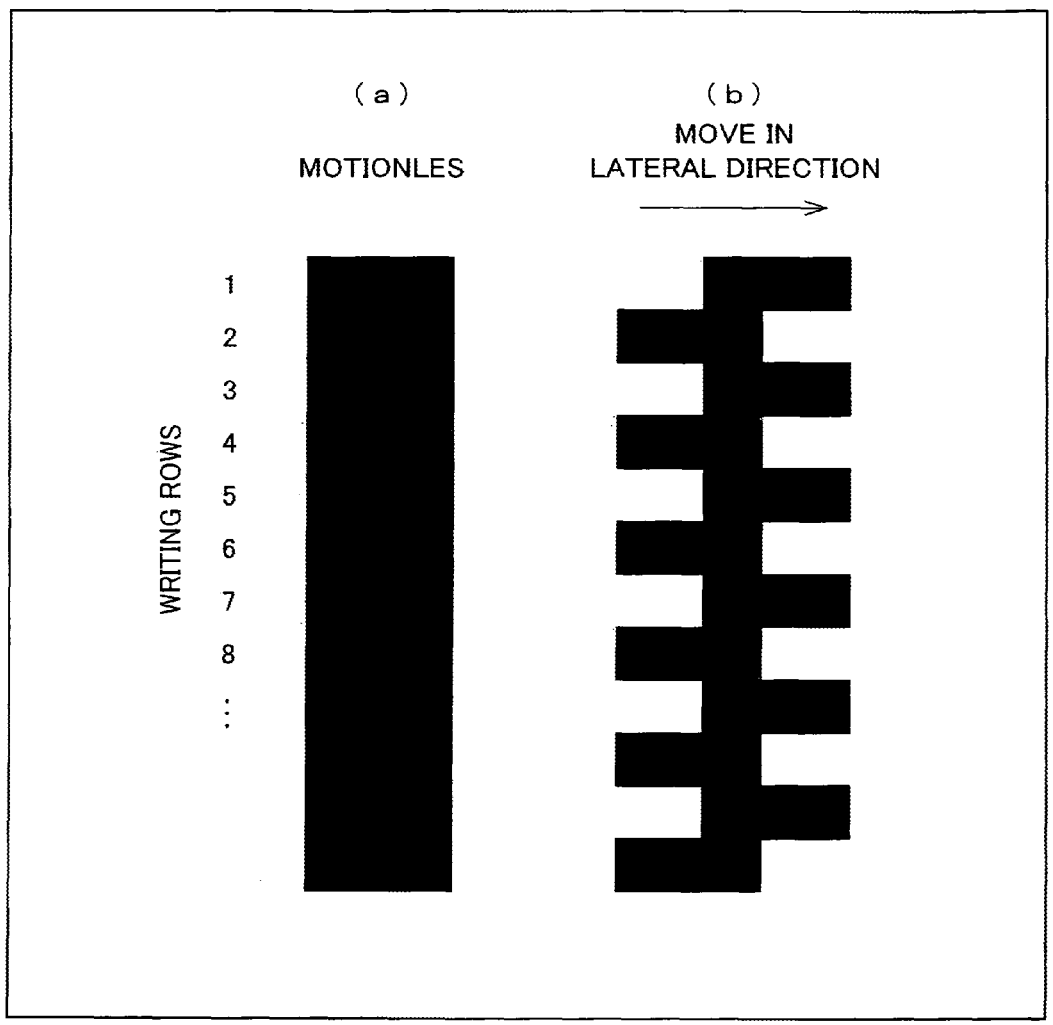
FIG. 7

(a) of FIG. 7 shows an example of an image that is longer in vertical direction than in horizontal direction. (b) of FIG. 7 shows an example of an image where combining appears.

FIG. 8

Figure 8:
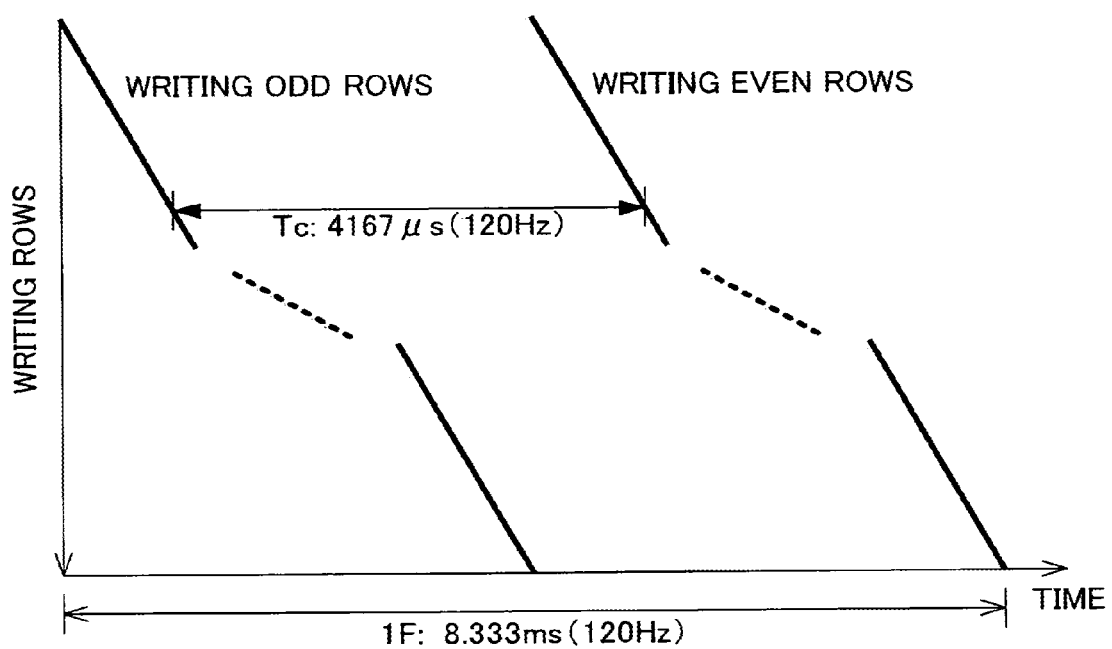

FIG. 8 schematically shows a writing operation in normal interlace scan.

FIG. 9

Figure 9:
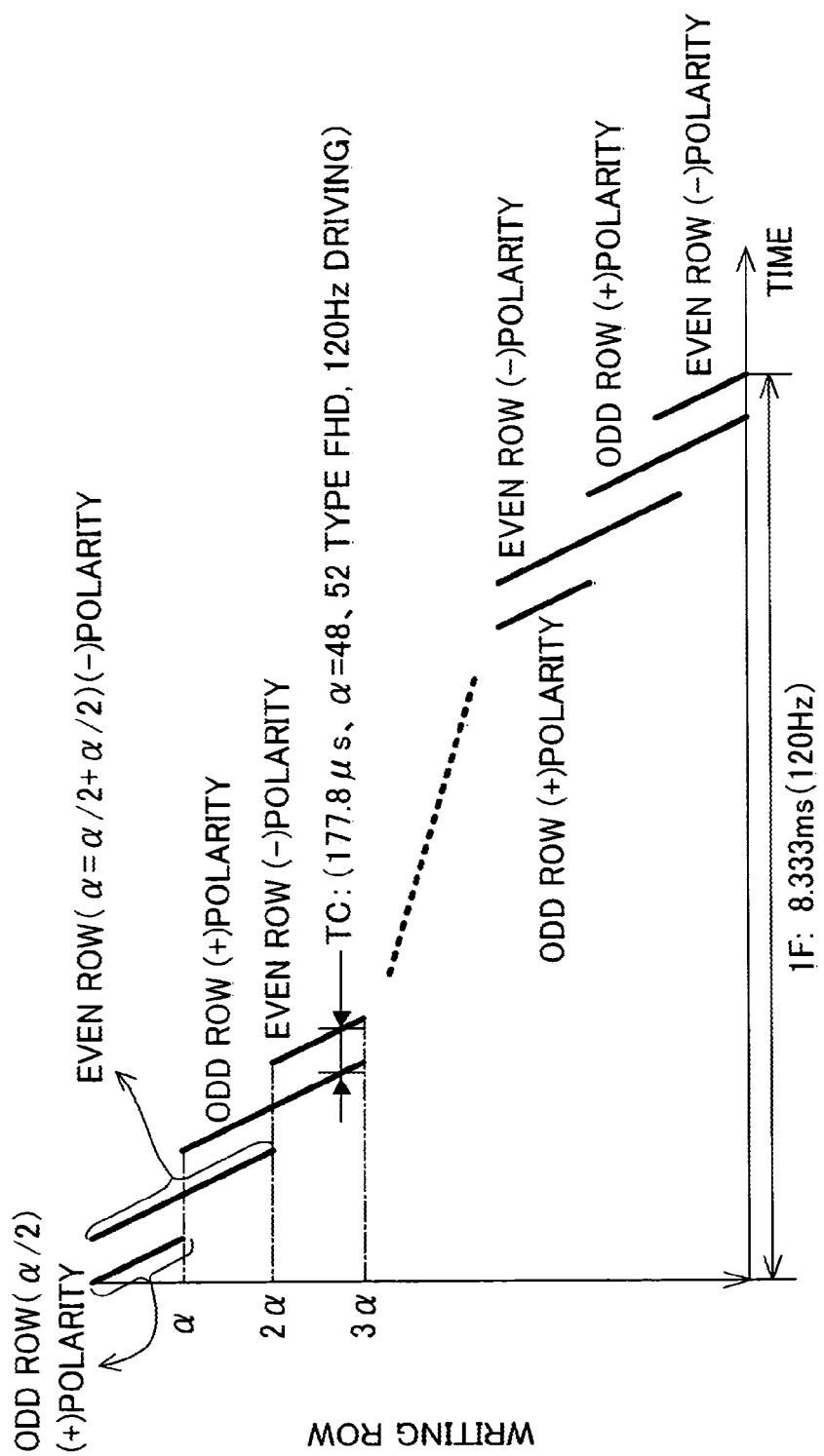

FIG. 9 schematically shows a writing operation in block-divided interlace scan.

FIG. 10

Figure 10:
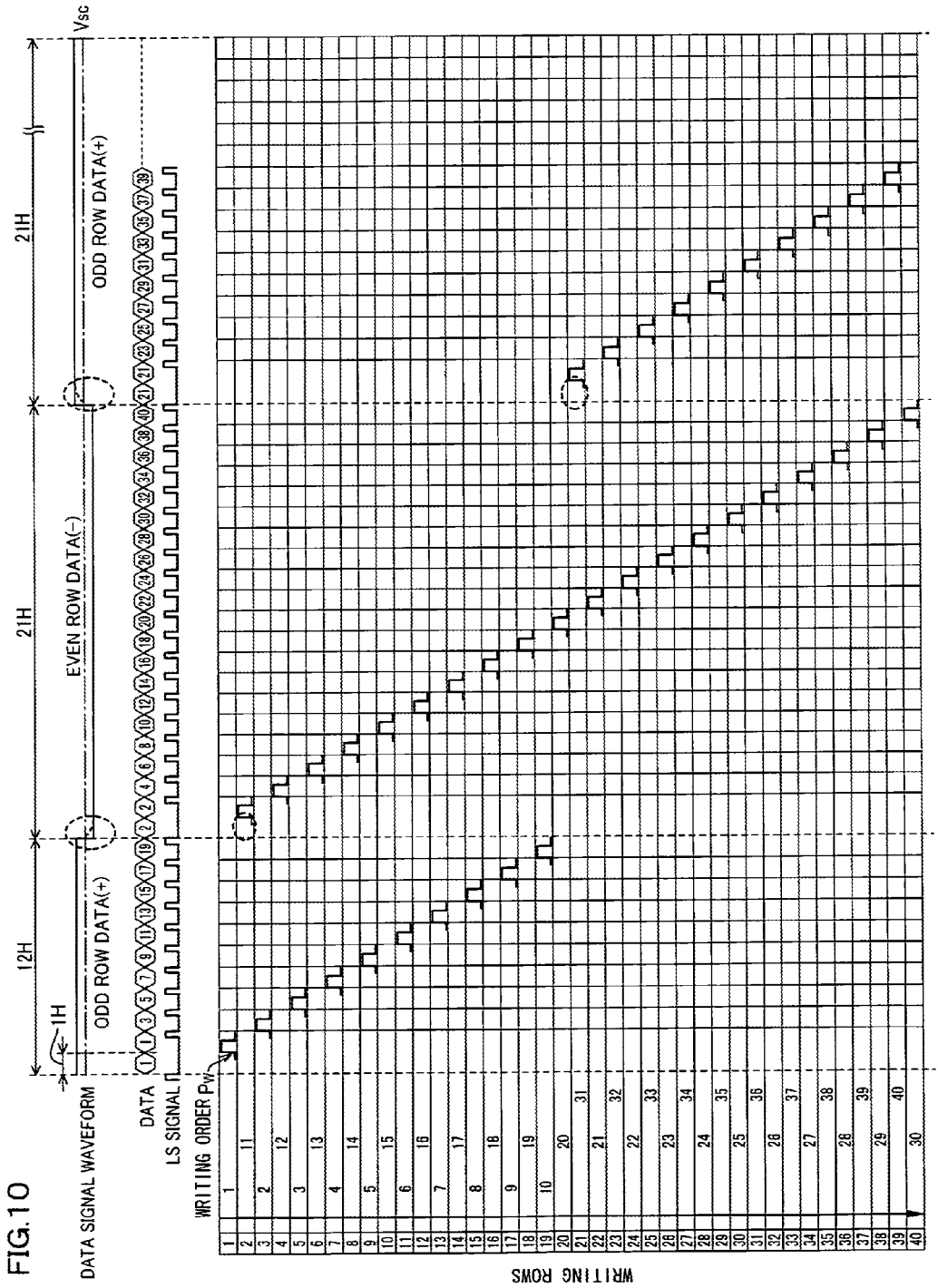

FIG. 10 shows a timing chart of a data signal waveform, a data signal, a latch strobe signal, and a gate-on pulse in driving by block-divided interlace scan where the number of scanning lines in one block is 20 and where 1 horizontal period right after polarity inversion is regarded as a dummy insertion period.

FIG. 11

Figure 11:
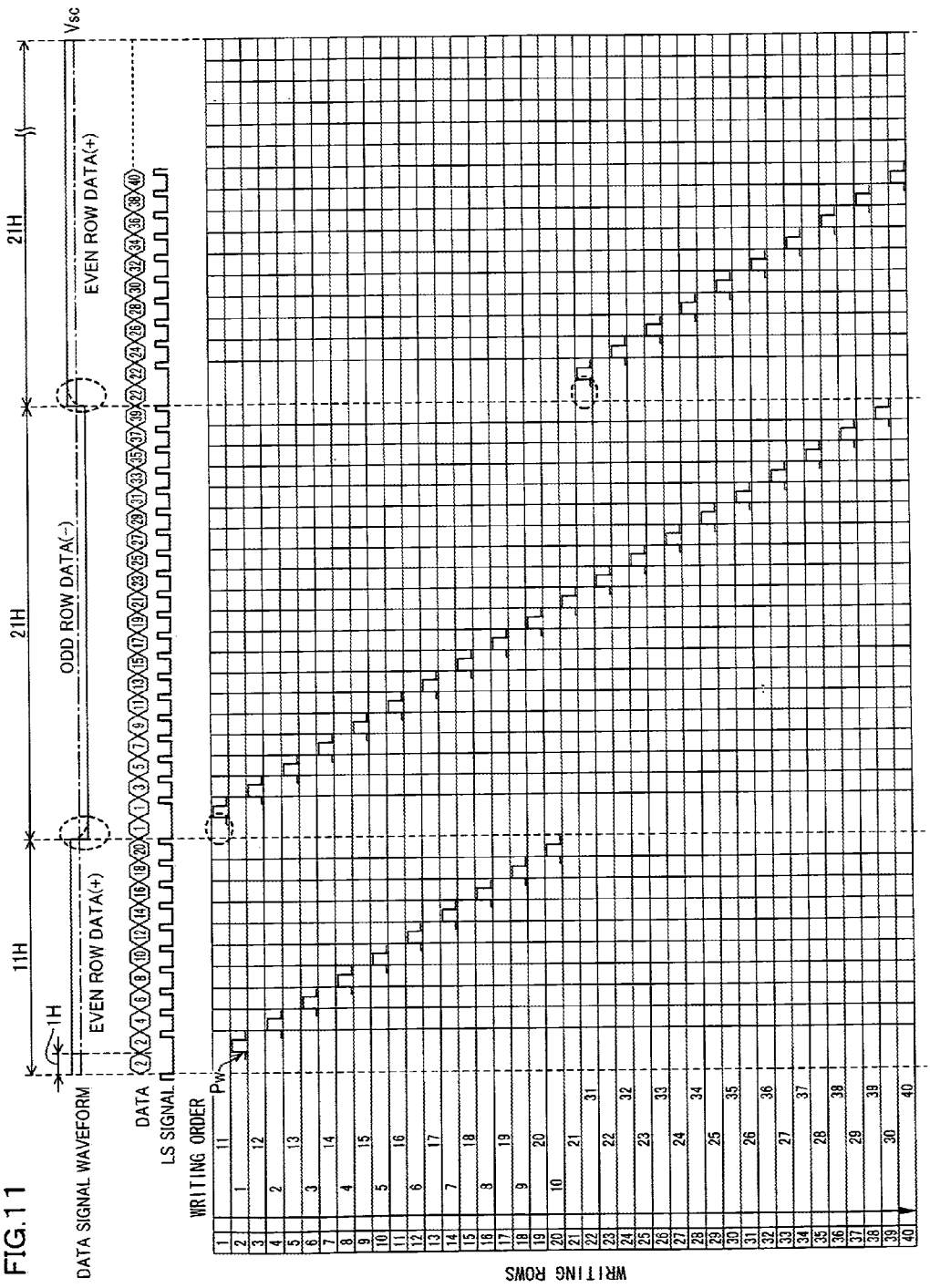

FIG. 11 shows another example of a timing chart of a data signal waveform, a data signal, a latch strobe signal, and a gate-on pulse in driving by block-divided interlace scan where the number of scanning lines in one block is 20 and where 1 horizontal period right after polarity inversion is regarded as a dummy insertion period.

FIG. 12

Figure 12:
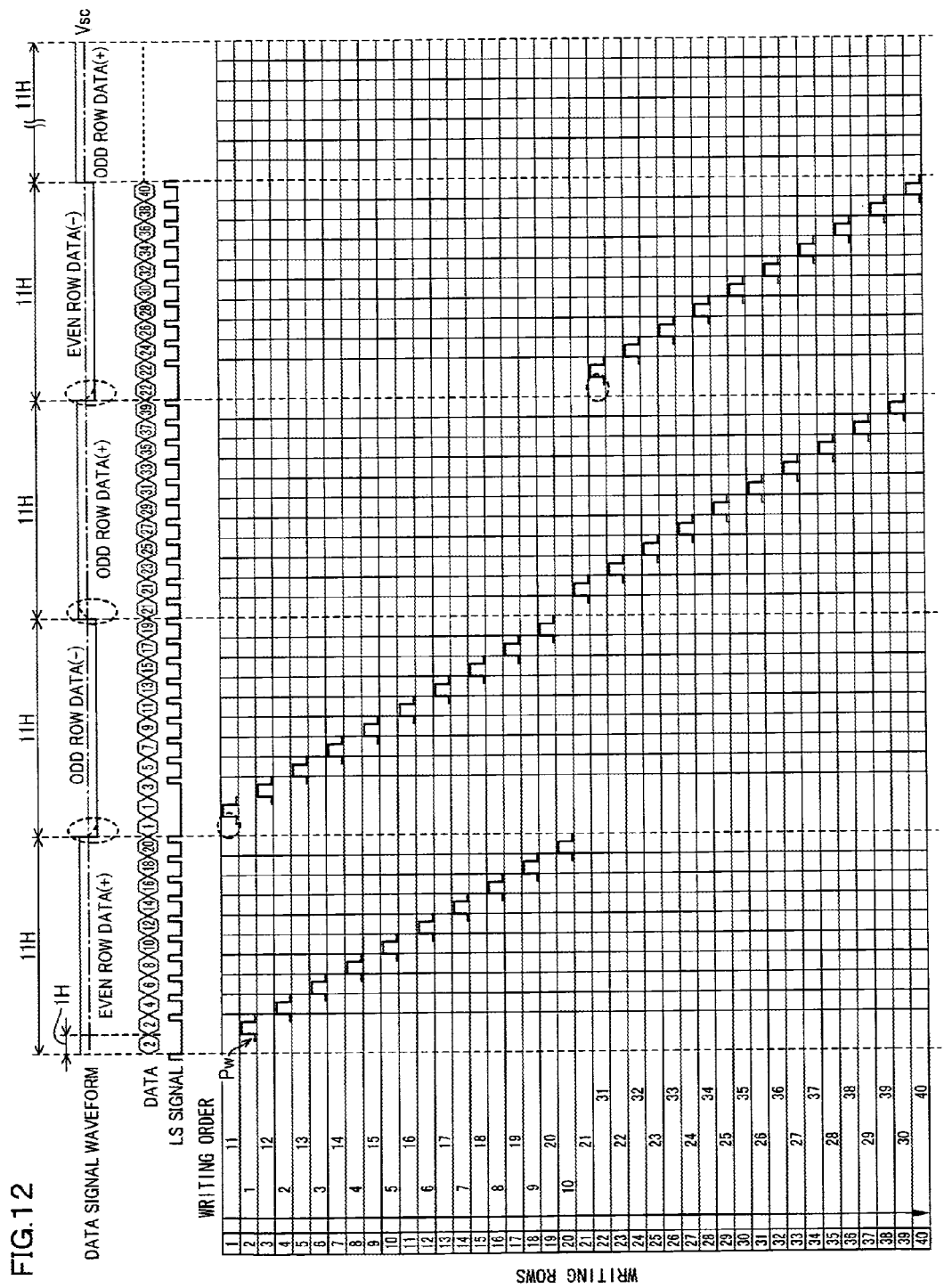

FIG. 12 shows further another example of a timing chart of a data signal waveform, a data signal, a latch strobe signal, and a gate-on pulse in driving by block-divided interlace scan where the number of scanning lines in one block is 20 and where 1 horizontal period right after polarity inversion is regarded as a dummy insertion period.

FIG. 13

Figure 13:
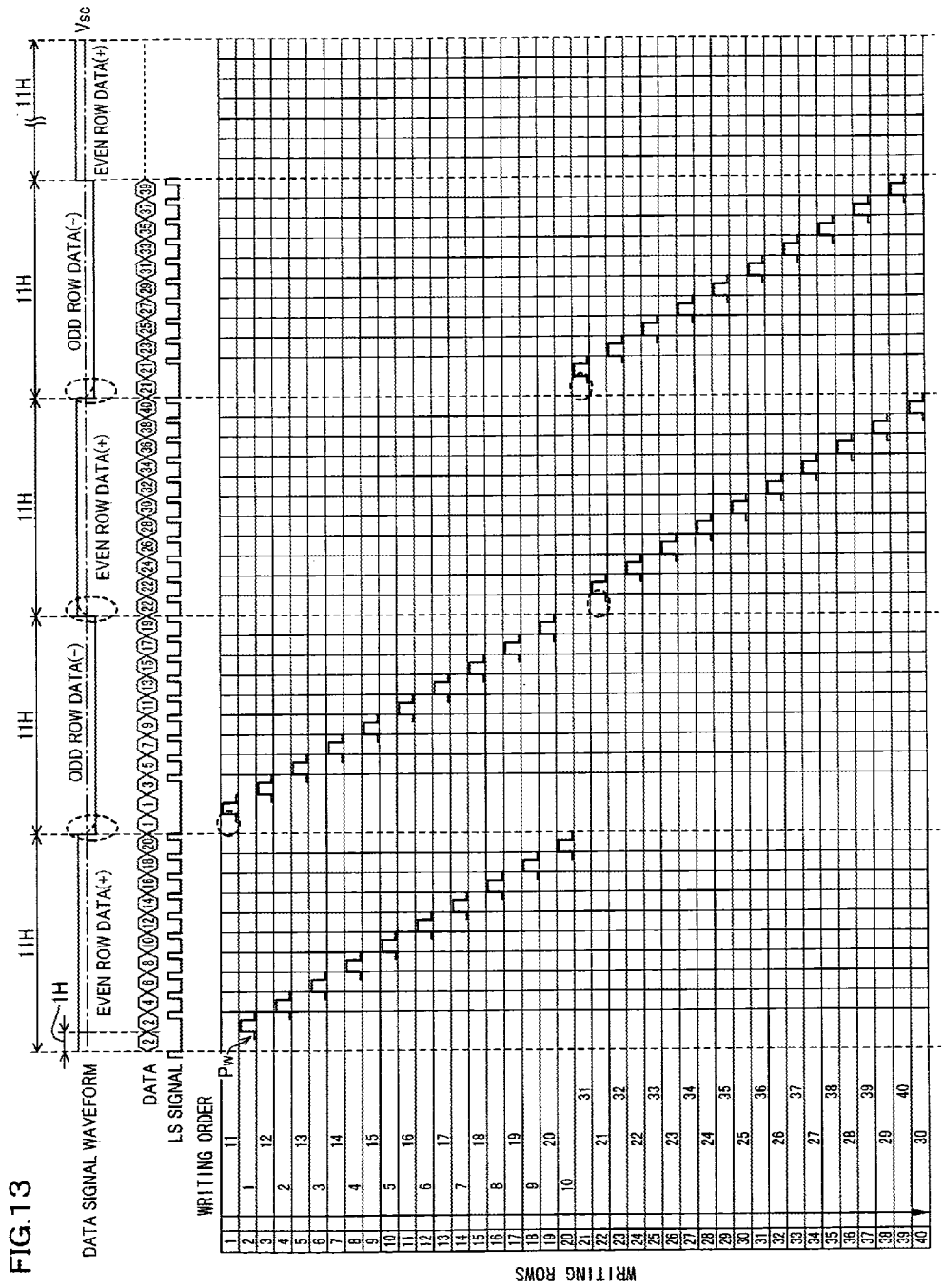

FIG. 13 shows another example of a timing chart of a data signal waveform, a data signal, a latch strobe signal, and a gate-on pulse in driving by block-divided interlace scan where the number of scanning lines in one block is 20 and where 1 horizontal period right after polarity inversion is regarded as a dummy insertion period.

FIG. 14

Figure 14:
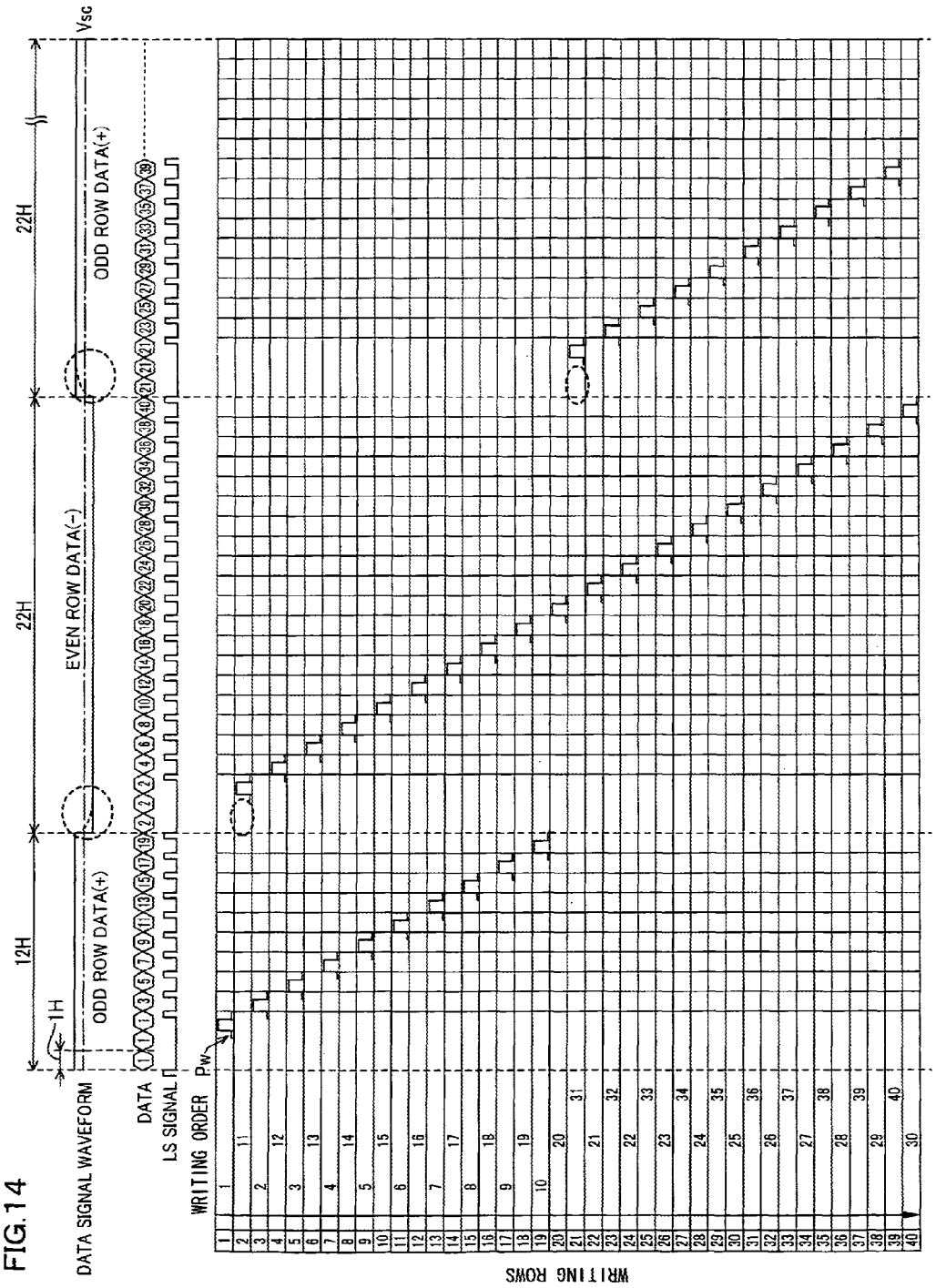

FIG. 14 shows a timing chart of a data signal waveform, a data signal, a latch strobe signal, and a gate-on pulse in driving by block-divided interlace scan where the number of scanning lines in one block is 20 and where 2 horizontal periods right after polarity inversion is regarded as a dummy insertion period.

FIG. 15

Figure 15:
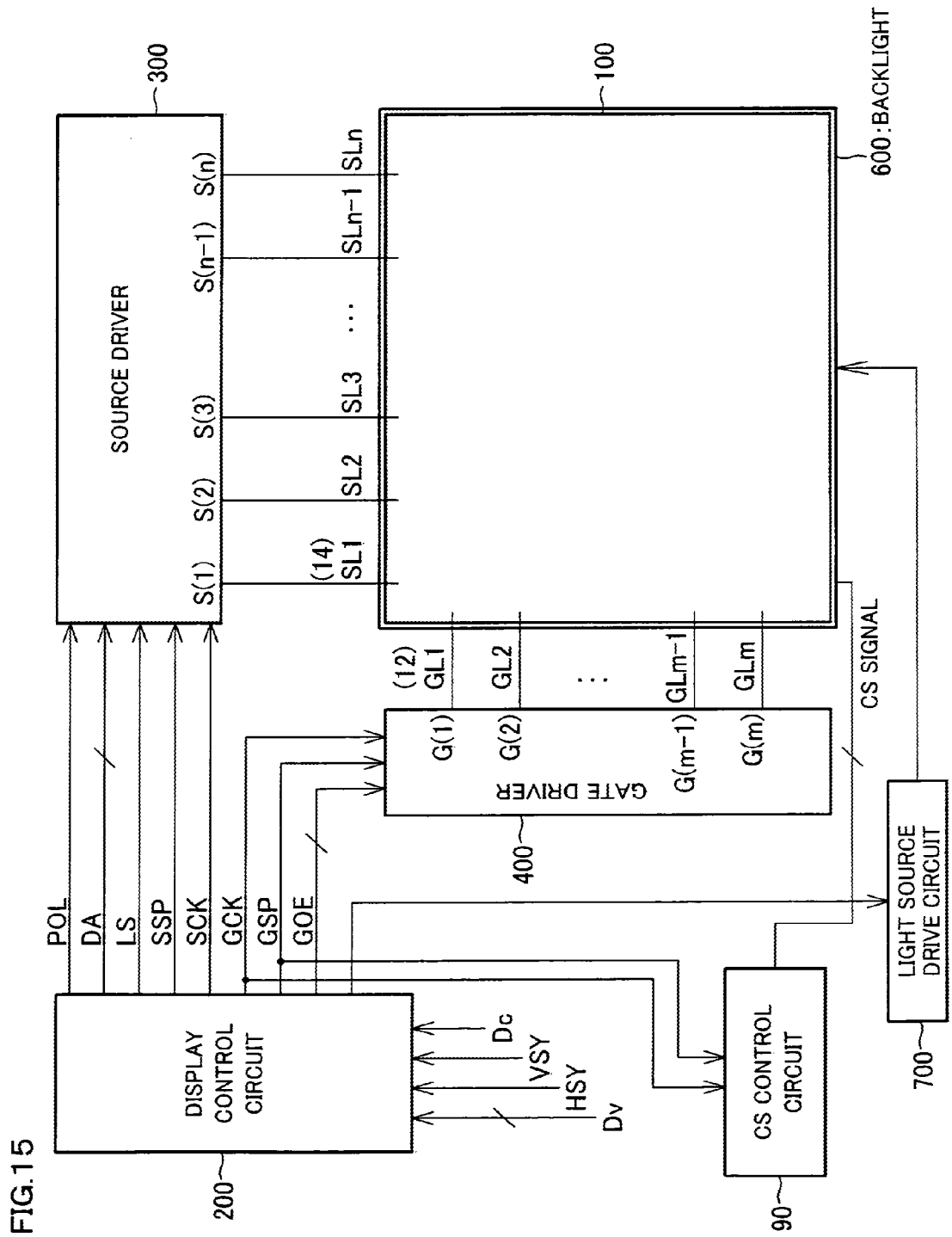

FIG. 15 is a block diagram showing a configuration of a liquid crystal display device of another embodiment of the present invention and an equivalent circuit of a display section of the liquid crystal display device.

FIG. 16

Figure 16:
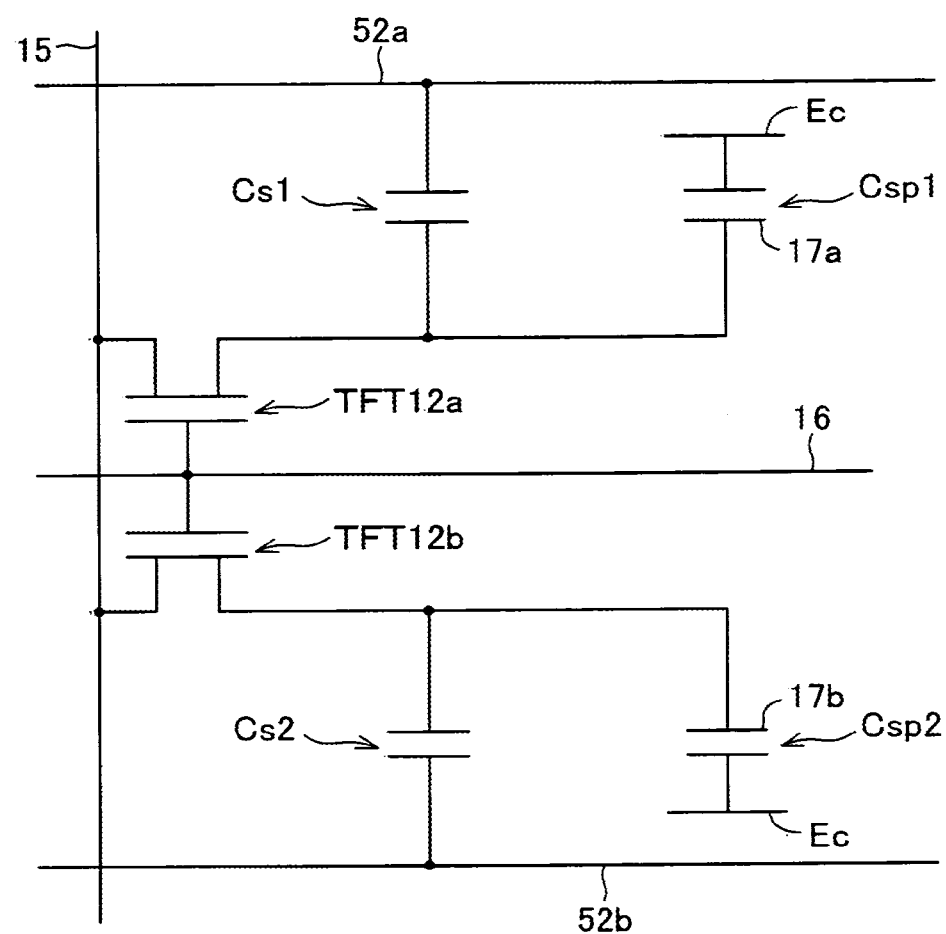

FIG. 16 schematically shows an equivalent circuit of one pixel of the liquid crystal display device in FIG. 15.

FIG. 17

Figure 17:
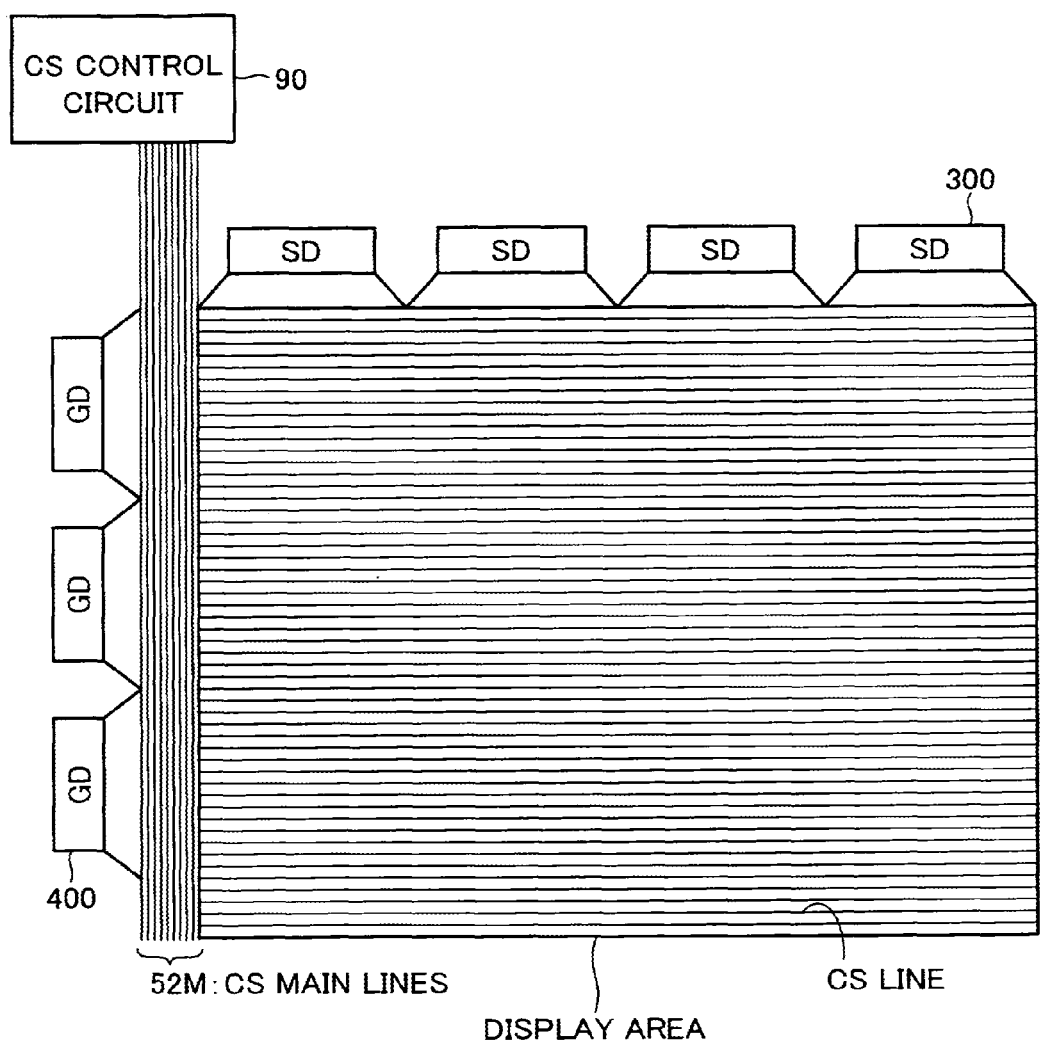

FIG. 17 illustrates how a CS control circuit, CS main lines, and CS lines.

FIG. 18

Figure 18:
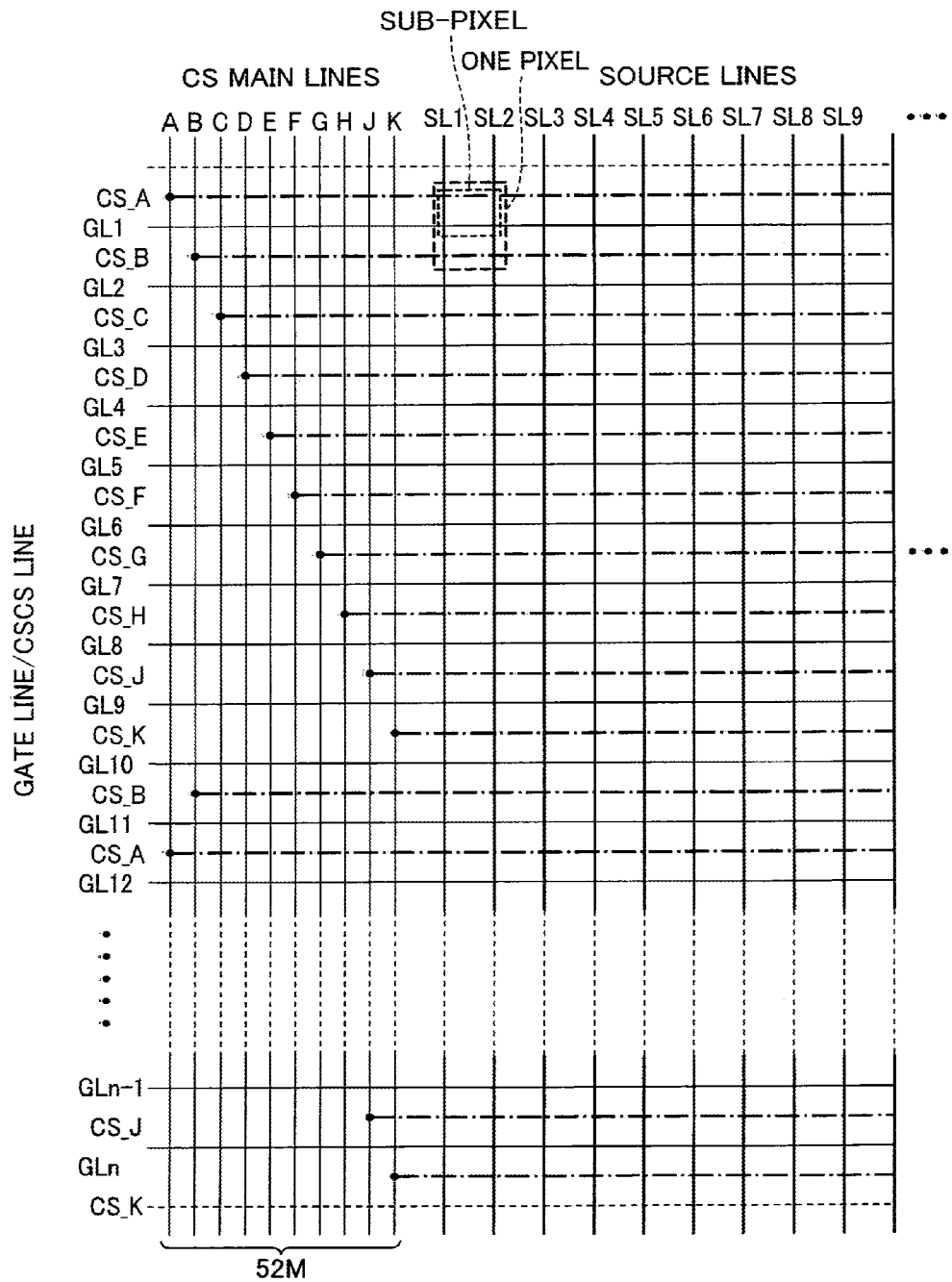

FIG. 18 details how CS main lines and CS lines are connected with one another.

FIG. 19

Figure 19:
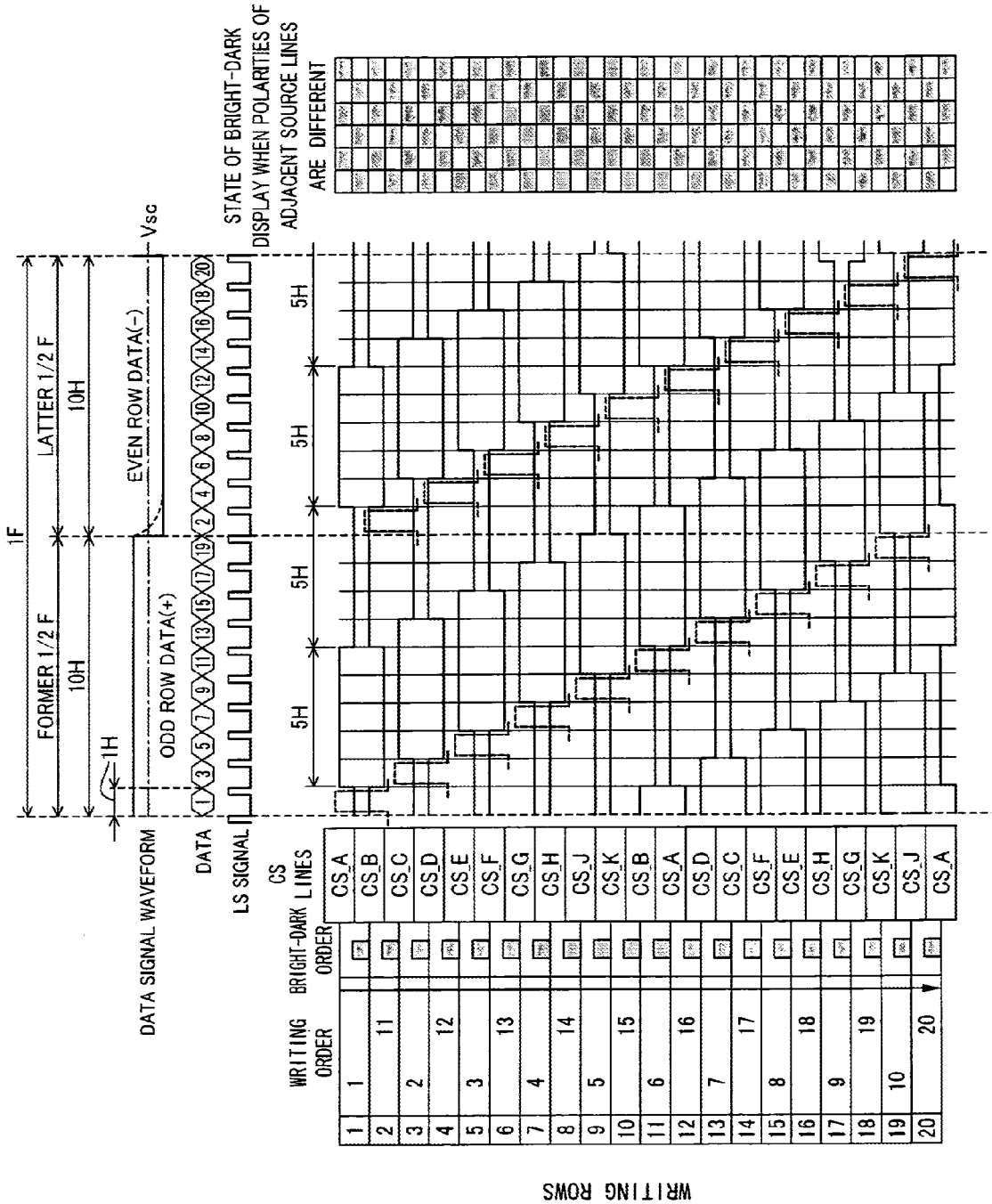

FIG. 19 is a timing chart of a data signal waveform, a data signal, a latch strobe signal, a gate-on pulse, and a CS signal in driving by interlace scan where the polarity of a data signal voltage is inversed with respect to every 10 rows.

FIG. 20

Figure 20:
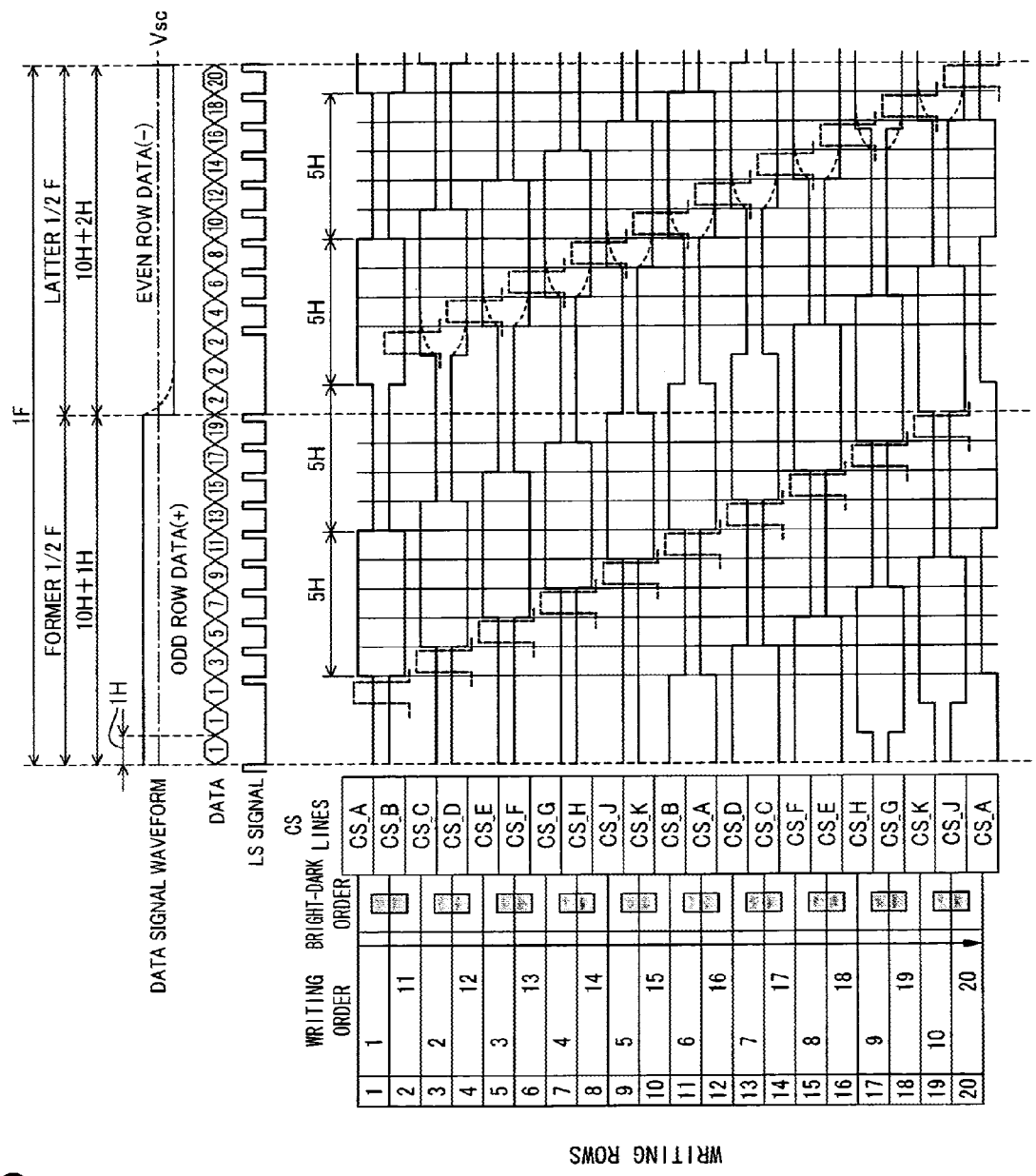

FIG. 20 shows a timing chart of a data signal waveform, a data signal, a latch strobe signal, and a gate-on pulse in driving by interlace scan where the polarity of a data signal voltage is inverted and where 2 horizontal periods right after polarity inversion are regarded as a dummy insertion period.

FIG. 21

Figure 21:
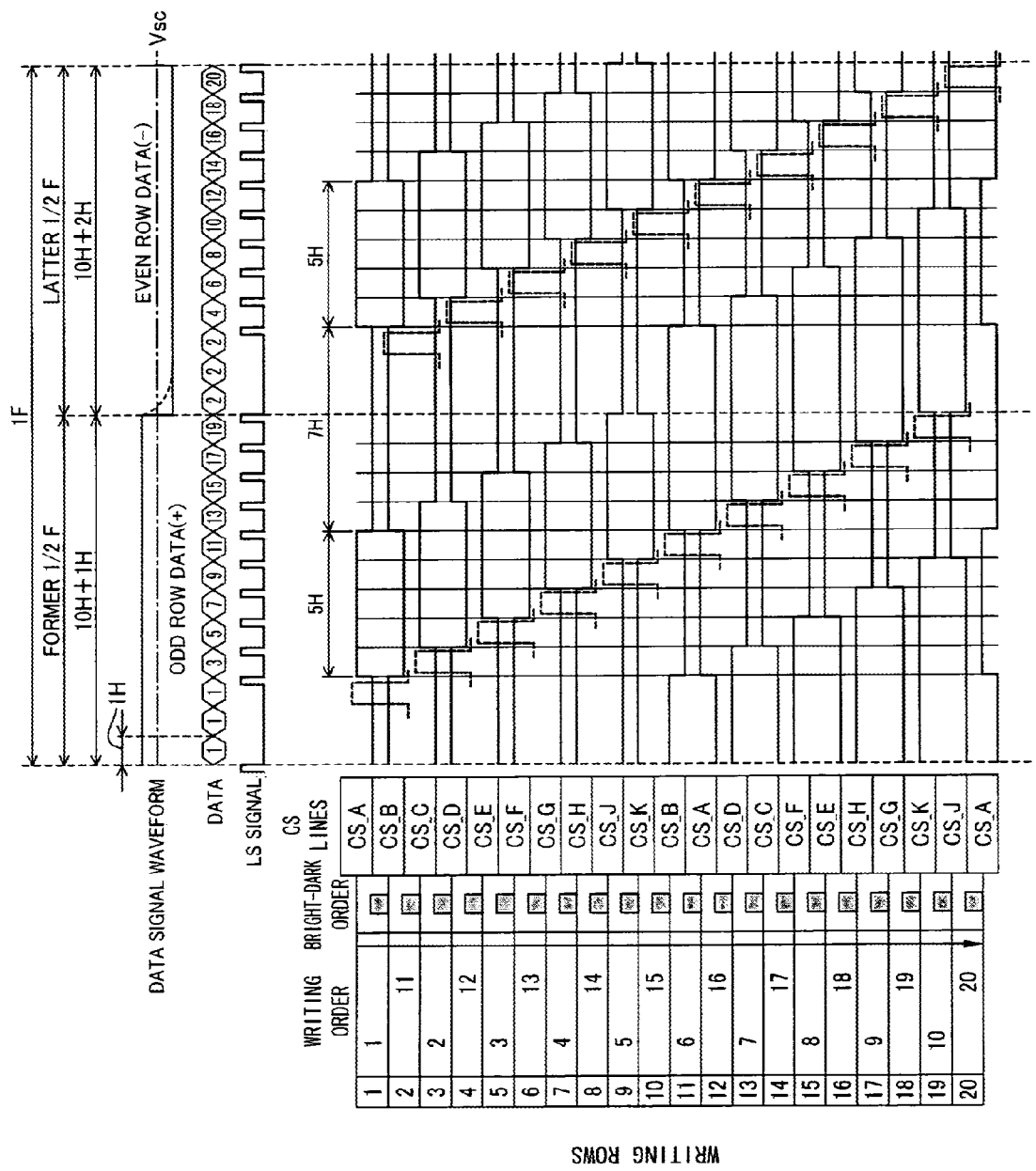

FIG. 21 shows a timing chart of a data signal waveform, a data signal, a latch strobe signal, a gate-on pulse and a CS signal in driving by interlace scan where a data signal voltage is inverted with respect to every 10 rows and where 2 horizontal periods right after polarity inversion are regarded as a dummy insertion period and a CS signal dummy period corresponding to 2H is inserted into a CS signal during a period to which the dummy insertion period is inserted.

FIG. 22

Figure 22:
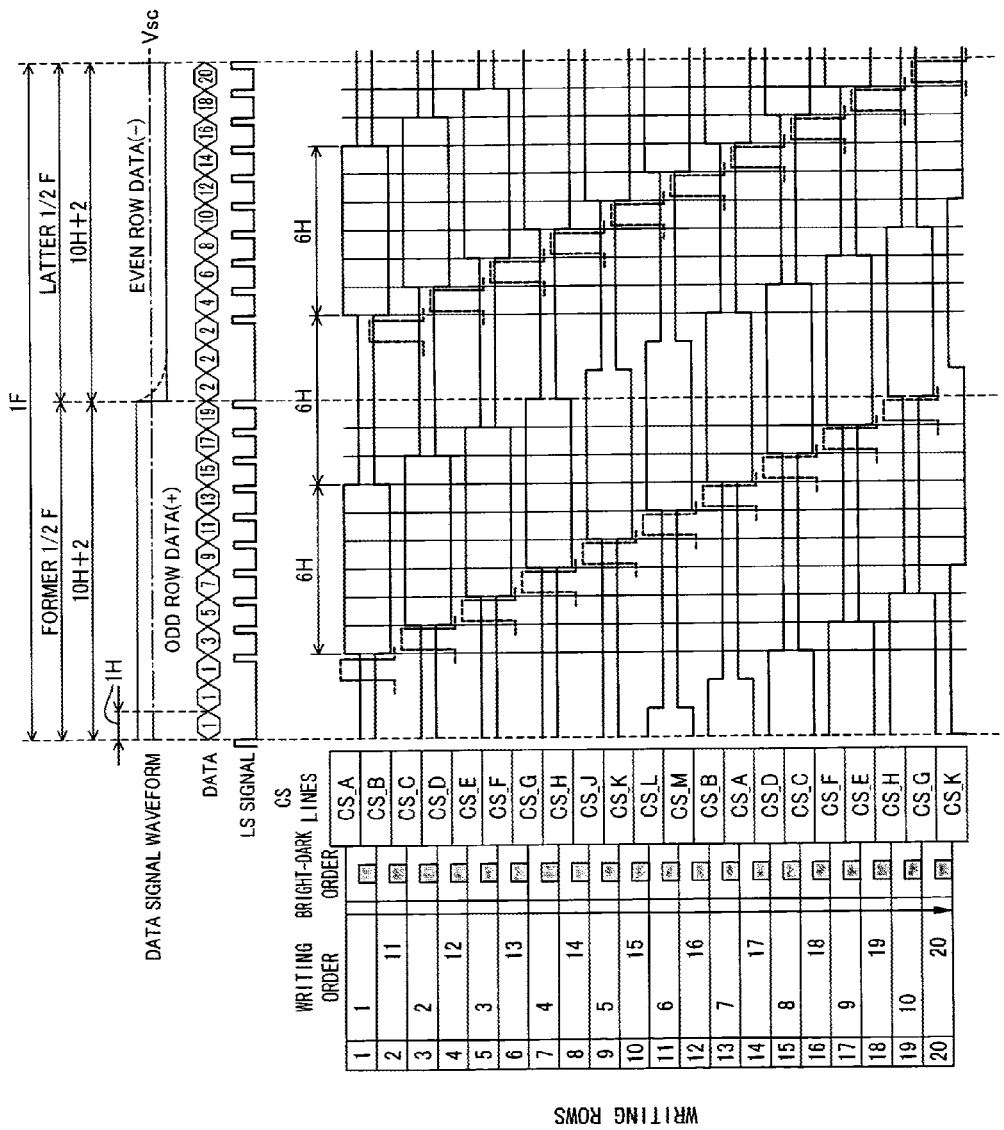

FIG. 22 shows a timing chart of a data signal waveform, a data signal, a latch strobe signal, a gate-on pulse and a CS signal in driving by interlace scan where a data signal voltage is inverted with respect to every 10 rows and where 2 horizontal periods right after polarity inversion are regarded as a dummy insertion period and polarity continuation periods of CS signals are individually increased by 1H.

FIG. 23

Figure 23:
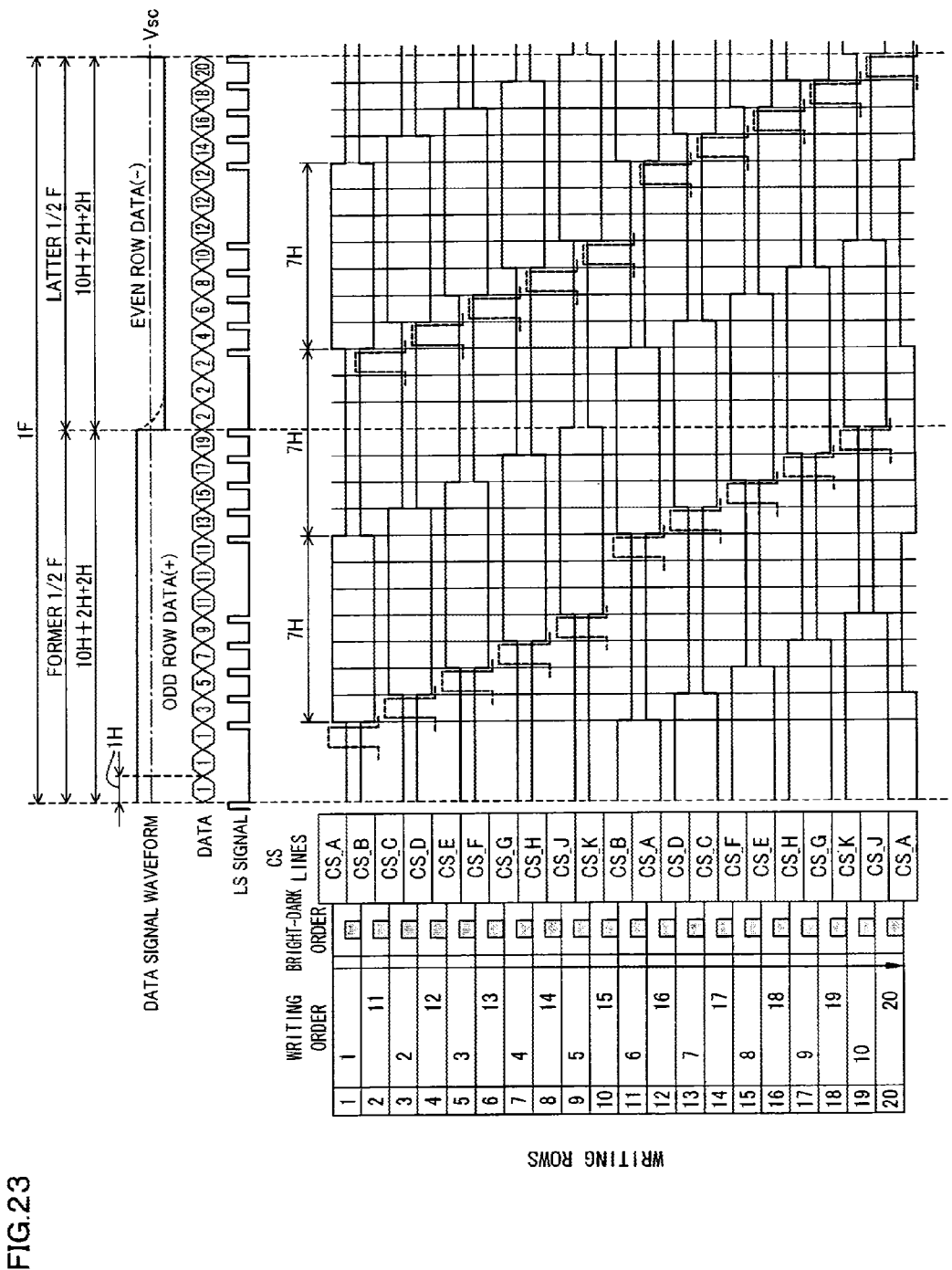

FIG. 23 is a timing chart of a data signal waveform, a data signal, a latch strobe signal, a gate-on pulse, and a CS signal in driving by interlace scan where the polarity of a data signal voltage is inverted with reference to 10 lines and where 2 horizontal periods right after the polarity of a data signal is inverted are regarded as a first dummy insertion period and 2 horizontal periods prior to the time of inversion of the polarity of a data signal by 5 horizontal periods are regarded as a second dummy insertion period, and CS signal dummy periods each corresponding to 2H are inserted into CS signals during periods to which the first and second dummy insertion periods are inserted, respectively.

FIG. 24

Figure 24:
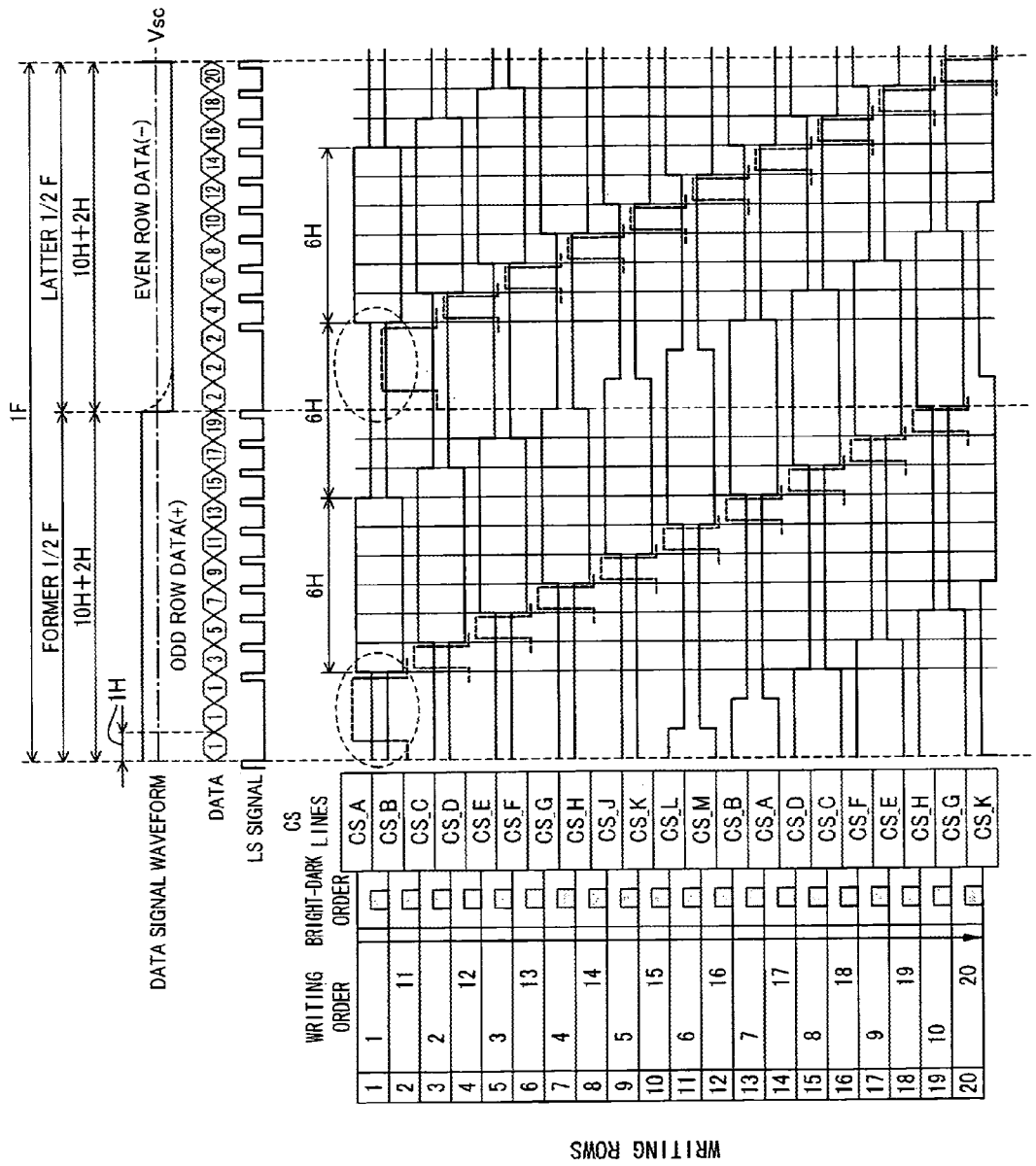

FIG. 24 shows a timing chart of a data signal waveform, a data signal, a latch strobe signal, a gate-on pulse, and a CS signal in driving by interlace scan where the polarity of a data signal voltage is inverted with respect to every 10 rows and 2 horizontal periods right after polarity inversion are regarded as a dummy insertion period and polarity continuation periods of CS signals are increased by 1H, respectively.

FIG. 25

Figure 25:
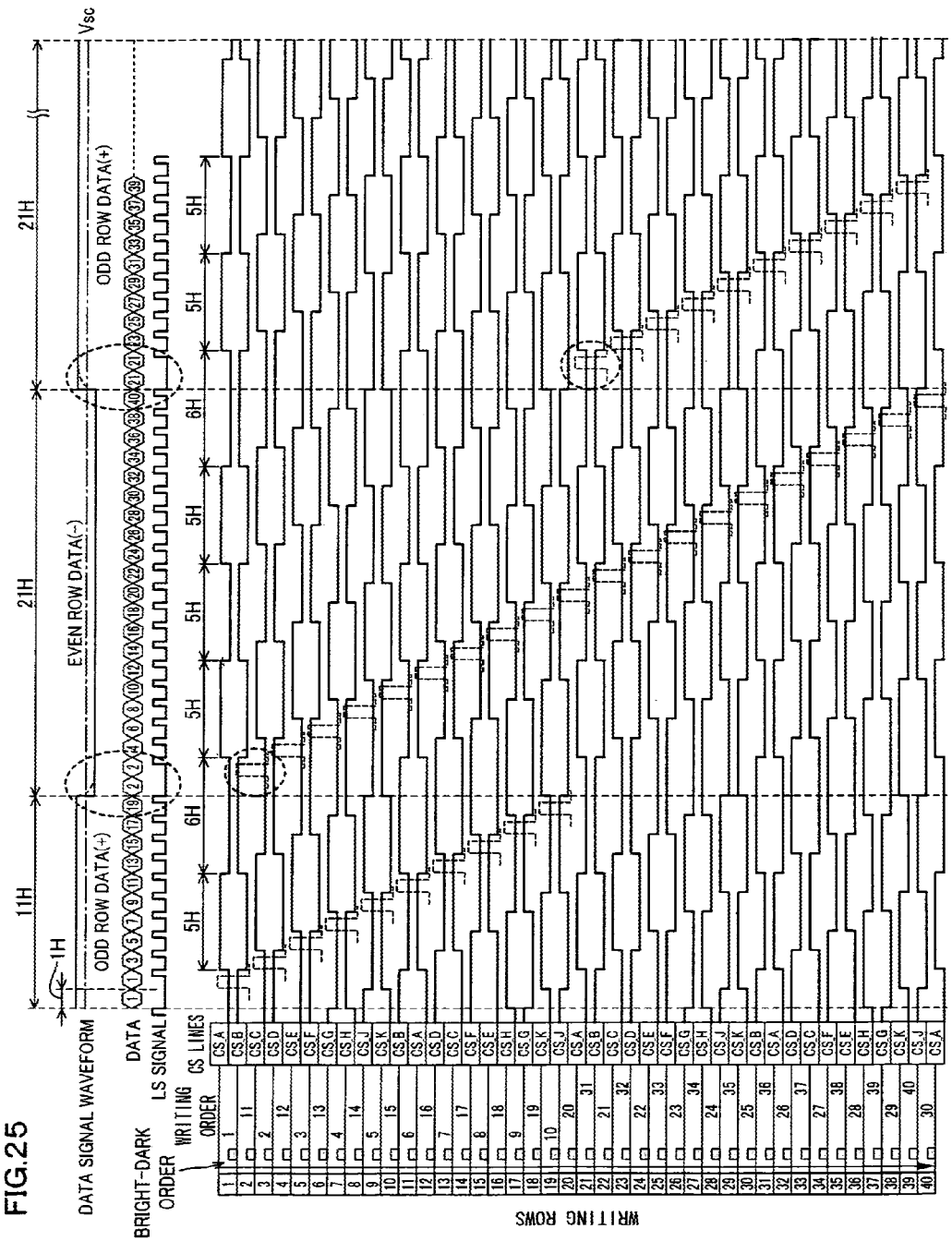

FIG. 25 shows a timing chart of a data signal waveform, a data signal, a latch strobe signal, a gate-on pulse, and a CS signal in driving by block-divided interlace scan where the number α of scanning signal lines in one block is 20 and where 1 horizontal period right after polarity inversion is regarded as a dummy insertion period.

FIG. 26

Figure 26:
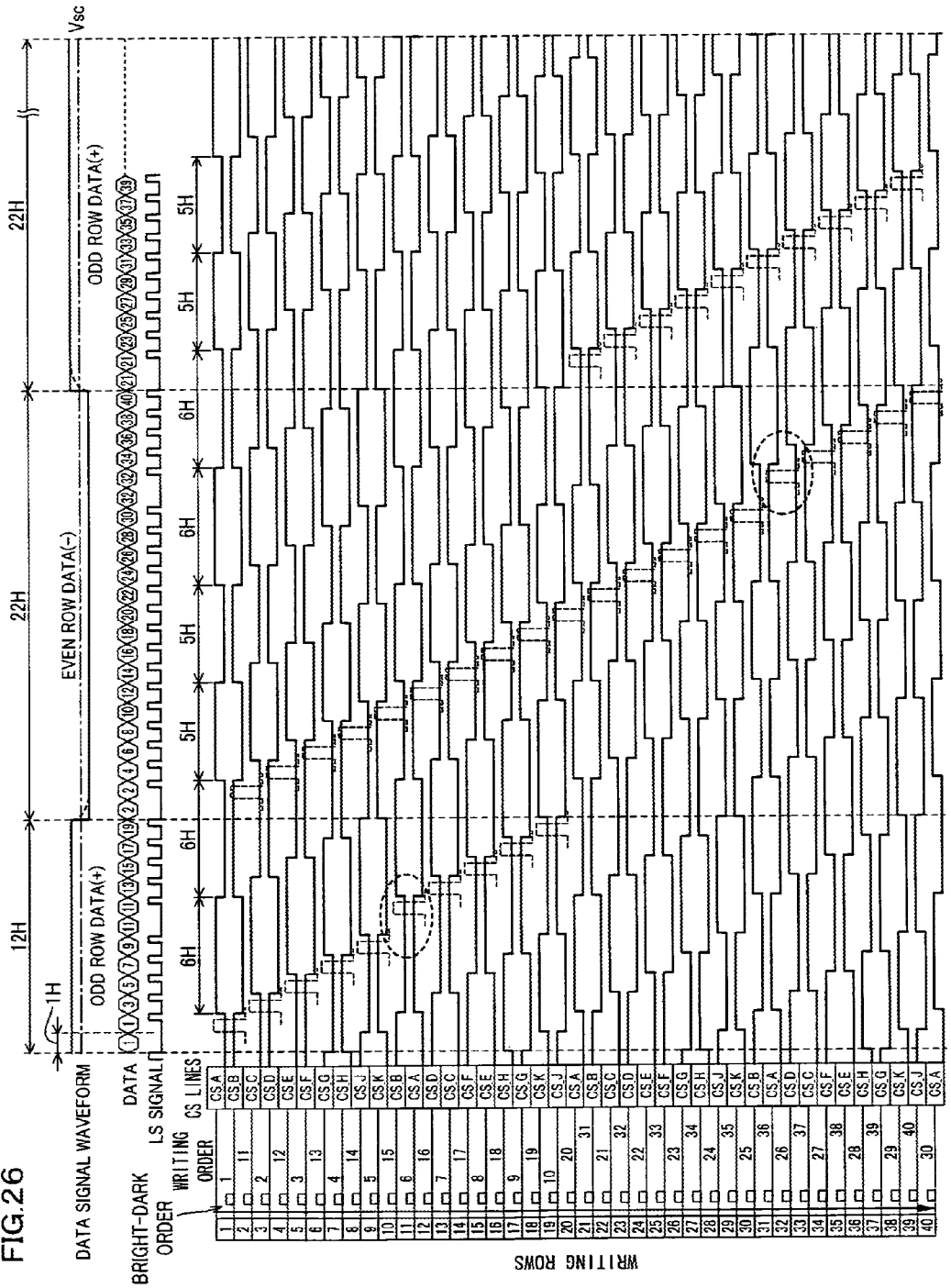

FIG. 26 shows a timing chart of a data signal waveform, a data signal, a latch strobe signal, a gate-on pulse, and a CS signal in driving by block-divided interlace scan where the number α of scanning lines in one block is 20 and where 1 horizontal period right after inversion of the polarity of a data signal is regarded as a first dummy insertion period, 1 horizontal period which is 5 horizontal period before the time of inversion of the polarity of a data signal is regarded as a second dummy insertion period, and CS signals during periods to which the first and second insertion periods are inserted are made to include insertion of CS signal dummy periods corresponding to 1H, respectively.

FIG. 27

Figure 27:
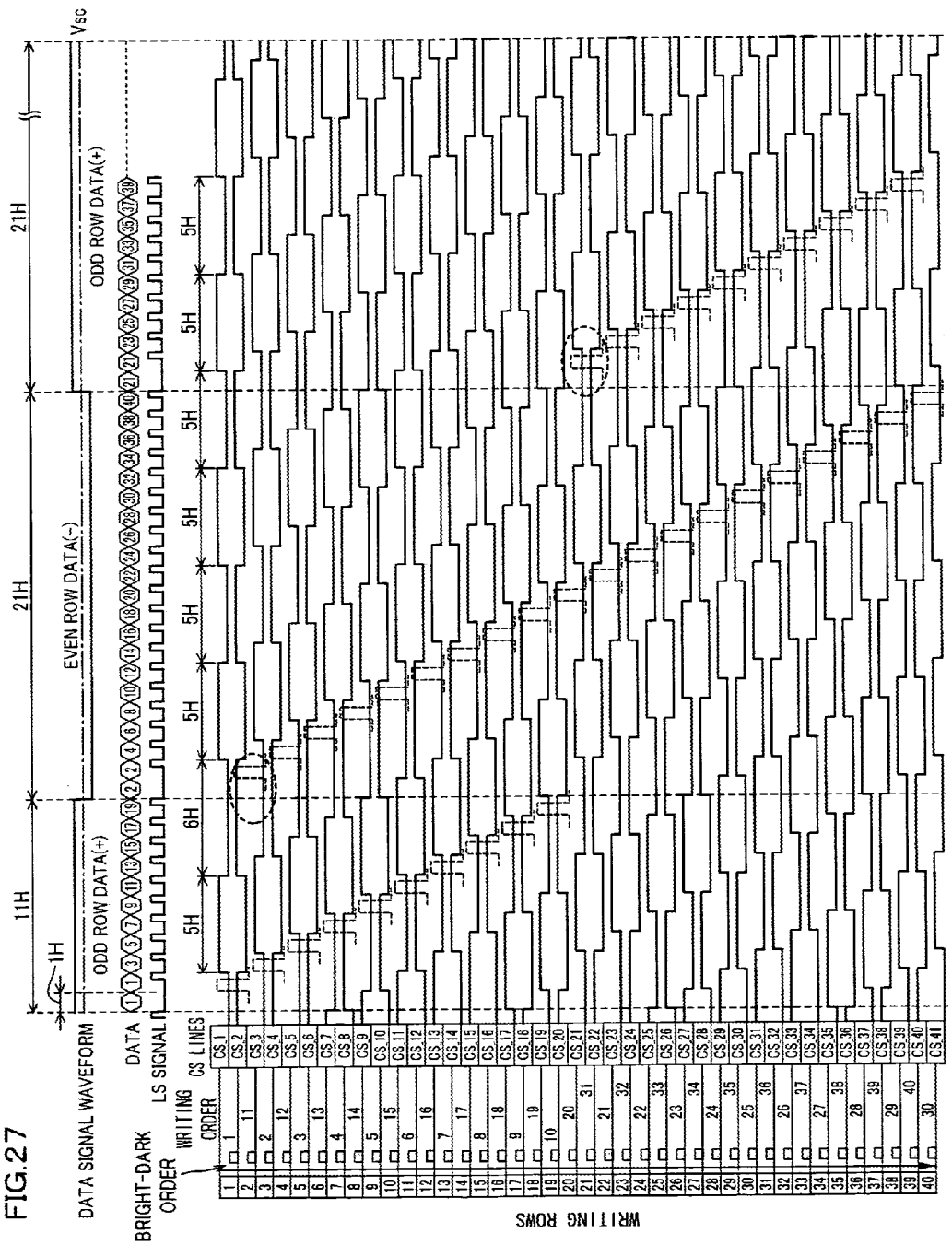

FIG. 27 shows a timing chart of a data signal waveform, a data signal, a latch strobe signal, a gate-on pulse, and a CS signal in driving by block-divided interlace scan where the number α of scanning lines in one block is 20 and where 1 horizontal period right after inversion of the polarity of a data signal is regarded as a dummy insertion period and a CS signal dummy period corresponding to a dummy insertion period of a data signal is inserted into at least one of polarity continuation periods for a CS signal.

FIG. 28

Figure 28:
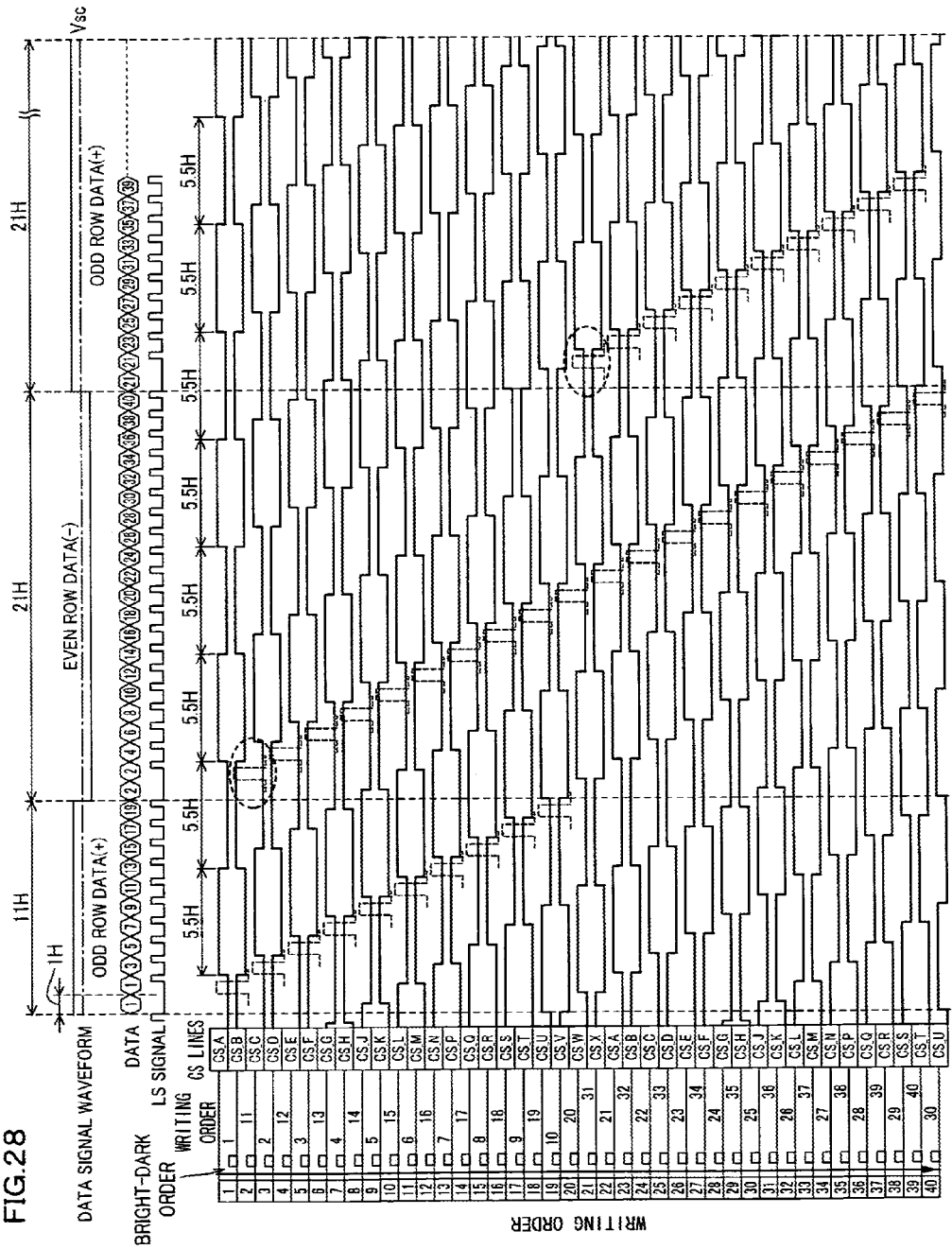

FIG. 28 shows a timing chart of a data signal waveform, a data signal, a latch strobe signal, a gate-on pulse, and a CS signal in driving by block-divided interlace scan where the number α of scanning lines in one block is 20 and where 1 horizontal period right after inversion of the polarity of a data signal is regarded as a dummy insertion period and each of two polarity continuation periods of CS signals included in an adjacent line writing time difference period is 5.5H.

FIG. 29

Figure 29:
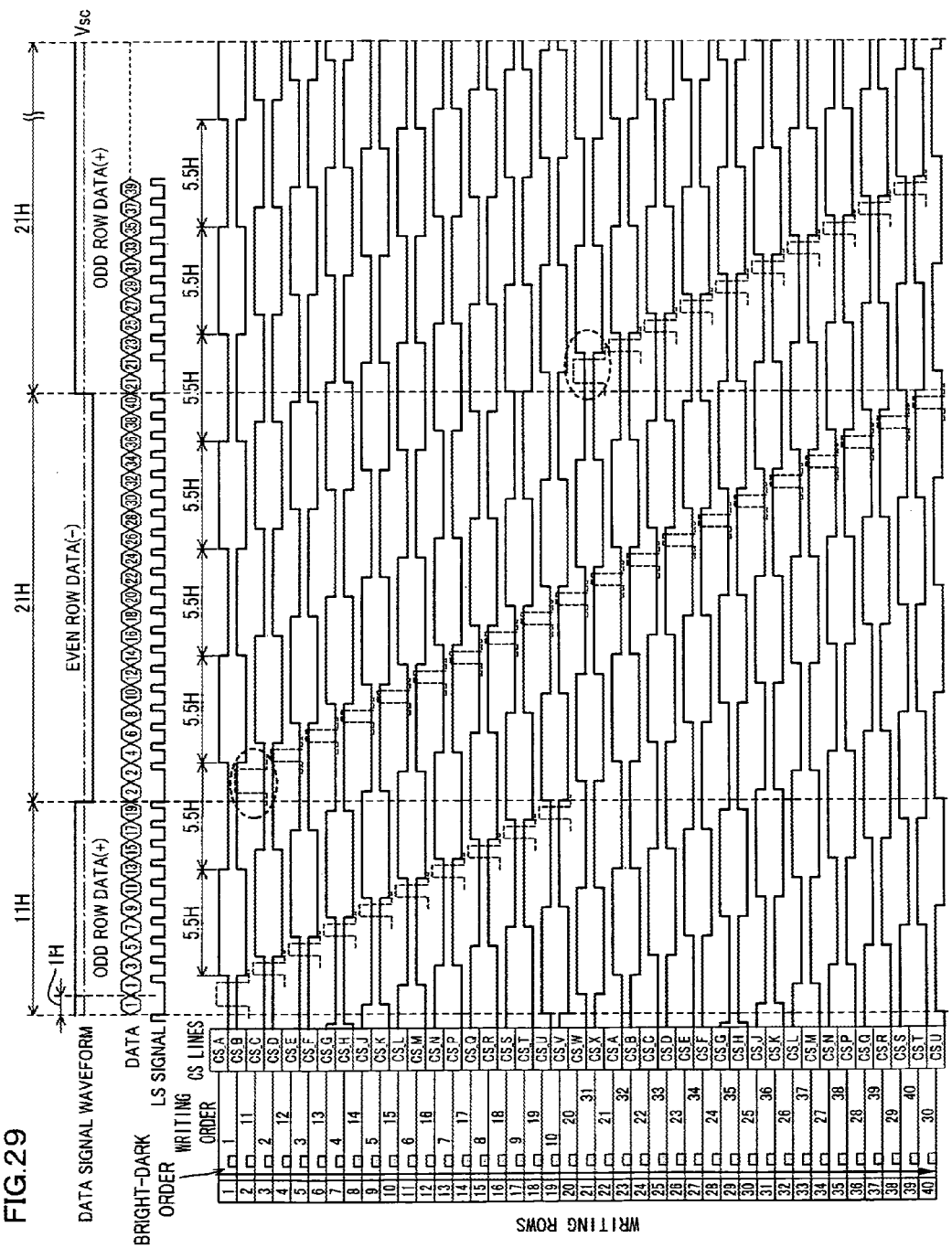

FIG. 29 shows a timing chart of a data signal waveform, a data signal, a latch strobe signal, a gate-on pulse, and a CS signal in driving by block-divided interlace scan where the number α of scanning lines in one block is 20 and where 1 horizontal period right after inversion of the polarity of a data signal is regarded as a dummy insertion period and where each of polarity continuation periods of CS signals in an adjacent line writing time difference period is 5.5H.

FIG. 30

Figure 30:
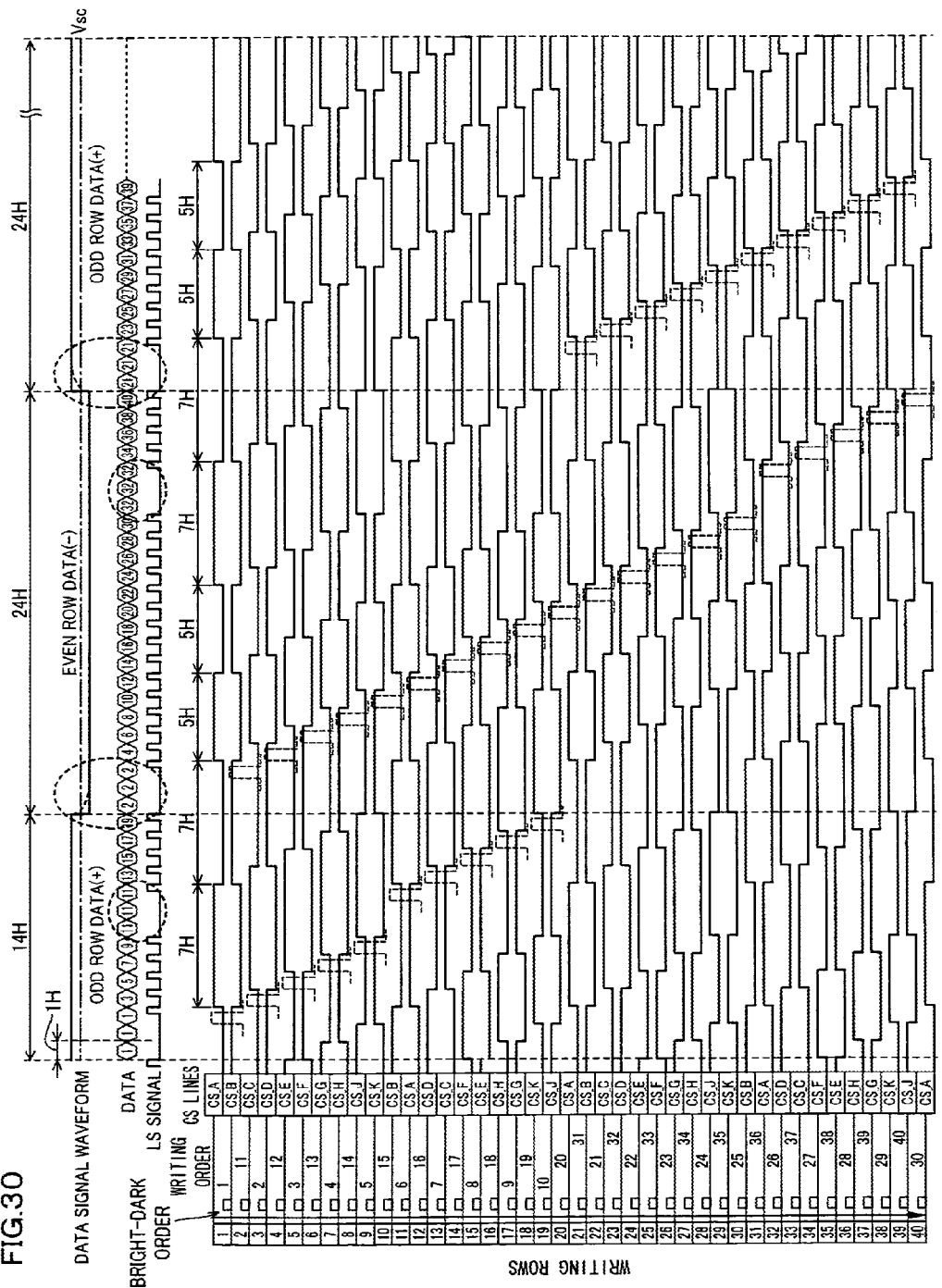

FIG. 30 shows a timing chart of a data signal waveform, a data signal, a latch strobe signal, a gate-on pulse, and a CS signal in driving by block-divided interlace scan where the number α of scanning lines in one block is 20 and where 2 horizontal periods right after inversion of the polarity of a data signal is regarded as a first dummy insertion period, 2 horizontal periods which are 5 horizontal period before the time of inversion of the polarity of a data signal is regarded as a second dummy insertion period, and CS signals during periods to which the first and second insertion periods are inserted are made to include insertion of CS signal dummy periods corresponding to 1H, respectively.

FIG. 31

Figure 31:
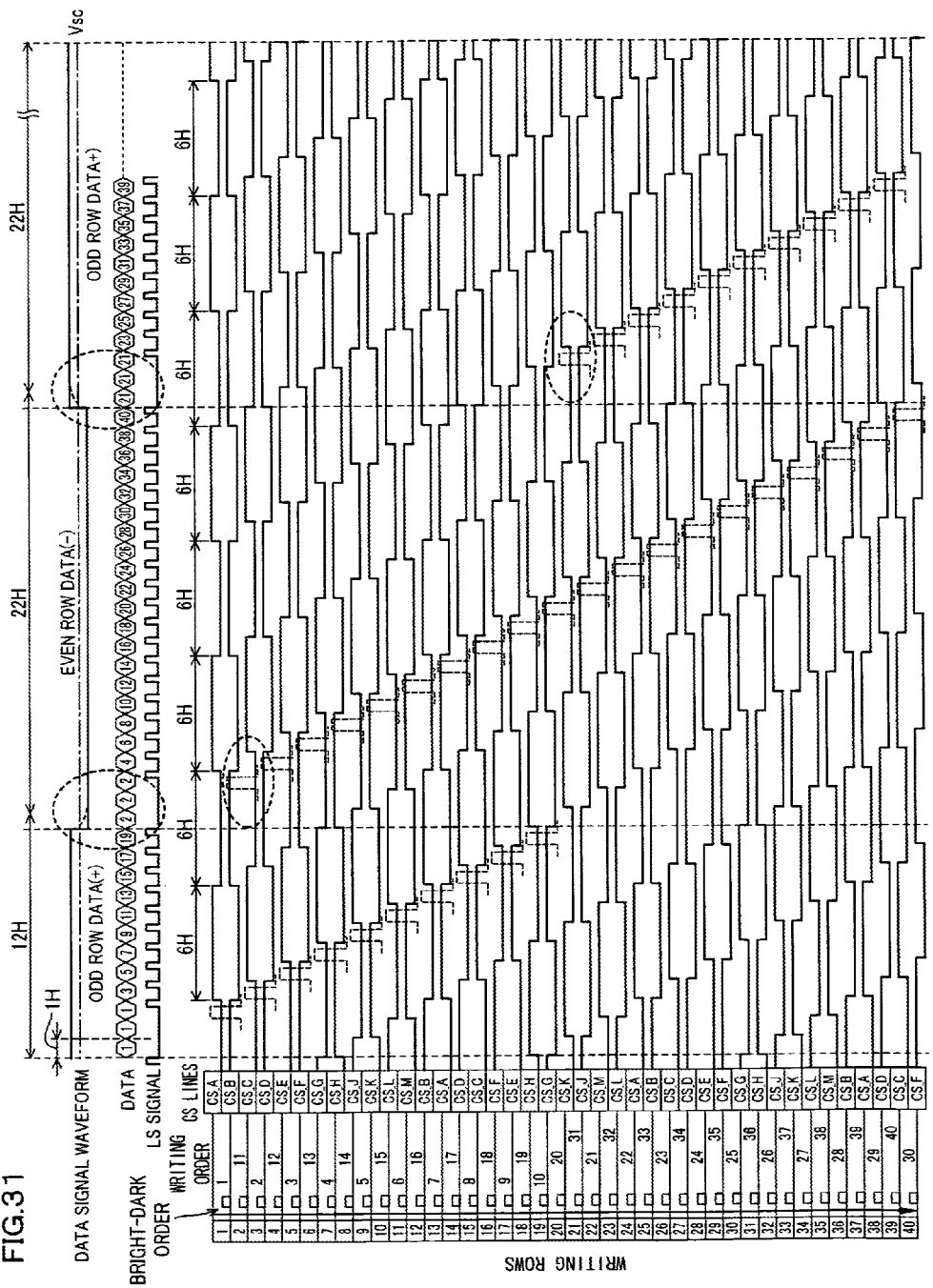

FIG. 31 shows a timing chart of a data signal waveform, a data signal, a latch strobe signal, a gate-on pulse, and a CS signal in driving by block-divided interlace scan where the number α of scanning lines in one block is 20 and where 2 horizontal periods right after inversion of the polarity of a data signal is regarded as a dummy insertion period and each of two polarity continuation periods of CS signals included in an adjacent line writing time difference period is 6H.

FIG. 32

Figure 32:
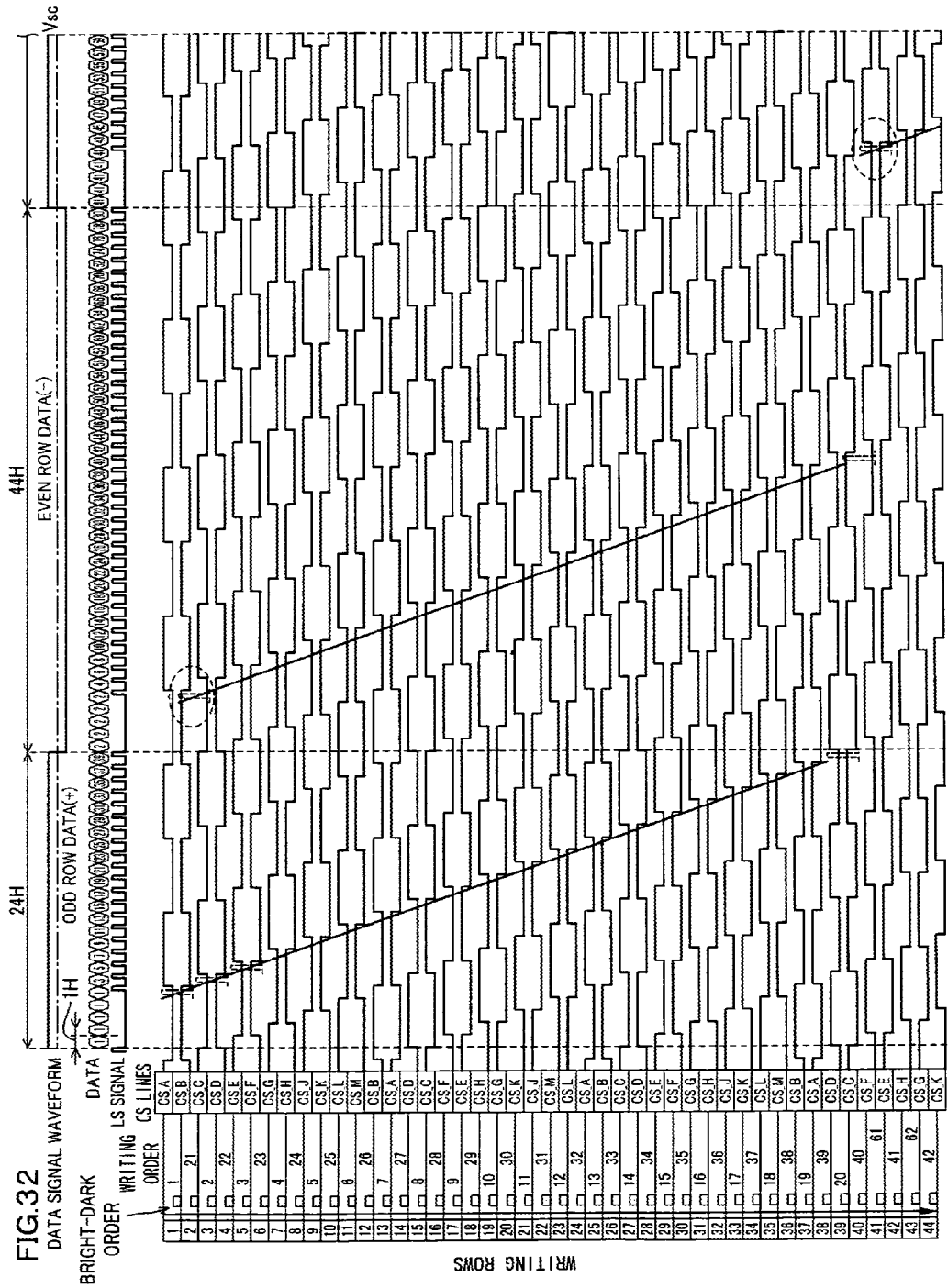

FIG. 32 shows a timing chart of a data signal waveform, a data signal, a latch strobe signal, a gate-on pulse, and a CS signal in driving by block-divided interlace scan where the number α of scanning lines in one block is 20 and where 4 horizontal periods right after inversion of the polarity of a data signal are regarded as a dummy insertion period and each of two polarity continuation periods of CS signals included in an adjacent line writing time difference period is 6H.

FIG. 33

Figure 33:
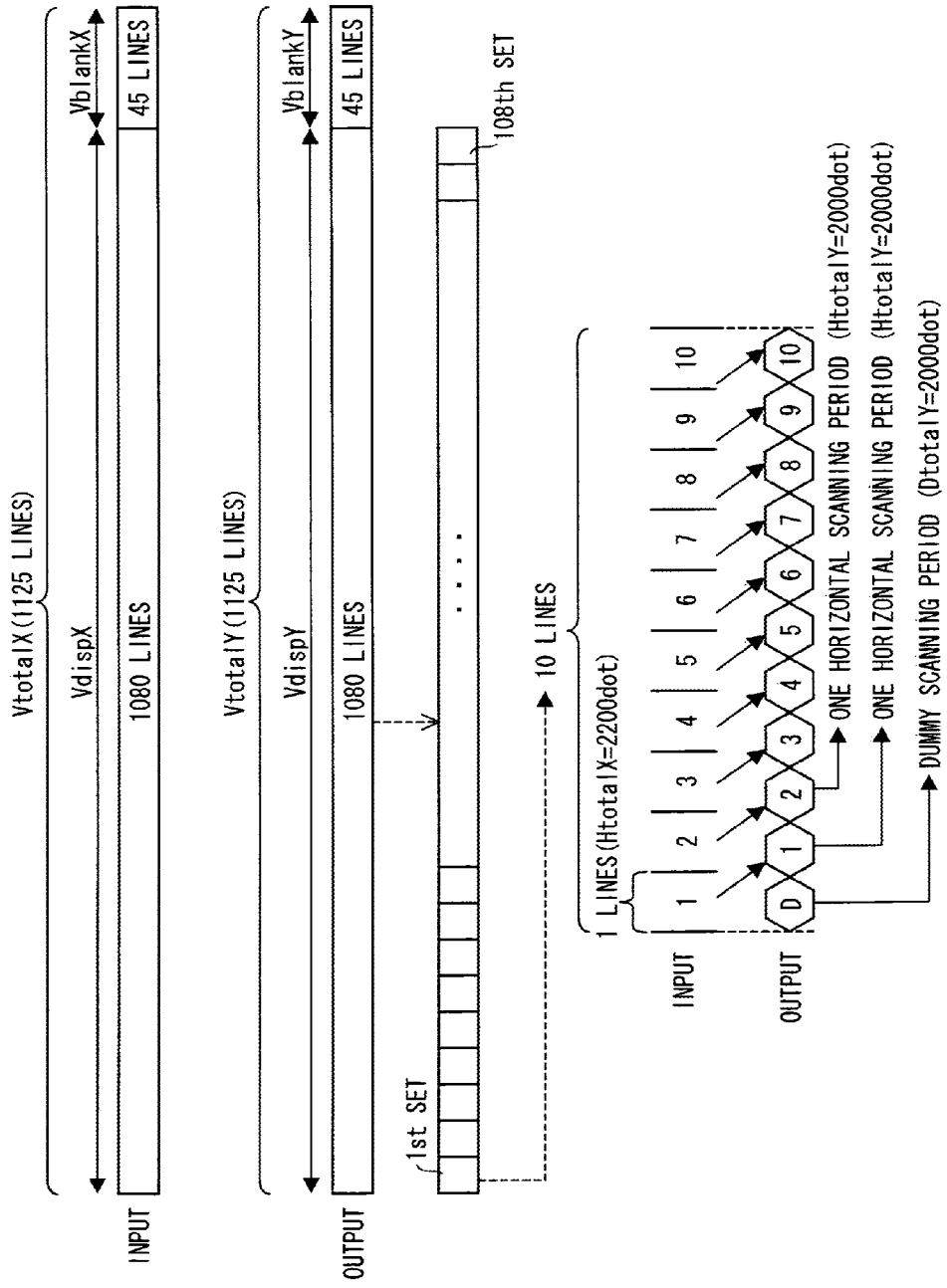

FIG. 33 is a drawing schematically explaining a method for driving a liquid crystal display device of the present invention.

FIG. 34

Figure 34:
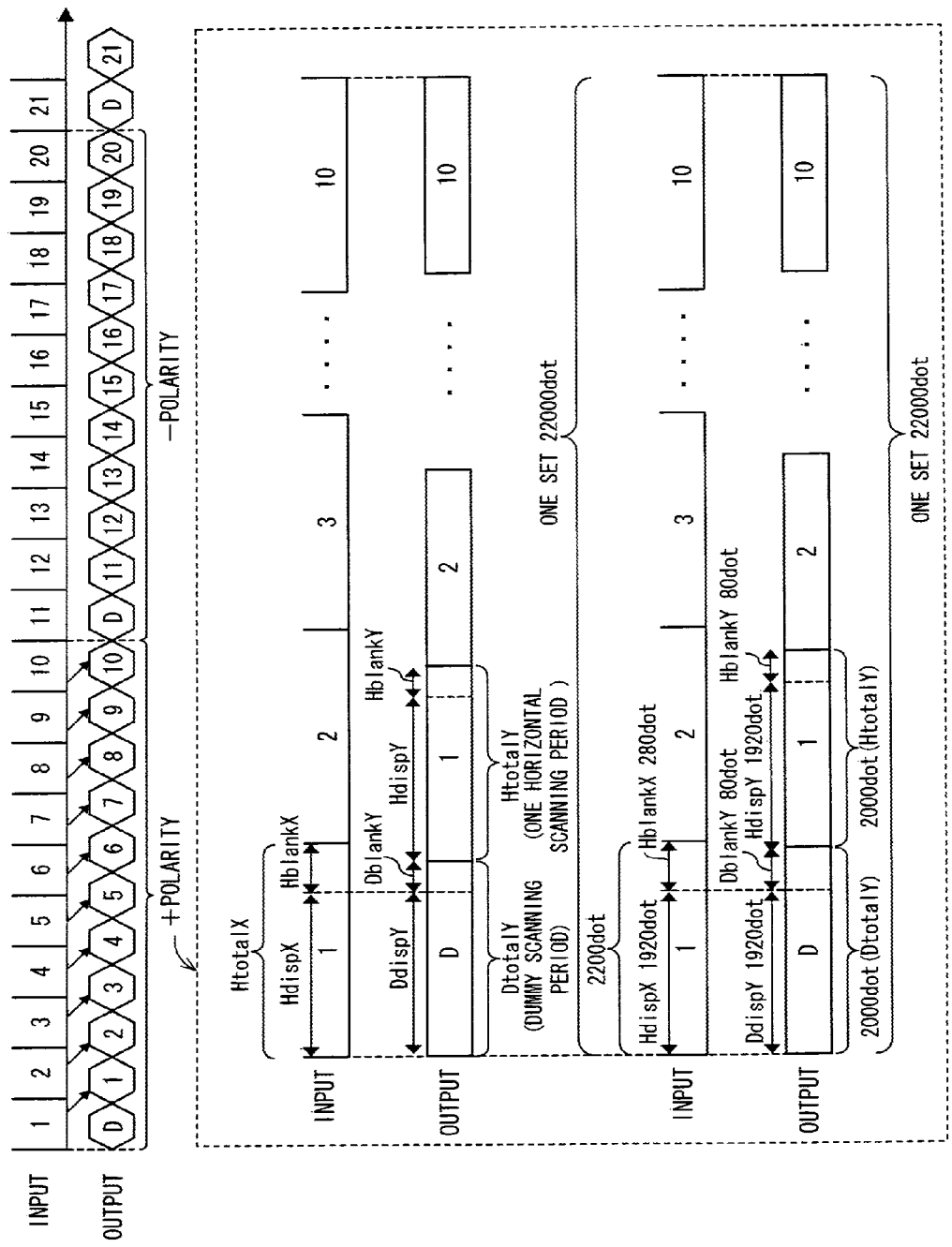

FIG. 34 is a drawing schematically explaining the method shown in FIG. 33 in more detail.

FIG. 35

Figure 35:
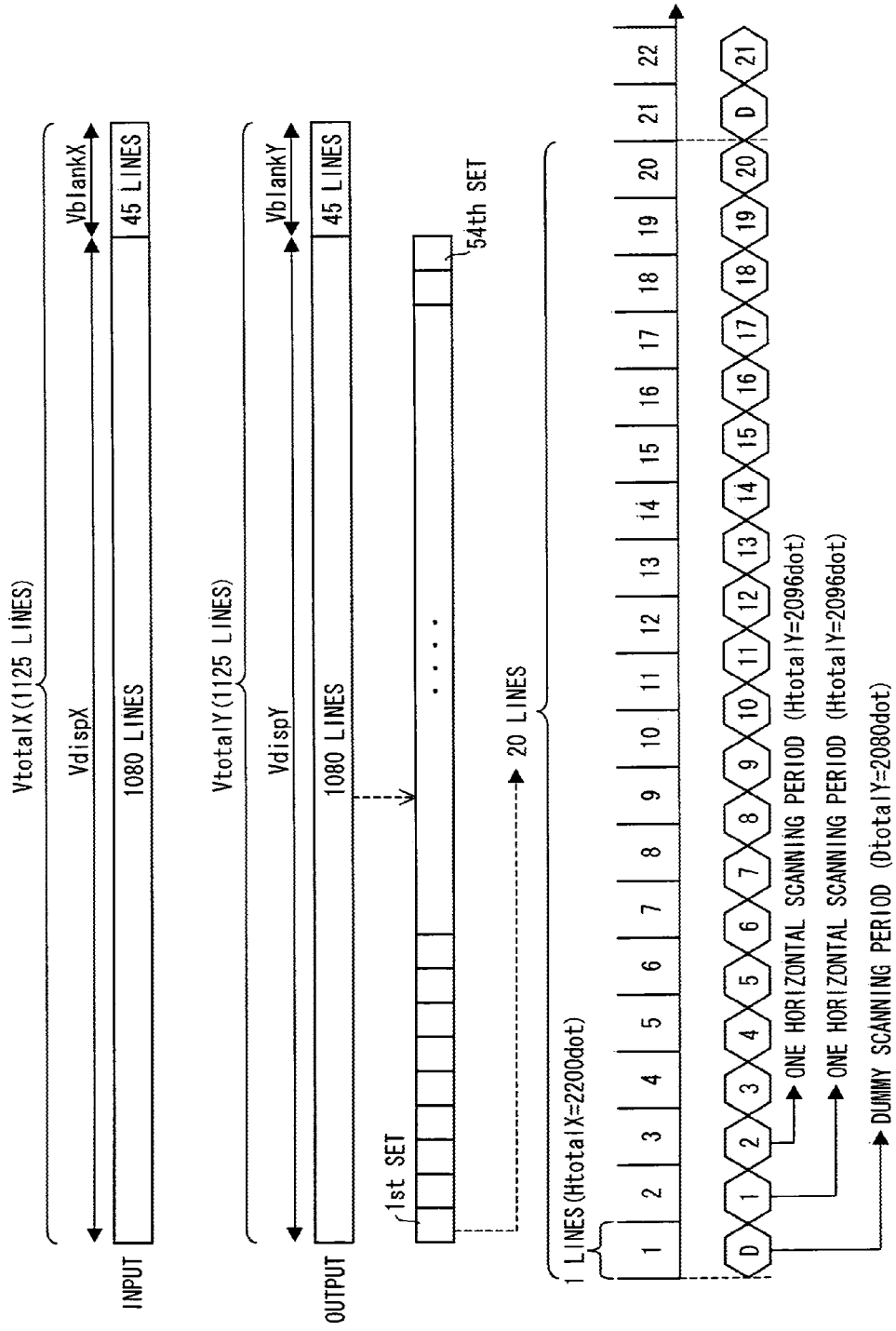

FIG. 35 is a drawing schematically explaining another method for driving a liquid crystal display device of the present invention.

FIG. 36

Figure 36:
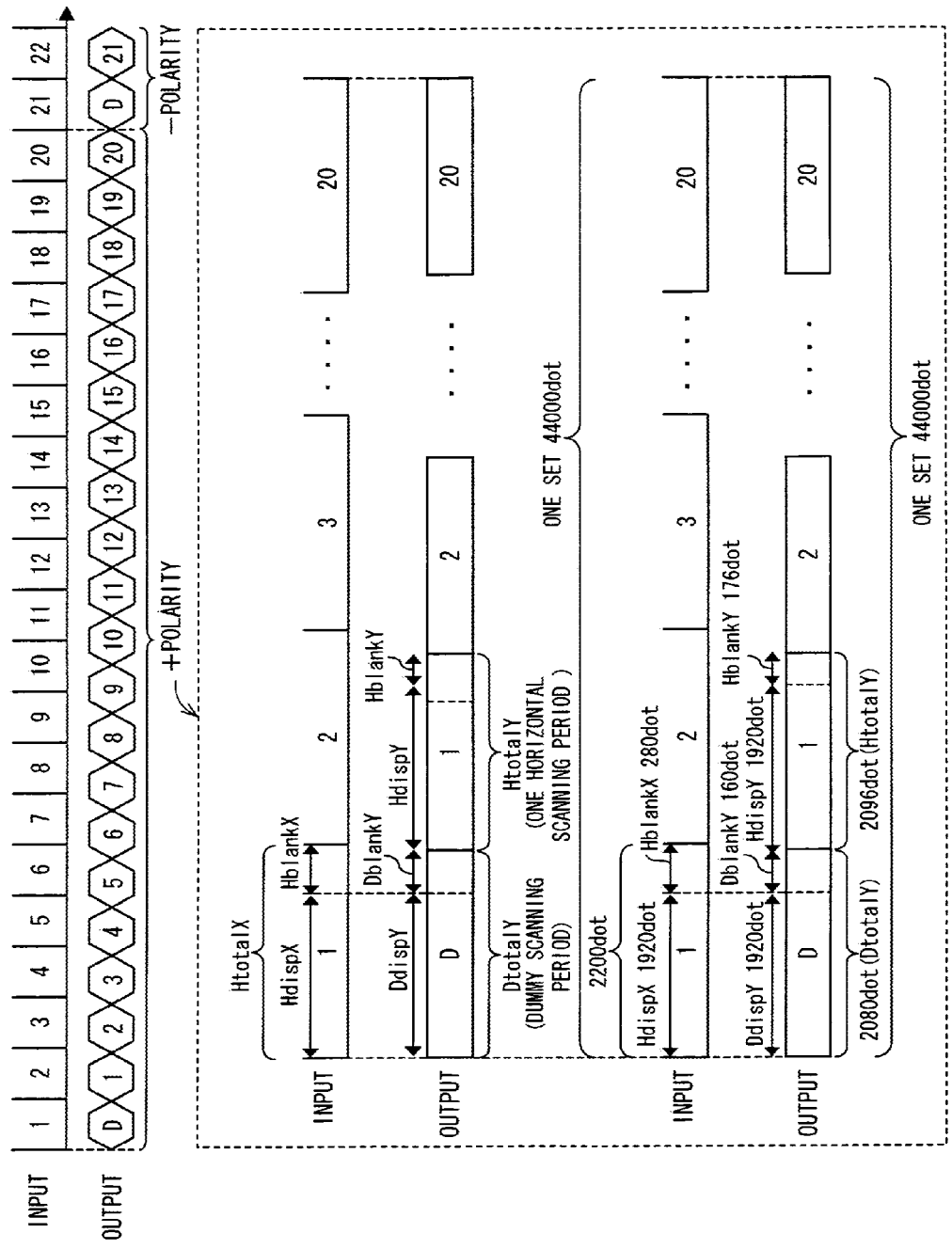

FIG. 36 is a drawing schematically explaining the method shown in FIG. 35 in more detail.

FIG. 37

Figure 37:
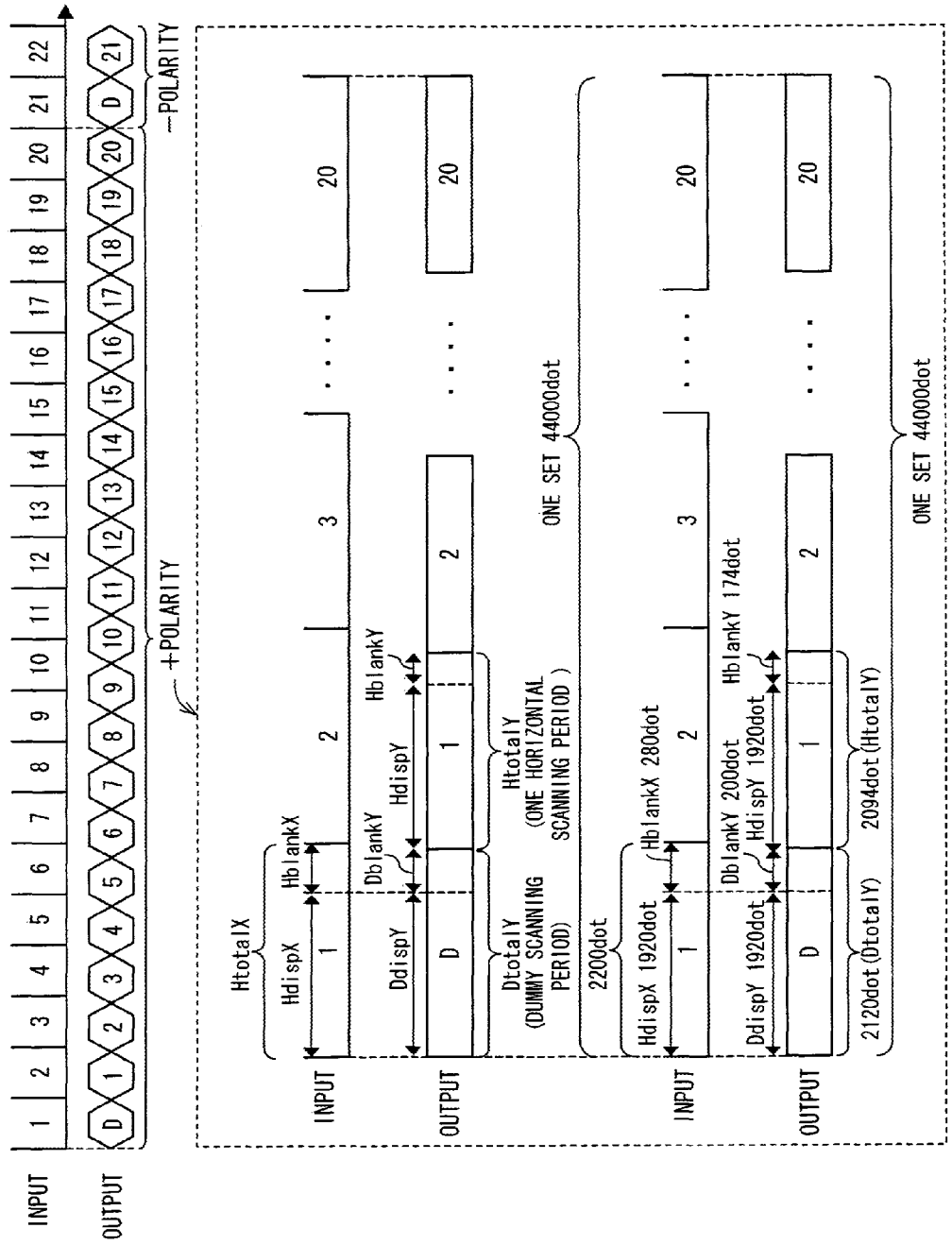

FIG. 37 is a drawing schematically explaining another method for driving a liquid crystal display device of the present invention.

FIG. 38

FIG. 38 is a table showing examples of set combinations of a horizontal scanning period and a dummy scanning period in the liquid crystal display device of the present invention.

FIG. 39

Figure 39:
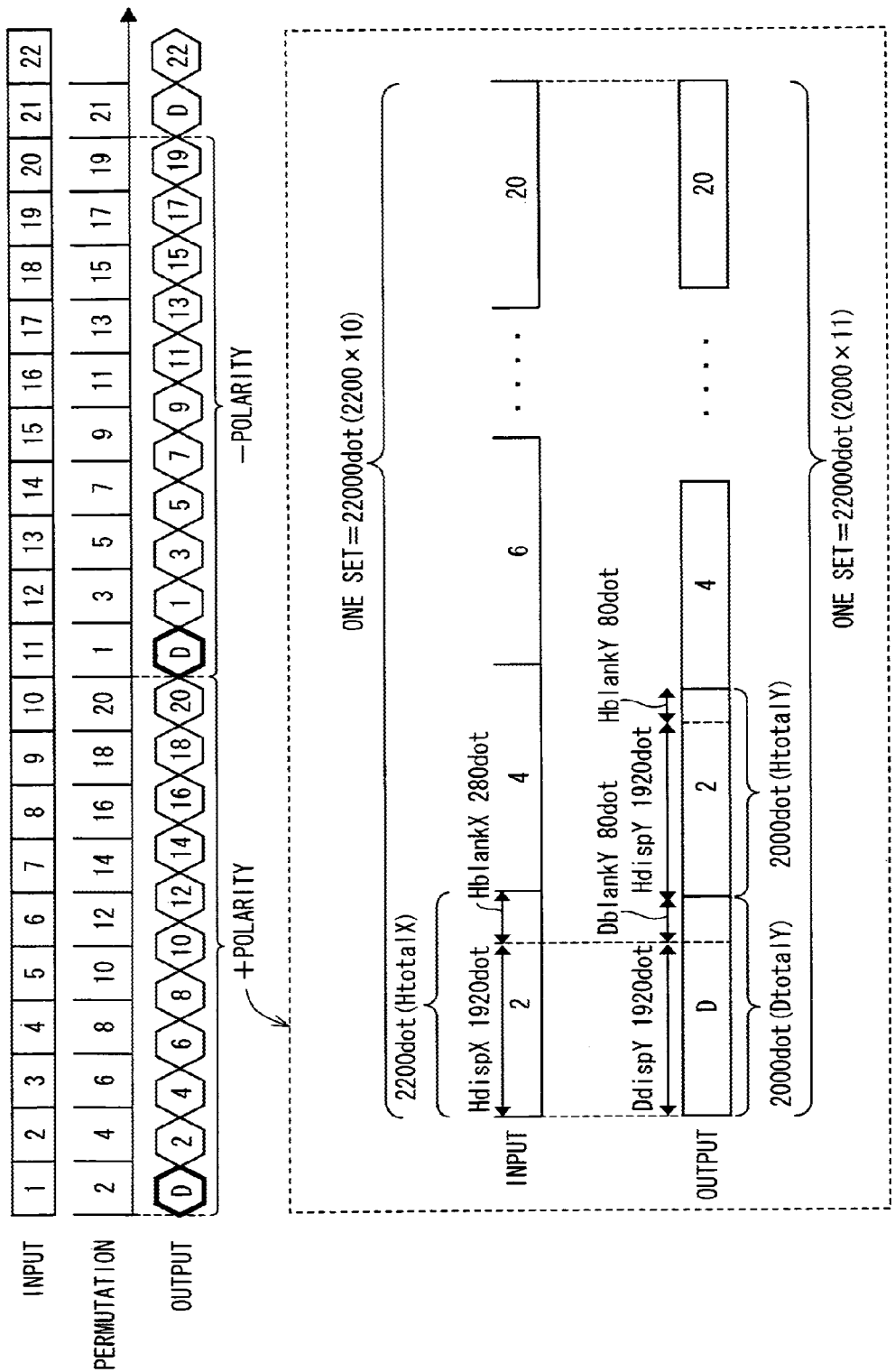

FIG. 39 is a drawing schematically explaining another method for driving a liquid crystal display device of the present invention.

FIG. 40

Figure 40:
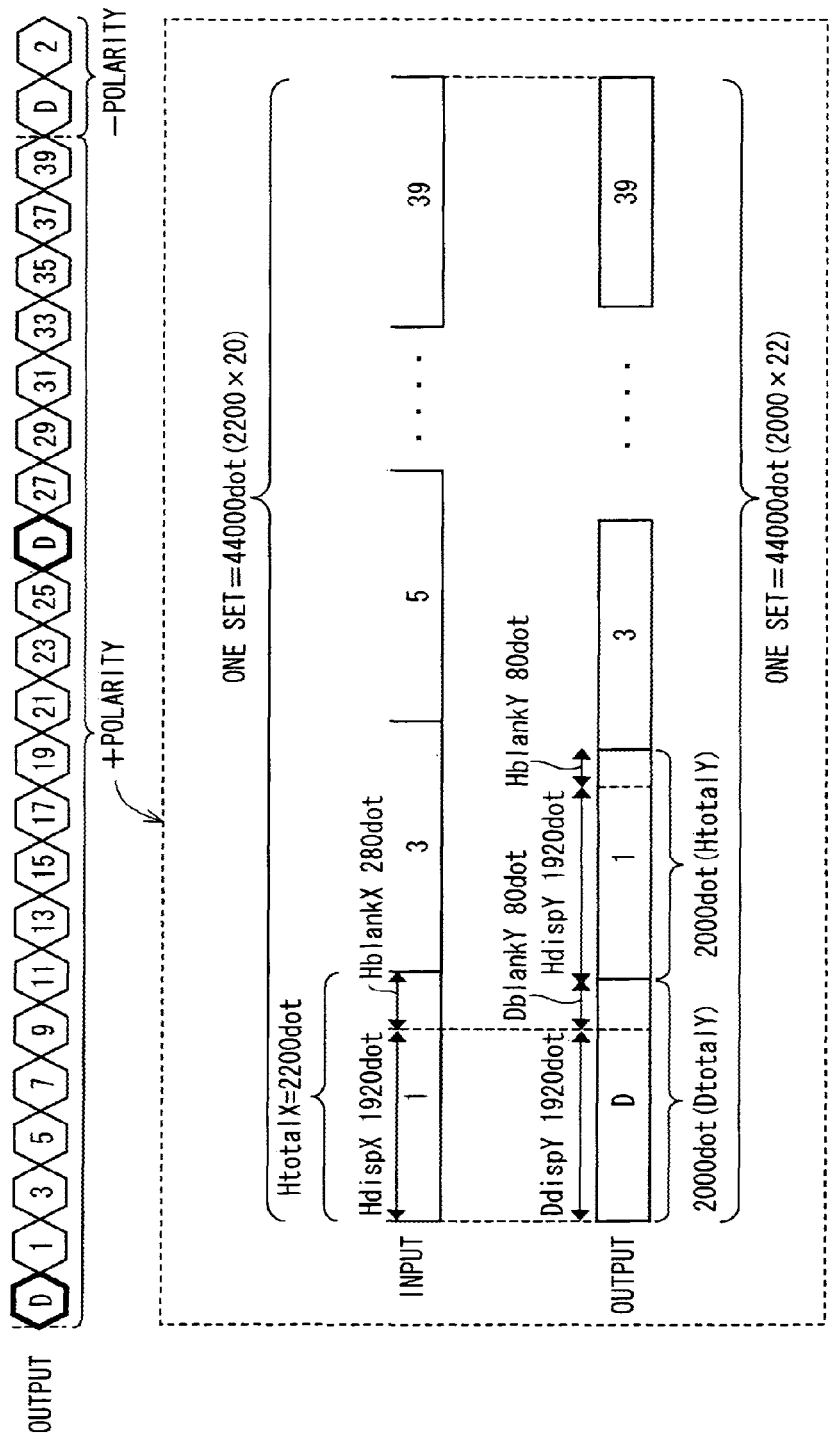

FIG. 40 is a drawing schematically explaining another method for driving a liquid crystal display device of the present invention.

FIG. 41

Figure 41:
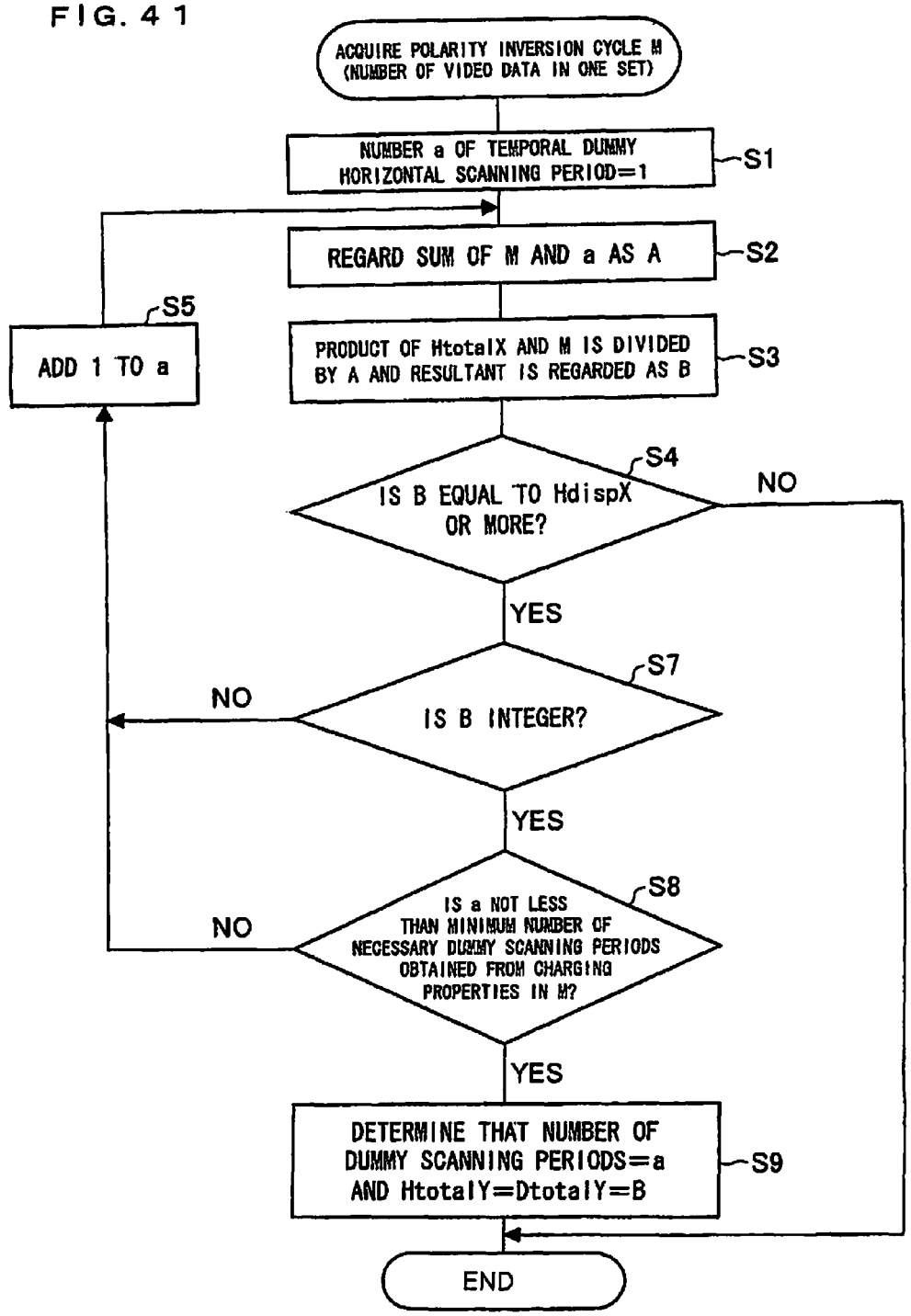

FIG. 41 is a flowchart showing an example of a process for determining a horizontal scanning period and a dummy scanning period in the liquid crystal display device of the present invention.

FIG. 42

Figure 42:
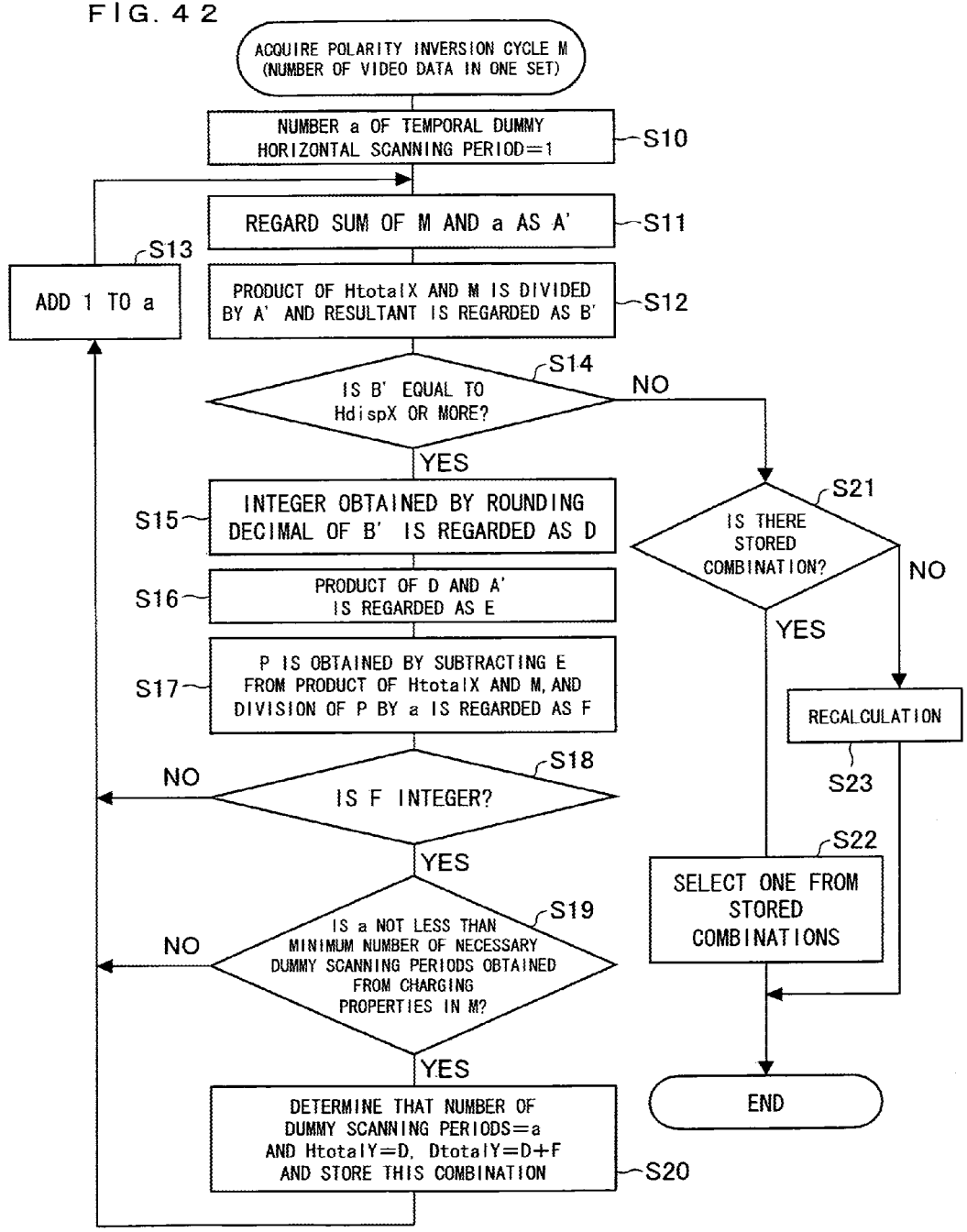

FIG. 42 is another flowchart showing an example of a process for determining a horizontal scanning period and a dummy scanning period in the liquid crystal display device of the present invention.

FIG. 43

FIG. 43 is a table showing examples of combinations of a horizontal scanning period and a dummy scanning period that are set in the process in FIG. 42.

FIG. 44

FIG. 44 is a table showing examples of combinations of a horizontal scanning period and a dummy scanning period that are set by recalculation.

FIG. 45

Figure 45:
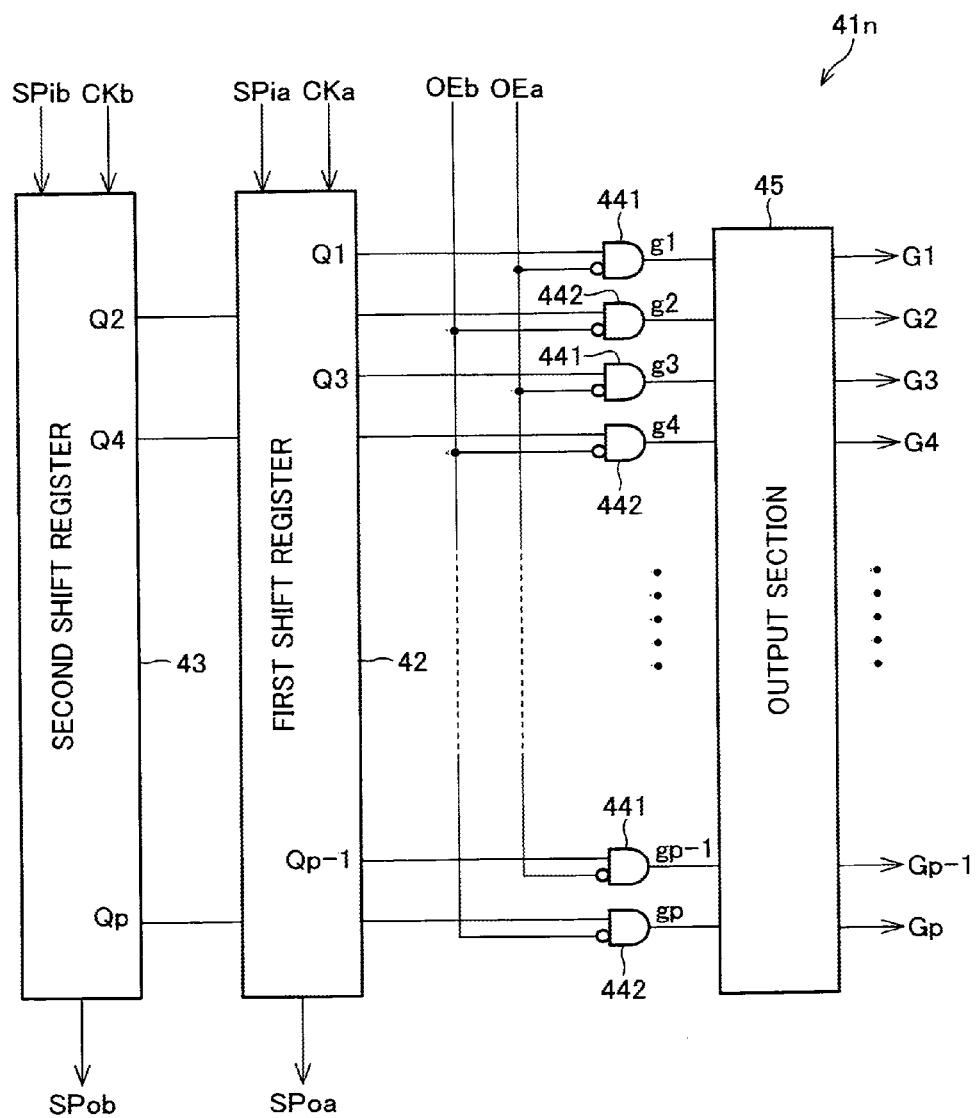

FIG. 45 is a block diagram showing an example of a configuration of a gate driver IC.

FIG. 46

Figure 46:
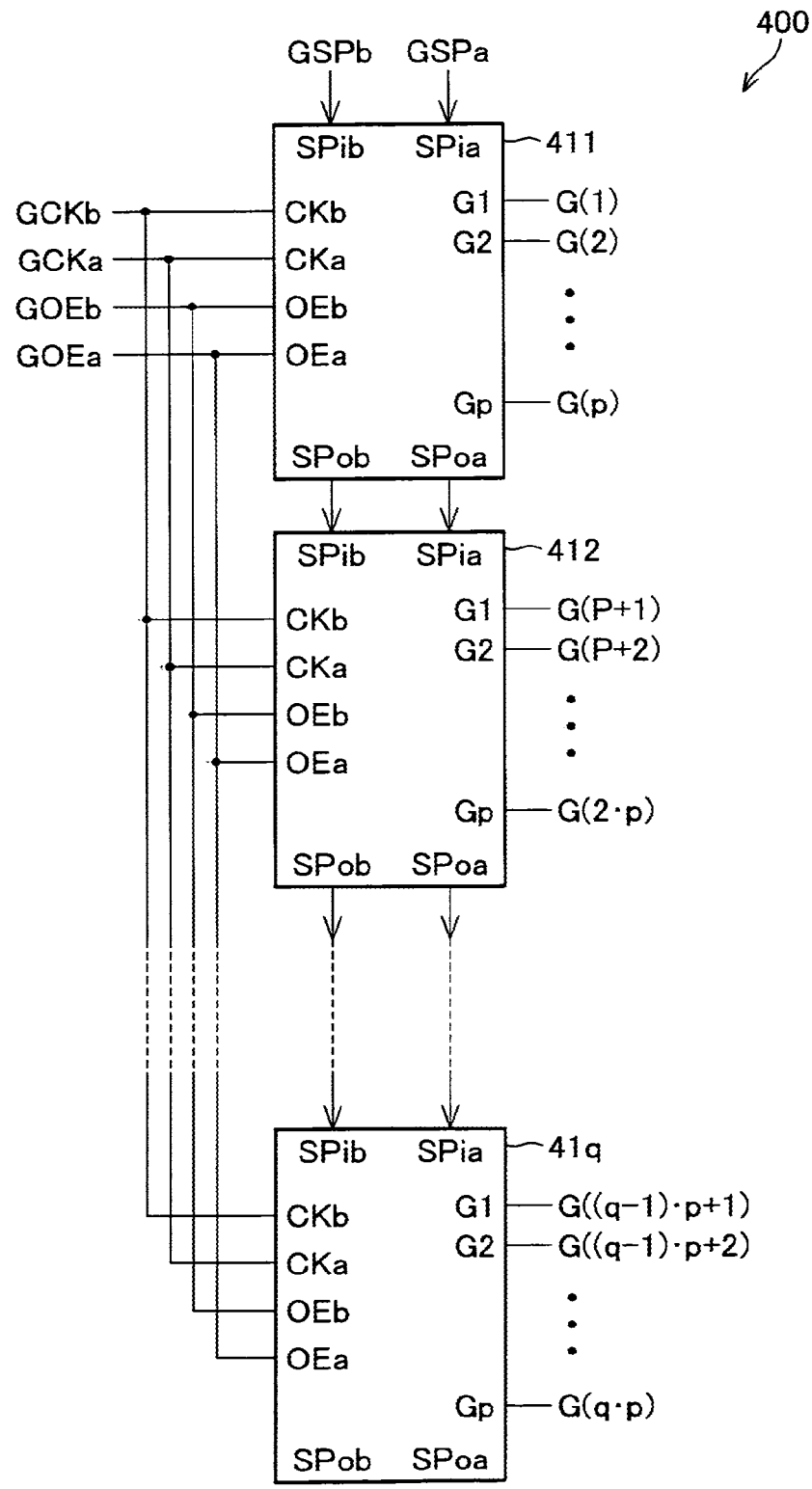

FIG. 46 is a block diagram showing an example of a gate driver.

FIG. 47

Figure 47:
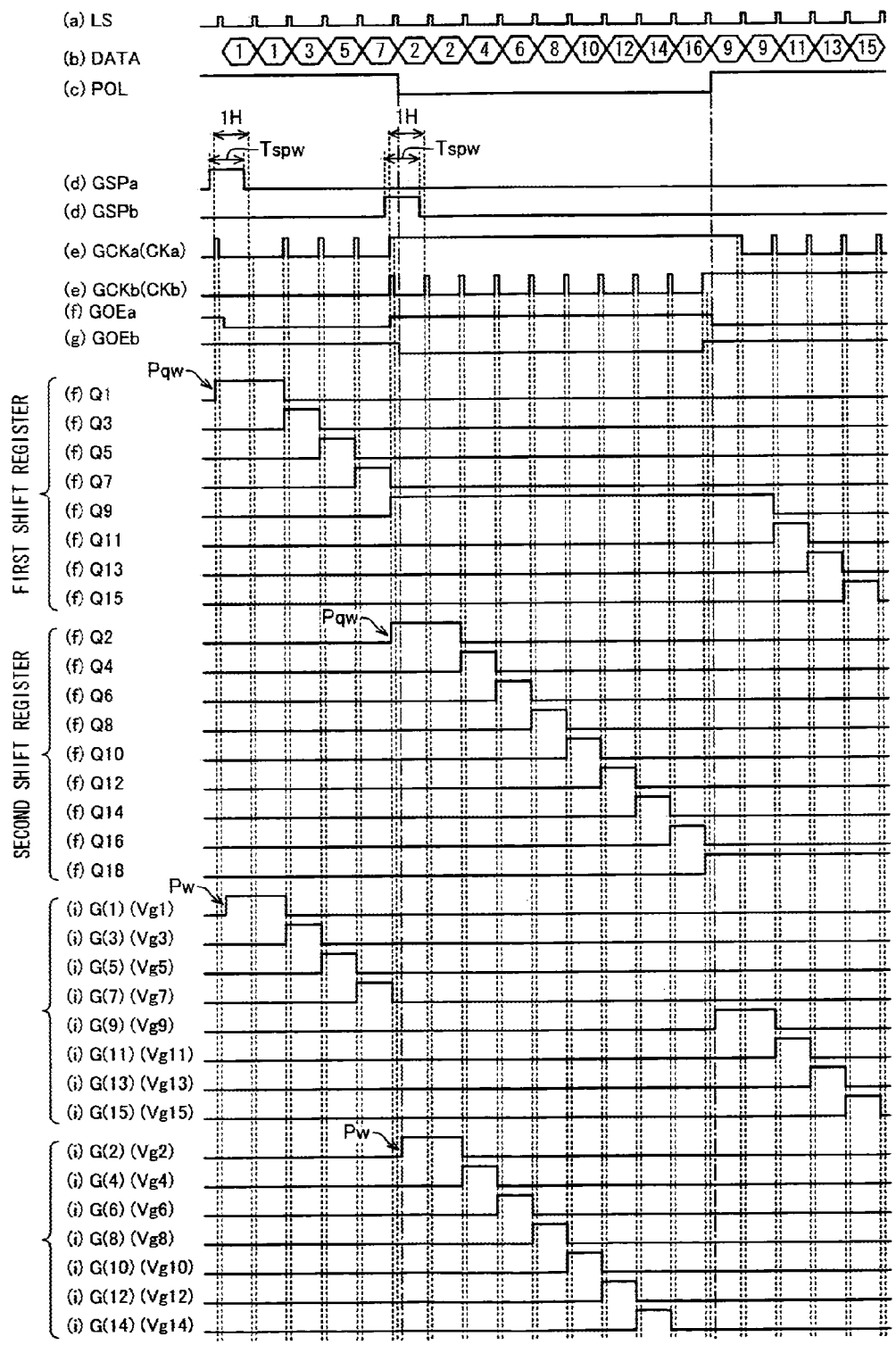

FIG. 47 is a waveform chart showing performance of a gate driver.

FIG. 48

Figure 48:
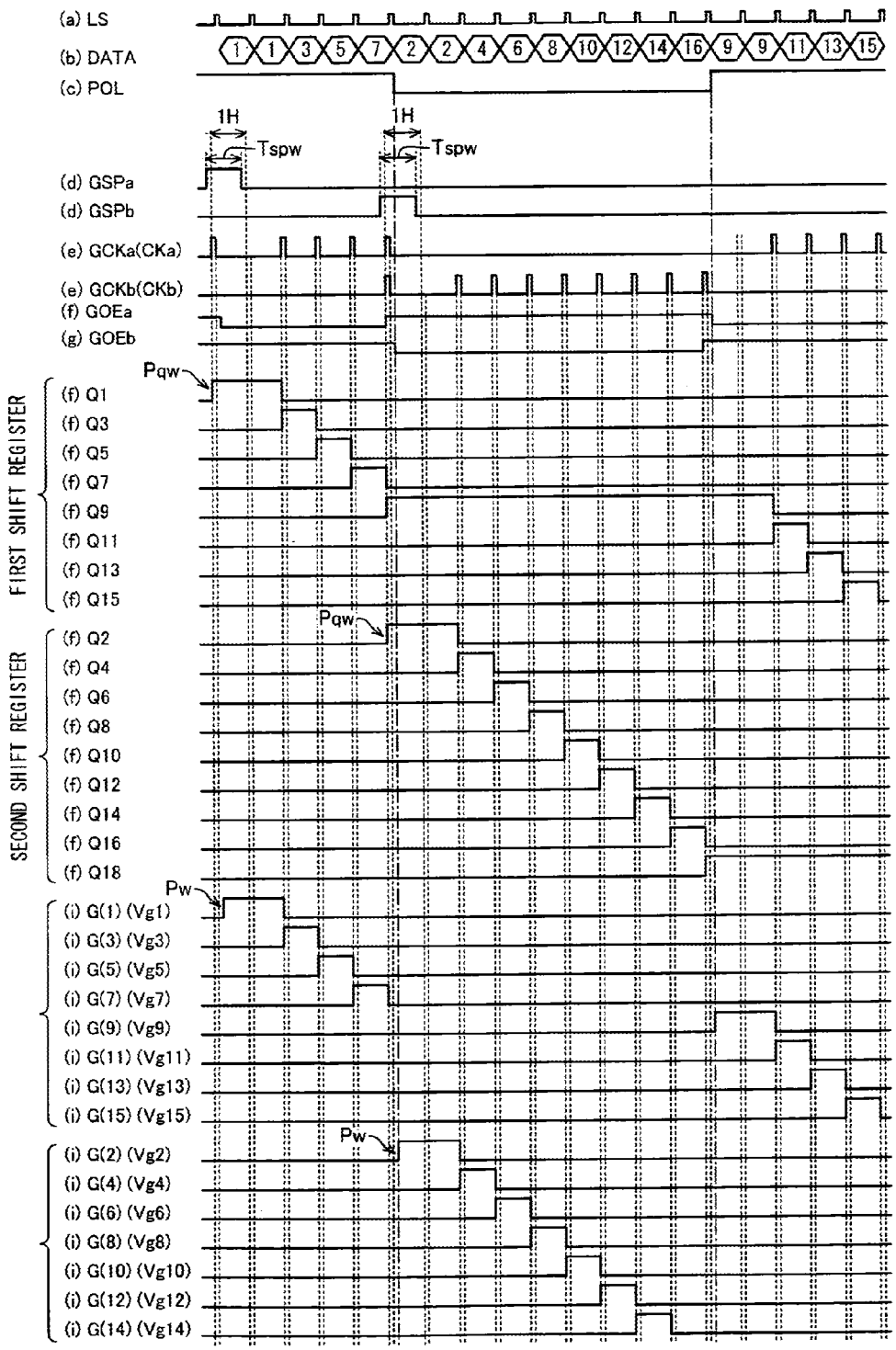

FIG. 48 is a waveform chart showing a drive performance other than that in FIG. 47.

FIG. 49

Figure 49:
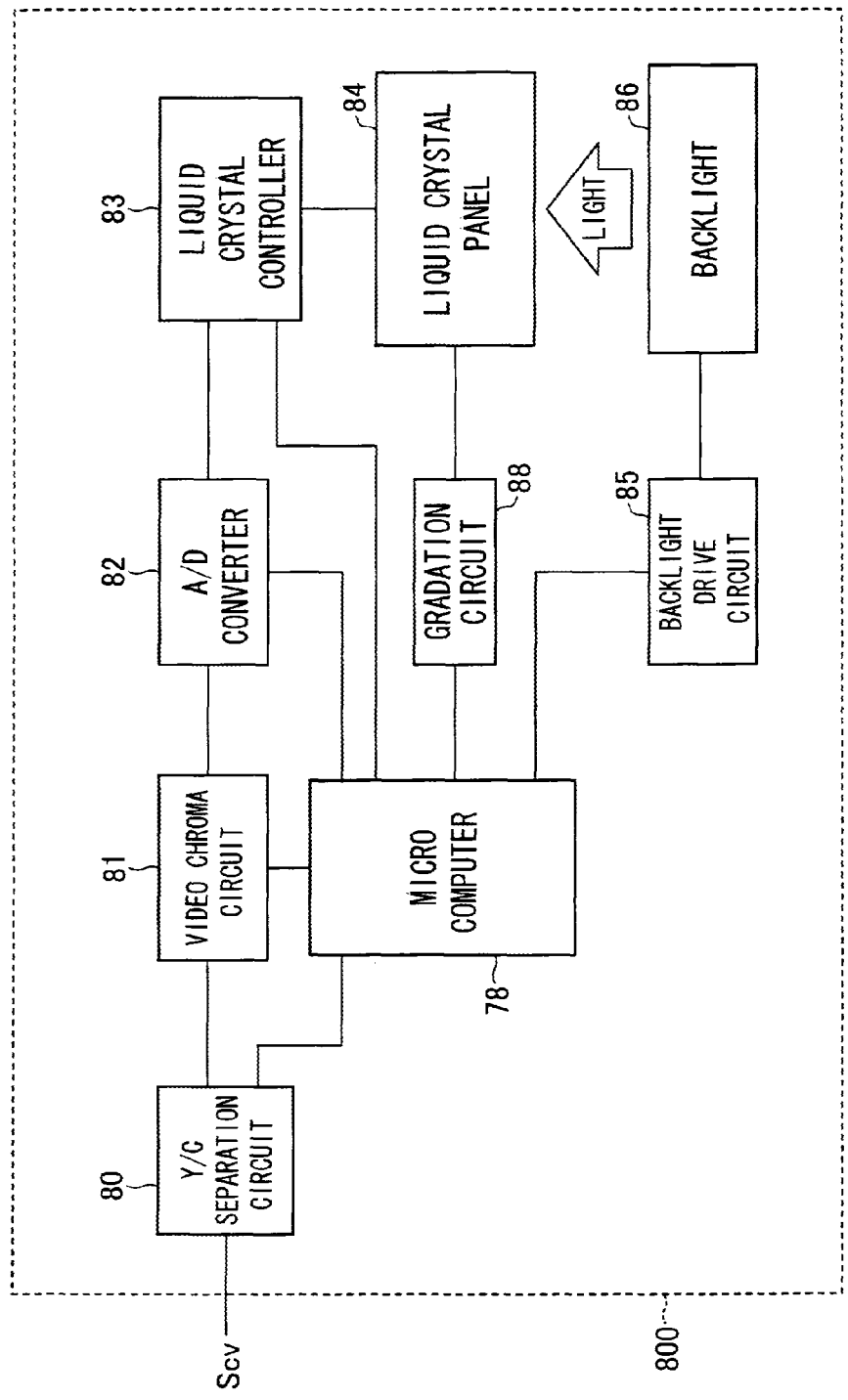

FIG. 49 is a block diagram showing a configuration of a display device for a television receiver.

FIG. 50

FIG. 50 is a block diagram showing a connection relation between a tuner section and a display device.

FIG. 51

FIG. 51 is an exploded perspective drawing showing FIG. 52.

FIG. 52

FIG. 52 shows the result of sensory analysis in which whether tearing was observed or not was examined while changing the length of a dummy insertion period.

FIG. 53

Figure 53:
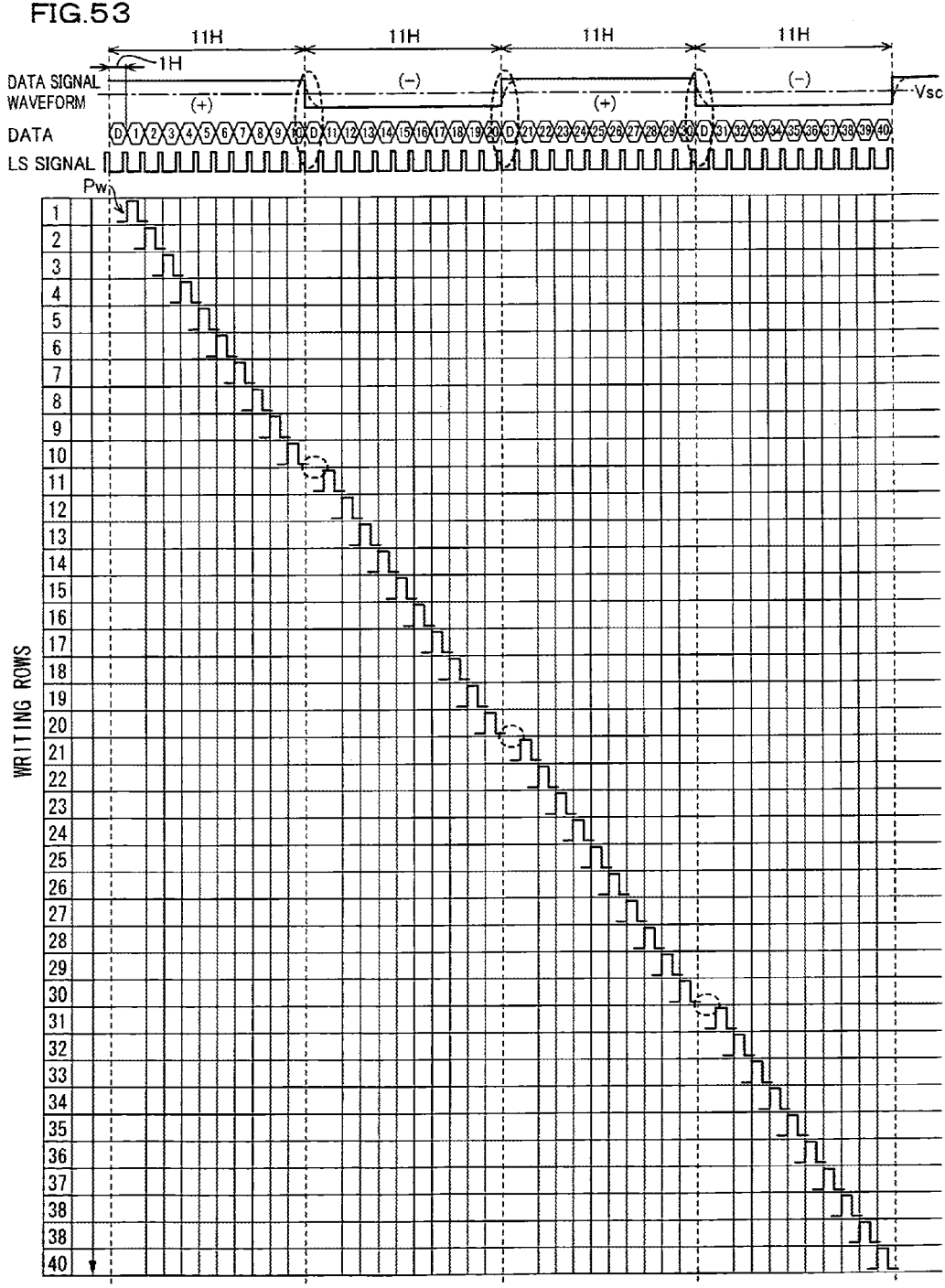

FIG. 53 shows a data signal waveform, a data signal, a latch strobe signal, and a gate-on pulse in driving by progressive scan where the polarity of a data signal voltage is inverted with respect to every 10 rows and 1 horizontal period right after polarity inversion is regarded as a dummy insertion period.

FIG. 54

Figure 54:
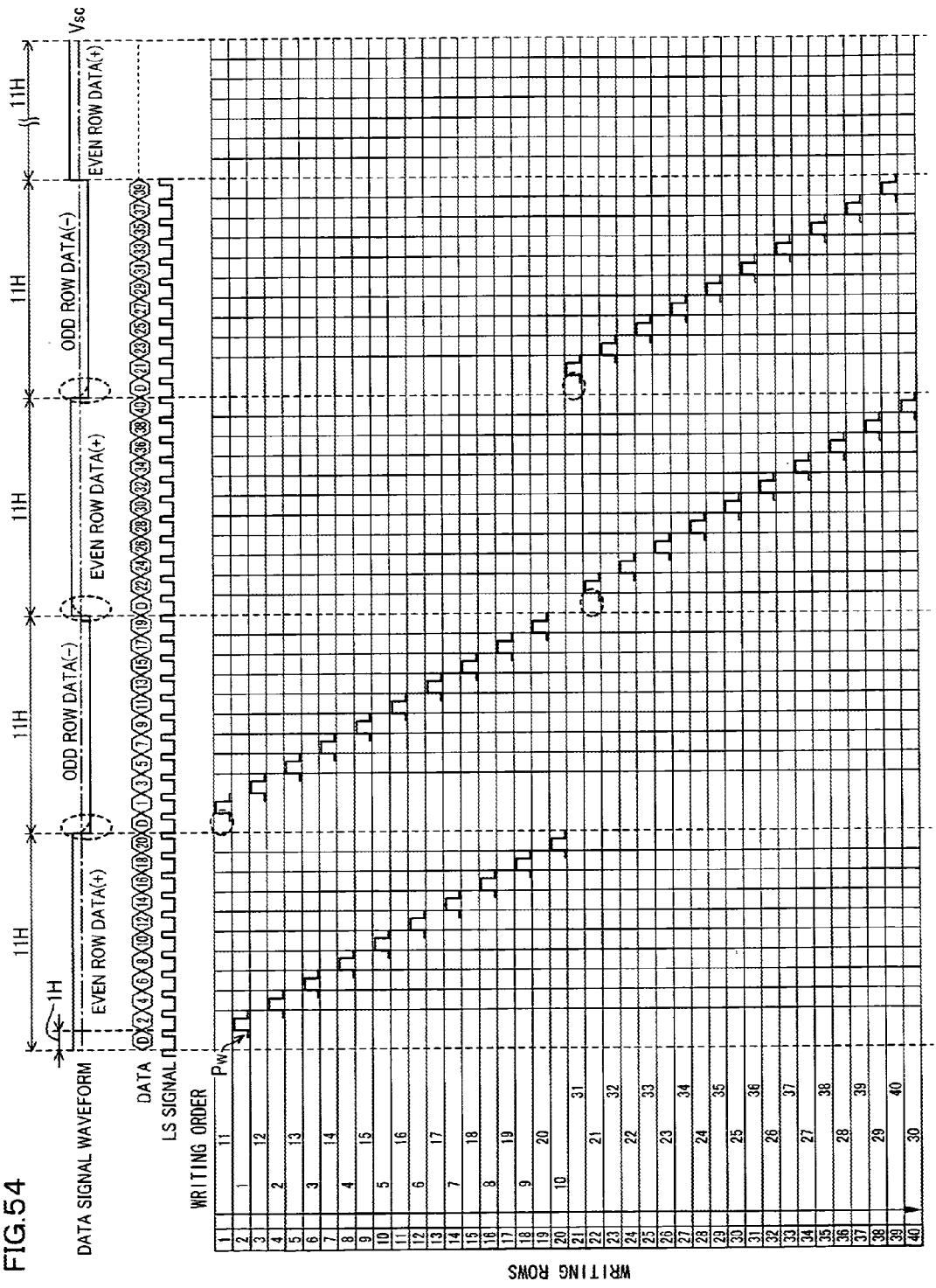

FIG. 54 shows a timing chart of a data signal waveform, a data signal, a latch strobe signal, and a gate-on pulse in a case where interlace scan of skipping every second gate line is performed and where the polarity of a signal potential to be supplied to one source line is inverted with respect to every 10 data, and one dummy scanning period is inserted right after polarity inversion (with respect to every 10 horizontal scanning periods).

FIG. 55

Figure 55:
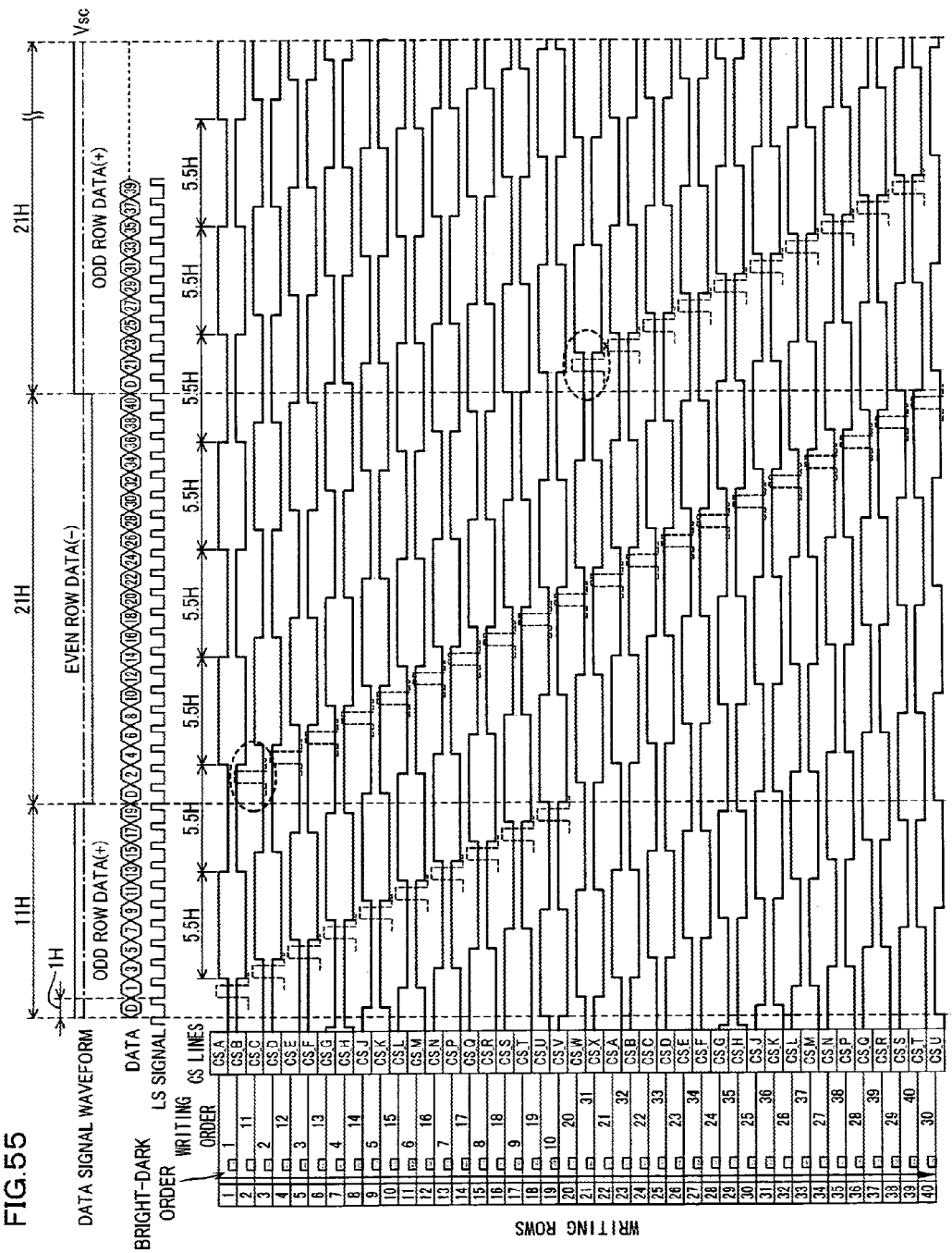

FIG. 55 shows a timing chart of a data signal waveform, a data signal, a latch strobe signal, and a gate-on pulse in driving where interlace scan of skipping every second gate line is performed and the polarity of a signal potential supplied to one source line is inverted with respect to 10 data in a first set, and 1 dummy scanning period is inserted right after polarity inversion (including start of scanning), and the polarity of a data signal is inverted with respect to every 20 data in a second set and thereafter, and 1 dummy scanning period is inserted right after polarity inversion.

FIG. 56

Figure 56:
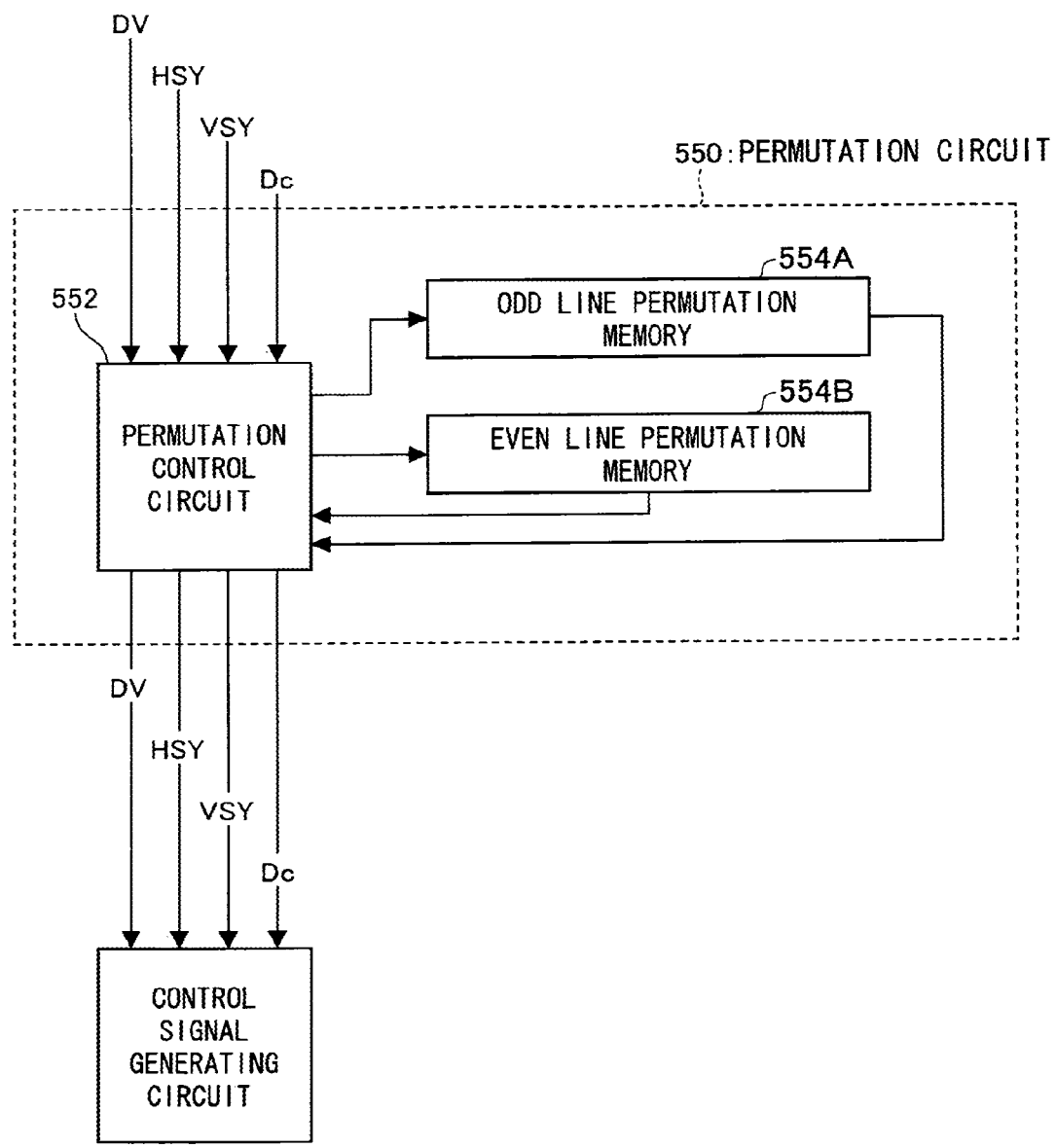

FIG. 56 is a block diagram schematically showing a permutation circuit.

FIG. 57

Figure 57:
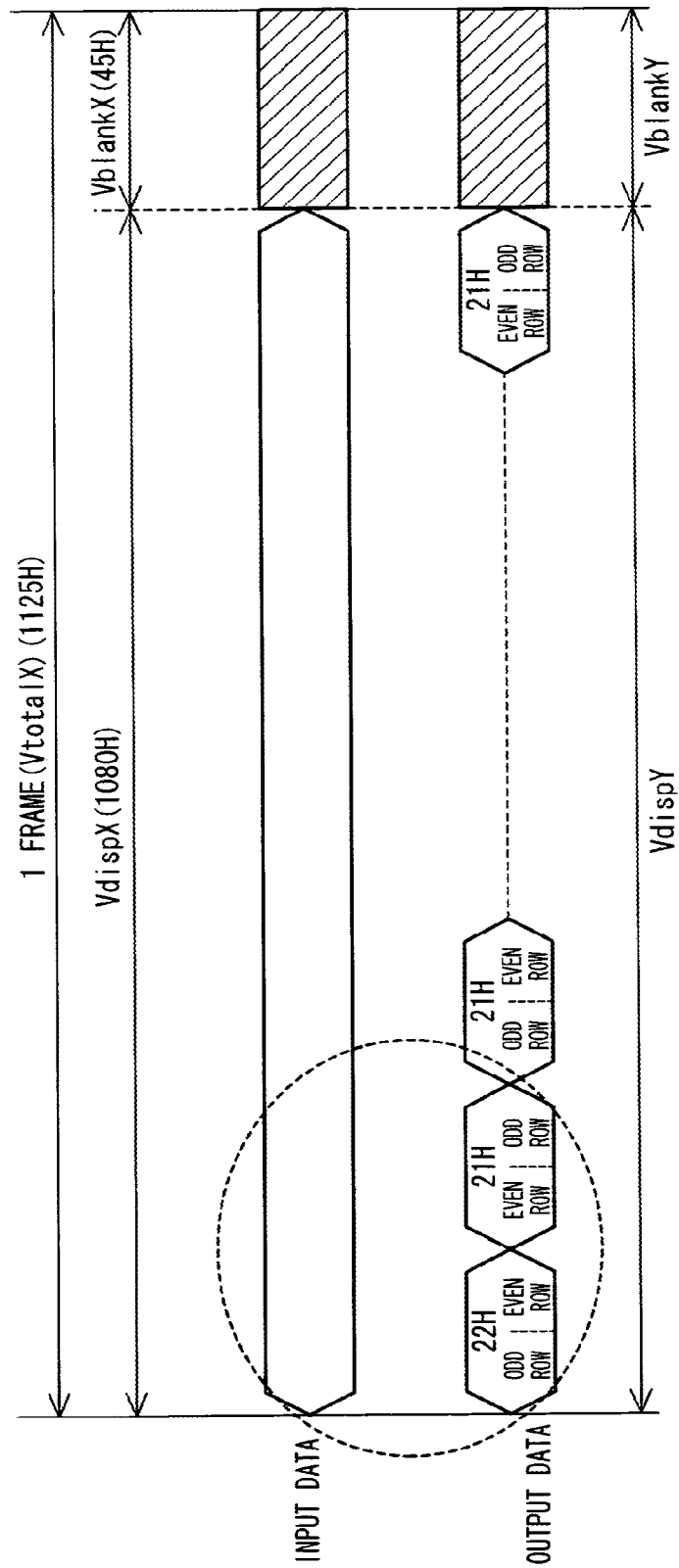

FIG. 57 is a drawing schematically explaining how to permute data.

FIG. 58

Figure 58:
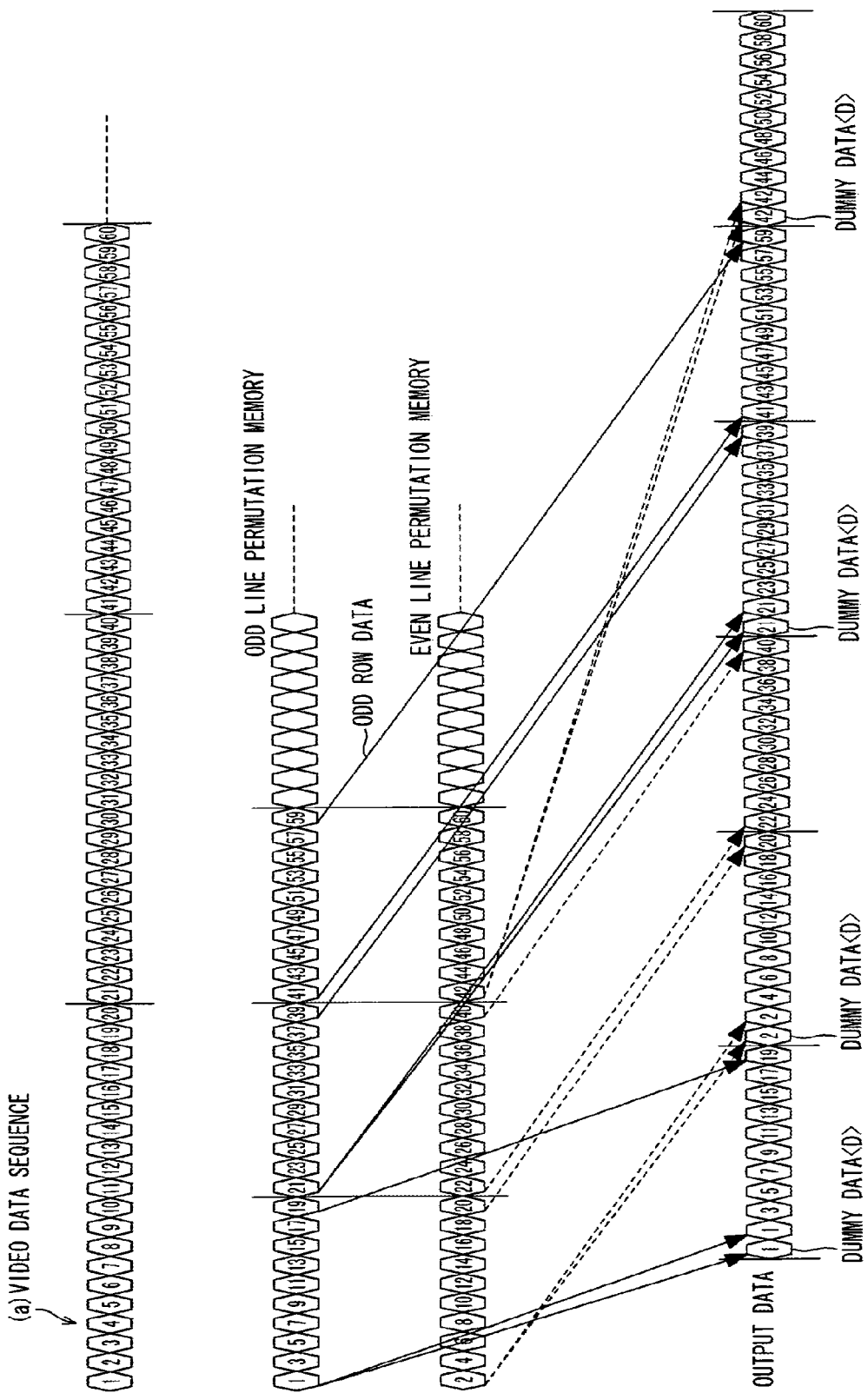

FIG. 58 is an enlarged drawing schematically showing a portion surrounded by a dotted line in FIG. 57.

FIG. 59

Figure 59:
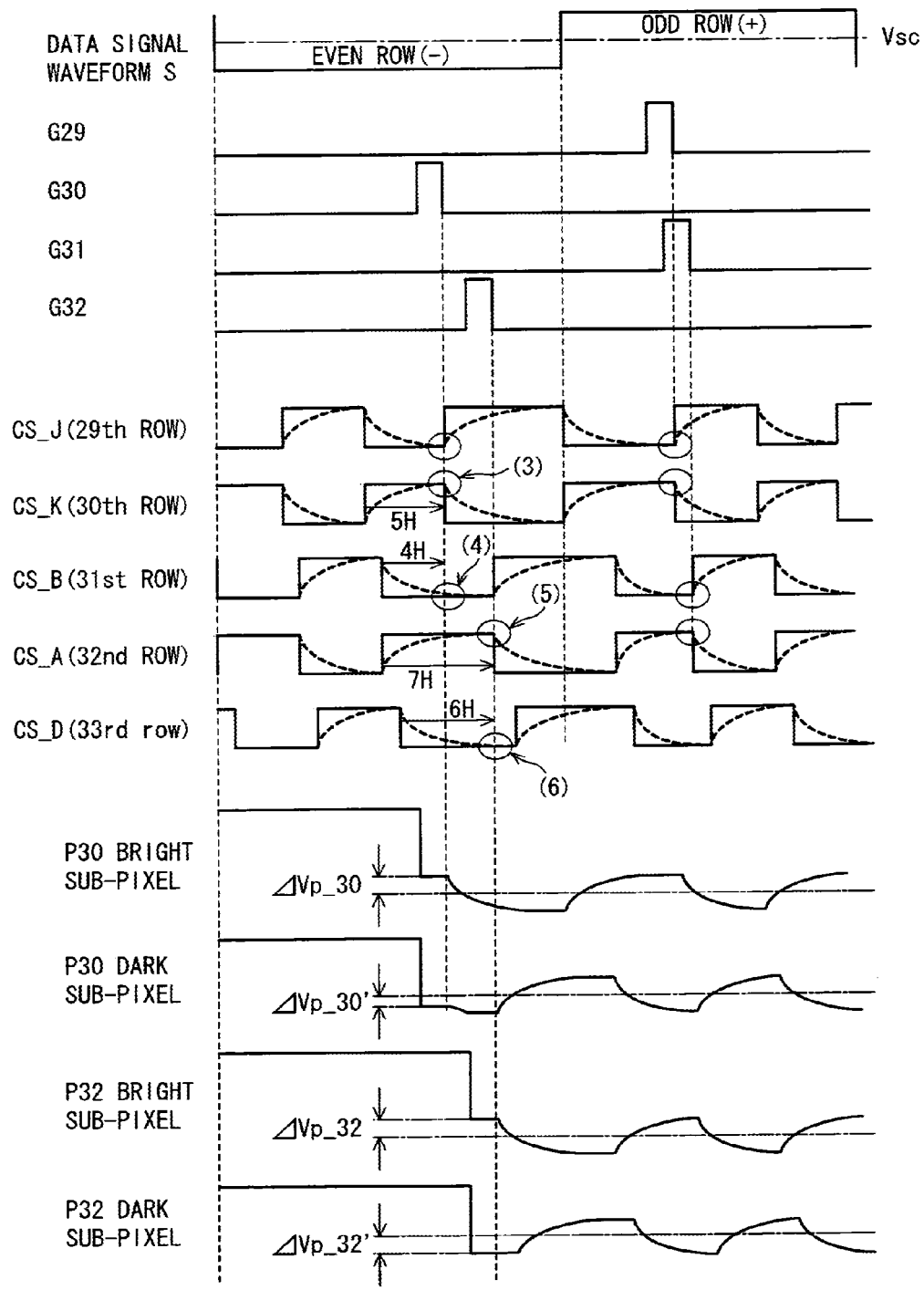

FIG. 59 is a timing chart showing a data signal waveform, a gate-on pulse, a CS signal, and a state of application of a voltage on a sub-pixel.

FIG. 60

Figure 60:
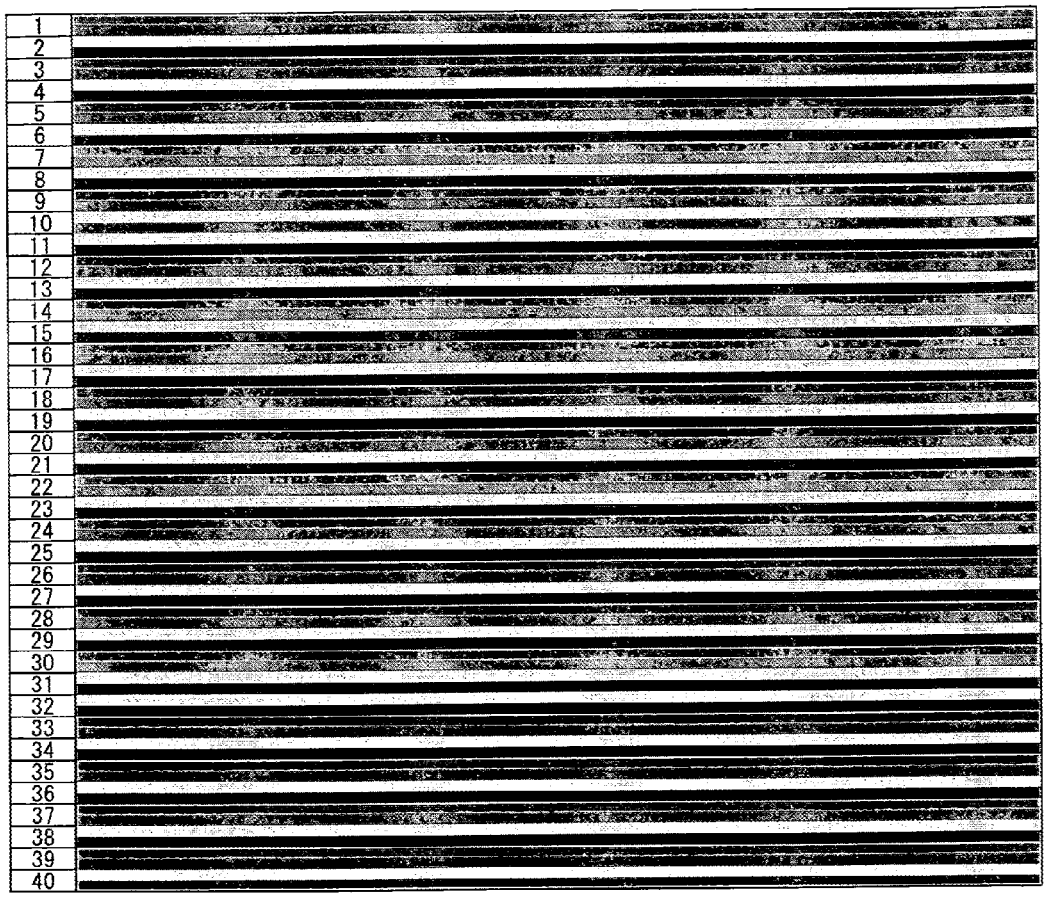

FIG. 60 is a drawing showing periodic display unevenness on a display screen due to difference in a reaching ratio of a voltage of a CS signal.

FIG. 61

Figure 61:
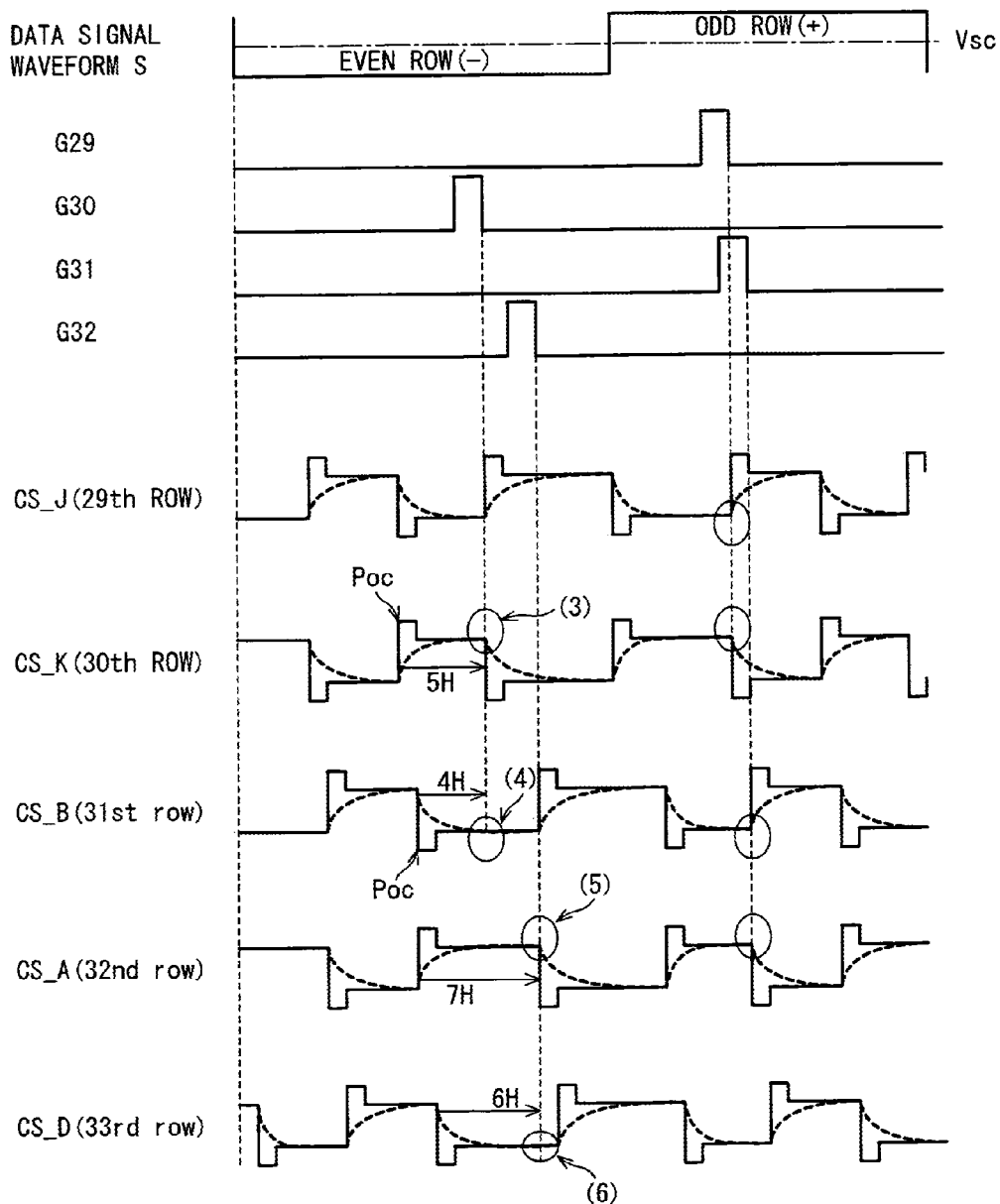

FIG. 61 is a timing chart of a data signal waveform, a gate-on pulse, and a CS signal in a case where control is performed so as to generate an overshoot pulse Poc with a predetermined width with timing of rise or fall of a CS signal.

FIG. 62

Figure 62:
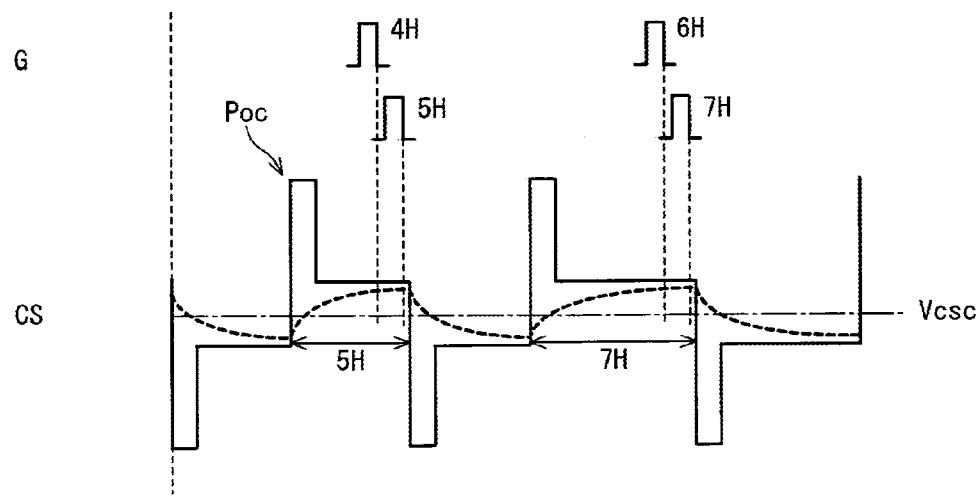

FIG. 62 a drawing showing a set waveform and an actual waveform of a CS signal in a case where a horizontal period H is short.

FIG. 63

Figure 63:
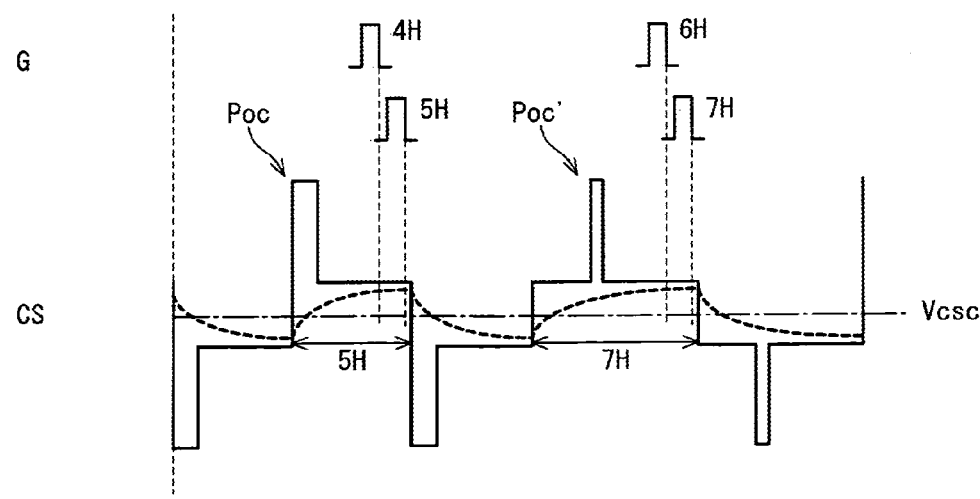

FIG. 63 is a drawing showing a set waveform and an actual waveform of a CS signal in a case where a pulse width of an overshoot pulse and application timing of an overshoot pulse are changed according to the length of a polarity inversion cycle of a CS signal.

FIG. 64

Figure 64:
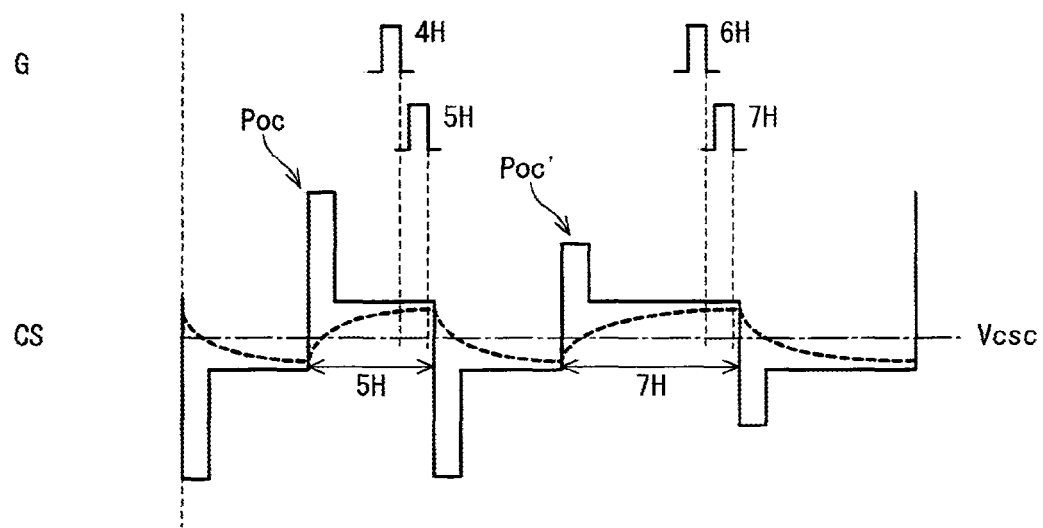

FIG. 64 is a drawing showing a set waveform and an actual waveform of a CS signal in a case where a voltage of an overshoot pulse is changed according to the length of a polarity inversion cycle of a CS signal.

FIG. 65

Figure 65:
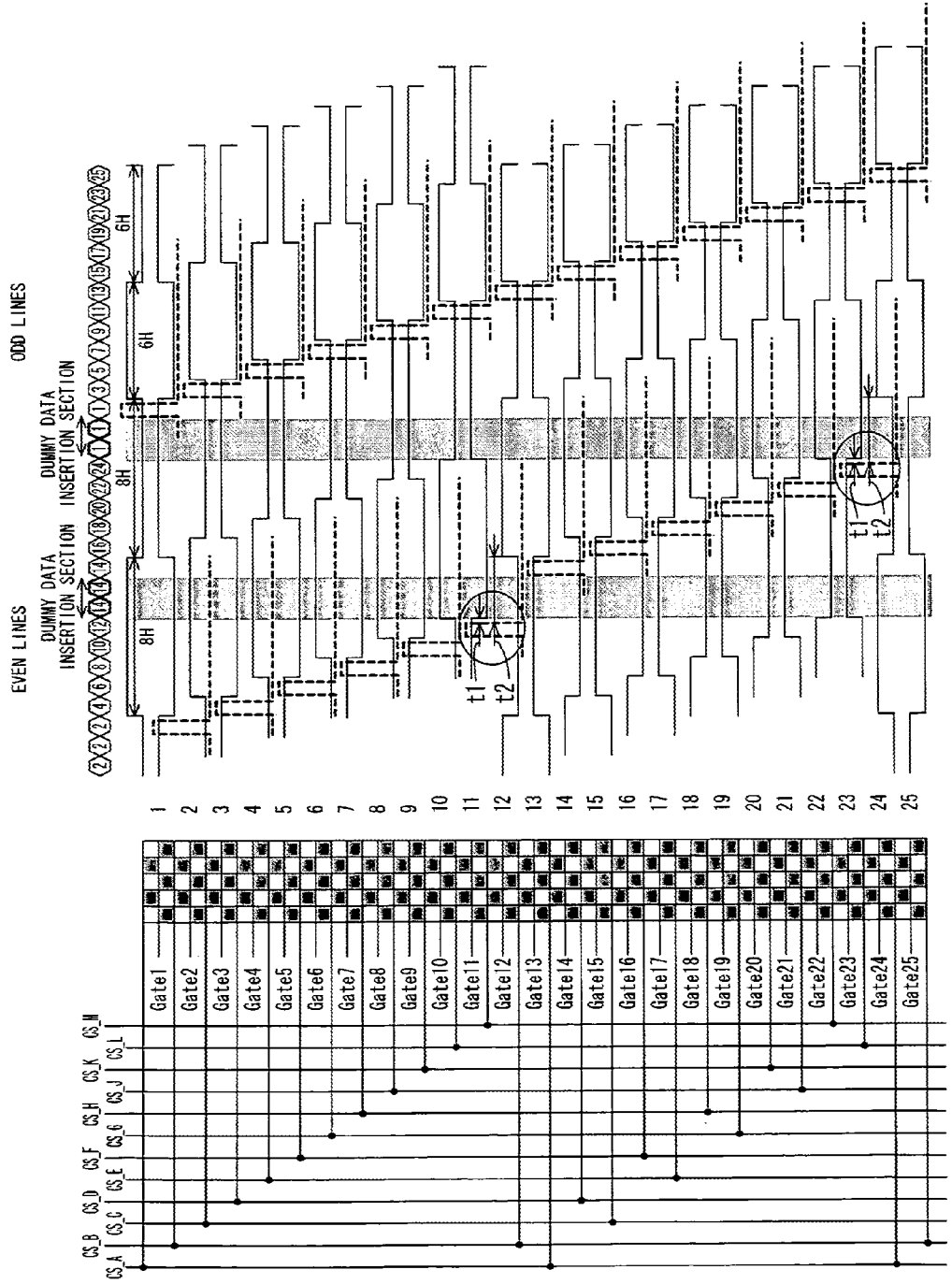

FIG. 65 shows states of connections between CS main lines and CS lines and a timing chart of a CS signal and a gate-on pulse in driving by block-divided interlace scan where the number α of scanning lines in one block is 48 and where each of a first dummy insertion period and a second dummy insertion period is 2H.

FIG. 66

Figure 66:
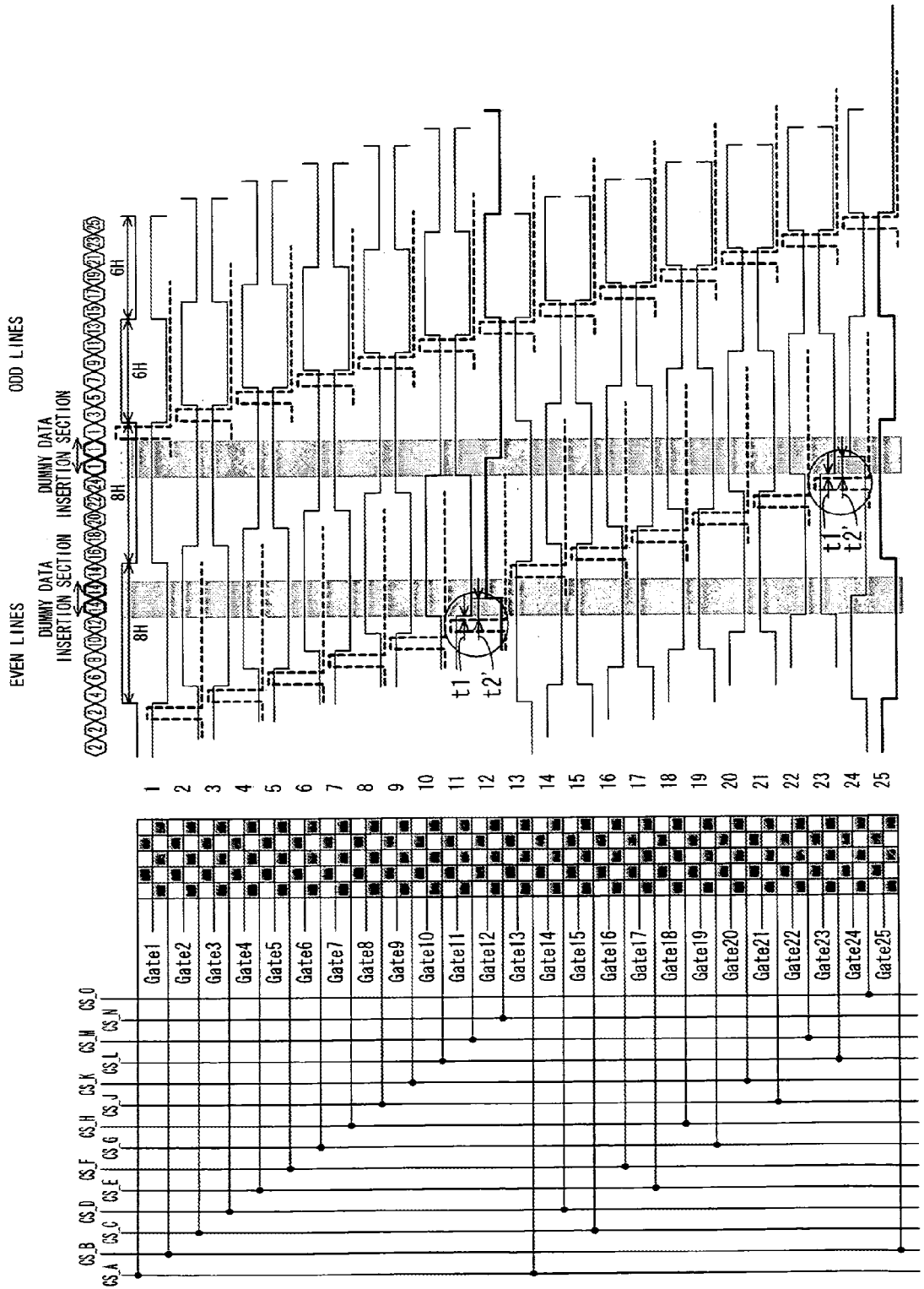

FIG. 66 is a timing chart showing a state of FIG. 65 to which two CS main lines are added and CS_P and CS_O are added as a phase of a CS signal.

FIG. 67

Figure 67:
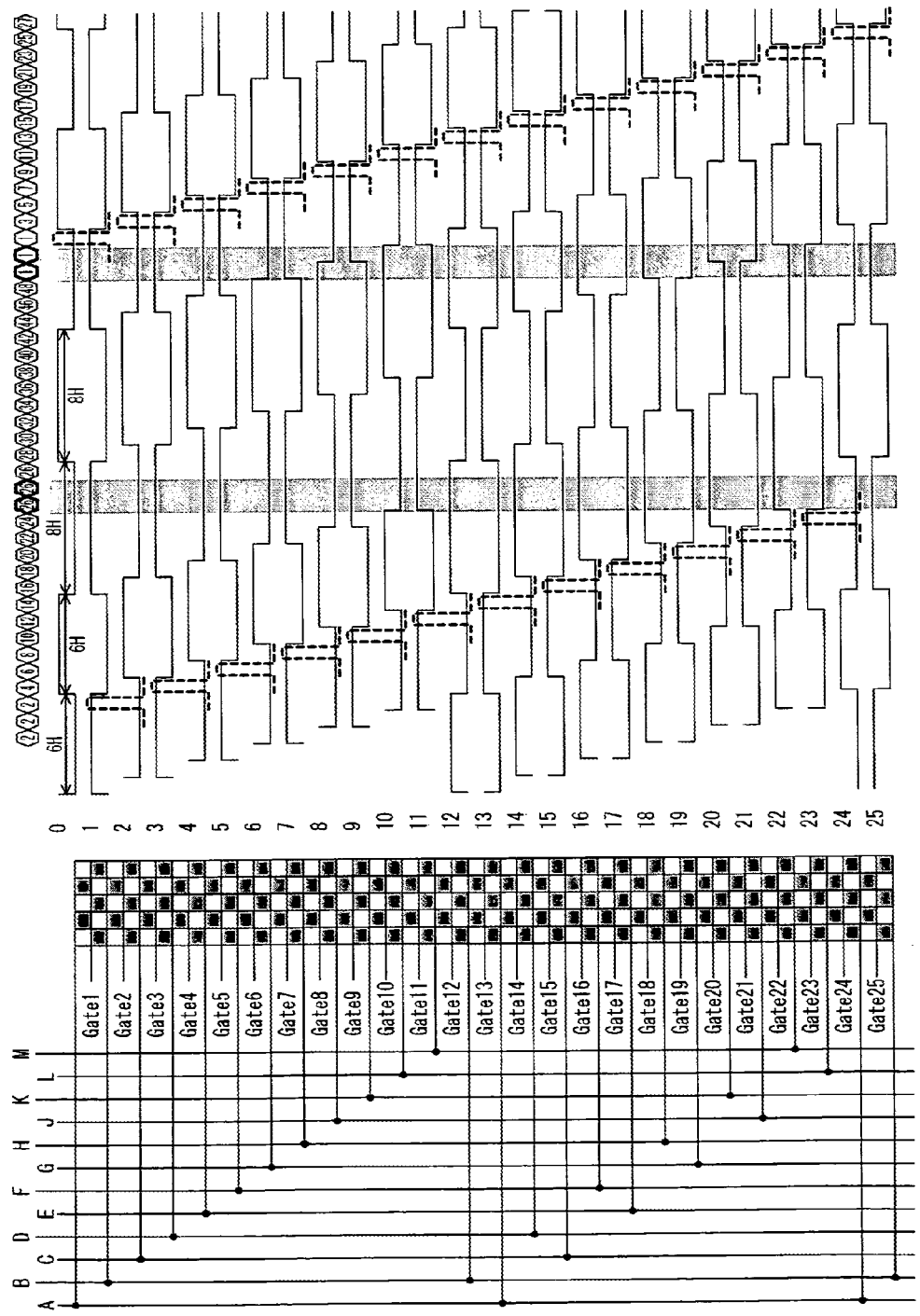

FIG. 67 shows states of connections between CS main lines and CS lines and a timing chart of a CS signal and a gate-on pulse in driving by block-divided interlace scan where the number α of scanning lines in one block is 48 and where each of a first dummy insertion period and a second dummy insertion period is 2H.

FIG. 68

Figure 68:
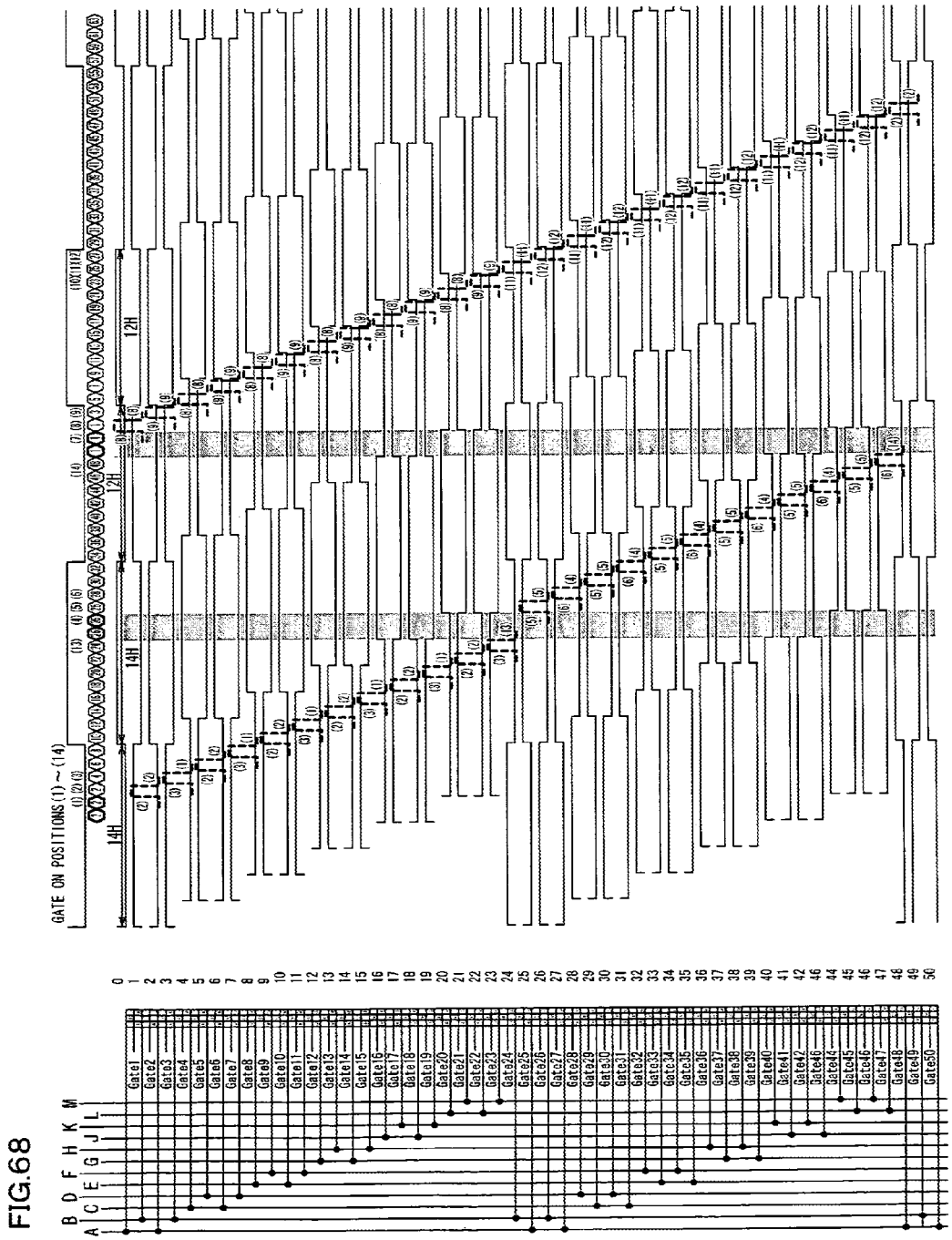

FIG. 68 shows connection states of CS main lines and CS lines and a timing chart of a CS signal and a gate-on pulse in a case where there are 12 phases of waveforms of CS signals.

FIG. 69

Figure 69:
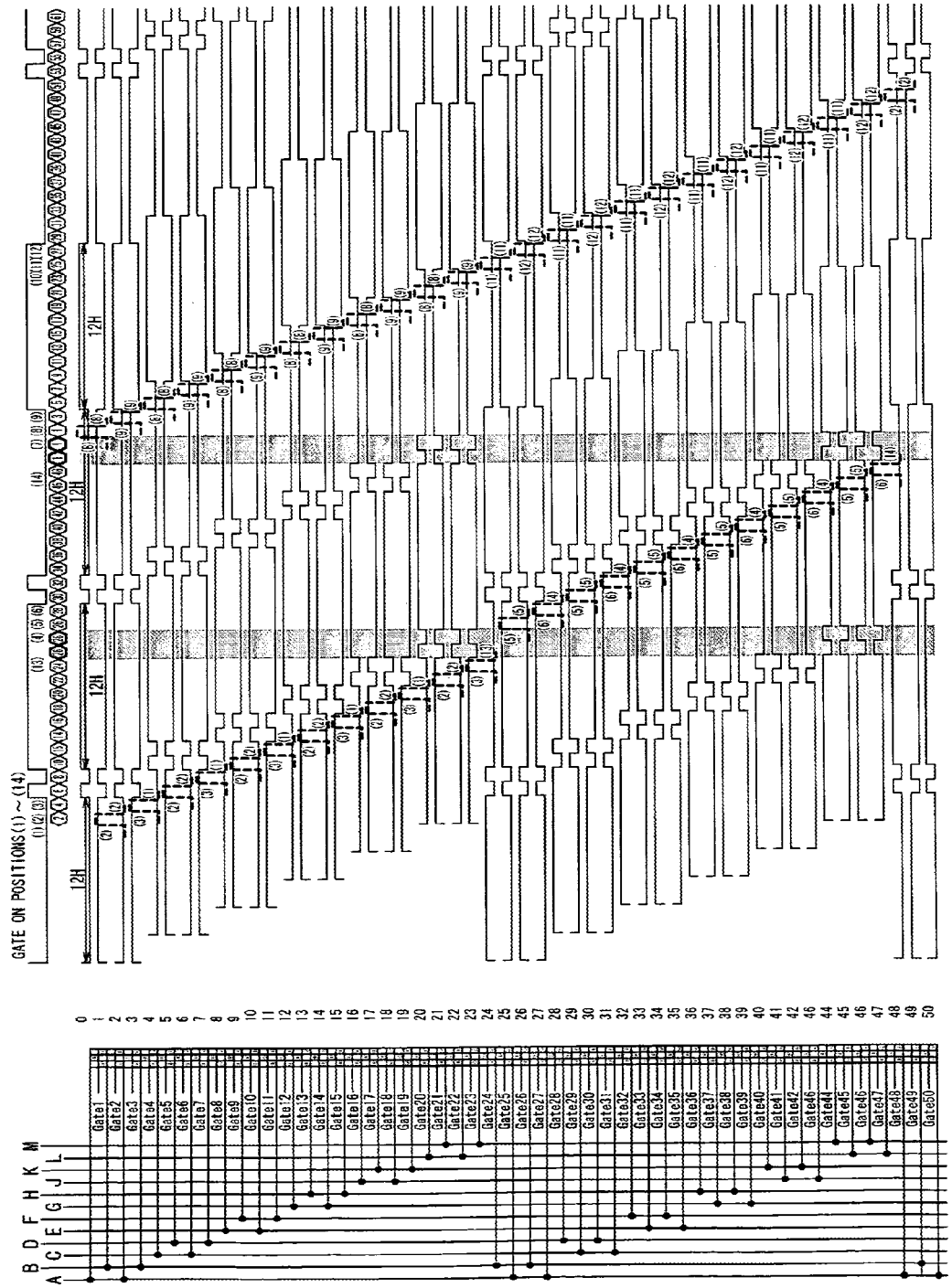
Figure 70:
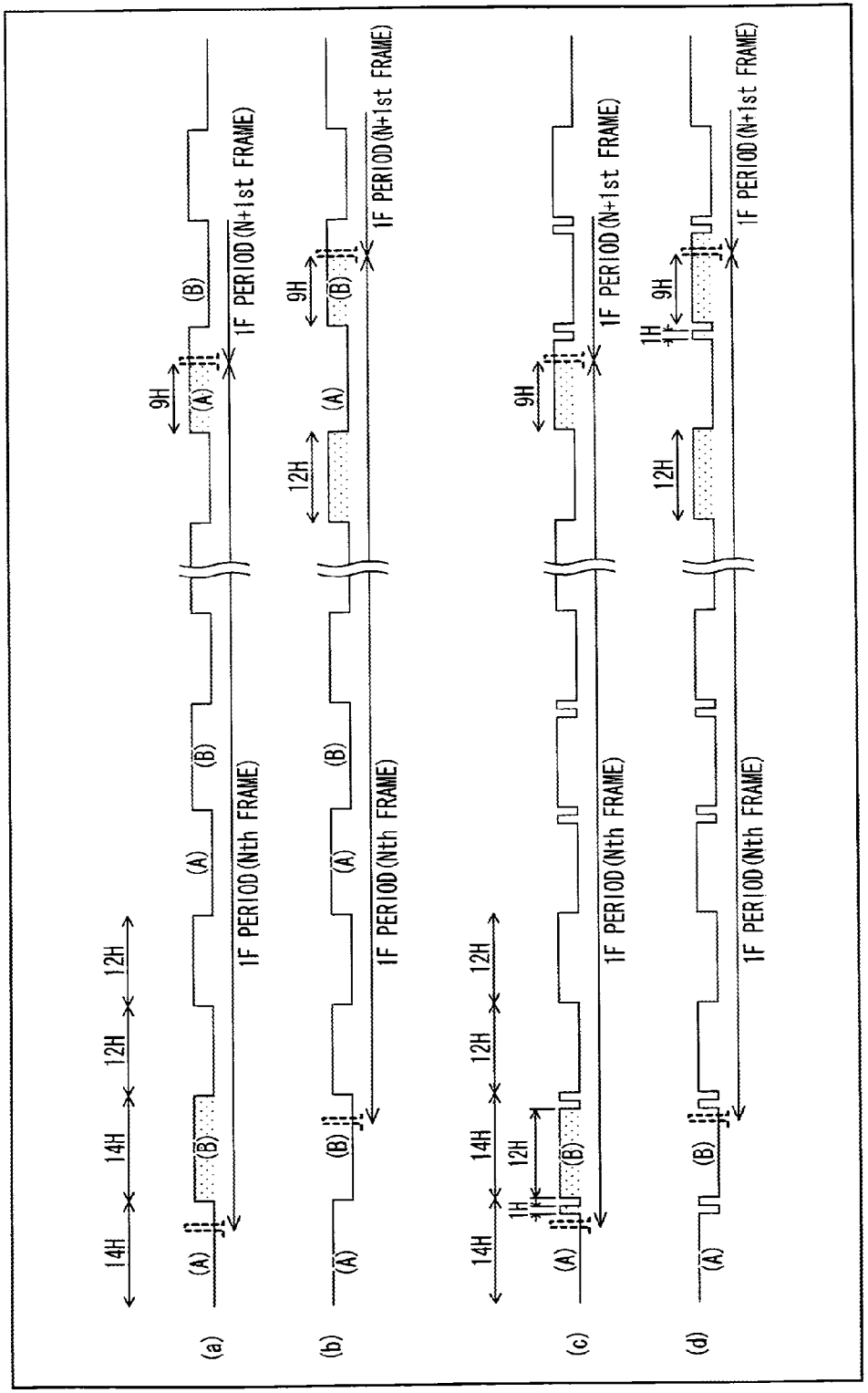

FIG. 69 shows connection states of CS main lines and CS lines and a timing chart of a CS signal and a gate-on pulse in cases where CS signals indicated by (c) and (d) of FIG. 70 are applied.

FIG. 70

(a) and (b) of FIG. 70 show driving examples whose relations between polarity inversion timing of a CS signal and gate-off timing are different from each other. (c) and (d) of FIG. 70 show driving examples in which a polarity continuation period of 14H is separated into a period of 12H and a period of 2H and the period of 2H is set so that a period of H and a period of L are equal to each other.

FIG. 71

Figure 71:
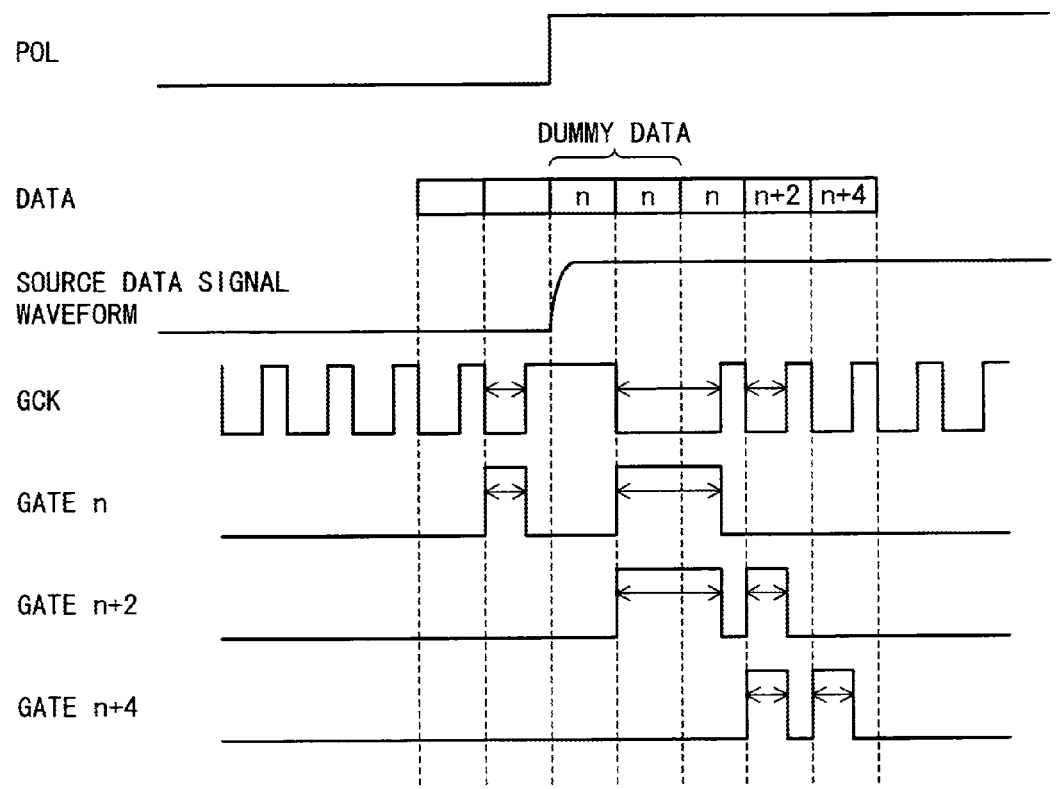

FIG. 71 is an example of driving in which a main-charging period and a pre-charging period are provided.

FIG. 72

Figure 72:
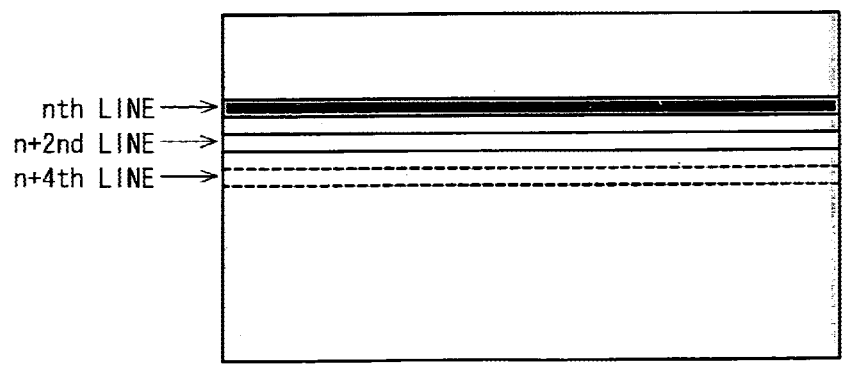

FIG. 72 shows an example of display unevenness caused by difference in luminance due to difference in charging ratio between rows.

FIG. 73

Figure 73:
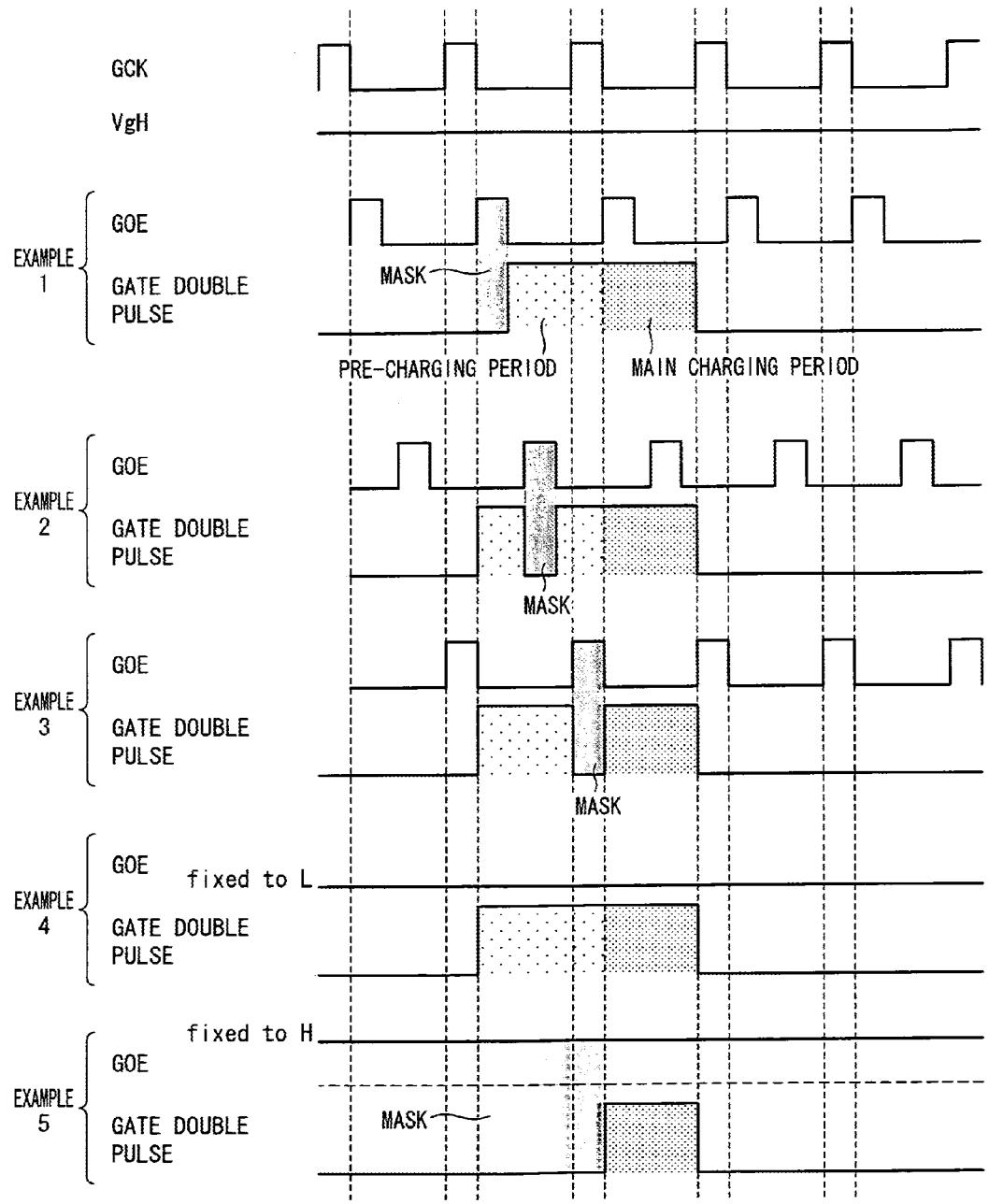

FIG. 73 shows examples of controlling a pulse width of a gate-on pulse.

FIG. 74

Figure 74:
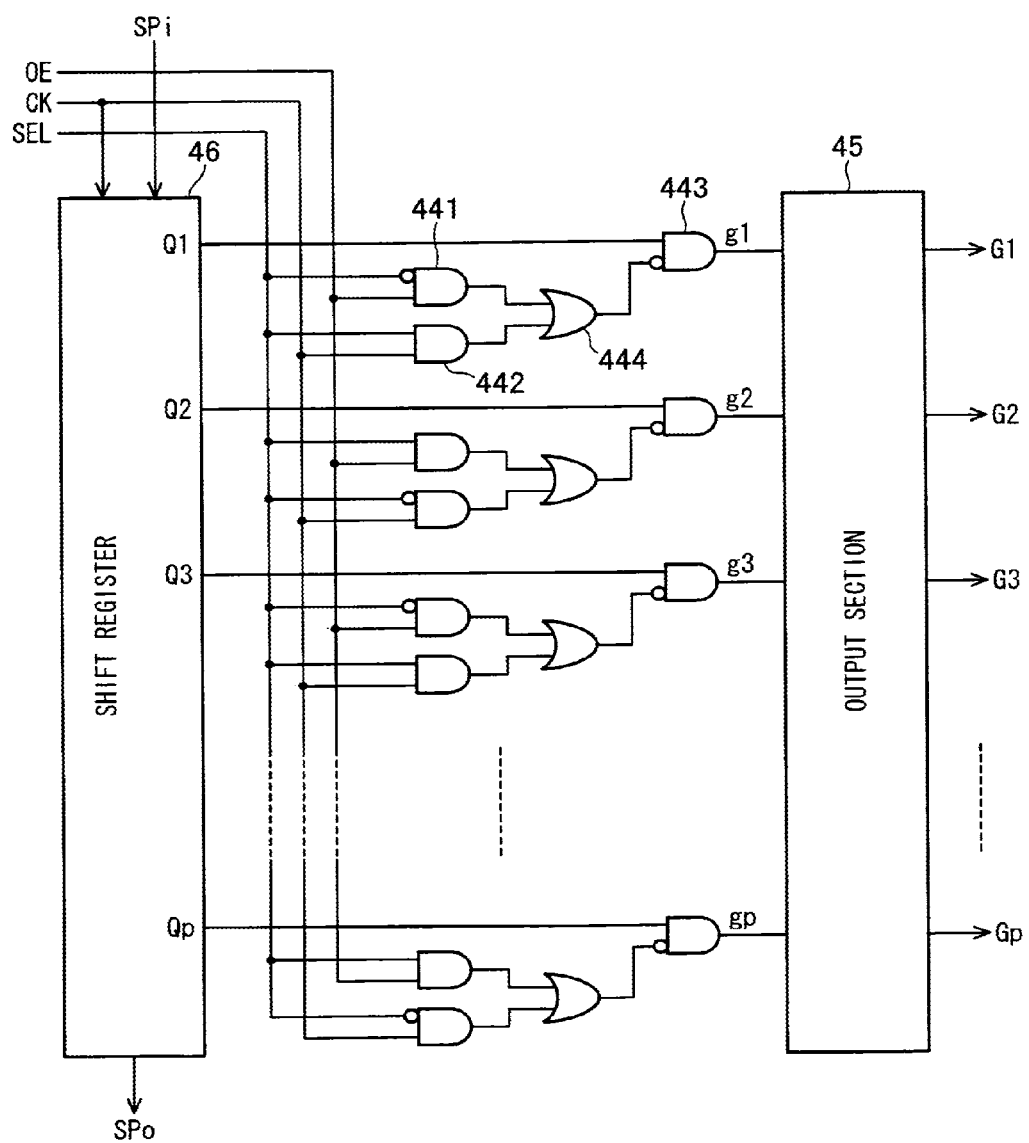

FIG. 74 shows an example of a configuration of a gate driver IC for realizing progressive scan nH inversion driving in double pulse driving.

FIG. 75

Figure 75:
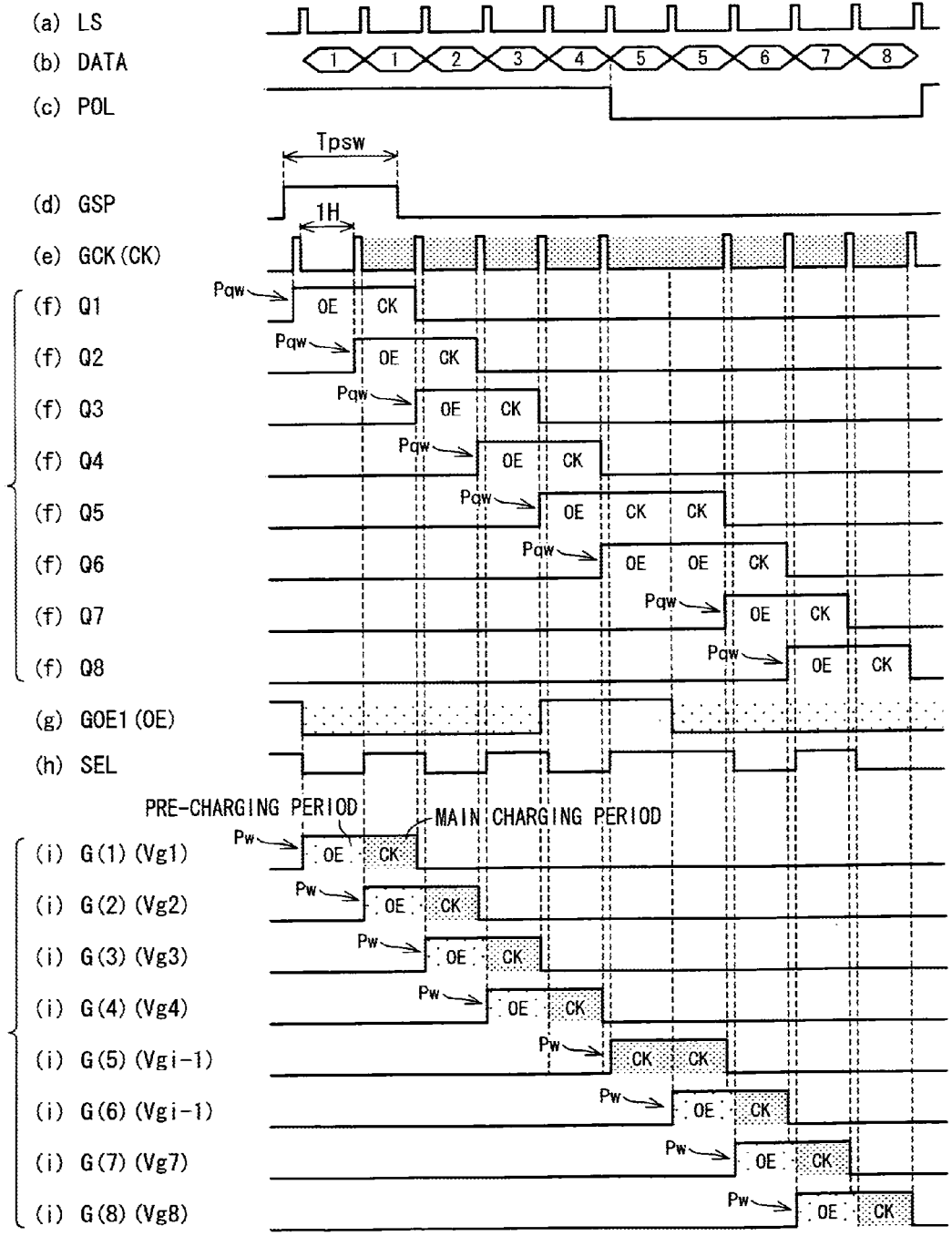

FIG. 75 is a waveform chart showing an example of performance of the gate driver shown in FIG. 74.

FIG. 76

Figure 76:
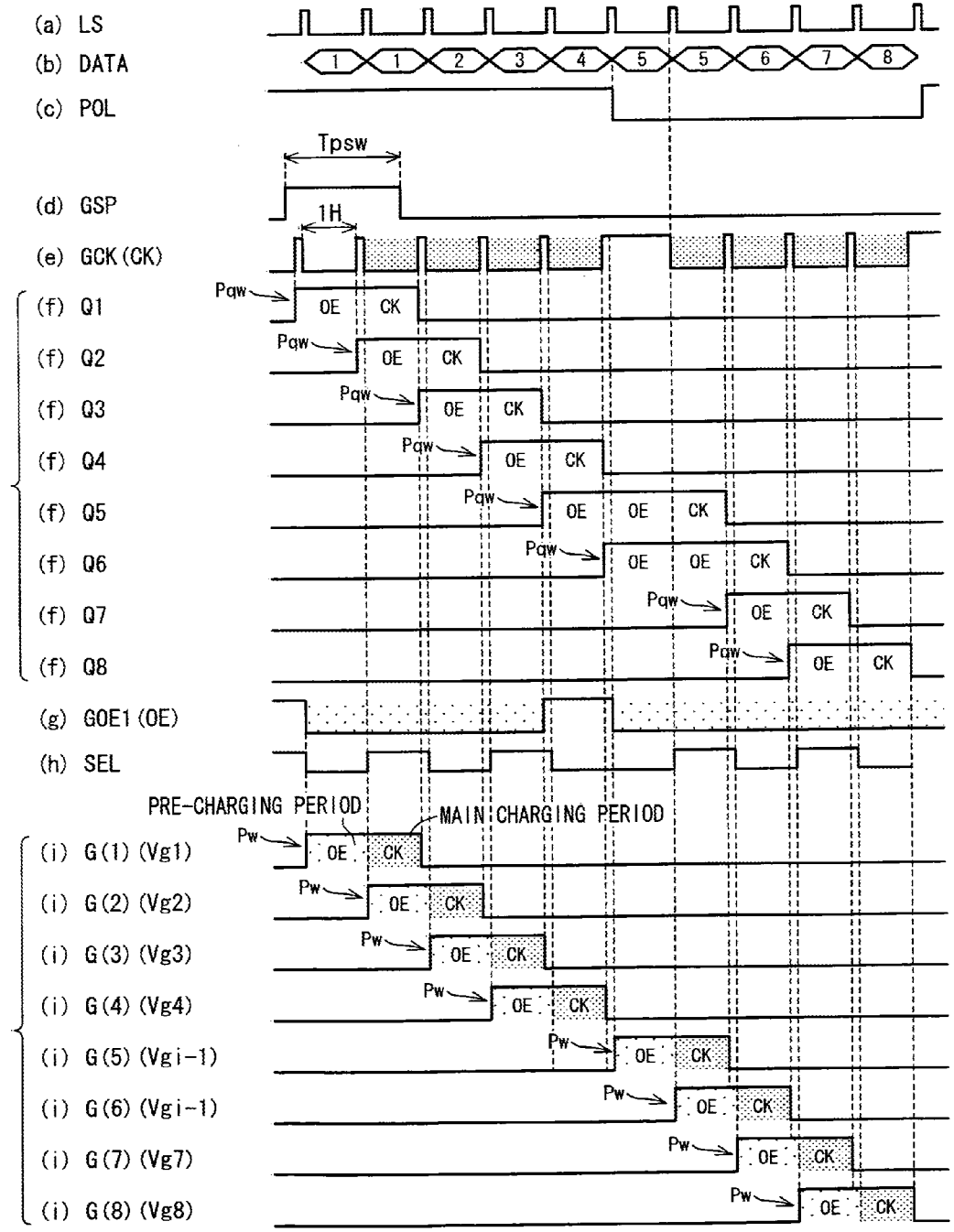

FIG. 76 is a waveform chart showing another example of performance of the gate driver shown in FIG. 74.

FIG. 77

Figure 77:
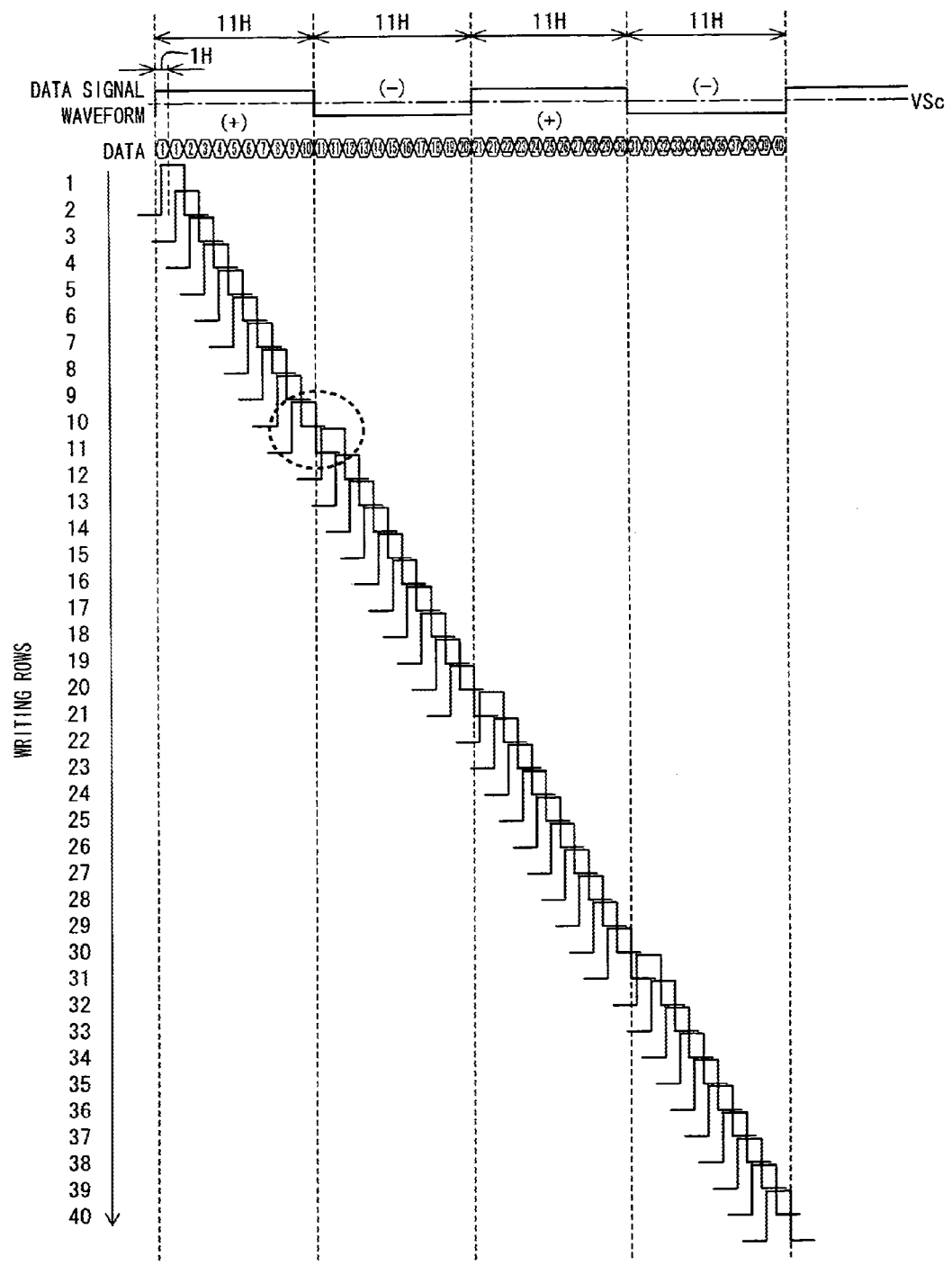

FIG. 77 is a timing chart of a data signal waveform, a data signal, a latch strobe signal, and a gate-on pulse in double pulse driving by progressive scan where 1 horizontal period right after polarity inversion is regarded as a dummy insertion period.

FIG. 78

Figure 78:
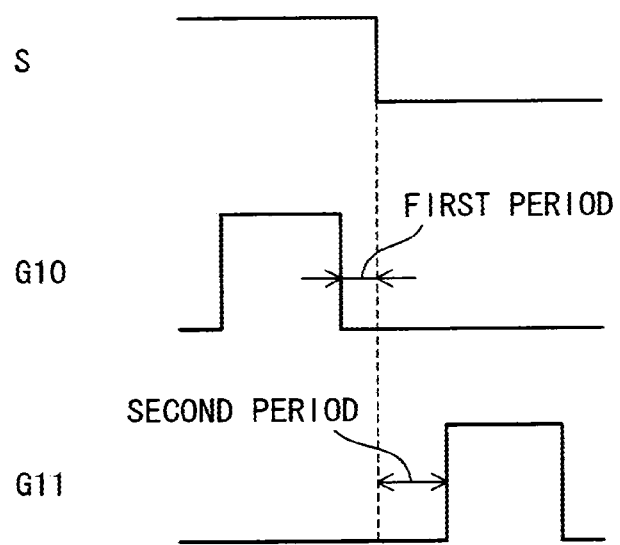

FIG. 78 is an enlarged drawing of a part of FIG. 77.

FIG. 79

Figure 79:
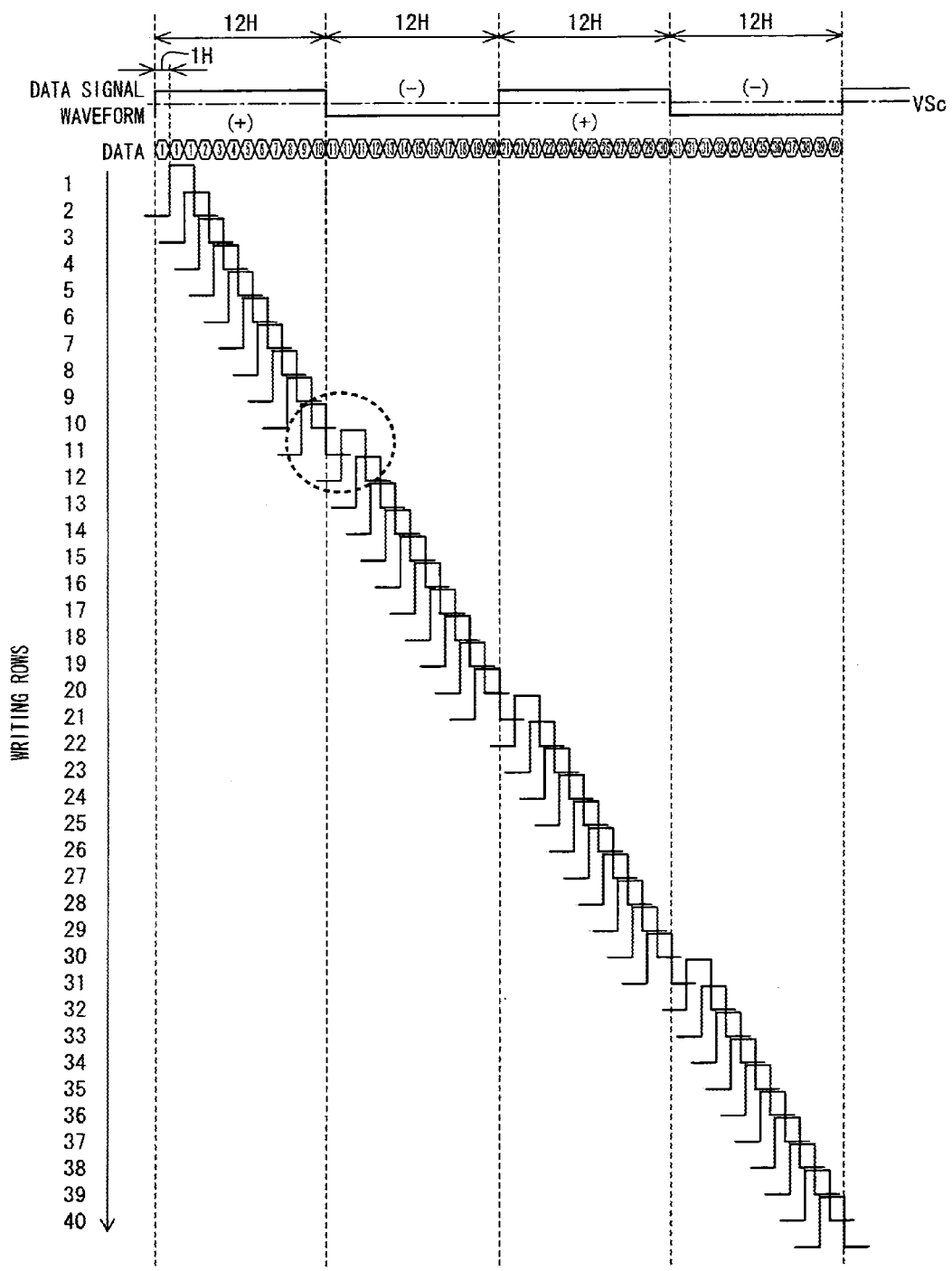

FIG. 79 shows a timing chart of a data signal waveform, a data signal, a latch strobe signal, and a gate-on pulse in double pulse driving by progressive scan where 2 horizontal periods right after polarity inversion is regarded as a dummy insertion period.

FIG. 80

Figure 80:
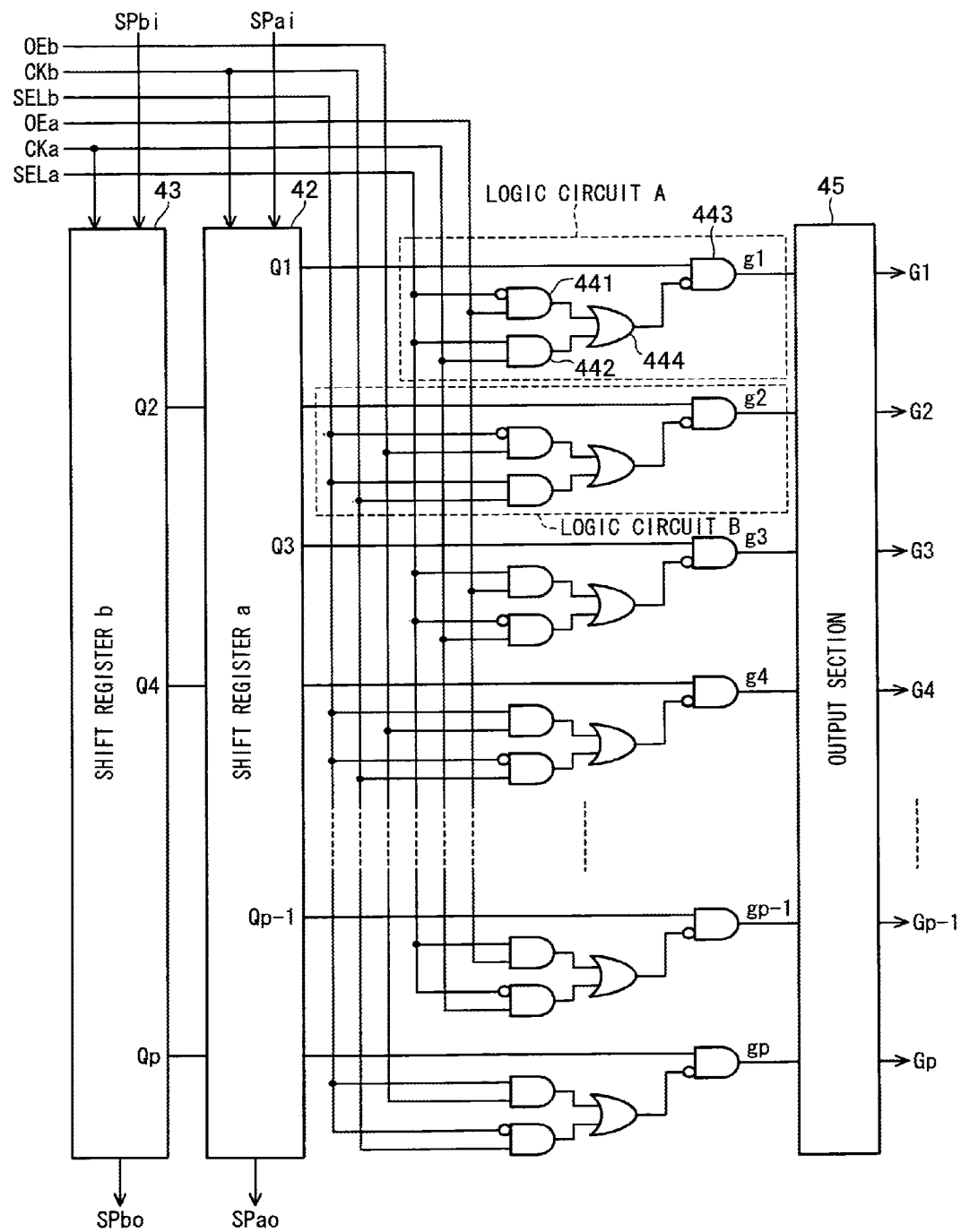

FIG. 80 shows an example of a configuration of a gate driver IC for realizing block-divided interlace driving in double pulse driving.

FIG. 81

Figure 81:
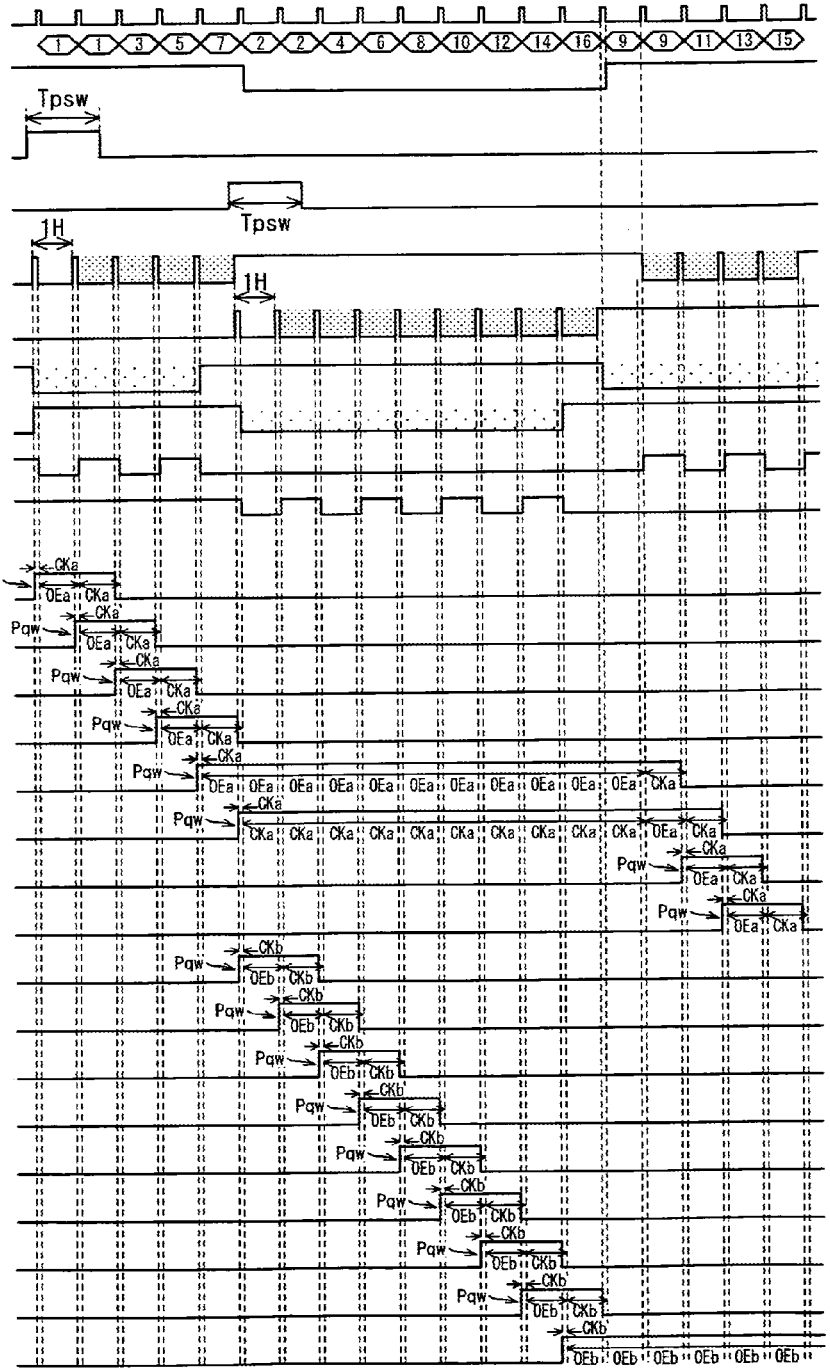

FIG. 81 shows a waveform chart showing an example of performance of the gate driver in FIG. 80.

FIG. 82

Figure 82:
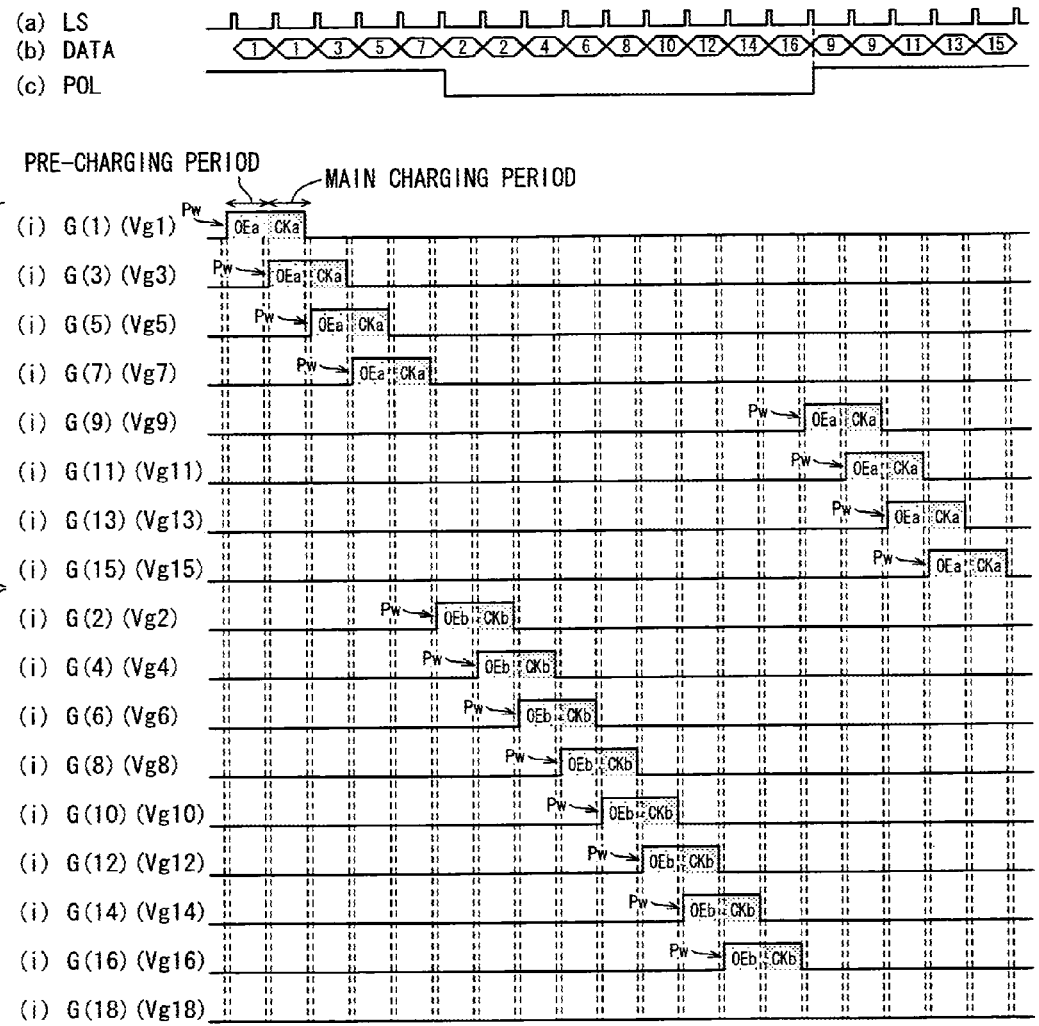

FIG. 82 shows a waveform chart showing an example of performance of the gate driver in FIG. 80.

FIG. 83

Figure 83:
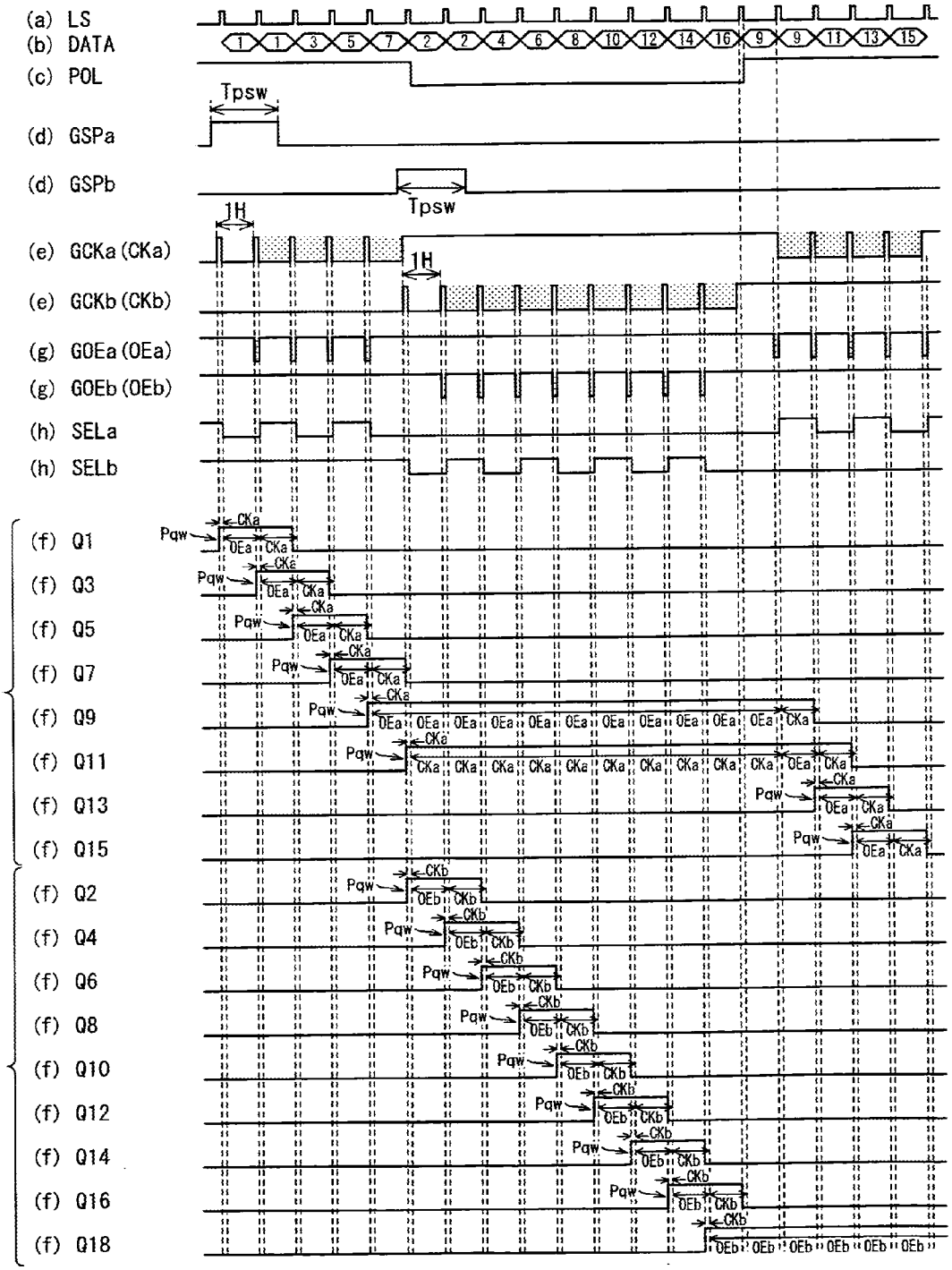

FIG. 83 shows a waveform chart showing another example of performance of the gate driver in FIG. 80.

FIG. 84

Figure 84:
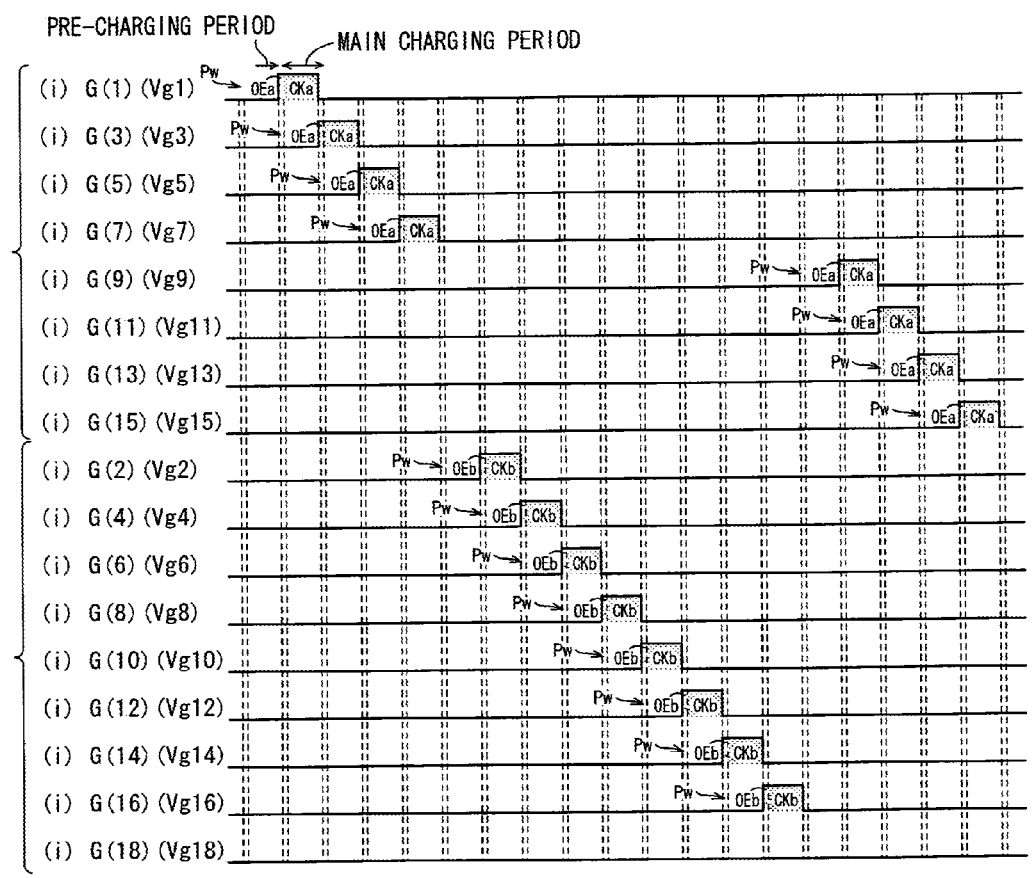

FIG. 84 shows a waveform chart showing another example of performance of the gate driver in FIG. 80.

FIG. 85

Figure 85:
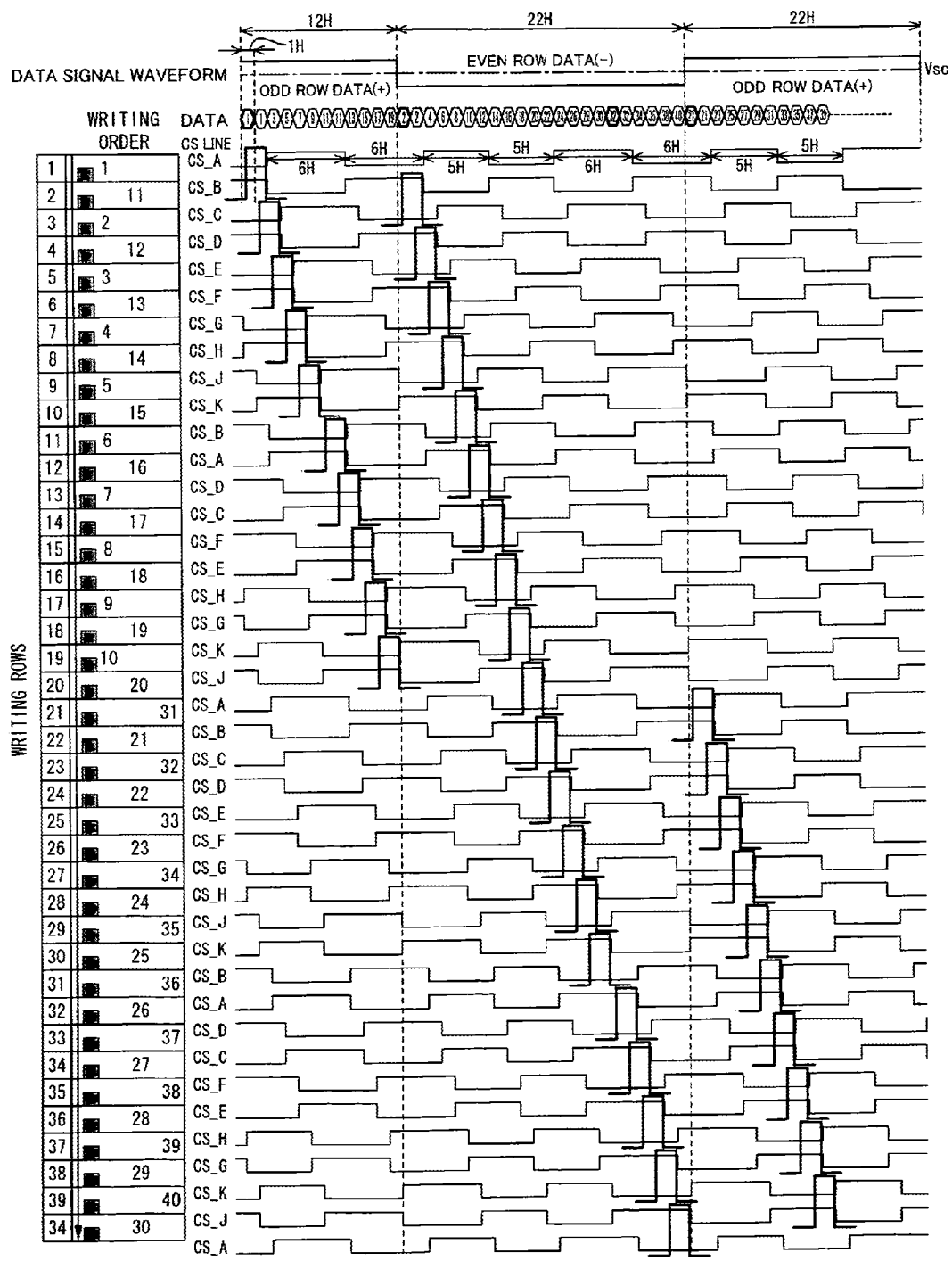

FIG. 85 shows a timing chart of a data signal waveform, a data signal, a latch strobe signal, a gate-on pulse, and a CS signal in double pulse driving by block-divided interlace scan where 1 horizontal period right after polarity inversion of a data signal is regarded as a first dummy insertion period, 1 horizontal period which is 5 horizontal period before the moment of polarity inversion of a data signal is regarded as a second dummy insertion period, and CS signals during periods to which the first and second insertion periods are inserted are made to include insertion of CS signal dummy periods corresponding to 1H, respectively.

FIG. 86

Figure 86:
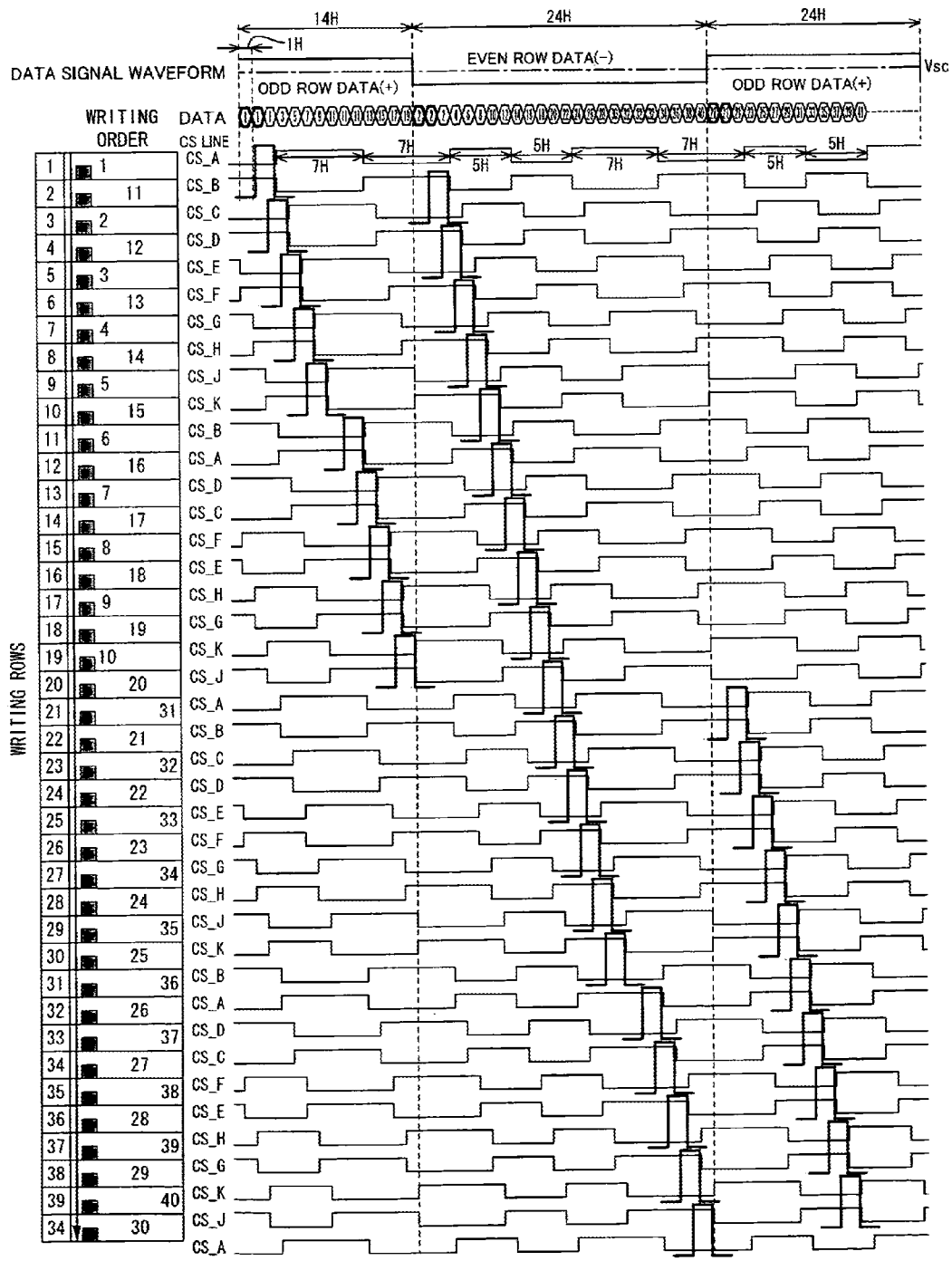

FIG. 86 shows a driving example in which each of the first and second dummy insertion periods is 2H.

FIG. 87

Figure 87:
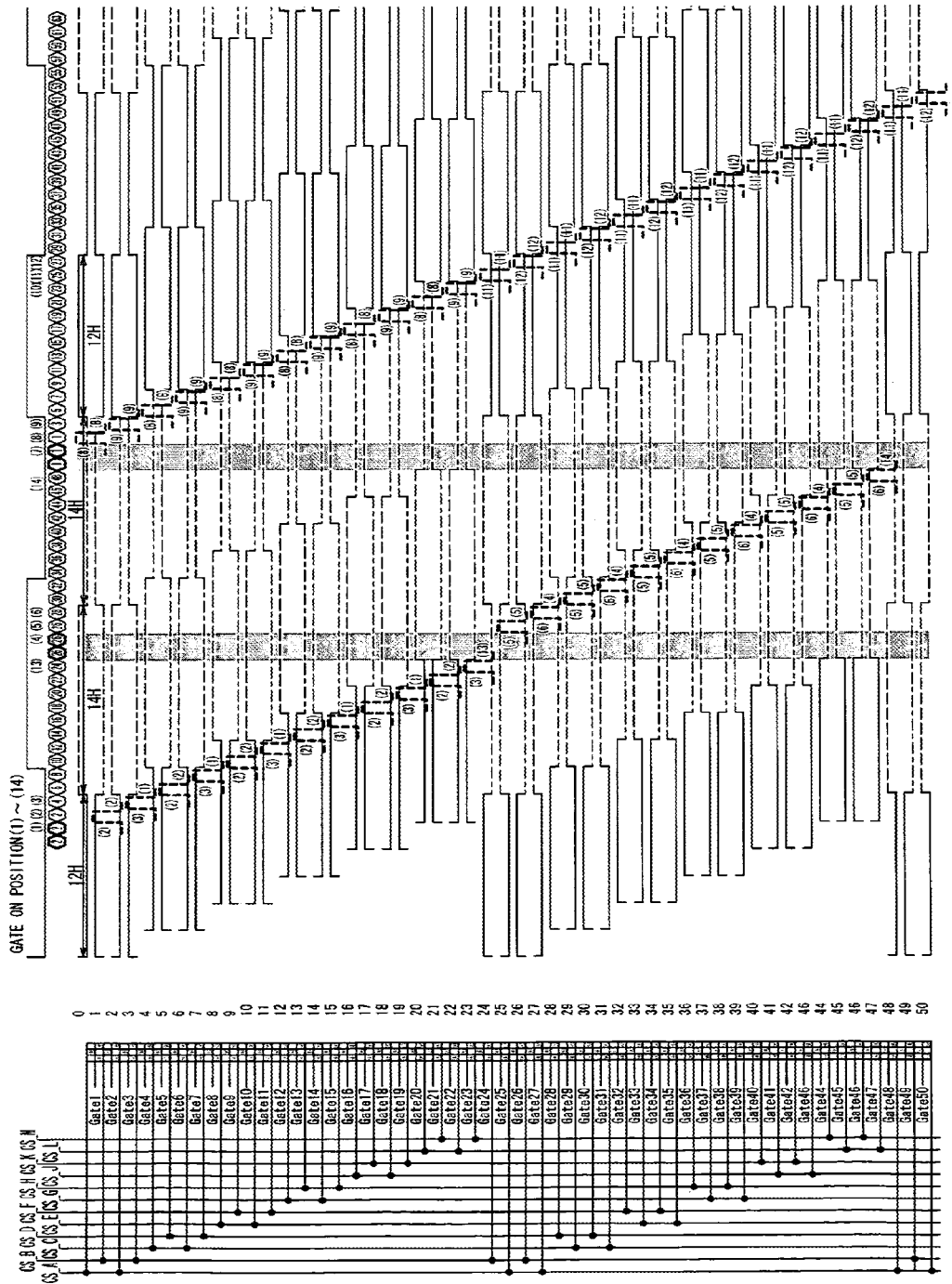

FIG. 87 is a drawing showing another example of connection states of CS main lines and CS lines and a timing chart of a CS signal and a gate-on pulse in a case where there are 12 phases of waveforms of CS signals.

FIG. 88

Figure 88:
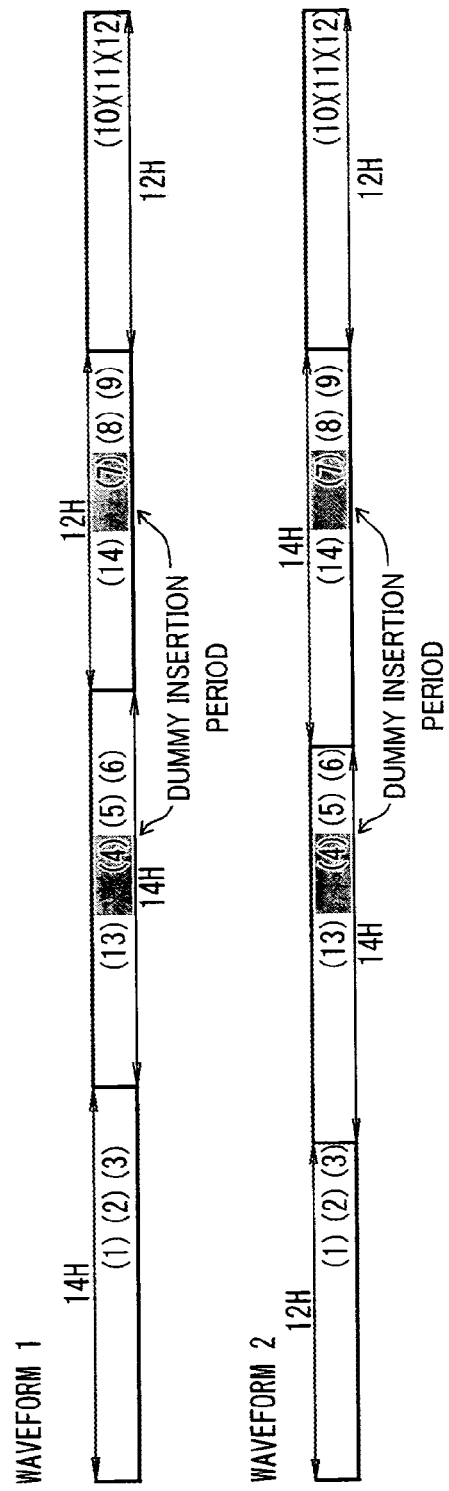

FIG. 88 is a drawing showing a waveform 1 that shows polarity inversion timing of a CS signal and gate-on pulse timing in FIG. 68, and a waveform 2 that shows polarity inversion timing of a CS signal and gate-on pulse timing in FIG. 87.

FIG. 89

FIG. 89 is a table showing, with respect to every kinds of the number of scanning signal lines, a difference between a period in which a retention capacitor signal gets H level and a period in which the retention capacitor signal gets L level, a ratio of the difference to one frame period, and a state of difference in luminance based on visual observation.

FIG. 90

Figure 90:
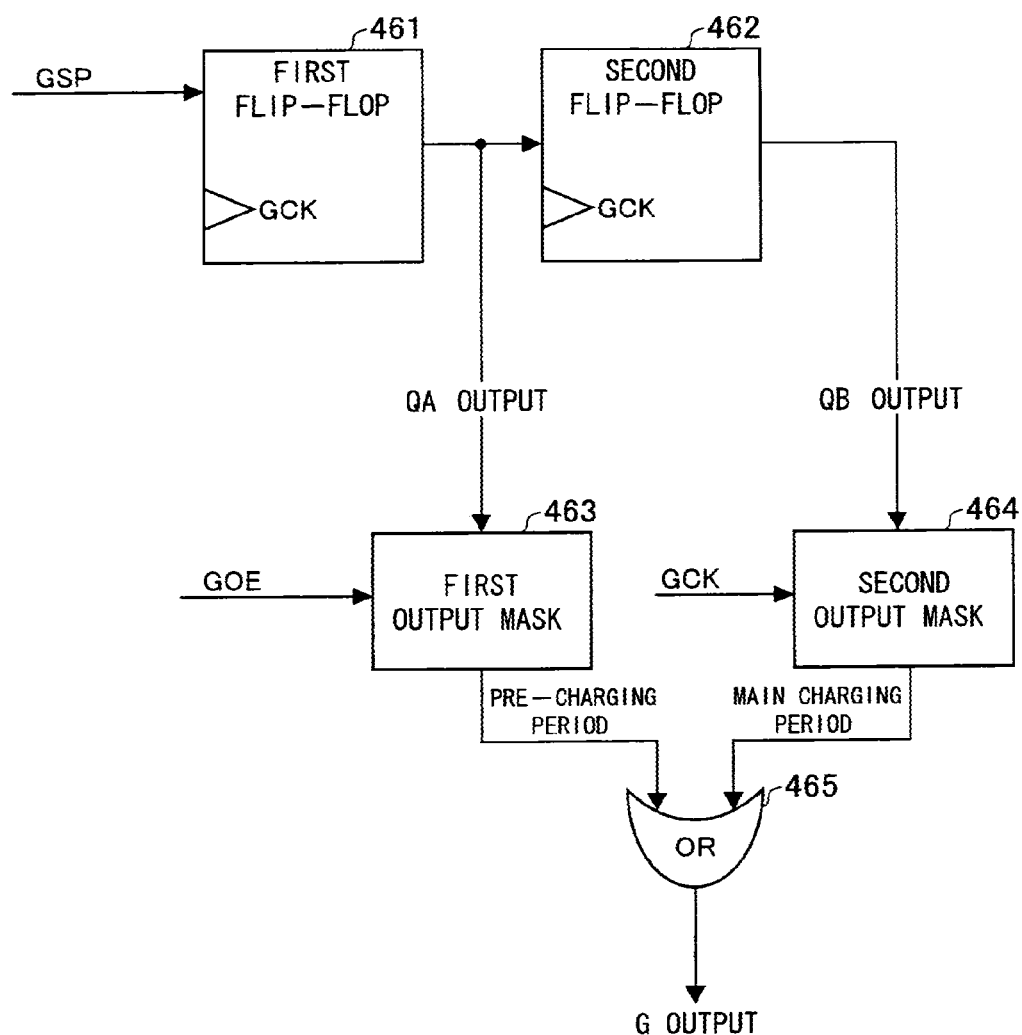

FIG. 90 shows a configuration of a main part of a gate driver IC for applying a gate-on pulse that is a double pulse without using a selection signal.

FIG. 91

Figure 91:
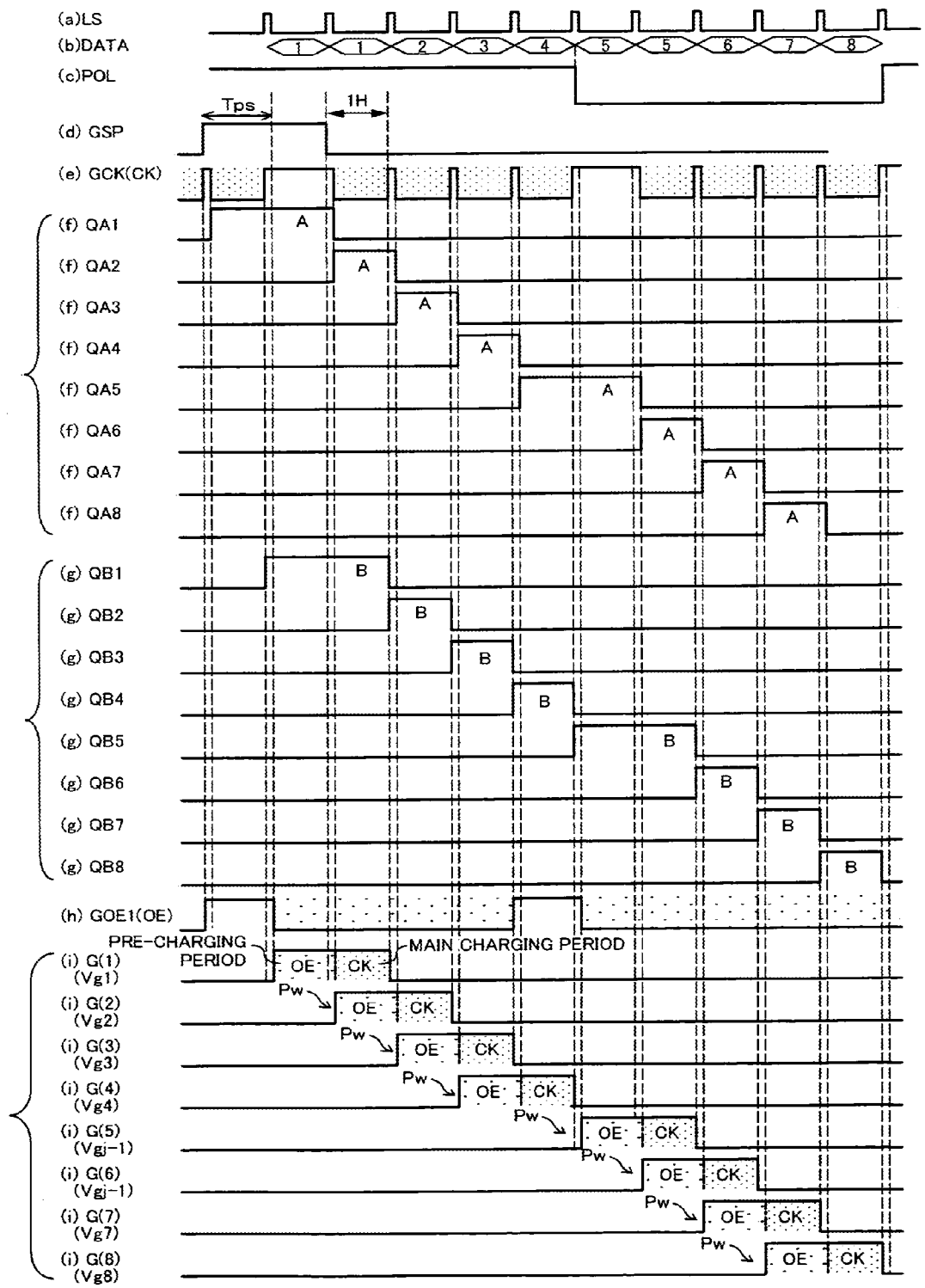

FIG. 91 is a waveform chart showing a driving example employing the gate driver unit in FIG. 90.

FIG. 92

Figure 92:
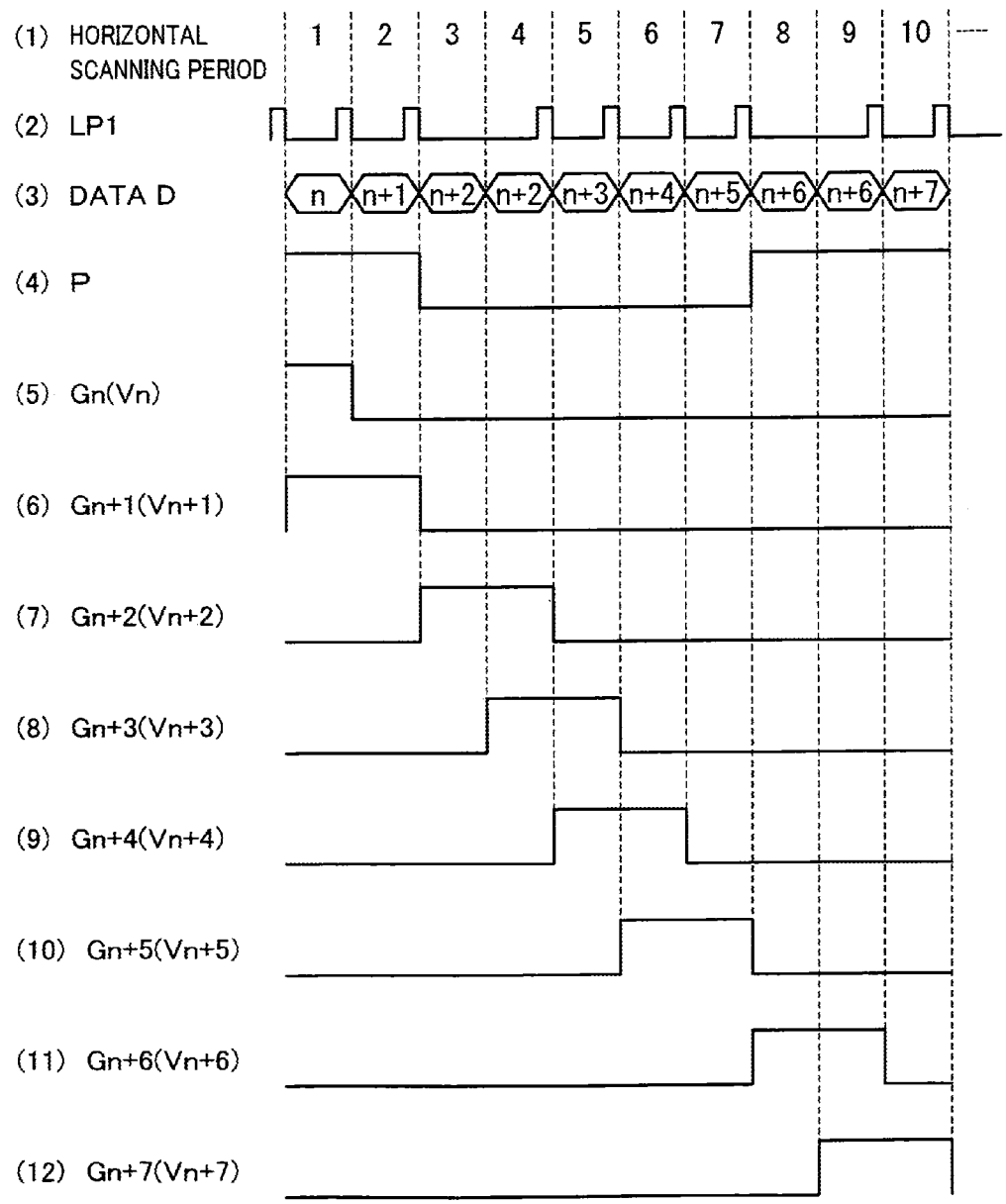

FIG. 92 is a voltage waveform chart showing driving by a conventional technique.

FIG. 93

Figure 93:
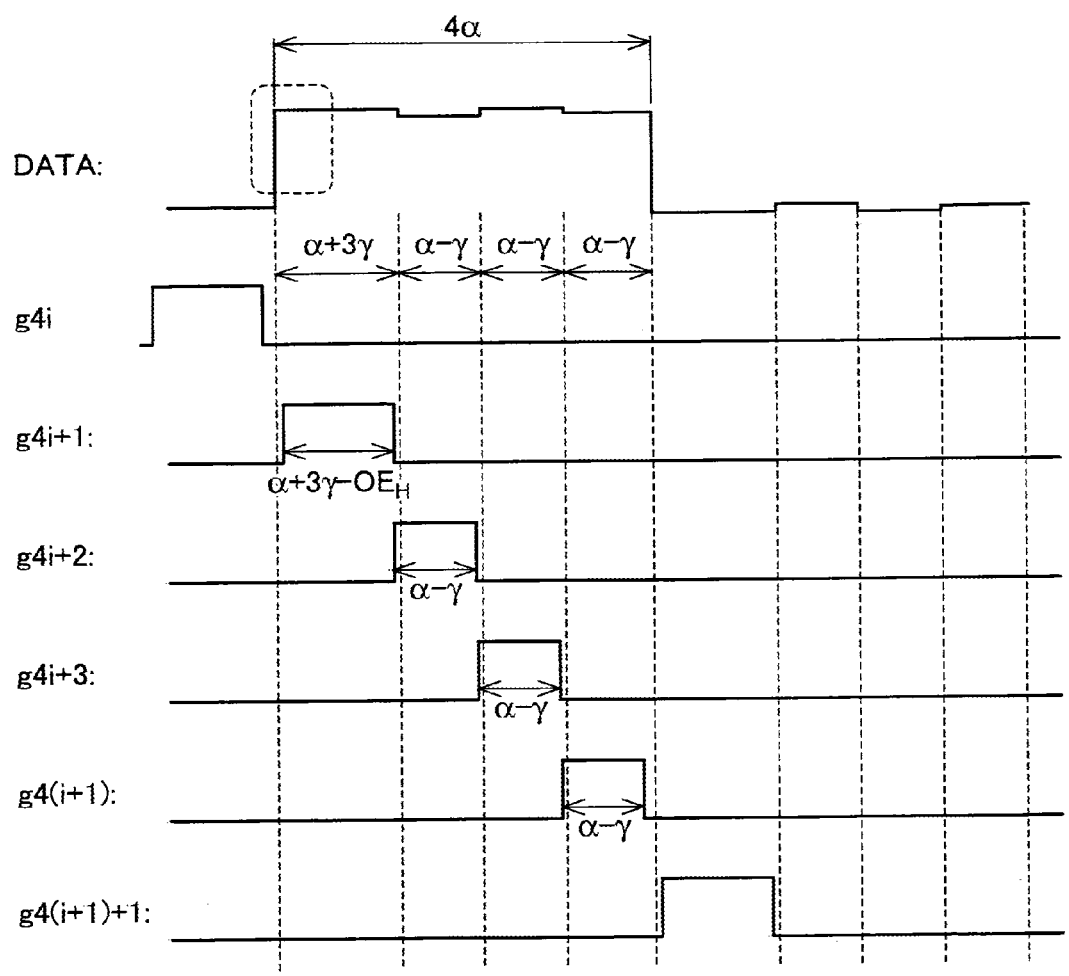

FIG. 93 is a voltage waveform chart showing driving by another conventional technique.

REFERENCE SIGNS LIST

10: TFT
12a: first TFT
12b: second TFT
15: signal line
16: scanning line
17a: first sub-pixel electrode
17b: second sub-pixel electrode
41: first AND gate
41n: gate driver IC chip
42: first shift register
43: second shift register
45: output section
52: CS line
52M: CS main line (retention capacitor signal supply line)
52a: auxiliary capacitor line
52b: auxiliary capacitor line
83: liquid crystal controller
84: liquid crystal panel
90: CS control circuit (retention capacitor signal drive section)
90: tuner section
100: display section
200: display control circuit
300: source driver
400: gate driver
441: first AND gate
442: second AND gate
600: backlight
700: light source drive circuit
800: display device Description Of Embodiments

[Embodiment 1]

One embodiment of the present invention is described below with reference to the attached drawings.

(Structure of Liquid Crystal Display Device)

Figure 1:
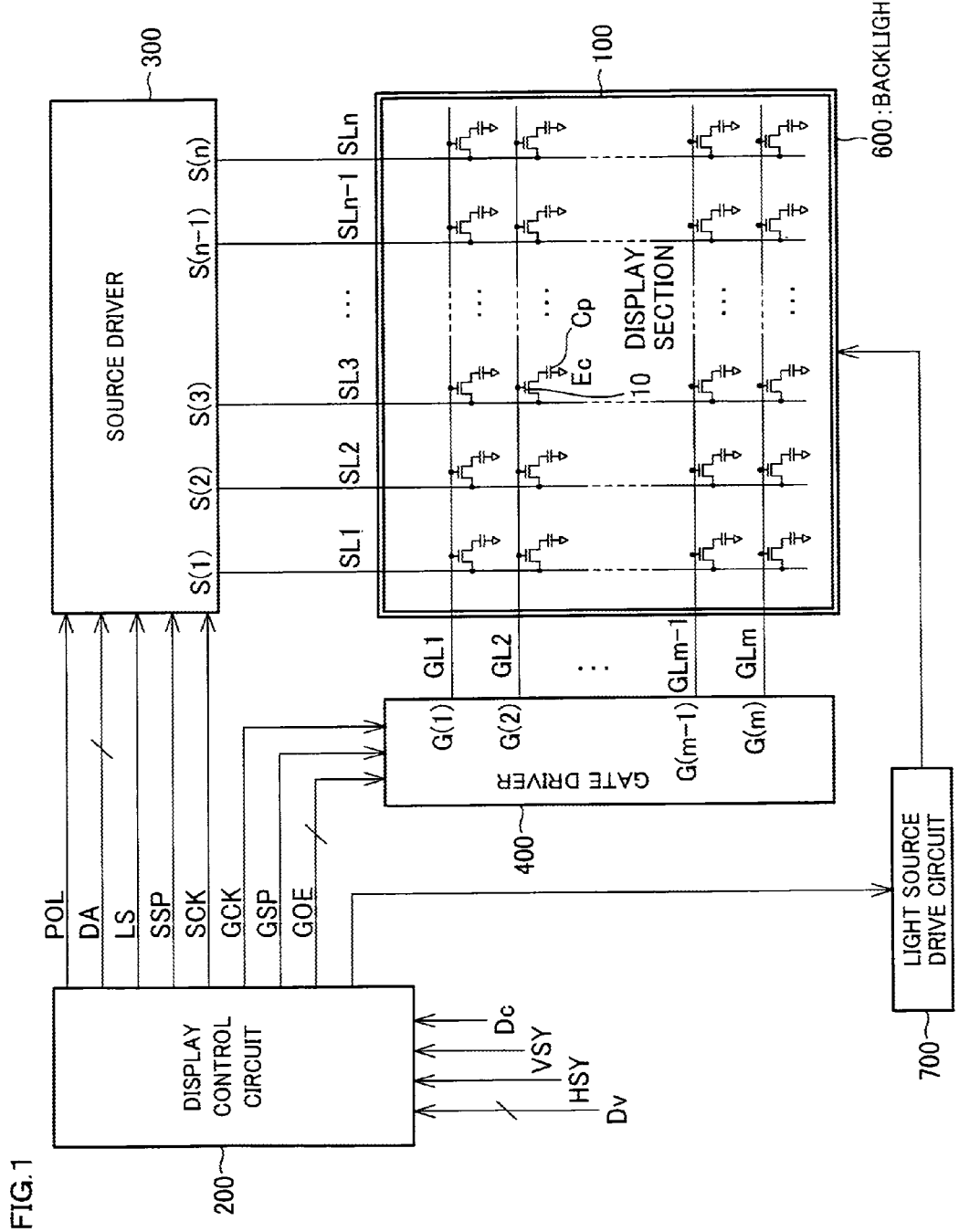
FIG. 1

FIG. 1 is a block diagram showing a structure of a liquid crystal display device of the present invention and an equivalent circuit of a display section of the liquid crystal display device. The liquid crystal display device includes a source driver 300 serving as a data signal line drive circuit, a display section 100 that is an active matrix display section, a backlight 600 serving as a planer illuminating device, a light source drive circuit 700 for driving the backlight 600, and a display control circuit 200 for controlling the source driver 300, the gate driver 400, and the light source drive circuit 700. In the present embodiment, the display section 100 is an active matrix liquid crystal panel. Alternatively, the display section 100 may be integrated with the source driver 300 and the gate driver 400 to form a liquid crystal panel.

The display section 100 in the liquid crystal display device includes gate lines GL1-GLm that are a plurality of (m) scanning signal lines, source lines SL1-SLn that are a plurality of (n) data signal lines each intersecting each of the gate lines GL1-GLm, and a plurality of (m×n) pixel formation sections provided respectively at intersections of the gate lines GL1-GLm and the source lines SL1-SLn. The pixel formation sections are disposed in a matrix manner so as to form pixel arrays. Hereinafter, a direction in which a gate line extends in a pixel array is referred to as a row direction and a direction in which a source line extends in a pixel array is referred to as a column direction.

Each pixel formation section includes: a TFT 10 serving as a switching element whose gate terminal is connected with a gate line GLj that crosses a corresponding intersection and whose source terminal is connected with a source line SLi that crosses the intersection; a pixel electrode connected with a drain terminal of the TFT 10; a common electrode Ec serving as a counter electrode provided commonly for the plurality of pixel formation sections; and a liquid crystal layer that is provided commonly for the plurality of pixel formation sections and that is sandwiched between the pixel electrode and the common electrode Ec. A liquid crystal capacitor formed by the pixel electrode and the common electrode Ec serves as a pixel capacitor Cp. In general, an auxiliary capacitor (retention capacitor) is provided in parallel with a liquid crystal capacitor in order that a pixel capacitor retains a voltage surely. However, the auxiliary capacitor is not explained here and not shown in the drawings since the auxiliary capacitor is not directly related to the present embodiment.

The source driver 300 and the gate driver 400 supply to a pixel electrode in each pixel formation section a potential corresponding to an image to be displayed, and a power circuit (not shown) supplies a predetermined potential Vcom to the common electrode Ec. Consequently, a voltage corresponding to a potential difference between the pixel electrode and the common electrode Ec is applied to liquid crystal. The application of a voltage controls light transmittance of the liquid crystal layer, thus enabling image display. It should be noted that a polarization plate is used when the application of a voltage to the liquid crystal layer controls light transmittance, and a polarization plate in the present embodiment is provided in such a manner as to realize a normally black mode. Therefore, each pixel formation section forms a black pixel when no voltage is applied to the pixel capacitor Cp of the pixel formation section.

The backlight 600 is a planer illuminating device for illuminating the display section 100 from backward, and includes a cold-cathode tube and an optical waveguide for example. The backlight 600 is driven by the light source drive circuit 700 to emit light to each pixel formation section of the display section 100.

The display control circuit 200 receives, from an outside signal source, a digital video signal Dv indicative of an image to be displayed; a horizontal sync signal HSY and a vertical sync signal VSY each corresponding to the digital video signal Dv; and a control signal Dc for controlling display operation. Further, the control circuit 200 generates, based on the signals Dv, HSY, VSY, and Dc thus received, a data start pulse signal SSP, a data clock signal SCK, a latch strobe signal (data signal application control signal) LS, a polarity inversion signal POL, a digital image signal DA indicative of an image to be displayed (signal corresponding to video signal Dv), a gate start pulse signal GSP, a gate clock signal GCK, and a gate driver output control signal (scanning signal output control signal) GOE, each serving as a signal for enabling the display section 100 to display an image indicated by the digital video signal Dv, and the control circuit 200 outputs these signals.

To be more specific, the video signal Dv is subjected to timing adjustment etc. in an internal memory if necessary and then outputted as the digital image signal DA from the display control circuit 200. The data clock signal SCK is generated as a signal consisting of pulses corresponding to pixels of an image indicated by the digital image signal DA. The data start pulse signal SSP is generated, based on the horizontal sync signal HSY, as a signal which has a high (H) level only during a predetermined period with respect to each horizontal scanning period. The gate start pulse signal GSP (GSPa, GSPb) is generated, based on the vertical sync signal VSY, as a signal which has a H level only during a predetermined period with respect to each frame period (each vertical scanning period). The gate clock signal GCK (GCKa, GCKb) is generated based on the horizontal sync signal HSY. The latch strobe signal LS and the gate driver output control signal GOE (GOEa, GOEb) are generated based on the horizontal sync signal HSY and the control signal Dc.

Among the signals thus generated by the display control circuit 200, the digital image signal DA, the latch strobe signal LS, the data start pulse signal SSP, the data clock signal SCK, and the polarity inversion signal POL are input to the source driver 300, and the gate start pulse signal GSP, the gate clock signal GCK, and the gate driver output control signal GOE are input to the gate driver 400.

Based on the digital image signal DA, the data start pulse signal SSP, the data clock signal SCK, the latch strobe signal LS, and the polarity inversion signal POL, the source driver 300 sequentially generates data signals S(1)-S(n) that are analog voltages corresponding to pixel values in each horizontal scanning line of an image represented by the digital image signal DA, and applies the data signals S(1)-S(n) to source lines SL1-SLn, respectively.

Based on the gate start pulse signal GSP (GSPa, GSPb), the gate clock signal GCK (GCKa, GCKb), and the gate driver output control signal GOE (GOEa, GOEb), the gate driver 400 generates scanning signals G(1)-G(m) and applies the scanning signals G(1)-G(m) to gate lines GL1-GLm, respectively, so as to selectively drive the gate lines GL1-GLm. Selective driving of the gate lines GL1-GLm is realized by applying, as the scanning signals G(1)-G(m), gate-on pulses whose selection periods equal to pulse widths. It should be noted that in the present embodiment, all of pulse widths of gate-on pulses Pw to be applied to individual gate lines have the same length, except for a certain example of driving. This makes charging conditions for individual pixels equal, enabling display more even over the whole display screen. This increases display quality.

As described above, the source driver 300 and the gate driver 400 drive the source lines SL1-SLn and the gate lines GL1-GLm of the display section 100, so that a voltage of a source line SLi is supplied to the pixel capacitor Cp via the TFT 10 connected with the selected gate line GLj (i=1 to n and j=1 to m). Thus, in individual pixel formation sections, a voltage corresponding to the digital image signal DA is applied to the liquid crystal layer, and application of the voltage controls transmittance of light from the backlight 600, enabling the display section 100 to display an image indicated by the digital video signal Dv from the outside.

Examples of a display method include progressive scan and interlace scan. The progressive scan is a method in which when displaying one frame, i.e. during one frame period, the gate lines GL1-GLm are sequentially selected one by one from top to bottom.

The interlace scan is a method in which the gate lines GL1-GLm are divided into a plurality of groups in such a manner that gate lines positioned with a predetermined line distance from each other belong to one group, and individual groups are scanned sequentially. In a case where the gate lines GL1-GLm are divided into two groups in such a manner that gate lines positioned with a distance of 1 line belong to one group, odd gate lines or even gate lines of the gate lines GL1-GLm are selected sequentially from top to bottom, and then even gate lines or odd gate lines of the gate lines GL1-GLm are selected sequentially from top to bottom.

(Example of Driving by Progressive Scan)

Figure 2:
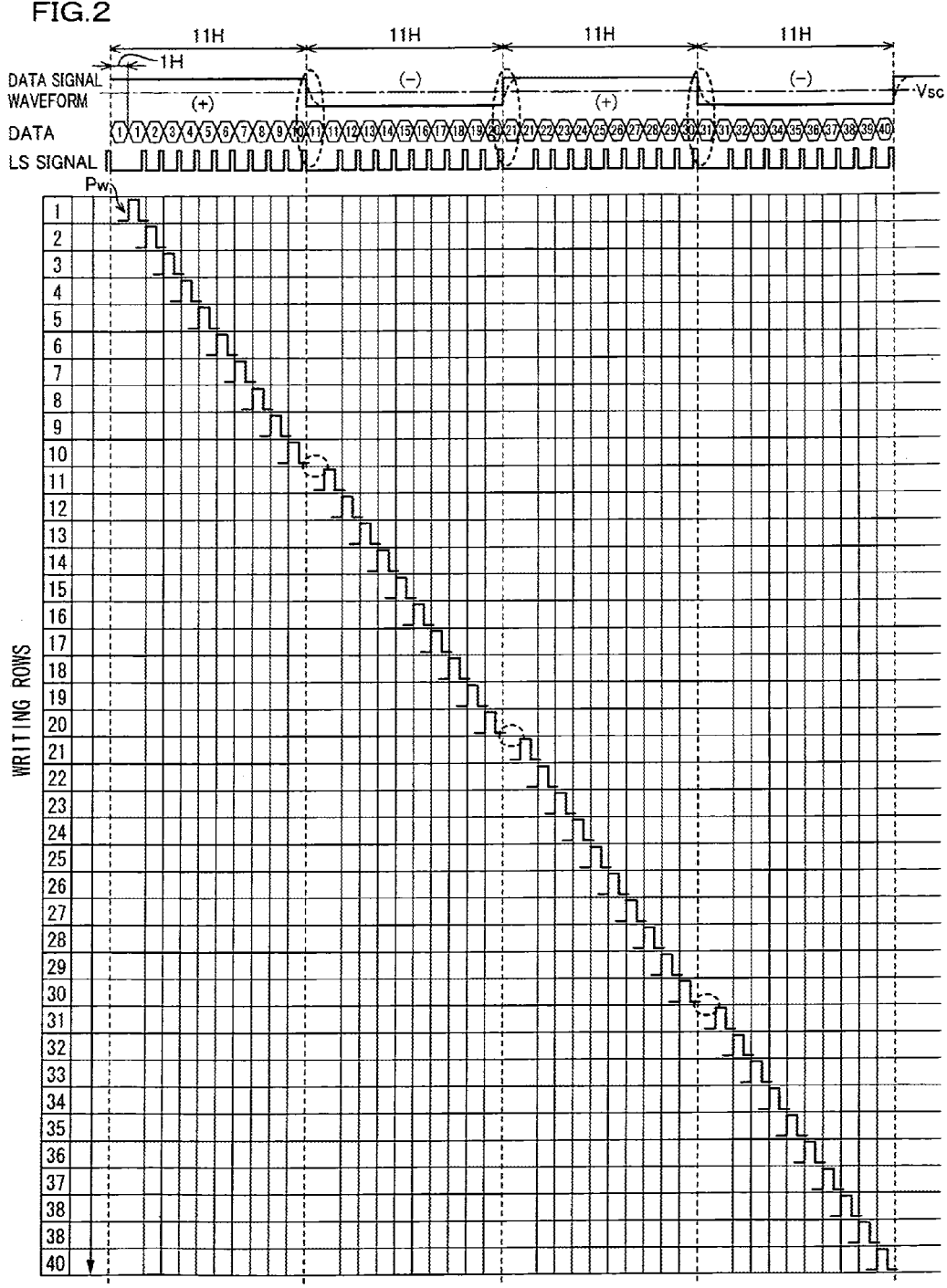
FIG. 2

FIG. 2 shows a timing chart of a data signal waveform, a data signal, a latch strobe signal LS, and a gate-on pulse (pixel data writing pulse) Pw in driving by progressive scan where the polarity of a data signal voltage is inverted with respect to every ten rows with a center value Vsc (substantially equal to Vcom in general) of the data signal voltage as a reference and where 1 horizontal period (1H) right after polarity inversion is regarded as a dummy insertion period (indicated by circle). In FIG. 2, a lateral direction represents time elapse and a longitudinal direction represents individual rows of the gate lines (writing lines) GL1-GLm to which gate-on pulses are applied.

As shown in FIG. 2, an actual waveform of the data signal is rounded right after inversion of the polarity. That is, it takes time for the data signal waveform to reach a predetermined voltage after the inversion of the polarity. In the example shown in FIG. 2, it takes substantially 1 horizontal period for the actual data signal waveform to reach the predetermined voltage. In FIG. 2, the data signal waveform is in a simplified signal state where a data signal voltage (tone) does not change during the same polarity. This holds for the drawings mentioned hereinafter.

In order to deal with this problem, in the above driving, the gate-on pulse Pw is not applied during 1 horizontal period right after the inversion of the polarity in order to provide a dummy horizontal period. Consequently, in a horizontal period next to a dummy insertion period, a data signal with the predetermined voltage is written in individual pixels.

Providing the dummy insertion period in this manner allows increasing a reaching ratio (charging ratio) of an actual voltage to an application voltage in the source lines SL1-SLn (data signal lines) when writing pixel data after polarity inversion. This prevents display unevenness with respect to every 10 rows which is caused by rounding of the data signal waveform at the moment of polarity inversion.

It should be noted that during the dummy insertion period, the display control circuit 200 stops application of an on-pulse of an LS signal to be input to the source driver 300. Consequently, a data signal to be written during the dummy insertion period is written during a horizontal period next to the dummy insertion period. Therefore, providing the dummy insertion period does not result in skip of data to be displayed, and allows suitable display.

Alternatively, the display control circuit 200 may output, in a horizontal period next to the dummy insertion period, a data signal equal to a data signal to be applied during the dummy insertion period right after the polarity inversion. Also in this case, providing the dummy insertion period does not result in skip of data to be displayed, and allows suitable display.

Figure 3:
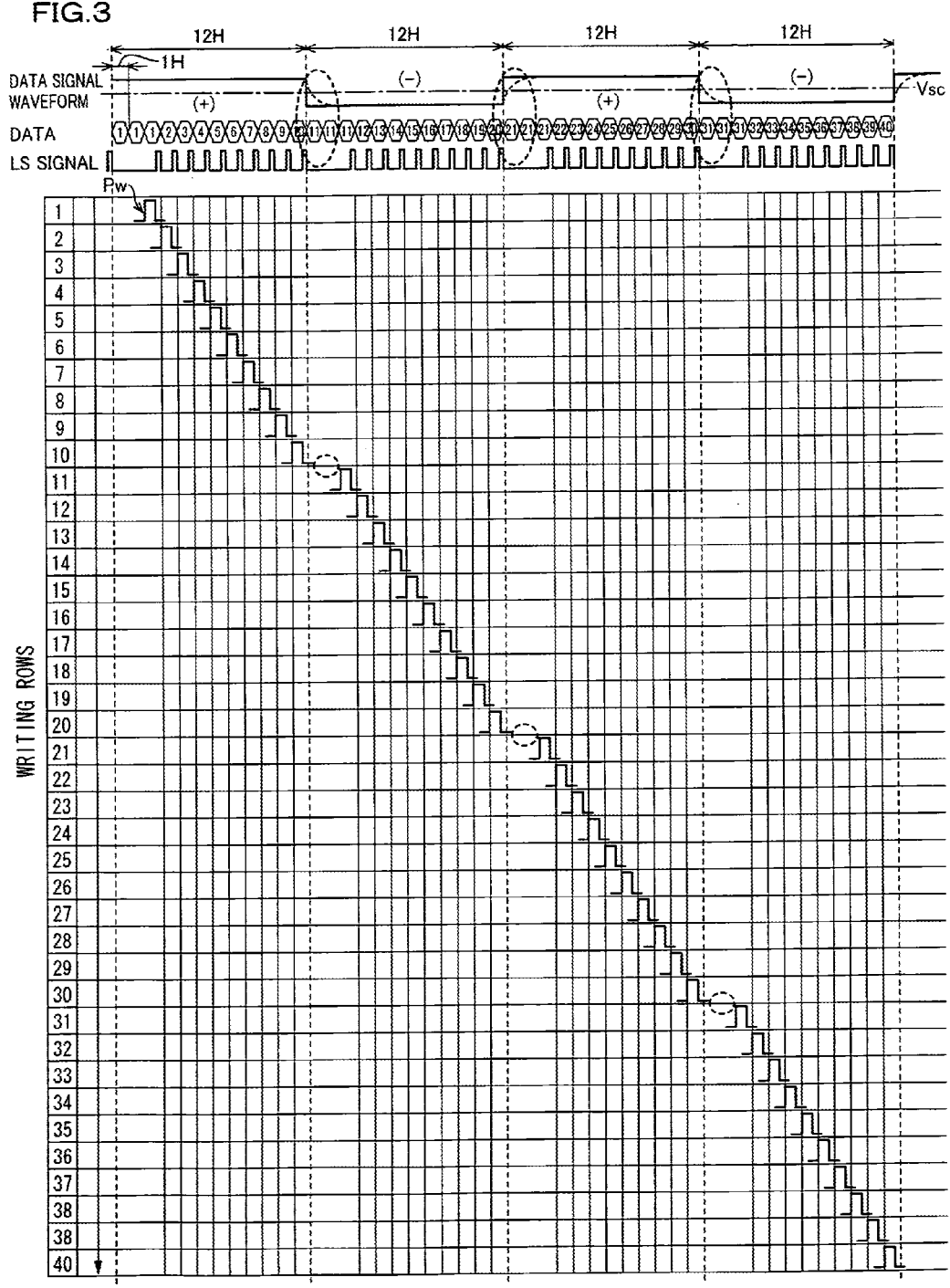
FIG. 3
Figure 4:
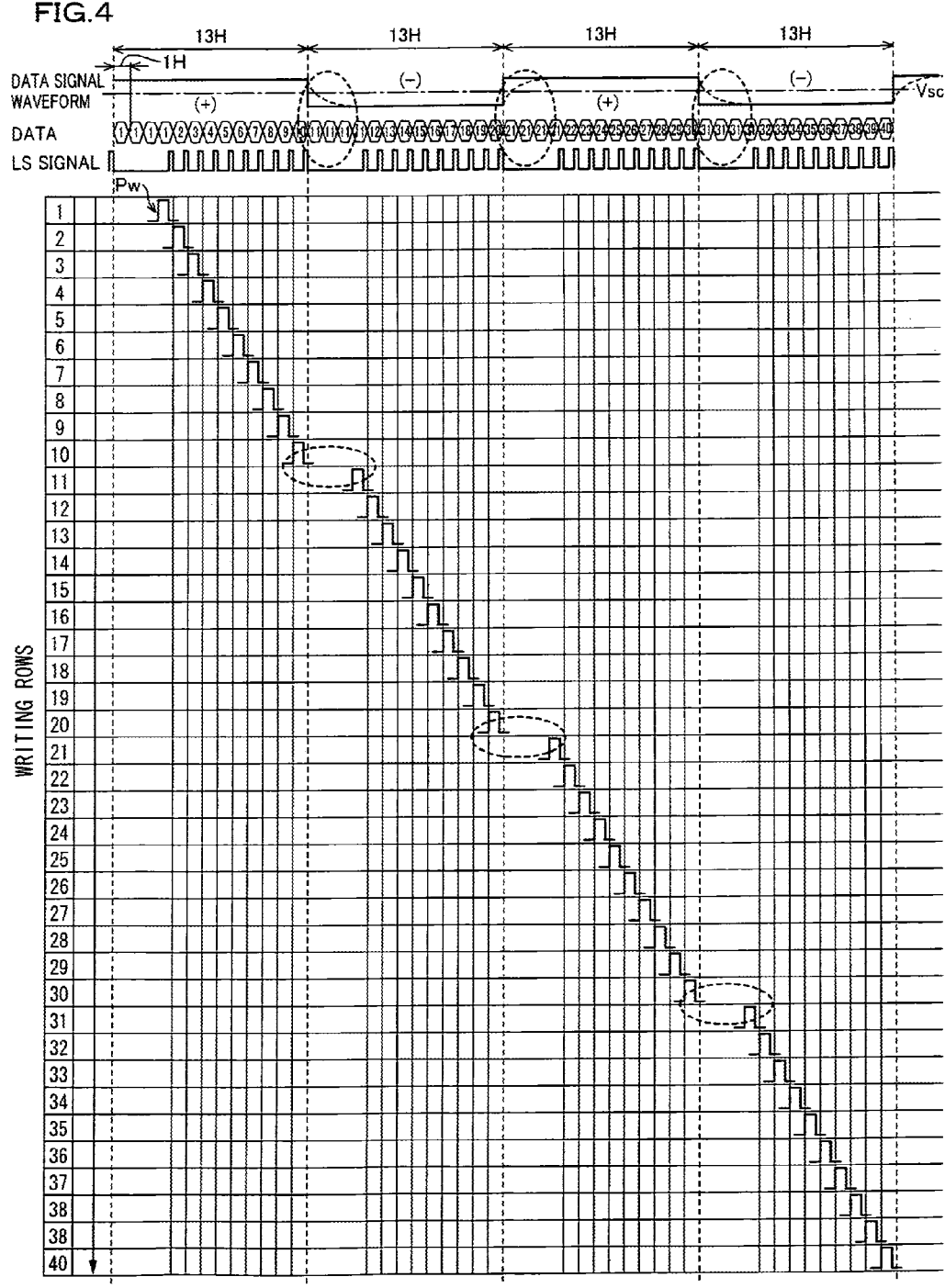
FIG. 4

FIG. 3 shows a timing chart of a data signal waveform, a data signal, a latch strobe signal LS, and a gate-on pulse (pixel data writing pulse) Pw in driving by progressive scan where the polarity of a data signal voltage is inverted with respect to every 10 rows with Vsc as a reference and where 2 horizontal periods (2H) right after polarity inversion is regarded as a dummy insertion period (indicated by circle). FIG. 4 shows a timing chart of a data signal waveform, a data signal, a latch strobe signal LS, and a gate-on pulse (pixel data writing pulse) Pw in driving by progressive scan where the polarity of a data signal voltage is inverted with respect to every 10 rows with Vsc as a reference and where 3 horizontal periods (3H) right after polarity inversion is regarded as a dummy insertion period (indicated by circle). In FIGS. 3 and 4, a lateral direction represents time elapse and a longitudinal direction represents individual rows of the gate lines (writing rows) GL1-GLm to which gate-on pulses are applied.

In the example shown in FIG. 3, it takes approximately 2 horizontal periods for the actual data signal waveform to reach a predetermined voltage. In the example shown in FIG. 4, it takes approximately 3 horizontal periods for the actual data signal waveform to reach a predetermined voltage. As described above, the degree of rounding of a voltage waveform of a data signal differs depending on the specification of a liquid crystal display device. This is because the degree of loads to the source lines SL1-SLn differs depending on, for example, the screen size and the number of pixels of a liquid crystal display device.

Therefore, by setting the length of the dummy insertion period in such a manner that the dummy insertion period includes a time for the actual data signal to reach a predetermined voltage after polarity inversion, it is possible to write the data signal with the predetermined voltage in individual pixels during a horizontal period next to the dummy insertion period. For example, in a case where rounding of the data signal waveform is seen in a 1 horizontal period corresponding to 60 Hz, the dummy insertion period is set to be 1 horizontal period (1H). In a case where 120 Hz driving is performed in the same liquid crystal display device, since rounding of the data signal waveform is seen in 2 horizontal periods corresponding to 120 Hz, and therefore the dummy insertion period is set to be 2 horizontal periods (2H).

Providing the dummy insertion period in this manner allows increasing a reaching ratio of an actual voltage to an application voltage in the source lines SL1-SLn when writing pixel data after the inversion of the polarity. This prevents display unevenness with respect to every 10 rows which is caused by rounding of the data signal waveform at the moment of the inversion of the polarity.

In the above examples, the dummy insertion period is 2H or 3H. Alternatively, the dummy insertion period may be set to be 4H or more according to the degree of rounding of the data signal waveform at the moment of inversion of the polarity. It should be noted that setting the dummy insertion period to have a predetermined length or more may cause inconvenience such as tearing, in which an image is seen shifted in a horizontal direction between gate lines around the moment of inversion of the polarity. How the tearing is seen depends on the length of the dummy insertion period.

To be more specific, in a case where the dummy insertion period is provided as described above, a difference in display timing occurs between a pixel on a gate line where display is performed before inversion of the polarity and a pixel on a gate line where display is performed after inversion of the polarity. FIG. 52 shows the result of sensory analysis in which whether tearing was observed or not was examined while changing the length of the dummy insertion period. In the example shown in FIG. 52, a FHD panel (1920×1080 dots) performed display with frame frequency of 60 Hz, and the dummy insertion period was changed within a range of 40H (593 μs) to 540H (8000 μs). The result shows that when the dummy insertion period was 815 μs or less, tearing was hardly noticed, when the dummy insertion period was 1185 μs, tearing was a little noticed, and when the dummy insertion period was 1481 μs or more, tearing was in a very poor state.

In view of the above, when the difference in display timing around the moment of polarity inversion gets more than 0.8 msec, tearing gets likely to be seen, which deteriorates display quality. Therefore, by setting the time from the moment of polarity inversion to the moment of an application start of a gate-on pulse nearest to the moment of polarity inversion among gate-on pulses applied after the moment of polarity inversion to be equal to 0.8 msec or less, it is possible to perform excellent display with little or no tearing.

(Example of Driving by Interlace Scan)

Figure 5:
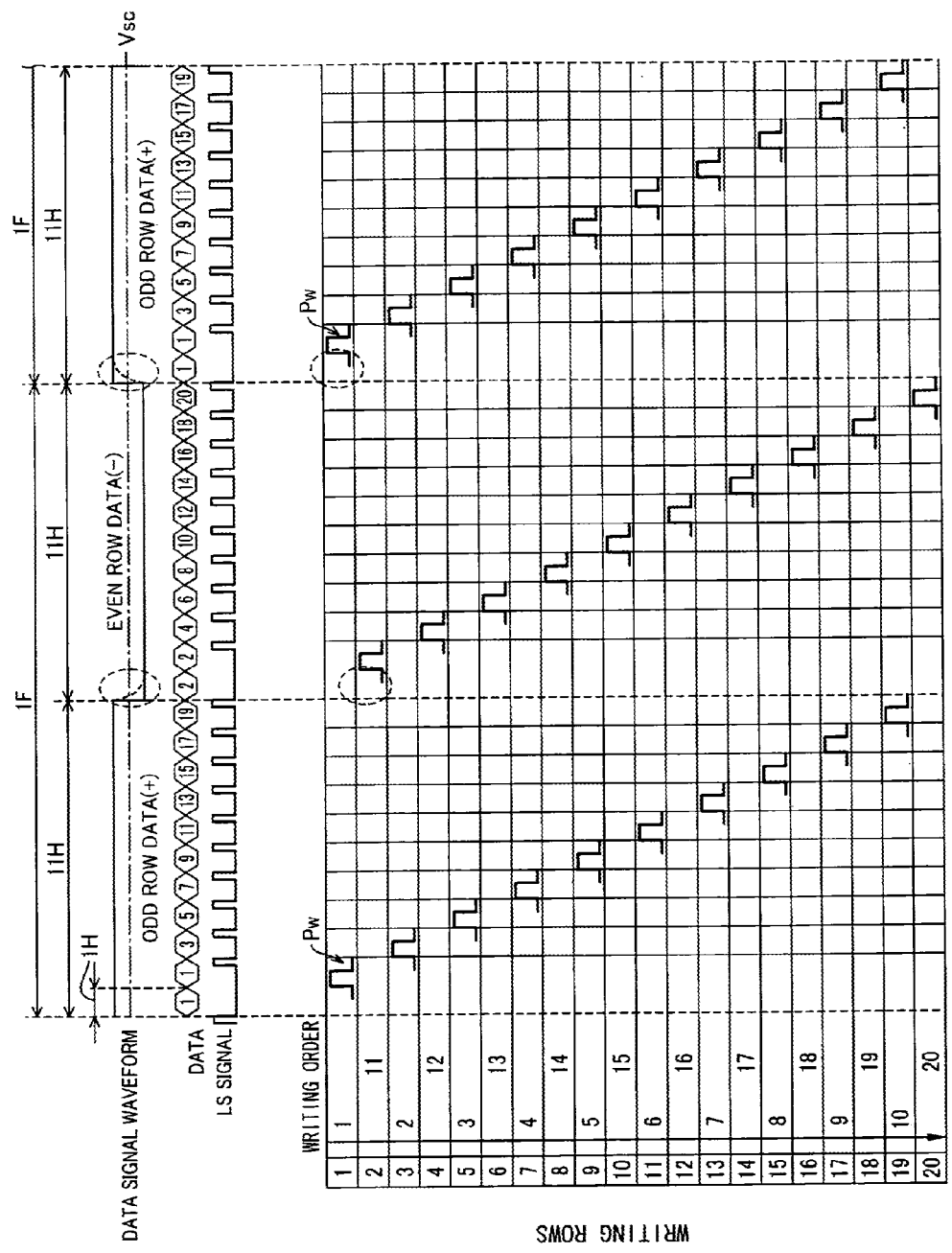
FIG. 5

FIG. 5 shows a timing chart of a data signal waveform, a data signal, a latch strobe signal LS, and a gate-on pulse (pixel data writing pulse) Pw in driving by interlace scan where the polarity of a data signal voltage is inverted with Vsc as a reference and where 1 horizontal period (1H) right after inversion of the polarity is regarded as a dummy insertion period (indicated by circle). In the interlace scan in FIG. 5, 1 frame period is divided into the former half ½ frame period (½F) and the latter half ½ frame period, odd rows are scanned with the polarity of a data signal being plus in the former half ½F, and then even rows are scanned with the polarity of a data signal being minus in the latter half ½F. For simplicity, in the present example, it is supposed that there are 20 scanning signal lines.

In the interlace scan, a polarity inversion cycle is ½F. Accordingly, the interlace scan allows reduction of power consumption and reduction of heat generated by the source driver 300. Further, in the interlace scan, the polarity of a voltage to be applied on pixels appears to be inverted with respect to 1 row. This allows reducing flickers compared with the progressive scan, and allows reducing display unevenness due to coupling capacitance by pixels that are adjacent in a longitudinal direction.

As in the progressive scan, also in the interlace scan, an actual waveform of a data signal is rounded at the moment of inversion of the polarity of the data signal. That is, it takes approximately 1 horizontal period for the data signal to reach a predetermined voltage right after the inversion of the polarity. In order to deal with this problem, in the above driving, the gate-on pulse Pw is not applied during 1 horizontal period right after the inversion of the polarity in order to provide a dummy horizontal period. Consequently, in a horizontal period next to the dummy insertion period, a data signal with the predetermined voltage is written in individual pixels.

Providing the dummy insertion period in this manner allows increasing a reaching ratio (charging ratio) of an actual voltage to an application voltage in the source lines SL1-SLn (data signal lines) when writing pixel data after the inversion of the polarity.

It should be noted that, as in the progressive scan, also in the interlace scan, during the dummy insertion period, the display control circuit 200 stops application of an on-pulse of an LS signal to be input to the source driver 300. Consequently, a data signal to be written during the dummy insertion period is written during a horizontal period next to the dummy insertion period. Alternatively, the display control circuit 200 may output, in a horizontal period next to the dummy insertion period, a data signal equal to a data signal to be applied during the dummy insertion period right after the inversion of the polarity.

Data signals have been permutated beforehand by a data signal permutation circuit included in the display control circuit 200 in such a manner as to correspond to the interlace scan as shown in the drawing. The data signals thus permutated are subjected to a necessary process such as a timing process, and then supplied as digital image signals DA to the source driver 300. The data signal permutation circuit receives digital video signals Dv that are digital RGB signals supplied chronologically from an external signal source to the display control circuit 200, causes the digital video signals Dv to be temporarily stored in a memory, and then read out a signal corresponding to a scanning signal line driven currently, and thus permutates the data signals.

(Block-divided Interlace Scan)

Figure 6:
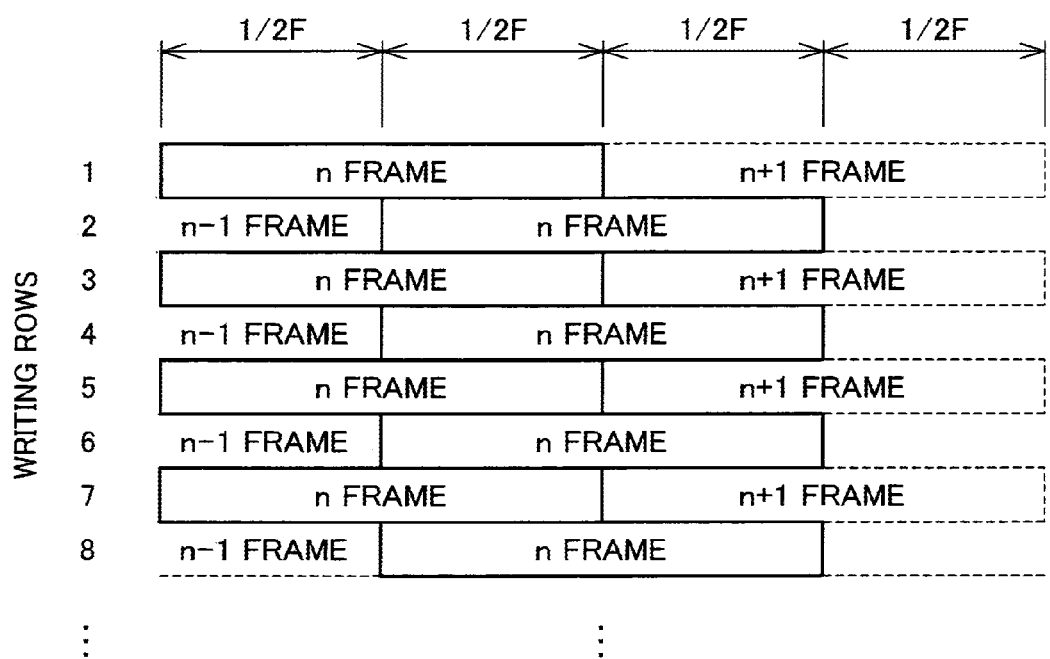
FIG. 6

FIG. 6 is a drawing showing frame numbers of data signals to be applied to individual rows of the gate lines (writing rows) GL1-GLm. In the interlace scan, odd rows and even rows of the gate lines display images of different frame numbers with respect to every ½ frame. In the example shown in FIG. 6, in the first ½F, odd rows of gate lines display an $n^{th}$ frame image, and even rows of the gate lines display an $n-1^{st}$ frame image. In the third ½F, the odd rows of the gate lines display an $n+1^{st}$ frame image, and the even rows of the gate lines display an $n^{th}$ frame image.

Under such circumstances, moving a vertically oblong image shown in (a) of FIG. 7 in a lateral direction may cause an inconvenience (combing) in which edges in a vertical direction appear comb-like as shown in (b) of FIG. 7. Combing is caused due to the same cause as a phenomenon in which, for example, when an interlaced image is displayed by a progressive scan monitor for PC without IP conversion, a laterally scrolled image appears comb-like. How far combing is seen depends on the length of period during which odd rows and even rows of the gate lines display images of different frame numbers.

FIG. 8 schematically shows a writing operation by normal interlace scan. In FIG. 8, the lateral axis indicates time lapse, and the longitudinal axis indicates gate lines GL1-GLm that are writing rows. In the example in FIG. 8, all odd rows of the gate lines GL1-GLm are written, and then even rows are written. If frame frequency is 120 Hz (1 cycle: 8.333 ms), time Tc from the moment when writing an odd row of adjacent two gate lines to the moment when writing an even row of the adjacent two gate lines is 4167 μs.

As with the cause of tearing as explained above, combing is caused by disparity in display timing between adjacent gate lines. Therefore, the result of sensory analysis for tearing is also true for combing. That is, combing is seen when the time Tc is approximately 0.8 ms or more. Consequently, in the example shown in FIG. 8, combing is seen.

In contrast thereto, in the present embodiment, the gate lines GL1-GLm are divided into a plurality of blocks and interlace scan is performed with respect to each block (block-divided interlace scan). This allows reducing the time Tc, making combing less likely to be seen.

FIG. 9 schematically illustrates writing operation in the block-divided interlace scan. The lateral axis indicates time lapse and the longitudinal axis indicates the gate lines GL1-GLm that are writing rows. In the example shown in FIG. 9, the gate lines GL1-GLm are divided into blocks with respect to every a rows, and interlace scan is performed with respect to each block. To be specific, odd rows of $1^{st}$ to $\alpha^{th}$ gate lines are written with a data signal voltage having a plus polarity (+ polarity) with respect to Vsc, and then even rows of the $1^{st}$ to $\alpha^{th}$ gate lines are written with a data signal voltage having a minus polarity (− polarity) with respect to Vsc. Next, even rows of $\alpha+1^{st}$ to $2\alpha^{th}$ gate lines are written with a data signal voltage having a minus polarity (− polarity) with respect to Vsc, and then odd rows of the $\alpha+1^{st}$ to $2\alpha^{th}$ gate lines are written with a data signal voltage having a plus polarity (+ polarity) with respect to Vsc. All rows of 1 frame are written by sequentially repeating these steps.

In the above steps, a first block including the $1^{st}$ to $\alpha^{th}$ gate lines are written in such a manner that odd rows are written firstly and even rows are written secondly, and a second block including the $\alpha+1^{st}$ to $2\alpha^{th}$ gate lines are written in such a manner that even rows are written firstly and odd rows are written secondly. That is, in the odd block, odd rows are written firstly and even rows are written secondly, and in the even block, even rows are written firstly and odd rows are written secondly. When the last line in one block is written and then the first line in next block is written, a data signal voltage maintains the same polarity. This makes it unnecessary to perform inversion of the polarity when switching blocks to be written, thus reducing power consumption.

The time Tc which is a difference in time between writing in adjacent rows in the block-divided interlace scan is represented by an equation below.

$$Tc=(\alpha/2)/(Vtotal)\times(\text{frame cycle})$$

wherein Vtotal represents 1 vertical period, that is, whole scanning lines. Since (frame cycle)/(Vtotal)=(time of 1 horizontal period), the above equation may be written as follows.

$$Tc=(\alpha/2)\times(1H, \text{time of 1 horizontal period})$$

For example, in a case of 120 Hz driving in 52 type full HD (the number of all scanning lines including blanking period is 1125), if α=48, the time Tc that would cause abnormal display state is $$Tc=(48/2)/1125\times(1/120)\times10^{\wedge}6=177.8\ \mu s$$

and consequently combing is so prevented as not to be seen.

Further, in a case of 60 Hz driving in 37 type full HD (the number of all scanning lines including blanking period is 1125), if α=20, similar calculation shows that Tc=148.1 μs, and consequently combing is so prevented as not to be seen.

(Example of Driving in Block-Divided Interlace Scan)

FIG. 10 shows a timing chart of a data signal waveform, a data signal, a latch strobe signal LS, and a gate-on pulse Pw in driving by block-divided interlace scan where the number α of scanning lines in one block is 20 and where 1 horizontal period (1H) right after inversion of the polarity is regarded as a dummy insertion period (indicated by circle). In FIG. 10, the lateral direction indicates time lapse and the longitudinal direction indicates individual rows of gate lines (writing rows) GL1-GLm to which gate-on pulses are applied.

In this driving example, a first block including $1^{st}$-$20^{th}$ gate lines is written in such a manner that odd rows are written firstly and even rows are written secondly, and a second block including $21^{st}$-$40^{th}$ gate lines is written in such a manner that even rows are written firstly and odd rows are written secondly. Therefore, in the $1^{st}$-$40^{th}$ gate lines, inversion of the polarity is made when switching from odd rows to even rows in the first block and when switching from even rows to odd rows in the second block. To be specific, even rows corresponding to 20H in the $1^{st}$-$40^{th}$ gate lines are scanned while a data signal maintains the same polarity (here, − polarity). 20 odd rows from $21^{st}$ gate line are scanned while a data signal maintains the same polarity (here, + polarity). Therefore, except for the first scan, scan is performed with the polarity of a data signal inverted with respect to every 20 rows.

In this example, it takes substantially 1 horizontal period right after inversion of the polarity for an actual data signal waveform to reach a predetermined voltage. Consequently, there is a case where display unevenness is caused by rounding of the data signal at the moment of polarity inversion.

Therefore, as described above, by setting the length of a dummy insertion period in such a manner that the dummy insertion period includes the time for a data signal to reach a predetermined voltage after inverting its polarity, a data signal with the predetermined voltage is written in individual pixels in a horizontal period next to the dummy insertion period. Providing the dummy insertion period in this manner allows increasing a reaching ratio of an actual voltage to an application voltage in the source lines SL1-SLn when writing pixel data after inversion of the polarity. This allows preventing display unevenness with respect to approximately every 20 rows that is caused by rounding of the data signal waveform at the moment of polarity inversion.

Further, compared with the above progressive scan, in this driving, the polarity of a voltage applied to a pixel is inverted with respect to each row, which reduces flickers and reduces display unevenness caused by coupling capacitance of pixels adjacent in a longitudinal direction. In addition, since the block-divided interlace scan is employed, it is possible to prevent the combing.

Data signals have been permutated beforehand by a data signal permutation circuit included in the display control circuit 200 in such a manner as to correspond to the block-divided interlace scan as shown in the drawing. The data signals thus permutated are subjected to a necessary process such as a timing process, and then supplied as digital image signals DA to the source driver 300. The data signal permutation circuit receives digital video signals Dv that are digital RGB signals supplied chronologically from an external signal source to the display control circuit 200, causes the digital video signals Dv to be temporarily stored in a memory, and then read out a signal corresponding to a scanning signal line driven currently, and thus permutates the data signals.

In the driving example shown in FIG. 11, in a first block including $1^{st}$-$20^{th}$ gate lines, even rows are written firstly and odd rows are written secondly, and in a second block including $21^{st}$-$40^{th}$ gate lines, odd rows are written firstly and even rows are written secondly. Consequently, inversion of the polarity is made at the time of switching from even rows to odd rows in the first block and at the time of switching from odd rows to even rows in the second block. Other features are the same as those of the driving example in FIG. 10 and therefore explanations thereof are omitted here.

In the driving example shown in FIG. 12, in a first block including $1^{st}$-$20^{th}$ gate lines, even rows are written firstly and odd rows are written secondly, and in a second block including $21^{st}$-$40^{th}$ gate lines, odd rows are written firstly and even rows are written secondly. From the $1^{st}$ gate line to the $40^{th}$ gate line, inversion of the polarity is made not only at the time of switching from even rows to odd rows in the first block and at the time of switching from odd rows to even rows in the second block, but also at the time of switching from the first block to the second block. 1 horizontal period (1H) right after these inversions of the polarities is regarded as a dummy insertion period.

Also in this driving example, providing the dummy insertion period yields the same effect as above. However, compared with the above driving examples in FIGS. 10 and 11, this driving example has increased number of inversion of the polarity. Accordingly, in view of power consumption, the driving examples in FIGS. 10 and 11 are preferable to the driving example in FIG. 12.

Further, in the driving example in FIG. 12, voltages with the same polarity are applied to pixel electrodes of $20^{th}$ and $21^{st}$ gate lines, respectively. In contrast thereto, in a case of other gate lines, voltages with opposite polarities are applied to pixel electrodes of adjacent gate lines in a longitudinal direction. Consequently, voltage variation of pixel electrodes after gate-off, which variation is caused by coupling capacitance of pixel electrodes adjacent in a longitudinal direction, differs between the case of $20^{th}$ and $21^{st}$ gate lines and other gate lines, resulting in stripped display unevenness. In view of this problem, the driving examples in FIGS. 10 and 11 are preferable to the driving example in FIG. 12.

In the driving example shown in FIG. 13, in a first block including $1^{st}$-$20^{th}$ gate lines, even rows are written firstly and odd rows are written secondly, and also in a second block including $21^{st}$-$40^{th}$ gate lines, even rows are written firstly and odd rows are written secondly. From the $1^{st}$ gate line to the $40^{th}$ gate line, inversion of the polarity is made not only at the time of switching from even rows to odd rows in the first block and at the time of switching from odd rows to even rows in the second block, but also at the time of switching from the first block to the second block. 1 horizontal period (1H) right after these inversions of the polarities is regarded as a dummy insertion period.

Unlike the driving example in FIG. 12, in the driving example in FIG. 13, voltages with opposite polarities are applied to pixel electrodes of the $20^{th}$ gate line and the $21^{st}$ gate line, respectively. Consequently, voltage variation of pixel electrodes after gate-off, which variation is caused by coupling capacitance of pixel electrodes adjacent in a longitudinal direction, are substantially identical among all rows, allowing prevention of stripped display unevenness.

FIG. 14 shows a timing chart of a data signal waveform, a data signal, a latch strobe signal LS, and a gate-on pulse Pw in driving by block-divided interlace scan where the number α of scanning lines in one block is 20 and where 2 horizontal periods (2H) right after inversion of the polarity is regarded as a dummy insertion period (indicated by circle). In FIG. 14, the lateral direction indicates time lapse and the longitudinal direction indicates individual rows of gate lines (writing rows) GL1-GLm to which gate-on pulses are applied.

In the example shown in FIG. 14, it takes substantially 2 horizontal periods right after inversion of the polarity for an actual data signal waveform to reach a predetermined voltage. Therefore, as described above, by setting the length of a dummy insertion period in such a manner that the dummy insertion period includes the time for a data signal to reach a predetermined voltage after inverting its polarity, the data signal with the predetermined voltage is written in individual pixels in a horizontal period next to the dummy insertion period. Providing the dummy insertion period in this manner allows increasing a reaching ratio of an actual voltage to an application voltage in the source lines SL1-SLn when writing pixel data after inversion of the polarity. This allows preventing display unevenness caused by rounding of the data signal waveform at the moment of inverting the polarity.

Although the length of the dummy insertion period in the above example is set to 2H, the length may be set to 3H or more according to the degree of rounding of the data signal waveform after inversion of the polarity.

(Control of Application of Gate-on Pulse)

The following explains the dummy insertion period in more details. In the above driving examples, a period from the moment of inversion of the polarity to the moment of first application of a gate-on pulse Pw is provided as one or more horizontal periods, thereby preventing the influence of rounding of a data signal waveform. However, this period is not limited to one or more horizontal periods. If this period is as defined below, this period can prevent the influence of rounding of a data signal waveform.

Initially, when a last end of a gate-on pulse nearest to a moment of polarity inversion of a data signal among gate-on pulses applied before the moment of polarity inversion is earlier than an end time of a horizontal period during which the gate-on pulse is applied, a period that starts at the last end of the gate-on pulse and ends at the end time of the horizontal period is defined as a first period. Further, a period that starts at the moment of the polarity inversion and ends at a moment of an application start of a gate-on pulse nearest to the moment of the polarity inversion among gate-on pulses applied after the polarity inversion is defined as a second period. The gate-on pulse Pw should be applied so that the second period is longer than the first period.

In the above driving examples, the second period corresponds to the dummy insertion period, and the first period corresponds to a period from the time when a gate-on pulse Pw is off in one horizontal period to the time when the horizontal period ends. Therefore, it is evident that the second period is longer than the first period in each of the above driving examples. Further, although not described as the above driving examples, driving may be performed in such a manner that a horizontal period in which a gate-on pulse Pw is not applied is provided right before inversion of the polarity. Also in this case, it is evident that the second period is longer than the first period.

With such driving, a gate-on pulse Pw is not applied at the moment of inversion of the polarity. This allows preventing data signals with opposite polarities from being simultaneously applied to two adjacent gate lines to which gate-on pulses Pw are applied before and after inversion of the polarity, respectively. This allows preventing image display from being disturbed at the moment of inversion of the polarity.

Further, among the gate-on pulses Pw applied after the moment of inversion of the polarity, the gate-on pulse Pw nearest to the moment of inversion of the polarity is gated on after a period longer than the first period has elapsed from the moment of inversion of the polarity. This prevents charge of a pixel from being carried out during a period where a data signal waveform is greatly rounded due to inversion of the polarity. This allows displaying an image with high quality that is free from display unevenness etc.

Further, the period from the moment of inversion of the polarity to the moment of first application of a gate-on pulse Pw may be set as follows. That is, a gate-on pulse may be applied so that a period from the moment of polarity inversion to the moment of application start of a gate-on pulse Pw nearest to the moment of polarity inversion among gate-on pulses Pw applied after the moment of polarity inversion is equal to or more than the length of a horizontal display period that is obtained by subtracting a horizontal blanking period from a horizontal period.

In the above driving examples, the period from the moment of polarity inversion to the moment of application start of a gate-on pulse Pw nearest to the moment of polarity inversion among gate-on pulses Pw applied after the moment of polarity inversion corresponds to a dummy insertion period. Accordingly, it is evident that the dummy insertion period is longer than the horizontal display period in each of the driving examples.

The length of a horizontal period is equal to the sum of the length of a horizontal display interval and the length of a horizontal blanking period. In general, a data signal to be applied to a source line is designed to have a signal waveform that allows a pixel to be charged within 1 horizontal display period. Accordingly, at the time when 1 horizontal display interval or more has elapsed from the moment of polarity inversion, the influence of rounding of a data signal waveform due to polarity inversion is prevented. This allows preventing charge of a pixel from being carried out during a period where a data signal waveform is greatly rounded due to polarity inversion. This allows displaying an image with high quality which is free from display unevenness etc.

As described above, a data signal to be applied to a source line is basically designed to have a signal waveform that allows a pixel to be charged within 1 horizontal display period. However, the case of carrying out polarity inversion causes a larger change in a voltage of a data signal waveform than the case of not carrying out the polarity inversion. Consequently, under a certain condition of designing a device, there is a possibility that a pixel is not charged within 1 horizontal display period. In order to deal with such a case, the dummy insertion period may be set to be 2H or more as in the above driving examples.

[Embodiment 2]

Another embodiment of the present invention is described below with reference to the drawings. Configurations having the same functions as those in Embodiment 1 are given the same reference numerals and explanations thereof are omitted here.

(Configuration of Liquid Crystal Display Device)

FIG. 15 is a block diagram illustrating a configuration of a liquid crystal display device of the present embodiment and an equivalent circuit of a display section of the liquid crystal display device. The liquid crystal display device is obtained by arranging the liquid crystal display device of FIG. 1 so as to further include a CS control circuit (retention capacitor signal drive section) 90 serving as an auxiliary capacitor line drive circuit. Except for the CS control circuit 90, the liquid crystal display device of the present embodiment is the same as the liquid crystal display device of Embodiment 1 and therefore explanation thereof is omitted here.

The CS control circuit 90 is a circuit for controlling the phase, the width etc. of a waveform of a CS (retention capacitor) signal to be applied to an auxiliary capacitor line (retention capacitor line; CS line). Control by the CS control circuit 90 and the auxiliary capacitor line will be detailed later.

FIG. 16 schematically illustrates an equivalent circuit of one pixel of the liquid crystal display device of the present embodiment. As illustrated in FIG. 16, each pixel includes two sub-pixels and a first TFT 12a and a second TFT 12b are provided so as to correspond to the sub-pixels, respectively. A first sub-pixel electrode 17a, a counter electrode Ec, and a liquid crystal layer between the first sub-pixel electrode 17a and the counter electrode Ec constitute a first sub-pixel capacitor Csp1, and a second sub-pixel electrode 17b, a counter electrode Ec, and a liquid crystal layer between the second sub-pixel electrode 17b and the counter electrode Ec constitute a second sub-pixel capacitor Csp2. Such pixel structure is referred to as a multi-pixel structure. In the present embodiment, one pixel includes two sub-pixels. Alternatively, one pixel may include three or more sub-pixels.

When employing such a multi-pixel structure, it is preferable that at least two of the sub-pixels have different luminance. If at least two of the sub-pixels have different luminance, then one pixel includes a bright sub-pixel and a dark sub-pixel, allowing the liquid crystal display device to display a half tone with use of area coverage modulation. This is suitable for reducing excess brightness when viewing a liquid crystal screen in a skew direction.

Electrostatic capacitances of the first sub-pixel capacitor Csp1 and the second sub-pixel capacitor Csp2 have the same value, and they depend on effective voltages applied on individual liquid crystal layers. Further, a first auxiliary capacitor Cs1 and a second auxiliary capacitor Cs2 are provided independently of the first sub-pixel capacitor Csp1 and the second sub-pixel capacitor Csp2, and electrostatic capacitances of the first auxiliary capacitor Cs1 and the second auxiliary capacitor Cs2 have the same value.

One electrodes of the first sub-pixel capacitor Csp1 and the first auxiliary capacitor Cs1 are connected with a drain electrode of the first TFT 12a, and the other electrode of the first sub-pixel capacitor Csp1 is connected with the counter electrode Ec, and the other electrode of the first auxiliary capacitor Cs1 is connected with an auxiliary capacitor line (CS line) 52a. On the other hand, one electrodes of the second sub-pixel capacitor Csp2 and the second auxiliary capacitor Cs2 are connected with a drain electrode of the second TFT 12b, and the other electrode of the second sub-pixel capacitor Csp2 is connected with the counter electrode Ec, and the other electrode of the second auxiliary capacitor Cs2 is connected with an auxiliary capacitor line (CS line) 52b.

Gate electrodes of the first TFT 12a and the second TFT 12b are connected with a scanning line 16, and source electrodes of the first TFT 12a and the second TFT 12b are connected with a signal line 15.

FIG. 17 illustrates how the CS control circuit 90, CS main lines (retention capacitor signal lines) 52M, and CS lines 52 are connected with one another. FIG. 18 details how the CS main lines 52M and the CS lines 52 are connected with one another.

The CS control circuit 90 outputs CS signals with different signal waveforms to the CS main lines 52M, respectively. In the example shown in FIG. 18, the CS main lines 52M are composed of 10 lines A-H and J and K, and receive respective CS signals with different signal waveforms. The CS main lines 52M are provided outside the display area of the liquid crystal display device.

Each of the CS lines 52 is provided between adjacent gate lines GLm-1 and GLm in such a manner as to be along with the gate line GLm. Further, each CS line 52 is connected with one of the CS main lines 52M. In the example shown in FIG. 18, the CS lines 52 correspond to CS_A-CS_H, CS_J and CS_K that are connected with A-H, J, and K of the CS main lines 52M, respectively.

In the liquid crystal display device having the above multi-pixel structure, when a source driver 300 drives the source lines SL1-SLn of the display section 100 and a gate driver 400 drives the gate lines GL1-GLm of the display section 100, a voltage of a source line SLi is applied on a pixel capacitor via a TFT 10 connected with a selected gate line GLj (i=1 to n, j=1 to m). Then, the CS control circuit 90 drives the CS lines 52 and controls, with use of a CS signal, the voltage of the source line SLi which is supplied to the pixel capacitor.

This allows voltages corresponding to digital image signals DA are applied on a liquid crystal layer in individual pixel formation sections. Transmittance of light from a backlight 600 is controlled in response to application of the voltages, causing the display section 100 to display an image indicated by a digital video signal Dv from outside.

(Example of Interlace Scan Drive)

FIG. 19 is a timing chart of a data signal waveform, a data signal, a latch strobe signal LS, a gate-on pulse Pw, and a CS signal in driving by interlace scan where the polarity of a data signal voltage is inversed with respect to every 10 rows with Vsc as a reference. In the interlace scan in FIG. 19, one frame period is divided into a former half ½ frame period (½F) and a latter half ½ frame period, and in the former half ½F, odd rows are scanned with the polarity of a data signal being plus, and in the latter half ½F, even rows are scanned with the polarity of a data signal being minus. Here, for simplicity, in this example, it is assumed that there are provided 20 scanning signal lines and the polarity of a data signal is inverted with respect to every 10H.

Bright-dark states of two sub-pixels that correspond to individual CS lines 52 are shown in FIG. 19. Further, the right side of the timing chart shows a bright-dark state of individual sub-pixels driven by inverting the polarity between adjacent source lines SLn-1 and SLn. In this driving example, combinations of bright-dark states of individual sub-pixels form a checkered pattern, which is the best form since the checkered pattern has the least jaggyness of an image. Here, a hatched piece indicates a dark sub-pixel and a non-hatched piece indicates a bright sub-pixel. In order to carry out such driving, conditions below are required.

When a period from the time of applying a gate-on pulse on an odd gate line that is one of two adjacent gate lines and that firstly receives application of a gate-on pulse to the time of applying a gate-on pulse on an even line that is the other of the two adjacent gate lines and that secondly receives application of a gate-on pulse is regarded as an adjacent line writing time difference period, inversion of the polarity is performed even times (2k (k is an integer of 1 or more)) during at least the adjacent line writing time difference period. In other words, if a polarity inversion cycle of a CS signal is the sum of a first polarity continuation period and a second polarity continuation period, setting that (polarity inversion cycle of CS signal) =(adjacent line writing time difference period)/k (k is an integer of 1 or more) enables a bright-dark state to be completely inverted between sub-pixels adjacent to each other in a column direction. That is, this enables to keep a bright-dark state of a sub-pixel constant, thereby preventing deterioration in display quality. Further, since the order of brightness and darkness of individual sub-pixels is inverted between an odd line and an even line with respect to each line, it is possible to prevent occurrence of jaggyness of an image.

In the example in FIG. 19, k=1 and a polarity inversion cycle of a CS signal is ½ of an adjacent line writing time difference period. In a case where k=1, the polarity inversion cycle of a CS signal is longest, and therefore applying a gate-on pulse Pw after inversion of the polarity of a CS signal and right before the next inversion of the polarity allows writing of data to individual sub-pixels at the time when a waveform of a CS signal sufficiently achieves a steady state.

Further, the phase of a CS signal to be applied to the $n+2^{nd}$ CS line 52 is delayed by 1H with respect to the phase of a CS signal to be applied to the $n^{th}$ CS line 52. This allows writing of data into individual sub-pixels at the moment after the same time has elapsed from the time of inversion of the polarity of a CS signal in all the CS lines 52 and at the moment when the waveform of the CS signal sufficiently achieves a steady state. Therefore, it is possible to prevent display unevenness due to rounding of the waveform of the CS signal.

In order to meet the above first and second conditions, CS signals in twice the number of a horizontal period included in a half period of a polarity inversion cycle of a data signal waveform, i.e. a period where one polarity continues. In the example in FIG. 19, 10(H)×2=20 kinds of CS signals are required. A simple calculation shows that, in this example, it is necessary to provide 20 CS main lines 52M. However, in this example, using CS signals with opposite polarities allows the above driving only with 10 kinds (phases) of CS signals.

To be specific, the CS lines 52 are divided into two blocks, i.e. a block including upper 10 rows and a block including lower 11 rows, and CS signals in two rows in the upper 10 rows are paired, and the order of CS signals in each pair is inverted in the lower 10 rows, and a CS signal at the lower $11^{th}$ row is made identical with a CS signal at the upper $1^{st}$ row, so that the above driving is realized with use of 10 kinds (phases) of CS signals.

As described above, in the interlace scan, the polarity inversion cycle is ½F. Accordingly, the interlace scan allows reducing power consumption and heat of the source driver 300, compared with the progressive scan. Further, in the interlace scan, the polarity of a voltage applied on a pixel appears to be inverted with respect to 1 row, allowing reduction of flickers, and allowing reduction of unevenness due to coupling capacitance of pixels adjacent in a longitudinal direction.

Data signals have been permutated beforehand by a data signal permutation circuit included in the display control circuit 200 in such a manner as to correspond to the interlace scan as shown in the drawing. The data signals thus permutated are subjected to a necessary process such as a timing process, and then supplied as digital image signals DA to the source driver 300. The data signal permutation circuit receives digital video signals Dv that are digital RGB signals supplied chronologically from an external signal source to the display control circuit 200, causes the digital video signals Dv to be temporarily stored in a memory, and then reads out a signal corresponding to a scanning signal line driven currently, and thus permutates the data signals. This holds for other driving examples below.

Also in this interlace scan, an actual data signal shows rounding of waveform, as described above. In the example in the drawing, it takes substantially 1 horizontal period right after inversion of the polarity for an actual data signal waveform to reach a predetermined voltage. Accordingly, there is a possibility that display unevenness due to rounding of the waveform of the data signal occurs.

An example of driving capable of improving display unevenness due to rounding of the waveform of the data signal is a driving example shown in FIG. 20. FIG. 20 shows a timing chart of a data signal waveform, a data signal, a latch strobe signal LS, a gate-on pulse Pw, and a CS signal in driving by interlace scan where the polarity of a data signal voltage is inverted with Vsc as a reference and where 2 horizontal periods (2H) right after inversion of the polarity are regarded as a dummy insertion period. In the interlace scan in FIG. 20, 1 frame period is divided into the former half ½ frame period (½F) and the latter half ½ frame period, odd rows are scanned with the polarity of a data signal being plus in the former half ½F, and then even rows are scanned with the polarity of a data signal being minus in the latter half ½F. For simplicity, it is assumed that there are 20 scanning signal lines.

In the example shown in FIG. 20, it takes substantially 2 horizontal periods right after polarity inversion for an actual data signal waveform to reach a predetermined voltage. In contrast, in the driving method, a gate-on pulse Pw is not applied during 2 horizontal periods right after inversion of the polarity so as to provide a dummy horizontal period. Consequently, in a horizontal period next to a dummy insertion period, a data signal with the predetermined voltage is written into individual pixels.

As described above, providing the dummy insertion period allows increasing a reaching ratio (charging ratio) of an actual voltage to an application voltage in the source lines SL1-SLn (data signal lines) when writing pixel data after inversion of the polarity.

It should be noted that, as in Embodiment 1, during the dummy insertion period, the display control circuit 200 stops application of an on-pulse of an LS signal to be input to the source driver 300. Consequently, a data signal to be written during the dummy insertion period is written during a horizontal period next to the dummy insertion period. Alternatively, the display control circuit 200 may output, in 2 horizontal periods next to the dummy insertion period, a data signal equal to a data signal to be applied during the dummy insertion period right after the inversion of the polarity.

On the other hand, simply inserting a dummy insertion period as in the present driving example raises the following problem in the multi-pixel driving. That is, insertion of the dummy insertion period lengths the polarity inversion cycle of a data signal waveform, whereas the polarity inversion cycle of a CS signal does not change. This causes disparity between phases of the data signal waveform and the CS signal. This makes the bright-dark state of a sub-pixel unstable, dropping display quality.

In FIG. 20 for example, in the latter half ½F, a gate-on pulse Pw is applied during a period when the waveform of a CS signal is greatly rounded and consequently display is carried out while the voltage of the CS signal does not reach a predetermined value, resulting in display unevenness. Further, in relations among the gate-on pulse Pw, the data signal waveform, and the CS signal waveform shown in the drawing, the order of brightness and darkness of individual sub-pixels is as follows: bright, dark, dark, bright, bright, dark, . . . , i.e., dark sub-pixels or bright sub-pixels appears successively with respect to every 2 rows. In the drawing, a hatched portion corresponds to a dark sub-pixel and a non-hatched portion corresponds to a bright sub-pixel. This configuration is problematic in that it has more eminent jaggyness as display quality compared with a configuration in which brightness and darkness are switched with respect to each row.

One example of a driving method that improves the problem due to the difference between a polarity inversion cycle of a CS signal and a polarity inversion cycle of a data signal waveform is a driving example shown in FIG. 21. The drawing shows a timing chart of a data signal waveform, a data signal, a latch strobe signal LS, a gate-on pulse Pw, and a CS signal in driving by interlace scan where the polarity of a data signal waveform is inverted with Vsc as a reference and where two horizontal periods (2H) right after inversion of the polarity of a data signal are regarded as a dummy insertion period and a CS signal dummy period corresponding to 2H is inserted into a CS signal during a period when the dummy insertion period is inserted. In the interlace scan in the drawing, 1 frame period is divided into a former half ½ frame period and a latter half ½ frame period and odd rows are subjected to interlace scan with the polarity of a data signal being plus in the former half ½F and even rows are subjected to interlace scan with the polarity of a data signal being minus in the latter half ½F. For simplicity, it is assumed that there are 20 scanning signal lines.

In the example in FIG. 21, when a dummy insertion period is not inserted, a period during which one polarity of a CS signal continues (polarity continuation period) is 5H. To a polarity continuation period of a CS signal right after inversion of the polarity of a data signal is added a period when a dummy insertion period is inserted, i.e. 2H. That is, a polarity continuation period of a CS signal right after inversion of the polarity is set to 7H and a polarity continuation period of other CS signal is set to 5H.

With the above driving, insertion of a dummy insertion period allows lengthening the polarity inversion cycle of a data signal waveform and lengthening the polarity inversion cycle of a CS signal. This allows keeping relationship in phase between the data signal waveform and the CS signal. Further, at least in an adjacent line writing time difference period, each of the CS signals has the same polarity inversion timing among successive frames. This stabilizes the state of brightness-darkness of sub pixels, preventing deterioration in display quality. Further, since the order of brightness and darkness of individual sub-pixels is inverted between an odd line and an even line with respect to each line, it is possible to prevent occurrence of jaggyness of an image.

Further, with the configuration, in all the CS lines, it is possible to write data into individual sub-pixels at a time when the same time has elapsed from the moment of inversion of the polarity of a CS signal and when the waveform of the CS signal sufficiently achieves a steady state. This allows preventing display unevenness due to rounding of the waveform of a CS signal.

Such driving can be realized by delaying the phase of a CS signal applied to an $n+2^{nd}$ CS line 52 by 1H with respect to the phase of a CS signal applied to an $n^{th}$ CS line 52 during a period when a data signal waveform continues to have the same polarity.

The CS signal lines 52 are divided into a block including upper 10 rows and a block including lower 11 rows, and CS signals in two rows in the upper 10 rows are paired, and the order of CS signals in each pair is inverted in the lower 10 rows, and a CS signal at the lower $11^{th}$ row is made identical with a CS signal at the upper $1^{st}$ row. Thus, the above driving is realized using 10 kinds of CS signals.

In the above example, the dummy insertion period is 2H. Alternatively, the dummy insertion period may be 1H or 3H or more depending on the degree of rounding of a data signal waveform.

On the other hand, in the driving example, two polarities have different polarity continuation periods in a waveform of a CS signal. In this case, there is a possibility that an effective voltage of a sub-pixel varies depending on the difference in the polarity continuation period, resulting in striped display unevenness.

One example of a driving method that improves the problem due to the difference in the polarity continuation period is a driving example shown in FIG. 22. The drawing shows a timing chart of a data signal waveform, a data signal, a latch strobe signal LS, a gate-on pulse Pw, and a CS signal in driving by interlace scan where the polarity of a data signal waveform is inverted with Vsc as a reference and where two horizontal periods (2H) right after inversion of the polarity of a data signal are regarded as a dummy insertion period and polarity continuation periods of CS signals are increased by 1H. In the interlace scan in FIG. 22, 1 frame period is divided into a former half ½ frame period and a latter half ½ frame period and odd rows are subjected to interlace scan with the polarity of a data signal being plus in the former half ½F and even rows are subjected to interlace scan with the polarity of a data signal being minus in the latter half ½F. For simplicity, it is assumed that there are 20 scanning signal lines.

In the example in FIG. 22, when a dummy insertion period is not inserted, a period during which one polarity of a CS signal continues (polarity continuation period) is 5H. To one polarity continuation period of a CS signal is added 1H of 2H corresponding to the inserted dummy insertion period, so that the one polarity continuation period becomes 6H. To the other polarity continuation period of a CS signal is added remaining 1H of the 2H corresponding to the inserted dummy insertion period, so that the other polarity continuation period becomes 6H. That is, the polarity inversion cycle of a CS signal is set to be half the length of a polarity inversion cycle of a data signal waveform to which the dummy insertion period is added, and the polarity continuation period of the CS signal is made constant regardless of the polarity.

It should be noted that the dummy insertion period is set in such a manner that half the length of the polarity inversion cycle of a data signal waveform to which the dummy insertion period is added is equal to the length corresponding to positive integer number of 1 horizontal periods. This allows setting the polarity continuation period by the length of 1 horizontal period as a unit. This prevents a circuit for generating a CS signal waveform from being complicated.

As in the case of the driving example in FIG. 21, this driving yields the effect of stabilizing the state of brightness-darkness of sub-pixels and preventing deterioration in display quality, the effect of preventing jaggyness, and the effect of preventing display unevenness due to rounding of waveform of a CS signal. In addition, this driving yields an effect as follows: since a polarity continuation period of one polarity is equal to a polarity continuation period of the other polarity, it is possible to keep an effective potential of a sub-pixel substantially constant, preventing striped display unevenness.

In the present driving example, the CS lines 52 are divided into a block including upper 12 rows and a block including lower 9 rows, and CS signals in two rows in the upper 8 rows in the block including upper 12 rows are paired, and the order of CS signals in each pair is inverted in the lower 8 rows, and a CS signal at lower $9^{th}$ row is made identical with a CS signal at upper $10^{th}$ row. This provides 12 kinds of (phases of) CS signals, allowing the above driving.

Another example of a driving method that improves the problem due to the difference in the polarity continuation period in the driving example in FIG. 21 is explained below. FIG. 23 is a timing chart of a data signal waveform, a data signal, a latch strobe signal LS, a gate-on pulse Pw, and a CS signal in driving by interlace scan where the polarity of a data signal voltage is inverted with Vsc as a reference and where 2 horizontal periods (2H) right after inversion of the polarity of a data signal are regarded as a first dummy insertion period and 2 horizontal periods (2H) prior to the inversion of the polarity of a data signal by 5 horizontal periods (5H) are regarded as a second dummy insertion period, and CS signal dummy periods each corresponding to 2H are inserted into CS signals during periods to which the first and second dummy insertion periods are inserted, respectively. In the interlace scan in FIG. 23, 1 frame period is divided into a former half ½ frame period (½F) and a latter half ½ frame period and odd rows are subjected to interlace scan with the polarity of a data signal being plus in the former half ½F and even rows are subjected to interlace scan with the polarity of a data signal being minus in the latter half ½F. For simplicity, it is assumed that there are 20 scanning signal lines.

According to the driving example, in a period that is a half of the polarity inversion cycle of a data signal, that is, in a period during which a data signal polarity POL continues to be the same, a dummy insertion period is inserted not only at a time right after inversion of the polarity but also at another time. At the time when the dummy insertion period is inserted, a gate-on pulse Pw is not applied.

Further, the polarity inversion cycle of a CS signal is set to be half the length of the polarity inversion cycle of the data signal polarity POL to which cycle all the dummy insertion periods are added, and the polarity continuation period of the CS signal is kept constant regardless of the polarity.

As with the driving example in FIG. 22, since this driving is configured such that a polarity continuation period of one polarity is equal to a polarity continuation period of the other polarity in a CS signal waveform, it is possible to keep an effective potential of a sub-pixel substantially constant, thereby preventing striped display unevenness.

The driving example is designed such that in two CS lines 52 corresponding to a gate line GLj to which a gate-on pulse Pw is applied right after insertion of a dummy insertion period, the phase of a CS signal to be applied to a CS line 52 that is the former of the two CS lines 52 in terms of a sub scanning order is delayed by 2H (length of inserted dummy insertion period)+1H with respect to the phase of a CS signal to be applied to a CS line 52 that is prior to the former one of the two CS lines 52 in terms of a sub scanning order. On the other hand, in other CS lines 52, the phase of a CS signal to be applied to $n+2^{nd}$ CS line 52 is delayed by 1H with respect to the phase of a CS signal to be applied to $n^{th}$ CS line 52.

This driving allows writing data into individual sub-pixels in all the CS lines 52 at a time when the same time has elapsed from inversion of the polarity of a CS signal and the waveform of the CS signal sufficiently achieves a steady state. This allows preventing display unevenness due to rounding of a CS signal waveform.

In the above driving example, the number of horizontal periods (5H) actually written between the first dummy insertion period and a second dummy insertion period next to the first dummy insertion period is equal to the number of horizontal periods (5H) actually written between the second dummy insertion period and a first dummy insertion period next to the second dummy insertion period.

Consequently, when the CS lines 52 are divided into a block including upper 10 rows and a block including lower 11 lines, and CS signals in two rows in the upper 10 rows are paired, and the order of CS signals in each pair is inverted in the lower 10 rows, and a CS signal at lower $11^{th}$ row is made identical with a CS signal at upper $1^{st}$ row, it is possible to realize the above driving using 10 kinds of (phases of) CS signals. In this regard, the driving example in FIG. 23 allows reducing the kinds of CS signals and the number of CS main lines 52M compared with the FIG. 22 configuration in which 12 kinds of (phases of) CS signals are used.

The following explains a driving example that allows preventing shortage in charging of a pixel at a moment of inversion of the polarity of a data signal in the driving example in FIG. 22. FIG. 24 shows a timing chart of a data signal waveform, a data signal, a latch strobe signal LS, a gate-on pulse Pw, and a CS signal in driving by interlace scan where the polarity of a data signal voltage is inverted with Vsc as a reference and 2 horizontal periods (2H) right after inversion of the polarity of a data signal are regarded as a dummy insertion period and polarity continuation periods of CS signals are increased by 1H, respectively.

The driving example in FIG. 24 differs from the driving example in FIG. 22 in that the pulse width of a gate-on pulse Pw to be firstly applied after inversion of the polarity of a data signal is made longer than the pulse width of other gate-on pulse Pw. As described above, right after inversion of the polarity of a data signal, the waveform of the data signal is rounded. In order to reduce shortage in charging of a pixel due to the rounding of the waveform of the data signal, a dummy insertion period is inserted. Making the pulse width of the gate-on pulse Pw longer allows further reducing the shortage in charging of a pixel. That is, making the pulse width of the gate-on pulse Pw longer makes the period of charging a pixel longer, increasing a charge ratio of the pixel.

(Example Of Block-divided Interlace Scan Drive)

In Embodiment 1, the block-divided interlace scan was explained as a method for preventing inconvenient combing that occurs when carrying out driving by normal interlace scan. The following explains a driving example in which the block-divided interlace scan is applied to the present embodiment.

FIG. 25 shows a timing chart of a data signal waveform, a data signal, a latch strobe signal LS, a gate-on pulse Pw, and a CS signal in driving by block-divided interlace scan where the number a of scanning signal lines in one block is 20 and where 1 horizontal period (1H) right after inversion of the polarity is regarded as a dummy insertion period (indicated by circle). In the drawing, the lateral direction indicates time lapse and the longitudinal direction indicates individual rows of gate lines (writing rows) GL1-GLm to which gate-on pulses are applied and individual rows of CS lines 52.

In this driving example, a first block including $1^{st}$-$20^{th}$ gate lines is written in such a manner that odd rows are written firstly and even rows are written secondly, and a second block including $21^{st}$-$40^{th}$ gate lines is written in such a manner that even rows are written firstly and odd rows are written secondly. Therefore, from the $1^{st}$-$40^{th}$ gate lines, inversion of the polarity is made when switching from odd rows to even rows in the first block and when switching from even rows to odd rows in the second block. To be specific, even rows corresponding to 20H in the $1^{st}$-$40^{th}$ gate lines are scanned while a data signal maintains the same polarity (here, – polarity). 20 odd rows from the $21^{st}$ gate line are scanned while a data signal maintains the same polarity (here, + polarity). Therefore, except for the first scan, scan is performed with the polarity of a data signal inverted with respect to scan of every 20 rows.

In this example, it takes substantially 1 horizontal period right after inversion of the polarity for an actual data signal waveform to reach a predetermined voltage. Consequently, there is a case where display unevenness is caused by rounding of the data signal when inverting the polarity.

Therefore, as described above, by setting the length of a dummy insertion period in such a manner that the dummy insertion period includes the time for a data signal to reach a predetermined voltage after inverting its polarity, a data signal with the predetermined voltage is written in individual pixels in a horizontal period next to the dummy insertion period. Providing the dummy insertion period in this manner allows increasing a reaching ratio of an actual voltage to an application voltage in the source lines SL1-SLn when writing pixel data after inversion of the polarity. This allows preventing display unevenness with respect to approximately every 20 rows that is caused by rounding of the data signal waveform at the time of inverting the polarity.

Further, compared with the above progressive scan, in this driving, the polarity of a voltage applied to a pixel appears to be inverted with respect to each row, which reduces flickers and reduces display unevenness caused by coupling capacitance of pixels adjacent in a longitudinal direction. In addition, since the block-divided interlace scan is employed, it is possible to prevent the combing.

When a period from the time of applying a gate-on pulse on an odd gate line that is one of two adjacent gate lines and that firstly receives application of a gate-on pulse to the time of applying a gate-on pulse on an even line that is the other of the two adjacent gate lines and that secondly receives application of a gate-on pulse is regarded as an adjacent line writing time difference period, inversion of the polarity is performed even times (2k (k is an integer of 1 or more)) during at least the adjacent line writing time difference period. In other words, if a polarity inversion cycle of a CS signal is the sum of a first polarity continuation period and a second polarity continuation period, setting that (polarity inversion cycle of CS signal) =(adjacent line writing time difference period)/k (k is an integer of 1 or more) enables a bright-dark state to be completely inverted between sub-pixels adjacent to each other in a column direction. Further, each of individual CS signals has the same polarity inversion timing between successive frames at least during the adjacent line writing time difference period. This makes the state of brightness-darkness of a sub-pixel constant, preventing deterioration in display quality. Further, since the order of brightness and darkness of individual sub-pixels between an odd line and an even line is inverted with respect to each line, it is possible to prevent the occurrence of jaggyness of an image.

In the example in FIG. 25, k=1 and a polarity inversion cycle of a CS signal is 11H which is the same as that of an adjacent line writing time difference period. In this case, if each of polarity continuation periods is simply assumed to be ½ of the polarity inversion cycle, each polarity continuation period is 5.5H (this case will be explained later with reference to FIG. 28). However, the polarity continuation periods are set so that one polarity continuation period is 5H and the other polarity continuation period is 6H. This is because setting the length of the polarity continuation period by 1H as a unit makes it easier to generate a waveform. In a case where k=1, the polarity inversion cycle of a CS signal gets longest, and therefore applying a gate-on pulse Pw after inversion of the polarity of a CS signal and right before the next inversion allows writing of data to individual sub-pixels at the time when a waveform of a CS signal sufficiently achieves a steady state.

Further, during a period when the same polarity of a data signal waveform continues, the phase of a CS signal to be applied to the n+2$^{nd}$ CS line 52 is delayed by 1H or 2H with respect to the phase of a CS signal to be applied to the n$^{th}$ CS line 52. This allows writing of data into individual sub-pixels at the time after 4H or more has elapsed from the time of inversion of the polarity of a CS signal in all the CS lines 52 and at the time when the waveform of the CS signal sufficiently achieves a steady state. Therefore, it is possible to prevent display unevenness due to rounding of the waveform of the CS signal.

The CS lines 52 are divided into blocks each including 10 rows, CS signals in two rows in a block are paired, and the order of CS signals in each pair is inverted in 10 rows in a block posterior by one to the block in the sub-scanning order. Thus, the above driving is realized with use of 10 kinds (phases) of CS signals.

Data signals have been permutated beforehand by a data signal permutation circuit included in the display control circuit 200 in such a manner as to correspond to the block-divided interlace scan as shown in the drawing. The data signals thus permutated are subjected to a necessary process such as a timing process, and then supplied as digital image signals DA to the source driver 300. The data signal permutation circuit receives digital video signals Dv that are digital RGB signals supplied chronologically from an external signal source to the display control circuit 200, causes the digital video signals Dv to be temporarily stored in a memory, and then reads out a signal corresponding to a scanning signal line driven currently, and thus permutates the data signals. This holds for other driving examples below.

In the above driving example, the length of a polarity continuation period of one polarity of a CS signal waveform is different from the length of a polarity continuation period of the other polarity of the CS signal waveform. For example, at a CS line 52 serving as CS_A, in a period in which the polarity of a data signal waveform is minus, H level period of the CS signal waveform is 5H+5H=10H, whereas L level period of the CS signal waveform is 5H+6H=11H. Such difference is seen in individual CS lines 52, causing a difference in actual potential between sub-pixels due to a difference in the length of a polarity continuation period of a CS signal waveform. This may cause striped display unevenness.

FIG. 26 shows a timing chart of a data signal waveform, a data signal, a latch strobe signal LS, a gate-on pulse Pw, and a CS signal in driving by block-divided interlace scan where the number a of scanning lines in one block is 20 and where 1 horizontal period (1H) right after inversion of the polarity of a data signal is regarded as a first dummy insertion period, 1 horizontal period (1H) which is prior to the moment of inversion of the polarity of a data signal by 5 horizontal periods (5H) is regarded as a second dummy insertion period, and CS signals during periods to which the first and second insertion periods are inserted are made to include insertion of CS signal dummy periods corresponding to 1H, respectively.

The following explains differences between the driving example in FIG. 26 and the driving example in FIG. 25. The driving example in FIG. 26 is designed such that, in a period that is a half of a polarity inversion cycle of a data signal, that is, in a period during which one polarity of a data signal waveform continues, a dummy insertion period is inserted not only right after inversion of the polarity but also at another timing. At such another timing when the dummy insertion period is inserted, a gate-on pulse Pw is not applied.

Further, to a polarity continuation period of a CS signal at timing when the dummy insertion period is inserted is added a period to which the dummy insertion period is inserted, i.e. 1H. That is, a polarity continuation period of the CS signal at timing when the dummy insertion period is inserted is set to 6H and a polarity continuation period of other CS signal is set to 5H.

With the driving, the length of a polarity continuation period of one polarity of a CS signal waveform is equal to the length of a polarity continuation period of the other polarity of the CS signal waveform. For example, at a CS line 52 serving as CS_A, in a period in which the polarity of a data signal waveform is minus, H level period of the CS signal waveform is 5H+6H=11H, and L level period of the CS signal waveform is 5H+6H=11H. This allows making an effective potential substantially equal between sub-pixels, preventing striped display unevenness.

The driving example is designed such that in two CS lines 52 corresponding to a gate line GLj to which a gate-on pulse Pw is applied right after insertion of a dummy insertion period, the phase of a CS signal to be applied to a CS line 52 that is the former of the two CS lines 52 in terms of a sub scanning order is delayed by 1H (length of inserted dummy insertion period)+1H with respect to the phase of a CS signal to be applied to a CS line 52 that is prior to the former one of the two CS lines 52 in terms of a sub scanning order. On the other hand, in other CS lines 52, the phase of a CS signal to be applied to n+2$^{nd}$ CS line 52 is delayed by 1H with respect to the phase of a CS signal to be applied to n$^{th}$ CS line 52.

This driving allows writing data into individual sub-pixels in all the CS lines 52 at a time when 4H or more has elapsed from inversion of the polarity of a CS signal and the waveform of the CS signal sufficiently achieves a steady state. This allows preventing display unevenness due to rounding of a CS signal waveform.

In the above driving example, the number of horizontal periods (5H) actually written between the first dummy insertion period and a second dummy insertion period next to the first dummy insertion period is equal to the number of horizontal periods (5H) actually written between the second dummy insertion period and a first dummy insertion period next to the second dummy insertion period.

Thus, the CS lines 52 are divided into blocks each including 10 rows, CS signals in two rows in a block are paired, and the order of CS signals in each pair is inverted in 10 rows in a block posterior by one to the block in the sub-scanning order. Thus, the above driving is realized with use of 10 kinds (phases) of CS signals.

In the above example, the first dummy insertion period and the second dummy insertion period are set to 1H. Alternatively, they may be set to 2H or more. FIG. 30 is a driving example in which the first dummy insertion period and the second dummy insertion period are set to 2H. In this example, to a polarity continuation period of a CS signal at timing when a dummy insertion period is inserted is added a period for inserting the dummy insertion period, i.e. 2H. That is, a polarity continuation period of a CS signal at timing when the dummy insertion period is inserted is set to 7H and a polarity continuation period of other CS signal is set to 5H.

In the example in FIG. 30, it takes substantially 2 horizontal periods right after inversion of the polarity for an actual data signal waveform to reach a predetermined voltage. As described above, the degree of rounding of a voltage waveform of a data signal differs depending on the specification of a liquid crystal display device. This is because the degrees of loads on the source lines SL1-SLn are different depending on, for example, the screen size and the number of pixels of the liquid crystal display device.

Therefore, as described above, by setting the length of the dummy insertion period to include the time for a data signal to reach a predetermined voltage after inversion of the polarity, a data signal with the predetermined voltage is written into individual pixels in a horizontal period next to the dummy insertion period.

FIG. 27 shows a timing chart of a data signal waveform, a data signal, a latch strobe signal LS, a gate-on pulse Pw, and a CS signal in driving by block-divided interlace scan where the number a of scanning lines in one block is 20 and where 1 horizontal period (1H) right after inversion of the polarity of a data signal is regarded as a dummy insertion period and a polarity continuation period of a CS signal is set as follows.

In this driving example, each block is configured such that only in a period (adjacent line writing time difference period) from the time of applying a gate-on pulse Pw on an odd or even line that is one of two adjacent gate lines and that firstly receives application of the gate-on pulse Pw to the time of applying a gate-on pulse Pw on an even or odd line that is the other of the two adjacent gate lines and that secondly receives application of the gate-on pulse Pw, a CS signal dummy period corresponding to a dummy insertion period (1H) of a data signal is inserted into at least one of polarity continuation periods for a CS signal. In this case, each of CS signals has the same polarity inversion timing between successive frames at least in the adjacent line writing time difference period.

In this case, other than in the adjacent line writing time difference period, a CS signal may be a periodic signal that has a certain polarity continuation period and may be a signal with a certain value whose potential is the same as that of a common electrode. It should be noted that application of a gate-on pulse Pw and a CS signal is required to be controlled so that the gate-on pulse Pw is applied other than in a period during which a dummy insertion period is inserted into a data signal and the gate-on pulse Pw is applied at the latter part of the polarity continuation period of a CS signal. Further, since all CS signals are independent, the number of kinds of CS signals and the number of CS main lines 52M are required to be identical with the number of CS lines 52. Signals may be independently supplied to individual CS lines 52 without using the CS main lines 52M.

With the above example, the number of a polarity continuation period to which a dummy insertion period is inserted in a CS signal is one per one frame, and therefore a difference in a ratio of a polarity continuation period of one polarity to a polarity continuation period of the other polarity is slight. This allows keeping an effective potential of a sub-pixel substantially constant, thereby preventing striped display unevenness.

In the above driving example, a CS signal dummy period corresponding to a dummy insertion period (1H) is inserted into at least one of polarity continuation periods for a CS signal in the adjacent line writing time difference period. Alternatively, dummy insertion periods may be evenly assigned to all of polarity continuation periods of CS signals in the adjacent line writing time difference period and individually inserted in the polarity continuation periods (each polarity continuation period is 0.5H).

FIG. 28 shows a timing chart of a data signal waveform, a data signal, a latch strobe signal LS, a gate-on pulse Pw, and a CS signal in driving by block-divided interlace scan where the number a of scanning lines in one block is 20 and where 1 horizontal period (1H) right after inversion of the polarity of a data signal is regarded as a dummy insertion period and, as described above, each of two polarity continuation periods of CS signals included in an adjacent line writing time difference period (11H) is 5.5H.

In this driving example, each polarity continuation period of a CS signal is 5.5H. This allows keeping an effective potential of a sub-pixel almost evenly, preventing striped display unevenness.

Further, the phase of a CS signal to be applied on an $n+2^{nd}$ CS line 52 is delayed by 1H with respect to the phase of a CS signal to be applied on an $n^{th}$ CS line 52 and each polarity continuation period is 5.5H. Consequently, CS signals show the same waveform with respect to every 22 lines. Accordingly, it is possible to supply CS signals to individual CS lines 52 via 22 CS main lines 52M.

In the above example, the dummy insertion period is 1H. Alternatively, the dummy insertion period may be 2H or more. FIG. 31 shows a driving example in which the dummy insertion period is 2H. In this case, each of two polarity continuation periods of CS signals included in an adjacent line writing time difference period (12H) is 6H. Since the unit of a polarity continuation period of a CS signal is 1H, the example in FIG. 31 allows reducing the number of the CS main lines 52M by half and simplifying a circuit for generating a CS signal waveform, compared with the embodiment in FIG. 28.

In the example in FIG. 31, it takes substantially 2 horizontal periods right after inversion of the polarity for a data signal waveform to reach a predetermined voltage. As described above, the degree of rounding of a voltage waveform of the data signal differs according to the specification of a liquid crystal display device. This is because the degree of loads to the source lines SL1-SLn differs according to, for example, the screen size and the number of pixels of the liquid crystal display device.

Therefore, by setting the length of the dummy insertion period in such a manner that the dummy insertion period includes a time for a data signal to reach a predetermined voltage after inversion of the polarity, it is possible to write the data signal with the predetermined voltage in individual pixels during a horizontal period next to the dummy insertion period.

Further, the phase of a CS signal to be applied on an $n+2^{nd}$ CS line 52 is delayed by 1H with respect to the phase of a CS signal to be applied on an $n^{th}$ CS line 52, and each polarity continuation period is 6H. In this case, CS signals show the same waveform with respect to every 24 lines. However, use of CS signals whose phases are opposite to each other allows realizing the above example by using 12 kinds (phases) of CS signals. That is, it is possible to supply CS signals to individual CS lines 52 by using 12 CS main lines 52M. It should be noted that signals may be supplied to individual CS lines 52 independently without using the CS main lines 52.

Here, in this driving example, when a polarity continuation period of a CS signal is regarded as c (=6H) and a dummy period of a CS signal is regarded as b (=1H), a basic polarity inversion cycle n2 of a data signal is calculated as n2=(c−b)×4k (k is a natural number)=(6−1)×4×1=20(H). Further, a dummy insertion period m is calculated as m=2b×k=2×1×1=2(H). Further, the number of phases of a CS signal is calculated as 2×c=2×6=12 (phases). On the other hand, the polarity continuation period c of a CS signal is calculated as c=n2/4k+b. Further, the number of inversion of the polarity of a CS signal in an adjacent line writing time difference period is 2k.

FIG. 32 shows a driving example obtained by arranging the driving example in FIG. 28 so that a dummy insertion period is 4H. In this example, when a polarity continuation period of a CS signal is regarded as c (=6H) and a dummy period of a CS signal is regarded as b (=1H), a basic polarity inversion cycle n2 of a data signal is calculated as n2=(c−b)×4k (k is a natural number)=(6−1)×4×2=40(H). Further, a dummy insertion period m is calculated as m=2b×k=2×1×2=4(H). Further, the number of phases of a CS signal is calculated as 2×c=2×6=12 (phases). On the other hand, the polarity continuation period c of a CS signal is calculated as c=n2/4k+b. Further, the number of inversion of the polarity of a CS signal in an adjacent line writing time difference period is 2k.

The following explains a driving example designed for preventing shortage in charging of a pixel when inverting the polarity of a data signal in the driving example in FIG. 28. FIG. 29 shows a timing chart of a data signal waveform, a data signal, a latch strobe signal LS, a gate-on pulse Pw, and a CS signal in driving by block-divided interlace scan where the number α of scanning lines in one block is 20 and where 1 horizontal period (1H) right after inversion of the polarity of a data signal is regarded as a dummy insertion period and where each of polarity continuation periods of CS signals in an adjacent line writing time difference period (11H) is 5.5H.

The driving example in FIG. 29 is different from the driving example in FIG. 28 in that the pulse width of a gate-on pulse Pw to be firstly applied after inversion of the polarity of a data signal is longer than the pulse width of other gate-on pulse Pw. As described above, right after inversion of the polarity of a data signal, a data signal waveform is rounded. In order to reduce shortage in charging of a pixel due to the rounding of a data signal waveform, a dummy insertion period is inserted. Making the pulse width of the gate-on pulse Pw longer allows further reducing the shortage in charging of a pixel. That is, making the pulse width of the gate-on pulse Pw longer leads to a longer charging period, allowing a charging ratio of a pixel to be increased.

(How to Set Horizontal Scanning Period)

The following explains how to set a horizontal scanning period. In the example, the horizontal period as explained above is referred to as a horizontal scanning period. The horizontal scanning period corresponds to the sum of a horizontal display period and a horizontal blanking period.

First, an explanation is made as to a configuration where the polarity of a signal potential to be applied on one source line is inverted with respect to a plurality of data (a plurality of pixels), and one or more dummy scanning periods (corresponding to the dummy insertion period as explained above) are inserted right after inversion of the polarity. This configuration realizes block inversion driving (nh/1v inversion driving) in which the polarity of a signal potential is inverted at a border where blocks of pixels are adjacent to each other in a column direction (it should be noted that the polarity of a signal potential is inverted at a border where pixels are adjacent to each other in a row direction).

FIG. 53 shows a data sequence to be output, a waveform of a signal potential corresponding to individual data, and a timing chart of a latch strobe signal LS and a gate-on pulse (pixel data writing pulse) Pw in a case where 10 video data are regarded as one set in the order of input, one dummy data is inserted at the top of each set, and the polarity of a signal potential is inverted with respect to each set (inversion cycle is equal to 1 dummy scanning period+10 horizontal scanning periods). In FIG. 53, the lateral direction indicates time lapse and the longitudinal direction indicates individual rows of gate lines (writing rows) GL1-GLm to which gate-on pulses are applied. FIG. 53 is different from FIG. 2 in that a LS signal pulse is generated also during a dummy scanning period. The configuration in FIG. 53 is advantageous in that the configuration in FIG. 53 allows freely setting data in the dummy scanning period. For simplicity, in the present example, data to be input in the dummy scanning period is identical with data in a horizontal scanning period right after the dummy scanning period.

In this case, when video data corresponding to $N^{th}$ gate line is referred to as N, video data to be inputted is lined as 1, 2, 3, 4, 5, 6, 7, 8, 9, 10 and 11, 12, 13, 14, 15, 16, 17, 18, 19, 20, and 21, 22, . . . . A circuit such as a dummy data insertion circuit in the display control circuit 200 brings these video data together into a set of 1, 2, 3, . . . , 8, 9, 10, a set of 11, 12, 13, . . . 18, 19, 20, and a set of 21, 22, . . . , and inserts dummy data at the front of each set. Consequently, as shown in FIG. 53, when video data corresponding to $N^{th}$ gate line is referred to as <N> and dummy data is referred to as <D>, data to be output (video data, dummy data) is lined as <D>, <1>, <2>, <3>, <4>, <5>, <6>, <7>, <8>, <9>, <10>, and <D>, <11>, <12>, <13>, <14>, <15>, <16>, <17>, <18>, <19>, <20>, and <D>, <21>, <22>, . . . . Signal potentials with plus polarity corresponding to individual data (video data, dummy data) <D>, <1>, <2>, . . . <10> are output to one source line in this order, and then signal potentials with minus polarity corresponding to individual data (video data, dummy data) <D>, <11>, <12>, . . . <20> are output to the source line in this order, and then signal potentials with plus polarity corresponding to individual data (video data, dummy data) <D>, <21>, <22>, . . . are output to the source line in this order.

Desired data may be freely set as dummy data <D>. For example, the dummy data <D> may be equal to video data at a point right after insertion of the dummy data <D>, or data corresponding to a higher voltage than that of video data right after insertion of the dummy data <D> may be separately set as the dummy data <D> in order to increase a charging effect of a source line.

The waveform of a signal potential is rounded right after inversion of the polarity of the signal potential. In the present configuration, a dummy scanning period is provided here to supply a predetermined signal potential (signal potential corresponding to dummy data), allowing charging of a source line in this period. Consequently, it is possible to write a desired signal potential (potential corresponding to video data) in a pixel during a horizontal scanning period following the dummy scanning period. This allows preventing display unevenness with respect to every 10 rows due to the rounding of the signal potential waveform right after inversion of the polarity.

In the present liquid crystal display device, in order that a vertical display period of 1 frame does not change when dummy data is inserted one by one into individual sets each including 10 video data and a dummy scanning period is assigned to each dummy data as described above (i.e. in order that a vertical blanking period VblankX set to an input data sequence is equal to a vertical blanking period VblankY in actual output), 1 horizontal scanning period HtotalY in actual output is set to be shorter than 1horizontal scanning period HtotalX set to an input data sequence.

FIG. 33 shows a relationship between input of a data sequence and output of signal potentials corresponding to individual data of the data sequence in a case where the liquid crystal display device is designed such that 10 video data (video data corresponding to 1 source line) are gathered into one set and 1 dummy data is inserted into the top of each set, signal potentials corresponding to individual data (video data, dummy data) are output in the order of alignment of the individual data in accordance with sequential scanning of scanning signal lines, 1 horizontal period is assigned to outputs of signal potentials corresponding to individual video data and a dummy scanning period is assigned to an output of a signal potential corresponding to dummy data, and the polarity of a signal potential is inverted with respect to each set (inversion cycle is 1 dummy scanning period+10 horizontal scanning periods). A data sequence to be input is set based on a full HD standard specification, i.e., dot clock=148.5 MHz, 1 frame period VtotalX=vertical display period VdispX (1080 lines)+vertical blanking period VblankX (45 lines), a horizontal scanning period HtotalX (input interval of data)= 2200 dots, a horizontal scanning period HtotalX=a horizontal scanning period HdispX (1920 dots)+a horizontal blanking period HblankX (280 dots).

As shown in FIG. 33, the present liquid crystal display device is designed such that 1 horizontal scanning period HtotalX set to an input data sequence is 2200 dots, whereas 1 horizontal scanning period HtotalY in an actual output is 2000 dots and a dummy scanning period DtotalY is 2000 dots. Consequently, whole horizontal scanning periods set to data sequences of individual sets each consisting of 10 lines (10 data corresponding to individual lines) are 2200 dots× 10=22000 dots, and a period obtained by adding a dummy scanning period to whole horizontal scanning periods in actual outputs of individual sets is 2000 dots×10+2000 dots× 1=22000 dots, and both periods are equal to each other.

To be specific, as shown in FIG. 34, a horizontal scanning period HtotalX set to an input data sequence, which is equal to the sum of a horizontal display period HdispX(1920 dots) set to an input data sequence and a horizontal blanking period HblankX(280 dots) set to an input data sequence, is 2200 dots, whereas a horizontal scanning period HtotalY in actual output is 2000 dot which is smaller than the HtotalX, and the horizontal scanning period HtotalY consists of a horizontal display period HdispY in actual output (1920 dots) and a horizontal blanking period HblankY in actual output (80 dots). Further, a dummy scanning period DtotalY is set to 2000 dots which is smaller than HtotalX, and DtotalY consists of a dummy display period DdispY 1920 dots and a dummy blanking period DblankY 80 dots.

Output of a signal potential to a source line continues during the horizontal scanning period (HtotalY) including the horizontal blanking period (HblankY), and data is written to a pixel during a period in which a transistor of a pixel is made ON in accordance with the horizontal scanning period (during a period in which a gate-on pulse is supplied to a corresponding gate line). Further, output of a signal potential to a source line continues during the dummy scanning period (DtotalY) including the dummy blanking period (DblankY). In FIG. 53, data is not written into a pixel during the dummy scanning period. Alternatively, data may be written into a pixel during the dummy scanning period.

In FIG. 53, a signal potential corresponding to one data (video data, dummy data) is latched in accordance with fall of a latch strobe signal, and a signal potential corresponding to next data (video data, dummy data) is latched in accordance with next fall of the latch strobe signal. This holds for the dummy scanning period. The width of the gate-on pulse Pw is set to, for example, less than 1 horizontal scanning period HtotalY.

This configuration allows the horizontal display period HdispX set to an input data sequence and the horizontal display period HdispY in actual output to be equal to each other. Consequently, it is possible to insert one dummy scanning period with respect to every 10 horizontal scanning periods while keeping a dot clock as it is, without increasing the vertical display period of a liquid crystal display device and without reducing the vertical blanking period of the liquid crystal display device (i.e. while keeping VdispX=VdispY, VblankX=VblankY).

Further, this configuration is advantageous in that since the dummy scanning period DtotalY is equal to the horizontal scanning period HtotalY (2000 dot), it is easy to perform signal processing or to design a configuration for signal processing.

A combination of the number of whole horizontal periods (number of video data) in one set, the number of whole dummy scanning periods (number of dummy data) in one set, 1 horizontal scanning period HtotalY, and the dummy scanning period DtotalY is set by the display control circuit 200 (liquid crystal panel driving device), and the display control circuit 200 generates the above various signals (POL, LS, SSP, SCK, GCK, GSP, and GOE) etc. The display control circuit 200 also carries out insertion of dummy data into input video data.

In the above configuration, dummy data is inserted into sequentially input video data. Alternatively, one dummy scanning period may be provided by reducing a latch pulse by one without inserting dummy data (while keeping input of a data sequence). However, this alternative configuration is problematic in that the same data is output both during the dummy scanning period and during 1 horizontal scanning period following the dummy scanning period.

FIG. 35 shows a relationship between an input data sequence and output of signal potentials corresponding to individual data of the data sequence in a case where 20 video data (video data corresponding to 1 source line) are gathered into one set and 1 dummy data is inserted into the top of each set, signal potentials corresponding to individual data (video data, dummy data) are output in the order of alignment of the individual data in accordance with sequential scanning of scanning signal lines, 1 horizontal period is assigned to outputs of signal potentials corresponding to individual video data and a dummy scanning period is assigned to an output of a signal potential corresponding to dummy data, and the polarity of a signal potential is inverted with respect to each set (inversion cycle is 1 dummy scanning period+20 horizontal scanning periods).

As shown in FIG. 35, the present liquid crystal display device is designed such that dummy data is inserted one by one into individual sets each including 20 video data, a dummy scanning period is assigned to individual dummy data, a vertical display period VdispX (1080 lines) set to an input data sequence is made equal to a vertical display period VdispY in actual output, and therefore a vertical blanking period VblankX (45 lines) set to the input data sequence is made equal to a vertical blanking period VblankY in actual output. In order to realize this, in relation to 1 horizontal scanning period HtotalX (2200 dots) set to an input data sequence, 1 horizontal scanning period HtotalY in actual output is set to 2096 dots and a dummy scanning period DtotalY is set to 2080 dots. Consequently, whole horizontal scanning periods set to each set with respect to every 20 input video data (every 20 gate lines) are 2200 dots×20=44000 dots, and a period obtained by adding a dummy scanning period to whole horizontal scanning periods in actual output in each set is 2096 dots×20+2080 dots×1=44000 dots, which are the same as the whole horizontal scanning periods set to each set.

To be specific, as shown in FIG. 36, a horizontal scanning period HtotalX set to an input data sequence, which is the sum of a horizontal display period HdispX(1920 dot) set to an input data sequence and a horizontal blanking period HblankX(280 dot) set to an input data sequence, is 2200 dots, whereas a horizontal scanning period HtotalY in actual output is 2096 dot which is smaller than the HtotalX, and the horizontal scanning period HtotalY consists of a horizontal display period HdispY in actual output (1920 dots) and a horizontal blanking period HblankY in actual output (176 dots). Further, a dummy scanning period DtotalY is set to 2080 dot which is smaller than HtotalX, and consists of a dummy display period DdispY (1920 dots) and a dummy blanking period DblankY (160 dots).

Output of a signal potential to a source line continues during the horizontal scanning period (HtotalY) including the horizontal blanking period (HblankY), and data is written to a pixel during a period in which a transistor of the pixel is made ON in accordance with the horizontal scanning period (during a period in which a gate-on pulse is supplied to a corresponding gate line). Further, output of a signal potential to a source line continues during the dummy scanning period (DtotalY) including the dummy blanking period (DblankY). In FIG. 13, data is not written into a pixel during the dummy scanning period. Alternatively, data may be written into a pixel during the dummy scanning period.

This configuration allows causing the horizontal display period HdispX set to an input data sequence to be equal to the horizontal display period HdispY in actual output. Consequently, it is possible to provide a dummy scanning period with respect to every 20 horizontal scanning periods while maintaining a dot clock as it is, without increasing a vertical display period of a liquid crystal display device, and without reducing a vertical blanking period of the liquid crystal display device (while maintaining VdispX=VdispY, VblankX=VblankY).

Further, the dummy scanning period DtotalY of 2080 dots and the horizontal scanning period HtotalY of 2096 dots ensure a longer horizontal scanning period, which is advantageous for charging a pixel.

In a case where dummy data is inserted one by one into each set including 20 video data and a dummy scanning period is assigned to each dummy data, as shown in FIG. 37, in relation to 1 horizontal scanning period HtotalX (2200 dots) set to an input data sequence, 1 horizontal scanning period HtotalY in actual output may be set to 2094 dots and a dummy scanning period DtotalY may be set to 2120 dots. Consequently, whole horizontal scanning periods set to each set with respect to every 20 input video data (20 gate lines) are 2200 dots×20=44000 dots, and a period obtained by adding a dummy scanning period to whole horizontal scanning periods in actual output in each set is 2094 dots×20+2120 dots×1=44000 dots, which is identical with the whole horizontal scanning periods set to each set. To be specific, as shown in FIG. 37, a horizontal scanning period HtotalX set to an input data sequence, which is the sum of a horizontal display period HdispX(1920 dot) set to an input data sequence and a horizontal blanking period HblankX(280 dot) set to an input data sequence, is 2200 dots, whereas a horizontal scanning period HtotalY in actual output is 2094 dot which is smaller than the HtotalX, and the horizontal scanning period HtotalY consists of a horizontal display period HdispY in actual output (1920 dots) and a horizontal blanking period HblankY in actual output (174 dots). Further, a dummy scanning period DtotalY is set to 2120 dots which is smaller than HtotalX, and consists of a dummy display period DdispY (1920 dots) and a dummy blanking period DblankY (200 dots).

This configuration allows causing the horizontal display period HdispX set to an input data sequence to be equal to the horizontal display period HdispY in actual output. Consequently, it is possible to provide a dummy scanning period with respect to every 20 horizontal scanning periods while maintaining a dot clock as it is, without increasing a vertical display period of a liquid crystal display device, and without reducing a vertical blanking period of the liquid crystal display device (while maintaining VdispX=VdispY, VblankX=VblankY).

Further, in the configuration, the dummy scanning period DtotalY of 2120 dots and the horizontal scanning period HtotalY of 2094 dots ensure a longer dummy scanning period, which is advantageous for charging a source line in a case where a signal voltage waveform is greatly rounded after inversion of the polarity.

In a case where input is designed such that HtotalX=2200 (HdispX1920+HblankX280), inserting dummy data one by one into each set including 20 video data and assigning a dummy scanning period to each dummy data require that HtotalY (=HdispY+HblankY) and DtotalY (=DdispY+DblankY) have values of any combination in FIG. 38.

It should be noted that the difference between a dummy scanning period and a horizontal scanning period is preferably small since the smaller difference allows simplifying adjustment of timing with other signal (e.g. facilitating setting of a potential waveform of a retention capacitor line when this configuration is applied to a later-mentioned pixel dividing method). Therefore, a combination in the hatched portion in FIG. 38, i.e. the combination of HtotalY being 2094 (HdispY1920+HblankY174) and DtotalY being 2120 (DdispY1920+DblankY200) (described above), or the combination of HtotalY being 2095(HdispY1920+HblankY175) and DtotalY being 2100(DdispY1920+DblankY180), or the combination of HtotalY being 2096(HdispY1920+HblankY176) and DtotalY being 2080(DdispY1920+DblankY160) (described above) is preferable.

The following explains a configuration in which a plurality of video data (video data corresponding to one source line) are gathered into a set in the order of input, one dummy data is inserted at least at the top of each set, and in accordance with interlace scan of scanning signal lines (interlace scan of skipping every second gate line), in the order of alignment of data (video data, dummy data), signal potentials corresponding to the data are output, and 1 horizontal period is assigned to outputs of signal potentials corresponding to individual video data and a dummy scanning period is assigned to outputs of signal potentials corresponding to individual dummy data, and the polarity of a signal potential is inverted with respect to each set. The configuration allows dot inverse driving (1h/1v inverse driving) in which the polarity of a signal potential is inverted at a border where blocks of pixels are adjacent to each other in a column direction (the polarity of a signal potential is inverted at a border where pixels are adjacent to each other in a row direction). In the configuration, the display control circuit 200 includes a data permutation circuit in which input data are permutated and dummy data is inserted (this will be explained later).

FIG. 54 shows waveforms of signal potentials corresponding to output data sequences and individual data (video data, dummy data) and a timing chart of a latch strobe signal LS and a gate-on pulse (pixel data writing pulse) Pw in a case where 10 video data (video data corresponding to one source line) are gathered into a set, one dummy data is inserted at the top of each set, and in accordance with interlace scan of scanning signal lines, in the order of alignment of data (video data, dummy data), signal potentials corresponding to the data are output, and 1 horizontal period is assigned to outputs of signal potentials corresponding to individual video data and a dummy scanning period is assigned to outputs of signal potentials corresponding to dummy data, and the polarity of a signal potential is inverted with respect to each set (inversion cycle is 1 dummy scanning period+10 horizontal scanning periods). In FIG. 54, the lateral direction indicates time lapse and the longitudinal direction indicates individual rows of gate lines (writing rows) GL1-GLm to which gate-on pulses are applied. The configuration of FIG. 54 differs from the configuration of FIG. 13 in that an LS signal pulse is generated also during a dummy scanning period. The configuration of FIG. 54 is advantageous in that the configuration allows freely setting data of the dummy scanning period. For simplicity, in the present example, data inputted during the dummy scanning period is the same as data inputted during a horizontal scanning period right after the dummy scanning period.

In this case, when video data corresponding to $N^{th}$ gate line is referred to as N, video data to be inputted is lined as 1, 2, 3, 4, 5, 6, 7, 8, 9, 10, 11, 12, 13, 14, 15, 16, 17, 18, 19, 20, 21, 22, 23, 24, . . . . A permutation circuit brings these video data together into a set of 2, 4, 6, 8, 10, 12, 14, 16, 18, 20, a set of 1, 3, 5, 7, 9, 11, 13, 15, 17, 19, and a set of 22, 24, . . . , and inserts dummy data at the top of each set. Consequently, when video data corresponding to $N^{th}$ gate line is referred to as <N> and dummy data is referred to as <D>, data to be output (video data, dummy data) is lined as <D>, <2>, <4>, <6>, <8>, <10>, <12>, <14>, <16>, <18>, <20>, and <D>, <1>, <3>, <5>, <7>, <9>, <11>, <13>, <15>, <17>, <19>, and <D>, <22>, <24>, . . . . Signal potentials with plus polarity corresponding to individual data <D>, <2>, <4>, . . . <20> are output to one source line in this order, and then signal potentials with minus polarity corresponding to individual data <D>, <1>, <3>, . . . <19> are output to one source line in this order, and then signal potentials with plus polarity corresponding to individual data <D>, <22>, <24>, . . . are output to one source line in this order.

Desired data may be freely set as dummy data <D>. For example, the dummy data <D> may be equal to video data at a point right after insertion of the dummy data <D>, or data corresponding to a higher voltage than that of video data right after insertion of the dummy data <D> may be separately set as the dummy data <D> in order to increase a charging effect of a source line.

The waveform of a signal potential is rounded right after inversion of the polarity of the signal potential. In the present configuration, a dummy scanning period is provided here to supply a predetermined signal potential (signal potential corresponding to dummy data), allowing charging a source line in this period. Consequently, it is possible to write a desired signal potential (potential corresponding to video data) in a pixel during a horizontal scanning period following the dummy scanning period. Further, by making the polarities of signal voltages applied to adjacent two source lines opposite to each other, the polarities of individual pixels appears to be inverted with respect to each dot, which is advantageous in terms of flickers.

In the present liquid crystal display device, in order that a vertical display period of 1 frame does not change when dummy data is inserted one by one into individual sets each including 10 video data and a dummy scanning period is assigned to each dummy data (i.e. in order that a vertical blanking period VblankX set to an input data sequence is equal to a vertical blanking period VblankY in actual output), 1 horizontal scanning period HtotalY in actual output is made shorter than 1 horizontal scanning period HtotalX set to an input data sequence.

To be specific, as shown in FIG. 39, a horizontal scanning period HtotalX set to an input data sequence, which is the sum of a horizontal display period HdispX(1920 dots) set to an input data sequence and a horizontal blanking period HblankX(280 dots) set to an input data sequence, is 2200 dots, whereas a horizontal scanning period HtotalY in actual output is 2000 dots which is smaller than the HtotalX, and the horizontal scanning period HtotalY consists of a horizontal display period HdispY in actual output (1920 dots) and a horizontal blanking period HblankY in actual output (80 dots). Further, a dummy scanning period DtotalY is set to 2000 dots which is smaller than HtotalX, and consists of a dummy display period DdispY (1920 dots) and a dummy blanking period DblankY (80 dot).

FIG. 40 shows a relation between input of a data sequence and signal potentials corresponding to individual data of the data sequence in a case where 20 video data (video data corresponding to one source line) are gathered into each set, dummy data are inserted at the top and the middle of each set, in accordance with interlace scan of scanning signal lines, in the order of alignment of data (video data, dummy data), signal potentials corresponding to the data are output, and 1 horizontal period is assigned to output of a signal potential corresponding to individual video data and a dummy scanning period is assigned to outputs of signal potentials corresponding to dummy data, and the polarity of a signal potential is inverted with respect to each set (inversion cycle is 2 dummy scanning periods+20 horizontal scanning periods). A dummy scanning period other than a dummy scanning period right after polarity inversion is set for the purpose of timing adjustment etc. of signal processings.

In this case, too, as shown in FIG. 40, setting a horizontal scanning period HtotalY to be 2000 dots smaller than HtotalX and setting a dummy scanning period DtotalY to be smaller than 2000 dots smaller than HtotalX allow providing a dummy scanning period without changing a vertical display period in one frame.

FIG. 55 shows waveforms of signal potentials corresponding to output data sequences and individual data (video data, dummy data) and a timing chart of a latch strobe signal LS, a gate-on pulse (pixel data writing pulse) Pw, and a CS signal in a case where 10 video data (video data corresponding to one source line) are gathered into a first set and one dummy data is inserted at the top of the first set and 20 video data are gathered into a second set and thereafter and one dummy data is inserted at the top of each of the second set and thereafter, and in accordance with interlace scan of scanning signal lines, in the order of alignment of data (video data, dummy data), signal potentials corresponding to the data are output, and 1 horizontal period is assigned to outputs of signal potentials corresponding to individual video data and a dummy scanning period is assigned to outputs of signal potentials corresponding to individual dummy data. In FIG. 55, CS_A·CS_B, CS_B·CS_C, CS_C·CS_D . . . correspond to the retention capacitor lines Csi·Csj. The configuration of FIG. 55 differs from the configuration of FIG. 28 in that a LS signal pulse is generated also during a dummy scanning period. The configuration of FIG. 55 is advantageous in that the configuration allows freely setting data of the dummy scanning period. For simplicity, in the present example, data inputted during the dummy scanning period is the same as data inputted during a horizontal scanning period right after the dummy scanning period.

In this case, when video data corresponding to $N^{th}$ gate line is referred to as N, video data to be inputted (not shown) is lined as 1, 2, 3, 4, 5, 6, 7, 8, 9, 10, 11, 12, 13, 14, 15, 16, . . . 43, 44, 45, 46, 47, 48, 49. A permutation circuit brings these video data together into a set of 1, 3, 5, 7, 9, 11, 13, 15, 17, 19, a set of 2, 4, 6, 8, 10, 11, 12, . . . , 36, 38, 40, a set of 21, 23, 25, . . . 45, 47, 49, and a set of 42, 44, 46, 48, . . . and inserts dummy data at the top of each set. Consequently, when video data corresponding to $N^{th}$ gate line is referred to as <N> and dummy data is referred to as <D>, data to be output (video data, dummy data) is lined as <D>, <1>, <3>, <5>, <7>, <9>, <11>, <13>, <15>, <17>, <19>, and <D>, <2>, <4>, <6>, <8>, <10>, <12>, . . . <36>, <38>, <40> and <D>, <21>, <23>, <25>, <27>, . . . <45>, <47>, <49>, and <D>, <42>, <44>, . . . . Signal potentials with plus polarity corresponding to individual data <D>, <1>, <3>, <5>, . . . <17> and <19> are output to one source line in this order, and then signal potentials with minus polarity corresponding to individual data <D>, <2>, <4>, <6>, . . . <36>, <38>, <40> are output to one source line in this order, and then signal potentials with plus polarity corresponding to individual data <D>, <21>, <23>, <25>, . . . <47>, <49> are output to one source line in this order, and then signal potentials with minus polarity corresponding to individual data <D>, <42>, <44>, . . . are output to one source line in this order.

Desired data may be freely set as dummy data <D>. For example, the dummy data <D> may be equal to video data at a point right after insertion of the dummy data <D>, or data corresponding to a higher voltage than that of video data right after insertion of the dummy data <D> may be separately set as the dummy data <D> in order to increase a charging effect of a source line.

In this case, in the first set, a horizontal scanning period HtotalY in actual output is set to 2000 dots smaller than HtotalX, a dummy scanning period DtotalY is set to 2000 dots smaller than HtotalX, and in the second set and thereafter, a horizontal scanning period HtotalY in actual output is set to be 2094 dots smaller than HtotalX and a dummy scanning period DtotalY is set to 2120 dots smaller than HtotalX. This allows providing a dummy scanning period without changing a vertical display period in 1 frame.

The following explains how to permute data with reference to FIGS. 56-58. In the following explanation, a vertical scanning period Vtotal is 1125H, a vertical display period Vdisp is 1080H, and a vertical blanking period is 45H.

FIG. 56 is a block diagram schematically showing a permutation circuit. FIG. 57 is a drawing schematically explaining how to permute data. FIG. 58 is an enlarged drawing of a portion surrounded by a dotted line in FIG. 56. As shown in FIG. 56, a permutation circuit 550 includes a permutation control circuit 552, an odd line permutation memory 554A, and an even line permutation memory 554B. The permutation circuit 550 is provided in the display control circuit 200.

The permutation control circuit 552 receives video data to be displayed, a vertical sync signal and a horizontal sync signal that are synchronized with video data, and a control signal for controlling display operation. The permutation control circuit 552 separates the video data thus received into video data for odd lines and video data for even lines and writes individual video data into the odd line permutation memory 554A and the even line permutation memory 554B. After carrying out this operation for a certain time, the permutation control circuit 552 sequentially reads out data from the odd line permutation memory 554A, and then reads out data from the even line permutation memory 554B.

In this process, the permutation control circuit 552 counts the number of video data in accordance with the number of lines in each set, reads out video data from the odd line permutation memory 554A and the even line permutation memory 554B, and inserts dummy data <D> at a predetermined position (e.g. at the top of each set). It should be noted that 1 horizontal scanning period during which video data is output and a dummy scanning period during which dummy data is output are set to be shorter than 1 horizontal scanning period set to input video data (input interval for each video data). Writing and reading of video data are carried out according to a predetermined order by using a look-up table that is prepared beforehand. This allows downsizing the permutation memories 554A and 554B without using a frame memory for storing video data corresponding to one image, and allows preventing temporal disparity between inputs and outputs of video data.

For example, as shown in FIG. 58, when a video data sequence (a) is inputted to the permutation control circuit 552, the permutation control circuit 552 sequentially separates individual data of the video data sequence (a) into data for the odd line permutation memory and data for the even line permutation memory and writes the data therein. In this case, after taking video data corresponding to at least 11 lines into the permutation memory and while taking sequentially inputted video data into the permutation memory, the permutation control circuit 552 starts reading out video data from the odd line permutation memory. For simplicity, dummy data <D> is identical with video data right after insertion of the dummy data <D>.

Specifically, the permutation control circuit 552 reads out first video data (video data corresponding to $1^{st}$ gate line) as dummy data <D> from the odd line permutation memory, and then sequentially reads out video data corresponding to 10 gate lines (corresponding to $1^{st}$, $3^{rd}$, $5^{th}$, . . . , and $19^{th}$ lines) and regards the video data as a first set. Next, the permutation control circuit 552 reads out second video data (video data corresponding to $2^{nd}$ gate line) as dummy data <D>, and then sequentially reads out video data corresponding to 10 gate lines (corresponding to $2^{th}$, $4^{th}$, $6^{th}$, . . . , $20^{th}$ lines), and then sequentially reads out video data corresponding to 10 lines (corresponding to $22^{nd}$, $24^{th}$, $26^{th}$, . . . , $40^{th}$ lines) from the even line permutation memory, and regards the video data corresponding to 20 gate lines as a second set. Subsequently, from the odd line permutation memory again, the permutation control circuit 552 reads out $21^{st}$ video data (video data corresponding to $21^{st}$ gate line) as dummy data <D>, and then sequentially reads out video data corresponding to 10 gate lines (corresponding to $21^{st}$, $23^{rd}$, $25^{th}$, ..., $39^{th}$ lines) and regards the video data corresponding to 10 gate lines as a third set. The permutation control circuit 552 controls permutation so as to repeat these steps, and thus sequentially reads out all video data until reading out video data corresponding to the last line from the permutation memory.

In the present example, dummy data <d> at the top (which is identical with data corresponding to $1^{st}$ line) is included in an effective display period VdispY. Alternatively, the dummy data <d> at the top may be positioned at the last of a vertical blanking period VblankY in a previous frame.

The following explains how to calculate the number a of dummy scanning periods to be provided for each set including M data and how to calculate a combination of the horizontal scanning period HtotalY and the dummy scanning period DtotalY in actual output in the above embodiments. The calculation may be carried out by the display control circuit 200 (liquid crystal panel driving device) as described above. In this case, the calculation may be carried out by a computer executing a predetermined program.

FIG. 41 is a flowchart showing an example of calculating the combination. As shown in FIG. 41, initially, a polarity inversion cycle M (the number of video data in one set) is acquired. Then, the process goes to S1 where temporary number a of dummy horizontal scanning periods (the number of dummy data in one set) is set to 1. Then, the sum of M and a is regarded as A (S2). Then, the product of HtotalX and M is divided by A, and the result is regarded as B (S3). After acquiring the polarity inversion cycle M, along with S1, the minimum number C of necessary dummy horizontal scanning periods may be set according to charging properties in the polarity inversion cycle M. It is determined whether B is not less than HdispX or not (S4). If YES, the process goes to S7. If No (B is less than HdispX), the process is finished. In S7, it is determined whether B is an integer or not. If YES, the process goes to S8. If No, the process goes to S5, and a is incremented by 1, and the process goes to S2. In S8, it is determined whether a is not less than the minimum number C of necessary dummy horizontal scanning periods which is obtained from the charging properties in M. If Yes, the process goes to S9. If No, the process goes to S5. In S9, it is determined that the number of dummy scanning periods=a and HtotalY=DtotalY=B, and the process is finished.

With the calculation, if M=10, the number of dummy scanning periods=1 and HtotalY=DtotalY=2000 dots, if M=30, the number of dummy scanning periods=3 and HtotalY=DtotalY=2000 dots, and if M=40, the number of dummy scanning periods=4 and HtotalY=DtotalY=2000 dots. Thus, it is possible to calculate a combination of HtotalY and DtotalY where HtotalY=DtotalY.

However, the calculation cannot be carried out if M=20. Therefore, the following calculation may be carried out as shown in FIG. 42. As shown in the drawing, initially, a polarity inversion cycle M (the number of video data in one set) is acquired. Then, the process goes to S10 where temporary number a of dummy horizontal scanning periods (the number of dummy data in one set) is set to 1. Then, the sum of M and a is regarded as A' (S11). Then, the product of HtotalX and M is divided by A', and the result is regarded as B' (S 12). After acquiring the polarity inversion cycle M, along with S1, the minimum number C of necessary dummy horizontal scanning periods may be set according to charging properties in the polarity inversion cycle M. It is determined whether B' is not less than HdispX or not (S14). If YES, the process goes to S15. If No (B' is less than HdispX), the process goes to S21. In S15, B' is rounded by dropping decimals, and the resulting integer is regarded as D. The product of D and A' is regarded as E (S16), E is subtracted from the product of HtotalX and M and the result is regarded as P, P is divided with a, and the result is regarded as F (S17). It is determined whether F is an integer or not (S18). If F is an integer, the process goes to S19, and if F is not an integer, the process goes to S13 and a is incremented by 1 and the process goes to S11. In S19, it is determined whether a is not less than the minimum number of necessary dummy scanning periods C that is obtained from the charging properties in M. If Yes, the process goes to S20. If No, the process goes to S13. In S20, a combination of the number of dummy scanning periods=a, HtotalY=D, and DtotalY=D+F is stored, and the process goes back to S13. In S21, it is determined whether a stored combination exists or not, and if YES, the process goes to S22, and if NO, the process goes to S23 and carries out recalculation (mentioned later). In S22, one of stored combinations is selected and the process is finished.

In the recalculation in S23, α and β that meets the relation of HtotalX(2200)×M=M×α+C×β are calculated using C (the minimum number C of necessary dummy scanning periods that is obtained from the charging properties in M). Thus, the number of dummy scanning periods=C, HtotalY=α, and DtotalY=β.

FIG. 43 shows the result of calculation by the flowchart of FIG. 42. As shown in FIG. 43, if M=30, there is calculated a combination of the number of dummy scanning periods=1, HtotalY=2129, and DtotalY=2130, a combination of the number of dummy scanning periods=2, HtotalY=2062, and DtotalY=2070, and a combination of the number of dummy scanning periods=3, HtotalY=2000, and DtotalY=2000. If M=40, there is calculated a combination of the number of dummy scanning periods=1, HtotalY=2146, and DtotalY=2160, a combination of the number of dummy scanning periods=2, HtotalY=2095, and DtotalY=2100, a combination of the number of dummy scanning periods=4, HtotalY=2000, and DtotalY=2000, and a combination of the number of dummy scanning periods=5, HtotalY=1955, and DtotalY=1960. One of these combinations is selected.

The calculation in FIG. 42 cannot be carried out if, for example, M=40 and the number a of dummy scanning periods=3. Therefore, in such a case (where the number of dummy scanning periods is predetermined), the above recalculation may be carried out. FIG. 44 shows the result of recalculation in a case where M=40 and the number of dummy scanning periods=3. As shown in FIG. 44, seven combinations are obtained in this case, and one of the seven combinations is selected (e.g. a combination of M=40, the number of dummy scanning periods=3, HtotalY=2044, and DtotalY=2080).

(Example of Overshoot-Driving a CS Signal).

The above explained a case of carrying out multi-pixel driving (MPD) in which a CS main line is shared by adjacent gate lines in block-divided interlace scan in which the polarity is inverted between even rows and odd rows. In this case, providing a dummy scanning period for preventing the influence of rounding of a waveform at the time of inversion of the polarity of a data signal as described above would require lengthening a wavelength of a CS signal by a period corresponding to the provided dummy scanning period when inverting the polarity of a data signal.

In this case, a period from rise or fall of a CS signal to a time of a gate-on pulse being off differs. In the example shown in FIG. 59, a dummy scanning period corresponding to 2H is inserted. In this example, when $30^{th}$ row and $32^{nd}$ row are compared with each other in terms of the period from rise or fall of a CS signal to a time of a gate-on pulse being off (gate-off timing), the result shows that the period is 5H in the point (3) of CS_K, the period is 4H in the point (4) of CS_B, the period is 7H in the point (5) of CS_A, and the period is 6H in the point (6) of CS_D. A reaching ratio of a voltage of a CS signal differs a little at individual points, making the degree of change in luminance of bright sub-pixels and dark sub-pixels differ.

A point with a great gap from target luminance change is the point (4). That is, in the change of a voltage of a dark sub-pixel of the pixel P30 in FIG. 59, a voltage difference indicated by $\Delta Vp\_30'$ is smaller than other voltage difference. This tendency is more evident when a horizontal period is short, increasing the number of points where a difference in the reaching ratio of a voltage of a CS signal appears as a difference in luminance. Consequently, as shown in FIG. 60, display unevenness periodically appears on a display screen.

In order to solve the above problem, an overshoot pulse Poc with a predetermined width is generated with timing of rise or fall of a CS signal as shown in FIG. 61. A CS control circuit 90 controls not only a CS signal with H level and a CS signal with L level but also a CS signal with overshoot H potential higher than H level and a CS signal with overshoot L potential lower than L level, i.e. CS signals with four values in total. To be specific, the CS control circuit 90 provides, in a polarity continuation period of a CS signal, a period during which a first voltage is applied and a period during which a second voltage which has the same polarity as the first voltage and which has a larger absolute value than the first voltage is applied.

Such CS signal allows improving rounding of a waveform at rise or fall of a pulse. In other words, even when a time from inversion of the polarity of a CS signal to gate-off timing is short, it is possible to increase a reaching ratio of a CS voltage at gate-off timing. This allows reducing a difference in a reaching ratio of a CS signal voltage which is caused by a difference in the period from rise or fall of a CS signal to gate-off timing. Further, even when the period from rise or fall of a CS signal to gate-off timing is short in one row and long in the other row, it is possible to prevent display unevenness due to a difference in a reaching ratio of a CS signal voltage. That is, it is possible to improve periodic display unevenness shown in FIG. 60.

In the present example, the width of Poc is 1H. Alternatively, the width may be 2H. It should be noted that in order to stabilize a potential of a CS signal when a gate-on pulse gets off, it is desirable to make the width of Poc equal to or smaller than the period from rise or fall of a CS signal to gate-off timing.

On the other hand, FIG. 62 shows a set waveform (full line) and an actual waveform (dotted line) of a CS signal in a case where a horizontal period H is short, e.g. a case of a high definition panel or a high frame rate. In FIG. 62, a numerical value shown at the side of a gate-on pulse is a time, indicated by horizontal period H, from inversion of the polarity of a CS signal to gate-off timing. For convenience of explanation, information regarding rows etc. is omitted here.

The magnitude of a voltage of a pulse Poc cannot be set to be larger than a breakdown voltage of the CS control circuit 90. Accordingly, when the horizontal period H is short, there is a case where a reaching ratio of a CS signal voltage remains insufficient even if a pulse Poc with the highest voltage is applied. In this case, the reaching ratio of a CS signal voltage differs depending on gate-off timing, and consequently the periodic display unevenness remains.

If the liquid crystal display device is configured such that a reaching ratio of a CS signal voltage in cases where a time from inversion of the polarity of a CS signal to gate-off timing is 4H or 5H is closer to a reaching ratio of a CS signal voltage in cases where the time is 6H or 7H, then it is possible to further reduce the display unevenness. FIG. 63 shows an example of driving a CS signal used for realizing this configuration. In the example in FIG. 63, a pulse width and application timing of an overshoot pulse is changed depending on the length of a polarity inversion cycle of a CS signal. Specifically, in a period where a polarity inversion cycle is 5H, an overshoot pulse Poc with a predetermined pulse width is applied with timing of rise or fall of a CS signal, whereas in a period where a polarity inversion cycle is 7H, an overshoot pulse Poc' with a shorter pulse width than that of the overshoot pulse Poc is applied with timing after a predetermined time has passed from the timing of rise or fall of a CS signal.

A reaching ratio of a CS signal voltage is higher in the period where a polarity inversion cycle is 7H than in the period where a polarity inversion cycle is 5H. Therefore, by setting the pulse width of the overshoot pulse Poc' to be narrower than the pulse width of the overshoot pulse Poc, it is possible to make the reaching ratios of the CS signals in the two periods closer to each other. Further, also by changing application timing of the overshoot pulse Poc', it is possible to make the reaching ratios of the CS signals in the two periods closer to each other. This allows further reducing the display unevenness.

In the example shown in FIG. 64, a voltage for the overshoot pulse Poc is different from a voltage for the overshoot pulse Poc'. By making the voltage for the overshoot pulse Poc' smaller than the voltage for the overshoot pulse Poc, it is possible to make a reaching ratio of a CS signal voltage in the period where a polarity inversion cycle is 7H and a reaching ratio of a CS signal voltage in the period where a polarity inversion cycle is 5H closer to each other.

By changing at least one of a pulse width, application timing, and a voltage of an overshoot pulse according to the length of a polarity inversion cycle of a CS signal, it is possible to obtain the above effect.

(Example of Configuration for Reducing Display Unevenness Seen During Dummy Insertion Period)

FIG. 65 shows states of connections between CS main lines and CS lines and a timing chart of a CS signal and a gate-on pulse in driving by block-divided interlace scan where the number α of scanning lines in one block is 24 and where each of a first dummy insertion period and a second dummy insertion period is 2H. The drawing shows $1^{st}$ to $24^{th}$ gate lines. In reality, 24 gate lines constitute one block, and this block is repeated in a column direction. Thus, block-divided interlace scan is realized.

In this case, to a polarity continuation period of a CS signal that exists at timing to insert a dummy insertion period is added a period to insert the dummy insertion period, i.e. 2H. That is, the polarity continuation period of a CS signal that exists at timing to insert a dummy insertion period is set to 8H and a polarity insertion period of other CS signal is set to 6H. Further, since the number a of scanning lines in one block is 24 that is an even number, providing 12 phases for a CS signal allows the CS signal to correspond to all CS lines.

In this type of block inversion driving, a blank is inserted at a part where the polarity is inverted and its vicinities. Consequently, a time from a moment when a gate-on pulse gets off to a moment of inversion of the polarity of a CS signal in $12^{th}$ and $24^{th}$ lines is greatly different from such time of other lines. For example, if a time t1 from a moment when a gate-on pulse of an upper sub-pixel of $12^{th}$ line gets off to a moment of inversion of the polarity of a CS signal is compared with a time t2 from a moment when a gate-on pulse of a lower sub-pixel of $12^{th}$ line gets off to a moment of inversion of the polarity of a CS signal, the comparison shows that t2 is longer by 3H than t1. Consequently, an average of a voltage variation per 1 frame of a pixel electrode due to a pushed-up/pulled-down voltage of a CS signal differs between a sub-pixel at a certain line and a sub-pixel at other lines. This may result in striped display unevenness.

FIG. 66 explains an example for solving the above problem. As with FIG. 65, FIG. 66 shows states of connections between CS main lines and CS lines and a timing chart of a CS signal and a gate-on pulse in driving by block-divided interlace scan where the number a of scanning lines in one block is 24 and where each of a first dummy insertion period and a second dummy insertion period is 2H.

FIG. 66 differs from FIG. 65 in that phases of two new CS signals are introduced. Specifically, two CS main lines are added and CS_N and CS_O are added as new phases of CS signals. As shown by thick lines in FIG. 66, a CS line corresponding to a lower sub-pixel at $12^{th}$ gate line is connected with CS_N and a lower sub-pixel at $24^{th}$ gate line is connected with CS_O. Observation of the thick waveform at the $12^{th}$ line shows that a time t2' from a moment when a gate-on pulse of a lower sub-pixel at $12^{th}$ line gets off to a moment when the polarity of a CS signal is inverted is shorter by 2H than t2' in FIG. 65. This eliminates a difference from other lines, thereby reducing striped display unevenness.

The waveform of CS_N and the waveform of CS_O have opposite phases. Also in the case of the $24^{th}$ line, a time from a moment when a gate-on pulse of a lower sub-pixel gets off to a moment when the polarity of a CS signal is inverted are equal to times of other lines, thereby reducing stripped display unevenness.

The above configuration is generalized as follows: In a driving method in which the number of scanning signal lines included in one block is α (α is a natural number) and a dummy insertion period is inserted at two or more points in scanning of one block, the retention capacitor lines should be driven in response to the retention capacitor signals with at least α/k (k is natural number: α and k are selected so that α/k is integer)+2 phases. In the example in FIG. 66, α=24 and k=2, and CS lines are driven in response to CS signals with 24/2+2=14 phases.

(Example of Configuration for Reducing Kinds of Phases of CS Signals)

FIG. 67 shows states of connections between CS main lines and CS lines and a timing chart of a CS signal and a gate-on pulse in driving by block-divided interlace scan where the number α of scanning lines in one block is 48 and where each of a first dummy insertion period and a second dummy insertion period is 2H. The drawing relates to $1^{st}$ to $24^{th}$ gate lines. In reality, 48 gate lines constitute one block, and this block is repeated in a column direction. Thus, block-divided interlace scan is realized.

In the example shown in the drawing, CS main lines A-H and J-M, i.e. 12 CS main lines in total, are used. A polarity continuation period of individual CS signals is 6H or 8H, and the polarity of a CS signal is inverted 4 times between application timings of gate-on pulses of an even line and an odd line adjacent to each other. This is because a polarity inversion cycle of a CS signal is shorter than an adjacent line writing time difference period.

In a case of a high driving frequency, when the polarity continuation period of a CS signal is short as described above, rounding of a waveform of a CS signal lowers a reaching ratio of a voltage of a CS signal to a target voltage at the time of gate off, which causes display unevenness. In order to improve the display unevenness, the polarity inversion cycle of a CS signal may be lengthened so as to reduce the influence of rounding of a CS signal. However, in order to lengthen the polarity inversion cycle of a CS signal, it is necessary to increase the number of kinds of phases of a CS signal, which requires increasing the number of CS main lines. This may increase the number of lines or complicate configuration of lines, which may require increasing the area of a substrate or may increase the possibility of short-circuit.

FIG. 68 shows a driving example for extending the polarity continuation period of a CS signal without increasing the number of CS main lines. FIG. 68 shows connection states of CS main lines and CS lines and a timing chart of a CS signal and a gate-on pulse in a case where there are 12 phases of waveforms of CS signals. Gate-on positions (1)-(14) in FIG. 68 indicate timing for inverting the polarity of a CS signal and timing of a gate-on pulse. The drawing relates to $1^{st}$ to $48^{th}$ gate lines. In reality, 48 gate lines constitute one block, and this block is repeated in a column direction. Thus, block-divided interlace scan is realized.

In this example, two CS lines with one CS line therebetween are connected with one CS main line. Specifically, CS lines 0, 2, 25, 27, 48, 50, 73, and 75 are connected with A of the CS main lines, and CS lines 1, 3, 24, 26, 49, 51, 72, and 74 are connected with B of the CS main lines. C, D, and thereafter of the CS main lines are connected with CS lines that are positioned by 4 lines away from the CS lines connected with A and B of the CS main lines. Further, the relation in connection between the CS main lines and the CS lines are repeated with respect to every 48 CS lines.

Further, in this driving example, a block including 48 scanning lines are subjected to interlace scan such that even rows are scanned and then odd rows are scanned (or vice versa), and a dummy scanning period of 2H is inserted when inverting the polarity of a data signal. Further, in order to correctly show brightness and darkness of a multi-pixel, a dummy scanning period of 2H is also inserted at a portion where the polarity is not inverted. A CS signal includes a signal whose polarity continuation period is 14H both in a L level period and a H level period, and a signal whose polarity continuation period is 12H both in a L level period and a H level period.

With the example shown in FIG. 68, it is possible to lengthen the polarity continuation period of a CS signal without increasing the number of phases of waveforms of the CS signal. This allows increasing a reaching ratio of a CS voltage at the time of gate-off without providing additional lines and circuits, thereby reducing display unevenness due to rounding of an actual waveform of the CS voltage.

Driving shown in FIG. 87 may be performed. The driving in FIG. 87 differs from the driving in FIG. 68 in that a polarity continuation period including a portion where a dummy insertion period is inserted is 14H and other polarity continuation period is 12H.

Polarity inversion timing of a CS signal and gate-on pulse timing in FIG. 68 and FIG. 87 are shown as a waveform 1 and a waveform 2, respectively, in FIG. 88. As shown in the drawing, five conditions should be satisfied: (a) a voltage level of a CS signal changes after gate-on positions (1), (2), and (3); (b) a voltage level of a CS signal changes after gate-on positions (13), (4), (5) and (6); (c) a voltage level of a CS signal changes after gate-on positions (14), (7), (8) and (9); (d) a voltage level of a CS signal changes after gate-on positions (10), (11), and (12); (e) a period during which a polarity continuation period is 14H and a period during which a polarity continuation period is 12H are the same as each other both in a L level and a H level.

(Example of Configuration for Removing Deviation in Polarity)

On the other hand, in a case of inserting a dummy horizontal period in block-divided interlace scan, it is necessary to lengthen a polarity continuation period of a CS signal in accordance with the length of a dummy horizontal period to be inserted. For example, in a case where a dummy horizontal period to be inserted is 2H, a polarity continuation period of 14H and a polarity continuation period of 12H coexists in the example in FIG. 68. In this case, the CS signal yields an effect of steep rise of a voltage on individual pixels, which effect varies in accordance with a relation between polarity inversion timing of a CS signal and gate-off timing, resulting in different effective values of a voltage to be applied on a liquid crystal. In the above example, the relation between polarity inversion timing of a CS signal and gate-off timing differs between adjacent blocks, causing unevenness in brightness with respect to each block. The following explains the cause of this unevenness in brightness.

(a) of FIG. 70 and (b) of FIG. 70 show driving examples with different relations between polarity inversion timing of a CS signal and gate-off timing. In both examples, a CS signal has polarity inversion timing such that a polarity continuation period of 14H is carried out successively two times and a polarity continuation period of 12H is carried out continuously two times and the same process is repeated. In (a) of FIG. 70, a gate-on pulse is applied during first 14H ((A) in the drawing)) of two-times successively carried out polarity continuation periods of 14H, whereas in (b) of FIG. 70, a gate-on pulse is applied during second 14H ((B) in the drawing)) of two-times successively carried out polarity continuation periods of 14H. It should be noted that (a) of FIG. 70 shows a driving example with timing of gate-on position (2) of FIG. 68, and (b) of FIG. 70 shows a driving example with timing of gate-on position (5) of FIG. 68.

Here, attention is paid to the length of a period in which a CS signal is kept "H" (H level) in one frame period. A period in which a CS signal in (a) of FIG. 70 gets "H" (H level) (steep rise period) and a period in which a CS signal in (b) of FIG. 70 gets "H" (H level) are different in some portions in one frame period, and these portions are hatched in (a) and (b) of FIG. 70. Comparison of (a) of FIG. 70 and (b) of FIG. 70 in terms of these portions shows that the hatched period in which a CS signal is kept "H" (H level) is 14H (14 horizontal periods)+9H (19 horizontal periods)=23H (23 horizontal periods) in case of (a) of FIG. 70 and 12H (12 horizontal periods)+9H (9 horizontal periods)=21H (21 horizontal periods) in case of (b) of FIG. 70, indicating that the period in which a CS signal is kept "H" (H level) is longer in (a) by 2H (2 horizontal periods) than in (b). That is, an effective value of a voltage to be applied on liquid crystals is higher in (a) than in (b). Consequently, pixel display corresponding to $1^{st}$-$24^{th}$ gate lines with timing of (a) gets brighter than pixel display corresponding to $25^{th}$-$48^{th}$ gate lines with timing of (b), making difference in luminance between adjacent blocks.

(c) of FIG. 70 and (d) of FIG. 70 show examples of waveforms of CS signals designed for solving this problem. As shown in (c) of FIG. 70 and (d) of FIG. 70, a polarity continuation period of 14H of a CS signal is divided into a portion of 12H and a portion of 2H, and the portion of 2H is set so that a period in which a CS signal is kept "H" (H level) and a period in which a CS signal is kept "L"(L level) are equal to each other. This allows making the "H" period of a CS signal and the "L" period of a CS signal equal to each other regardless of timing for applying a gate-on pulse, which solves the problem of deviation in time when a voltage is pushed up. In the examples shown in (c) of FIG. 70 and (d) of FIG. 70, the portion of 2H is divided into the "H" (H level) period of 1H and the "L" (L level) period of 1H. Alternatively, the portion of 2H may be divided into shorter periods so that the "H" (H level) period and the "L" (L level) are equal to each other.

In the examples shown in the drawings, the time indicated by hatching when a voltage is pushed up is 1H+12H+9H=22H in (c) and 12H+1H+9H=22H in (d), making the time when a voltage is pushed up equal both in (c) and (d). Consequently, an effective value of a voltage to be applied on liquid crystals is equal between a case of applying a gate-on pulse at (A) of (c) and a case of applying a gate-on pulse at (B) of (d).

FIG. 69 shows connection states of CS main lines and CS lines and a timing chart of a CS signal and a gate-on pulse in cases where CS signals indicated by the (c) and the (d) are applied. A period for scanning one block, including a dummy scanning period, i.e. 48H+2H+2H=52H, is designed such that a period in which a retention capacitor signal is in H level (1H+12H+1H+12H=26H) and a period in which a retention capacitor signal is in L level (1H+12H+1H+12H=26H) are equal to each other.

Gate-on positions (1)-(14) in FIG. 69 indicate all of polarity inversion timings of CS signals and all of timings of gate-on pulses. (c) of FIG. 70 is a driving example with timing indicated by gate-on position (2) of FIG. 69, and (d) of FIG. 70 is a driving example with timing indicated by gate-on position (5) of FIG. 69. With such driving, difference in luminance between $1^{st}$-$24^{th}$ gate lines with timing of (c) and $25^{th}$-$48^{th}$ gate lines with timing of (d) is removed.

Even if a period in which a CS signal is in H level and a period in which a CS signal is in L level are not completely equal to each other during a period for scanning one block, the difference in luminance can be substantially removed provided that a difference between the period in which a CS signal is in H level and the period in which a CS signal is in L level is 1H or less. Further, it is desirable that a difference among retention capacitor lines in an absolute value of a difference between H level period and L level period of a retention capacitor signal in one frame is equal to or less than 1 horizontal period.

In the above example, the driving example in FIG. 69 is arranged based on the driving example in FIG. 68. Alternatively, a driving example arranged based on the driving example in FIG. 87 will also result in the driving example in FIG. 69.

Further, as shown in FIG. 89 table showing the result of evaluation, the result of analysis with different number of scanning lines shows that, when a ratio of a difference among retention capacitor lines in an absolute value of a difference between H level period and L level period of a retention capacitor signal in one frame to one frame period is equal to or less than 0.13%, it is possible to prevent difference in luminance. When the ratio is equal to or less than 0.09%, it is possible to further increase display quality. In the column reading "unevenness (visual evaluation)", a double circle mark indicates excellent display quality with no difference in luminance, a single circle mark indicates excellent display quality with slight difference in luminance, and a triangle mark indicates display quality with somewhat noticeably difference in luminance, and a cross mark indicates display quality with considerably noticeable difference in luminance.

(Configuration and Operation of Gate Driver)

The following details a configuration of the gate driver 400 used in the above Embodiments. FIG. 46 is a block diagram showing an example of a configuration of the gate driver 400. As shown in the drawing, the gate driver 400 includes a plurality of gate driver ICs 411-41q. FIG. 45 shows an example of a configuration of a gate driver IC41n.

The gate driver IC41n includes a first shift register 42, a second shift register 43, a first AND gate 441, a second AND gate 442, and an output section 45. The first shift register 42 is a shift register for odd stages and the second shift register 43 is a shift register for even stages. The first AND gate 441 is provided so as to correspond to an output from the first shift register 42 and the second AND gate 442 is provided so as to correspond to an output from the second shift register 43. The output section 45 outputs scanning signals G1-Gp based on output signals g1-gp from the first AND gate 441 and the second AND gate 442.

The gate driver IC 41n receives start pulse signals SPia and SPib and clock signals CKa and CKb that are input to individual shift registers from the outside, and output control signals OEa and OEb. The start pulse signals SPia and Spib are input to input terminals of the first shift register 42 and the second shift register 43, respectively, and start pulse signals SPoa and SPob to be input to a subsequent gate driver IC are output from output terminals of the first shift register 42 and the second shift register 43.

The first AND gate 441 receives an even stage output signal Qk (k is an odd number) and a logic inversion signal of an output control signal OEa. On the other hand, the second AND gate 442 receives an odd stage output signal Qk (k is an even number) and a logic inversion signal of an output control signal OEb.

The gate driver 400 of the present configuration example is realized by cascade-connecting the plurality of (q) gate driver ICs 411-41q each having the above configuration. That is, in order that the first and second shift registers 42 and 43 in each of the gate driver ICs 411-41q constitute one shift register (shift register formed by cascade-connection in this manner is hereinafter referred to as "connection shift register"), output terminals of the first and second shift registers 42 and 43 in the gate driver IC 41n (output terminals for the start pulse signals SPoa and SPob) are connected with input terminals of the first and second shift registers 42 and 43 in the next gate driver IC (input terminals for the start pulse signals SPia and SPib).

It should be noted that gate start pulse signals GSPa and GSPb are input to input terminals of the first and second shift registers 42 and 43 in the gate driver IC 411 at the head and output terminals of the first and second shift registers 42 and 43 in the gate driver IC 41q at the end are not connected with the outside. Further, gate clock signals GCKa and GCKb and output control signals GOEa and GOEb from the display control circuit 200 are input as the clock signals CKa and CKb and the output control signals OEa and OEb to the gate driver IC 41n.

The following explains an operation of the gate driver 400 of the above configuration example with reference to a waveform chart of FIG. 47. As shown in the waveform chart, the display control circuit 200 generates, as a gate start pulse signal GSP (GSPa for odd stages and GSPb for even stages), a signal which gets H level (active) only during a period Tspw corresponding to a pixel data writing pulse Pw, and generates a gate clock signal GCK (GCKa for odd stages and GCKb for even stages) which gets H level only during a predetermined period with respect to each 1 horizontal scanning period (1H).

When the gate start pulse signal GSP and the gate clock signal GCK (GCKa and GCKb) are input to the gate driver 400, output signals Q1 and Q2 are output from first stages of the first and second shift registers 42 and 43 in the gate driver IC 411 at the head. The output signals Q1 and Q2 include a pulse Pqw corresponding to the pixel data writing pulse Pw.

Here, in order to generate the output signals Q1 and Q2 in the first stages, GCKa and GCKb in the first stages get H level with a distance of 2H.

Such pulse Pqw is sequentially transmitted through connection shift registers of the gate driver 400 in accordance with the gate clock signal GCK. Accordingly, output signals Qn whose signal waveform gets H level in accordance with rise of GCK and gets L level in accordance with next rise of GCK are output, sequentially and with a certain gap, from individual stages of the connection shift registers.

Further, as described above, the display control circuit 200 generates a gate driver output control signal GOE (GOEa and GOEb) to be supplied to the gate driver ICs 411-41q constituting the gate driver 400. A gate driver output control signal GOE to be supplied to $n^{th}$ gate driver IC 41n gets L level or H level due to adjustment of a pixel data writing pulse Pw during a period in which a pulse Pqw corresponding to the pixel data writing pulse Pw is output from any stage of the first and second shift registers 42 and 43 in the gate driver IC 41n. That is, GOE gets H level during the predetermined period, which will be hereinafter referred to as "writing period adjustment pulse".

It should be noted that a pulse (writing period adjustment pulse) included in the gate driver output control signal GOE for the sake of adjustment of the pixel data writing pulse Pw can be appropriately adjusted in accordance with the pixel data writing pulse Pw required. Here, GOE is controlled in order that when the polarity (POL) of a data signal waveform is inverted, a signal potential right before inversion of the polarity is not written. Similarly, the width of a pulse Pw can be controlled in order that when the polarity (POL) of a data signal waveform is inverted, a signal potential right after polarity inversion is not written in response to a pulse Pw right before the polarity inversion. By adjusting the width controllable by GOE, it is possible to generate a pixel data writing pulse Pw corresponding to all of the above Embodiments when the polarity (POL) of a data signal waveform is inverted.

GCK consists of GCKa for controlling output of odd stages and GCKb for controlling output of even stages. These clock signals maintain H level in connection with inversion of the polarity POL of a data signal, and when a dummy insertion period (1H) has elapsed after one more inversion of the polarity of a data signal, the clock signals get L level, restarting basic operation of getting H level for a predetermined period with respect to 1H. In accordance with operation of the clock signals (GCKa and GCKb), the length of the waveform Pqw of the output signal Qk varies. Using this variation, a period during which a pixel data writing pulse Pw out of pulses Pqw should be output is controlled in response to the output control signals GOEa and GOEb ("writing period adjustment pulse").

In the gate driver IC chips 41n (n ranges from 1 to q), in accordance with output signals Qk (k ranges from 1 to p) of individual stages of the shift registers, gate clock signals GCK, and gate driver output control signals GOE, the first and second AND gates 441 and 442 generate internal scanning signals g1 to gp, which are subjected to level conversion by the output section 45 and scanning signals G1 to Gp to be applied on the gate lines GL1 to GLm are output. Consequently, as shown in the waveform chart, pixel data writing pulses Pw are sequentially applied to the gate lines GL1 to GLm.

FIG. 48 is a waveform chart showing driving operation different from that of FIG. 47. The following explains only differences between the driving operation of FIG. 48 and that of FIG. 47.

GCK consists of GCKa for controlling output of odd stages and GCKb for controlling output of even stages. These clock signals maintain L level in connection with inversion of the polarity POL of a data signal, and when a dummy horizontal period (1H) and a horizontal period (1H) for writing pixel data have elapsed after one more inversion of the polarity of a data signal, restarting basic operation of a clock signal getting H level for a predetermined period with respect to 1H.

In accordance with operation of the clock signals (GCKa and GCKb), the length of the waveform Pqw of the output signal Qk varies. Using this variation, a period during which a pixel data writing pulse Pw out of pulses Pqw should be output is controlled in response to the output control signals GOEa and GOEb ("writing period adjustment pulse").

A pulse (writing period adjustment pulse) included in the gate driver output control signal GOE for the sake of adjustment of the pixel data writing pulse Pw can be appropriately adjusted in accordance with the pixel data writing pulse Pw required.

(Example of Double Pulse Driving)

In a case where a horizontal scanning period is required to be shorter in order to increase a scanning frequency, a pulse width of a gate-on pulse is also required to be shorter. This shortens a time for charging each pixel, resulting in insufficient charging. In order to avoid this problem, the present invention may be arranged such that charging of pixels may be carried out both during a main charging period in which a gate line is caused to be in a selected state so that source lines apply voltages on individual pixels and during a pre-charging period in which the same gate line is caused to be in a selected state with timing before the main charging period.

If driving in which a main charging period and a pre-charging period are provided is applied to the driving in FIG. 47, the driving is carried out as in FIG. 71 for example. As shown in FIG. 71, the pre-charging period and the main charging period are set according to an L period of a gate clock GCK, i.e. the width between pulses of the gate clock GCK.

In this case, at a part where the polarity of a waveform of a data signal is inverted, the L period of the gate clock GCK is set to be longer in order to insert dummy data. This causes difference in waveform of a gate-on pulse between (i) a gate line in which a pre-charging period or a main charging period is set based on a long L period of the gate clock GCK and (ii) other gate lines. This causes different charging ratios among lines, resulting in difference in luminance. FIG. 72 shows an example of display unevenness caused by the difference in luminance.

Although the example in FIG. 71 is an example of driving by interlace block inversion, a similar problem occurs in a case of progressive scanning block inversion (nH inversion). However, as shown in FIG. 72, display unevenness appears every two rows in the case of interlace scan, and consequently display unevenness appears more noticeably in interlace scan than in progressive scan.

As a countermeasure for this problem, the following explains a driving method in which the width of a gate-on pulse is set based not on the L period of GCK but on a combination of two signals: GCK and GOE. Initially, the width of a pulse Pqw on which a gate-on pulse Pw will be based is set to be a predetermined value (e.g. 2H) beforehand. Further, the length of a gate-on pulse may be slightly adjusted by masking the gate-on pulse with GOE. Further, by designing the present invention such that a gate-on pulse remains high even when a GOE pulse is generated (even in H level), it is possible to provide main charging periods that are common among all lines regardless of the GOE pulse. In this case, fixing GOE to H allows single pulse driving.

FIG. 73 shows examples of controlling a pulse width of a gate-on pulse Pw. In the examples, a main charging period is set based on the L period of GCK without being influenced by GOE. In contrast thereto, a pre-charging period is influenced by a pulse waveform of GOE. In the example 1, the pre-charging period gets shorter by masking a headmost portion of the pulse Pqw with use of a GOE pulse. In the example 2, the pre-charging period is divided into two periods and the total of the pre-charging period gets shorter by masking a middle portion of the pulse Pqw with use of a GOE pulse. In the example 3, the pre-charging period gets shorter by masking a last portion of the pulse Pqw with use of a GOE pulse and a gap is inserted between the pre-charging period and the main charging period. In the example 4, the pre-charging period gets longest by fixing GOE at L level. In the example 5, the pre-charging period gets 0 by fixing GOE at H level, thereby realizing single pulse driving.

(Configuration and Operation of Gate Driver for Realizing Double Pulse (1))

FIG. 74 shows an example of a configuration of a gate driver IC 41n for realizing progressive scan nH inversion driving in the above double pulse driving. As shown in FIG. 74, the gate driver IC 41n includes: a shift register 46; sets of a first AND gate 441, a second AND gate 442, a third AND gate 443, and a first OR gate 444, the sets respectively corresponding to individual stages of the shift register 46; and an output section 45 for outputting scanning signals G1-Gp based on output signals g1-gp from the third AND gate 443. Further, the gate driver IC 41n receives a start pulse signal SPi, a clock signal CK, an output control signal OE, and a selection signal SEL from the outside. The start pulse signal SPi is supplied to an input terminal of the shift register 46, and a start pulse signal Spo to be input to a subsequent gate driver IC 41n+1 is output from an output terminal of the shift register 46.

Further, in an odd stage (Qk; stage with k being odd number out of 1 to p) of the shift register 46, the first AND gate 441 receives the output control signal OE and a logic inversion signal of the selection signal SEL, the second AND gate 442 receives the clock signal CK and the selection signal SEL, the first OR gate 444 receives outputs of the first AND gate 441 and the second AND gate 442, the third AND gate 443 receives a logic inversion signal of an output of the first OR gate 444 and an output signal Qk (k is odd number) from an odd stage of the shift register 46.

On the other hand, in an even stage (Qk; stage with k being even number out of 1 to p) of the shift register 46, the first AND gate 441 receives the output control signal OE and the selection signal SEL, the second AND gate 442 receives the clock signal CK and a logic inversion signal of the selection signal SEL, the first OR gate 444 receives outputs of the first AND gate 441 and the second AND gate 442, the third AND gate 443 receives a logic inversion signal of an output of the first OR gate 444 and an output signal Qk (k is even number) from an even stage of the shift register 46.

The gate driver 400 of the present configuration example is realized by cascade-connecting plural number of (q) gate driver ICs 411-41q. That is, an output terminal of the shift register 46 in the gate driver IC 41n μs connected with an input terminal of the shift register 46 in the next gate driver IC 41n+1 so that the shift registers 46 in the gate driver ICs 411-41q form one shift register.

It should be noted that an input terminal of the shift register 46 in the gate driver IC 411 at the head receives a gate start pulse signal GSP from the display control circuit 200, and an output terminal of the shift register 46 in the gate driver IC chip 41q at the end is not connected with the outside. Further, a gate clock signal GCK, GOE, and SEL from the display control circuit 200 are supplied as a clock signal CK, an output control signal OE, and a selection signal SEL to each of the gate driver ICs 411-41q.

With reference to a waveform chart in FIG. 75, the following explains the operation of the gate driver 400 of the above configuration example. As shown in the waveform chart, the display control circuit 200 generates a gate start pulse signal GSP serving as a signal that gets H level only during a period Tspw corresponding to a pixel data writing pulse Pw, and generates a gate clock signal GCK that gets H level basically only for a predetermined period with respect to 1 horizontal scanning period (1H) except for a moment right after polarity inversion of a data signal.

When the gate start pulse signal GSP and the gate clock signal GCK are input to the gate driver 400, an output signal Q1 is output from a first stage of the shift register 46 in the gate driver IC 411 at the head. The output signal Q1 includes a pulse Pqw corresponding to a pixel data writing pulse Pw in each frame period.

The pulse Pqw is sequentially transmitted through connection shift registers of the gate driver 400 in accordance with the gate clock signal GCK. Accordingly, output signals Qn whose signal waveform gets H level in accordance with rise of GCK and gets L level in accordance with two-posterior rise of GCK are output, sequentially and with a certain gap, from individual stages of the connection shift registers.

At timing when the polarity of a data signal is inverted after GCK gets H level, a distance between H level of GCK and next H level of GCK is 2H. The length of the waveform Pqw of the output signal Qk varies depending on the operation of the clock GCK.

Further, as described above, the display control circuit 200 generates the gate driver output control signal GOE and the selection signal SEL to be supplied to the gate driver ICs 411-41q that constitute the gate driver 400. One of GCK and GOE is selected in response to the selection signal SEL, the pulse width of the pulse Pqw is adjusted in response to the selected one, and the pixel data writing pulse Pw is set. In the drawing, "OE" and "CK" described in the pulse widths of Pqw and Pw indicate portions controlled in response to GOE and GCK, respectively.

In the gate driver IC chips 41n (n ranges from 1 to q), the first AND gate 441, the second AND gate 442, the first OR gate 444, and the third AND gate 443 generate internal scanning signals g1-gp based on the output signal Qk (k ranges from 1 to p) from individual stages of the shift register, the gate clock signal GCK, the gate driver output control signal GOE, and the selection signal SEL. The internal scanning signals g1-gp are subjected to level-conversion by the output section 45 and scanning signals G1-Gp to be applied on the gate lines GL1-GLm are output.

Consequently, pixel data writing pulses Pw having the same pulse width are sequentially applied to the gate lines GL1-GLm. Consequently, the length of a charging period is equal between a gate line at which the polarity of a data signal is inverted and other gate lines. This prevents the display unevenness.

As shown in FIG. 76, the present configuration may be arranged so that at timing when the polarity of a data signal is inverted after GCK gets H level, GCK is kept at H level for 1H. In this case, too, the length of the waveform Pqw of the output signal Qk varies depending on the operation of the clock GCK. By appropriately setting the gate driver output control signal GOE and the selection signal SEL, it is possible to sequentially apply pixel data writing pulses Pw having the same pulse width to the gate lines GL1-GLm.

Gate-on pulses Pw at the time of polarity inversion of a data signal waveform shown in FIGS. 77 to 79 below can be generated by employing the gate driver IC in FIG. 74 and appropriately selecting the gate clock GCK, the pulse width of the gate driver output control signal GOE, and the selection signal SEL. For example, fall of a gate-on pulse right before polarity inversion may be masked with GCK and rise of a gate-on pulse right after the polarity inversion may be masked with GOE.

FIG. 77 shows a timing chart of a data signal waveform, a data signal, a latch strobe signal LS, and a gate-on pulse (pixel data writing pulse) Pw in the double pulse driving by progressive scan where the polarity of a data signal voltage is inverted with respect to every 10 rows with a center value of the data signal voltage Vsc as a reference and where 1 horizontal period (1H) right after inversion of the polarity is regarded as a dummy insertion period. In the drawing, the lateral direction indicates time lapse and the longitudinal direction indicates individual rows of gate lines (writing rows) GL1-GLm to which gate-on pulses are applied.

An actual waveform of the data signal is rounded right after inversion of the polarity. That is, it takes time for the waveform of the data signal to reach a predetermined voltage after the inversion of the polarity. In order to deal with this problem, in the above driving example, a main charging period is not provided during 1 horizontal period right after the inversion of the polarity in order to provide a dummy horizontal period. Consequently, in a horizontal period next to the dummy insertion period, a data signal with the predetermined voltage is written in individual pixels.

Providing the dummy insertion period in this manner allows increasing a reaching ratio (charging ratio) of an actual voltage to an application voltage in the source lines SL1-SLn (data signal lines) when writing pixel data after the inversion of the polarity. This prevents display unevenness with respect to every 10 rows which is caused by rounding of the data signal waveform at the time of the inversion of the polarity.

Further, as shown in FIG. 78, the driving is configured such that a second period is longer than a first period where the first period is a time from the last end of a gate-on pulse Pw nearest to a moment of polarity inversion among gate-on pulses Pw applied before the moment of polarity inversion to the end of a horizontal period during which the gate-on pulse Pw is applied and the second period is a time from the moment of polarity inversion to a moment of application start of a gate-on pulse Pw nearest to the moment of polarity inversion among gate-on pulses Pw applied after the moment of polarity inversion.

With such driving, a gate-on pulse Pw is not applied at the time of inversion of the polarity. This allows preventing data signals with opposite polarities from being simultaneously applied to two adjacent gate lines to which gate-on pulses Pw are applied before and after inversion of the polarity, respectively. This allows preventing image display from being disturbed at the moment of polarity inversion.

Further, out of the gate-on pulses Pw applied after the moment of polarity inversion, the gate-on pulse Pw nearest to the moment of polarity inversion is gated on after a period longer than the first period has elapsed from the moment of polarity inversion. This prevents pre-charging of a pixel during a period where a data signal waveform is greatly rounded due to polarity inversion. This allows displaying an image with high quality that is free from display unevenness etc.

FIG. 79 shows a timing chart of a data signal waveform, a data signal, a latch strobe signal LS, and a gate-on pulse Pw in the double pulse driving by progressive scan where the polarity of a data signal voltage is inverted with respect to every 10 rows with Vsc as a reference and where 2 horizontal periods (2H) right after inversion of the polarity is regarded as a dummy insertion period. In the drawing, a lateral direction represents time elapse and a longitudinal direction represents individual rows of the gate lines (writing rows) GL1-GLm to which gate-on pulses are applied.

As described above, by setting the length of a dummy insertion period so as to include a time for an actual data signal to reach a predetermined voltage after inversion of the polarity, a data signal with the predetermined voltage is written in individual pixels. Providing the dummy insertion period in this manner allows increasing a reaching ratio of an actual voltage to an application voltage in the source lines SL1-SLn when writing pixel data after the inversion of the polarity. This prevents display unevenness with respect to every 10 rows which is caused by rounding of the data signal waveform at the time of the inversion of the polarity.

In the above examples, the dummy insertion period is 2H or 3H. Alternatively, the dummy insertion period may be set to 4H or more according to the degree of rounding of the data signal waveform after inversion of the polarity.

In the above driving, a gate-on pulse is applied such that a time from a moment of polarity inversion to a moment of an application start of a gate-on pulse Pw nearest to the moment of polarity inversion among gate-on pulses Pw applied after the moment of polarity inversion is equal to or longer than a horizontal display period obtained by subtracting a horizontal blanking period from a horizontal period.

As described above, a data signal applied on a source line is normally designed such that the data signal has a signal waveform that allows a pixel to be charged within one horizontal display period. Consequently, at a moment more than one horizontal display period after a moment of polarity inversion, the influence of rounding of a data signal waveform which is caused by the polarity inversion is prevented. This allows preventing a pixel from being charged during a period in which a data signal waveform is greatly rounded due to polarity inversion, allowing high-quality display with subdued display unevenness.

In the above configuration example, a gate-on pulse Pw as a double pulse is applied by appropriately selecting a gate clock GCK, a pulse width of a gate driver output control signal GOE, and a selection signal SEL. Alternatively, the configuration may be arranged not to use a selection signal SEL. FIG. 90 shows a configuration of a main part of a gate driver IC for applying a gate-on pulse Pw that is a double pulse without using a selection signal SEL. The configuration in FIG. 90 shows a gate driver unit for outputting a scanning signal G to one gate line. The gate driver unit is a part of the gate driver ICs 41n.

As shown in the drawing, the gate driver unit includes a first flip-flop 461, a second flip-flop 462, a first output mask 463, a second output mask 464, and an OR gate 465. The first flip-flop 461 receives a gate start pulse signal GSP, operates in response to a gate clock signal GCK, and outputs an output signal QA. The first flip-flop 462 receives the output signal QA, operates in response to the gate clock signal GCK, and outputs an output signal QB.

The first output mask 463 masks the output signal QA with use of a gate driver output control signal GOE and outputs the masked signal. The second output mask 464 outputs the output signal QB only during a period in which the gate clock signal GCK is in L level. The OR gate 465 outputs, as a scanning signal G, the result of OR logic operation of a signal from the first output mask 463 and a signal from the second output mask 464. Although not shown in the drawing, the first flip-flop 461 outputs the output signal QA to a first flip-flop of a gate driver unit in a subsequent stage and this process is sequentially repeated. Thus, the gate driver units constitute a shift register and serves as a gate driver.

The following explains an operation of the gate driver 400 of the above configuration example with reference to the waveform chart in FIG. 91. As shown in the waveform chart, the display control circuit 200 generates, as a gate start pulse signal GSP, a signal that gets H level only during a period Tps corresponding to a pixel data writing pulse Pw, and generates a gate clock signal GCK that gets H level only during one horizontal scanning period (1H) right after polarity inversion of a data signal and gets H level only during a predetermined period with respect to each one horizontal scanning period (1H).

When such gate start pulse signal GSP and such gate clock signal GCK are supplied to the gate driver 400, an output signal QA1 is output from the first flip-flop 461 in the gate driver unit at the head.

The gate start pulse GSP is sequentially transmitted through the gate driver units in accordance with the gate clock signal GCK. Accordingly, output signals QAk whose signal waveform gets H level in accordance with fall of GCK and gets L level in accordance with one-posterior fall of GCK are output, sequentially and with a certain gap, from individual stages of the connection shift registers.

Further, at timing when the polarity of a data signal is inverted after GCK gets H level, GCK is kept at H level for 1H. The pulse width of an output signal QAk varies according to the operation of the clock GCK.

In response to output of an output signal QAk from the first flip-flop 461, the second flip-flop 462 outputs an output signal QBk in accordance with GCK. That is, the output signal QBk is obtained by delaying the output signal QAk by 1H.

Further, as described above, the display control circuit 200 generates the gate driver output control signal GOE to be supplied to the gate driver ICs 411-41q that constitute the gate driver 400. This GOE is a signal that gets H level only during 1H period right before polarity inversion of a data signal and gets L level during other periods. By controlling a pulse width of GOE when keeping H level, masking by the first output mask 463 controls the length of a pre-charging period of a scanning signal Gk. In accordance with the output signal QBk and GCK, masking by the second output mask 464 sets a main charging period for the scanning signal Gk.

Consequently, pixel data writing pulses Pw with the same pulse width are sequentially applied to the gate lines GL1-GLm without using the selection signal SEL. This makes the length of a charging period equal between a gate line at which the polarity of a data signal is inverted and other gate line, allowing prevention of the display unevenness.

Further, the present invention may be arranged so that two series of gate driver units are provided for odd lines and even lines, and input signals GSPa, GSPb, GCKa, GCKb, GOEa, and GOEb for odd lines and even lines are supplied to the gate driver units for odd lines and the gate driver units for even lines, respectively, as in the later-mentioned configuration in FIG. 80, so as to realize block-divided interlace drive.

(Configuration and Operation of Gate Driver for Realizing Double Pulse (2))

FIG. 80 shows an example of a configuration of a gate driver IC 41n for realizing block-divided interlace driving in the above double pulse driving. As shown in FIG. 80, the gate driver IC 41n includes a first shift register 42, a second shift register 43, a logic circuit A, a logic circuit B, and an output section 45.

The first shift register 42 is for odd lines and the second shift register 43 is for even lines. The logic circuit A is provided so as to correspond to an output from the first shift register 42 and the logic circuit B is provided so as to correspond to an output from the second shift register 43. The output section 45 outputs scanning signals G1-Gp based on output signals g1-gp from the logic circuits A and B.

The gate driver IC 41n receives start pulse signals SPia and SPib and clock signals CKa and CKb that are supplied from the outside to respective shift registers, output control signals OEa and OEb, and selection signals SELa and SELb. The start pulse signals SPia and SPib are supplied to input terminals of the first shift register 42 and the second shift register 43, respectively, and start pulse signals SPoa and SPob to be supplied to a subsequent gate driver IC are output from output terminals of the first shift register 42 and the second shift register 43, respectively.

Each of the logic circuits A and B includes a first AND gate 441, a second AND gate 442, a third AND gate 443, and a first OR gate 444.

In an odd stage (corresponding to Q(4k–3) (k=1, 2 . . . )) of the logic circuit A, the first AND gate 441 receives the output control signal OEa and a logic inversion signal of the selection signal SELa, the second AND gate 442 receives the clock signal CKa and the selection signal SELa, the first OR gate 444 receives outputs of the first AND gate 441 and the second AND gate 442, the third AND gate 443 receives a logic inversion signal of an output of the first OR gate 444 and an output signal Q(4k–3) from an odd stage of the shift register.

In an even stage (corresponding to Q(4k–1) (k=1, 2 . . . )) of the logic circuit A, the first AND gate 441 receives the output control signal OEa and the selection signal SELa, the second AND gate 442 receives the clock signal CKa and a logic inversion signal of the selection signal SELa, the first OR gate 444 receives outputs of the first AND gate 441 and the second AND gate 442, the third AND gate 443 receives a logic inversion signal of an output of the first OR gate 444 and an output signal Q(4k–1) from an odd stage of the shift register.

In an odd stage (corresponding to Q(4k–2) (k=1, 2 . . . )) of the logic circuit B, the first AND gate 441 receives the output control signal OEb and a logic inversion signal of the selection signal SELb, the second AND gate 442 receives the clock signal CKb and the selection signal SELb, the first OR gate 444 receives outputs of the first AND gate 441 and the second AND gate 442, the third AND gate 443 receives a logic inversion signal of an output of the first OR gate 444 and an output signal Q(4k–2) from an odd stage of the shift register 46.

In an even stage (corresponding to Q(4k) (k=1, 2 . . . )) of the logic circuit B, the first AND gate 441 receives the output control signal OEb and the selection signal SELb, the second AND gate 442 receives the clock signal CKb and a logic inversion signal of the selection signal SELb, the first OR gate 444 receives outputs of the first AND gate 441 and the second AND gate 442, the third AND gate 443 receives a logic inversion signal of an output of the first OR gate 444 and an output signal Q(4k) from an odd stage of the shift register.

The gate driver 400 of the present configuration example is realized by cascade-connecting plural number of (q) gate driver ICs 411-41q each having the above configuration. That is, output terminals of the first shift register 42 and the second shift register 43 in the gate driver IC 41n are connected with input terminals of the first shift register 42 and the second shift register 43 in the next gate driver IC so that the first shift registers 42 and the second shift registers 43 in the gate driver ICs 411-41q form one shift register.

It should be noted that input terminals of the first shift register 42 and the second shift register 43 in the gate driver IC 411 at the head receive gate start pulse signals GSPa and GSPb from the display control circuit 200, respectively, and output terminals of the first shift register 42 and the second shift register 43 in the gate driver IC 41q at the end are not connected with the outside. Further, gate clock signals GCKa and GCKb, output control signals GOEa and GOEb, and selection signals SELa and SELb from the display control circuit 200 are supplied as clock signals CKa and CKb, output control signals OEa and OEb, and selection signals SELa and SELb to each gate driver IC 41n.

With reference to waveform charts in FIGS. 81 and 82, the following explains the operation of the gate driver 400 of the above configuration example. FIG. 81 shows a timing chart of a latch strobe signal LS, a data signal, a polarity POL of a data signal, gate start pulse signals GSPa and GSPb, gate clock signals GCKa and GCKb, output control signals GOEa and GOEb, selection signals SELa and SELb, and an output signal Qn. FIG. 82 shows a timing chart, corresponding to FIG. 81, of a latch strobe signal LS, a data signal, a polarity POL of a data signal, and a scanning signal Gn.

As shown in the waveform chart, the display control circuit 200 generates a gate start pulse signal GSP (GSPa for odd line and GSPb for even line) serving as a signal that gets H level only during a period Tspw corresponding to a pixel data writing pulse Pw, and generates a gate clock signal GCK (GCKa for odd line and GCKb for even line) that gets H level basically only for a predetermined period with respect to 1 horizontal scanning period (1H) except for a moment right after polarity inversion of a data signal.

When the gate start pulse signal GSP and the gate clock signal GCK (GCKa and GCKb) are input to the gate driver 400, output signals Q1 and Q2 are output from first stages of the first shift register 42 and the second shift register 43 in the gate driver IC 411 at the head. Each of the output signals Q1 and Q2 includes a pulse Pqw corresponding to a pixel data writing pulse Pw in each frame period.

The pulse Pqw is sequentially transmitted through connection shift registers of the gate driver 400 in accordance with the gate clock signal GCK. Accordingly, output signals Qn whose signal waveform gets H level in accordance with rise of GCK and gets L level in accordance with two-posterior rise of GCK are output, sequentially and with a certain gap, from individual stages of the connection shift registers.

GCK consists of GCKa for controlling output of odd stages and GCKb for controlling output of even stages. These clock signals maintain H level in connection with inversion of the polarity POL of a data signal, and when a dummy insertion period (1H) has elapsed after one more inversion of the polarity of a data signal, the clock signals get L level, restarting basic operation of getting H level for a predetermined period with respect to 1H. The length of the waveform Pqw of the output signal Qk varies depending on the operation of the clock (GCKa and GCKb).

Further, as described above, the display control circuit 200 generates the gate driver output control signal GOE (GOEa and GOEb) and the selection signals SELa and SELb to be supplied to the gate driver ICs 411-41q that constitute the gate driver 400. One of GCK and GOE is selected in response to the selection signal SEL, the pulse width of the pulse Pqw is adjusted in response to the selected one, and the pixel data writing pulse Pw is set. In the drawing, "OEa(b)" and "CKa(b)" described in the pulse widths of Pqw and Pw indicate portions controlled in response to GOEa(b) and GCKa(b), respectively.

In the gate driver IC chips 41*n* (n ranges from 1 to q), the first and second AND gates 441 and 442, the first OR gate 444, and the third AND gate 443 generate internal scanning signals g1 to gp in accordance with output signals Qk (k ranges from 1 to p) from individual stages of the shift registers, the gate clock signals GCK, the gate driver output control signals GOE, and the selection signals SEL. The internal scanning signals g1-*gp* are subjected to level conversion by the output section 45 and scanning signals G1 to Gp to be applied on the gate lines GL1 to GLm are output.

Consequently, pixel data writing pulses Pw with the same pulse width are sequentially applied to the gate lines GL1-GLm. This allows making the length of a charging period equal between a gate line at which the polarity of a data signal is inverted and other gate line, allowing prevention of the display unevenness.

The present invention may be arranged so that as shown in FIGS. 83 and 84, in accordance with inversion of a polarity POL of a data signal, a period in which GOEa gets L level with a predetermined cycle (1H) and with a predetermined pulse width and a period in which GOEb gets L level with a predetermined cycle (1H) and with a predetermined pulse width are switchable with each other. In this case, by adjusting the lengths of a period in which GOEa gets L level and a period in which GOEb gets L level, it is possible to adjust the pulse width of the pixel data writing pulse Pw.

FIG. 85 shows a timing chart of a data signal waveform, a data signal, a latch strobe signal LS, a gate-on pulse Pw, and a CS signal in the double pulse driving by block-divided interlace scan where the number α of scanning lines in one block is 20 and where 1 horizontal period (1H) right after polarity inversion of a data signal is regarded as a first dummy insertion period, 1 horizontal period (1H) prior to polarity inversion of a data signal by 5 horizontal periods (5H) is regarded as a second dummy insertion period, and CS signals during periods to which the first and second insertion periods are inserted are made to include insertion of CS signal dummy periods corresponding to 1H, respectively. Further, FIG. 86 shows a driving example in which each of the first and second dummy insertion periods is 2H. The driving in FIG. 85 and the driving in FIG. 86 are similar to the driving in FIG. 26 and the driving in FIG. 30 except that the pulse width of the gate-on pulse Pw is a double pulse, and therefore explanations there of are omitted here.

[Configuration of Television Receiver]

Next, the following explains one example of configuration of applying the liquid crystal display device according to the present invention to a television receiver. FIG. 49 is a block diagram showing a configuration of a display device 800 for a television receiver. The display device 800 includes a Y/C separation circuit 80, a video chroma circuit 81, an A/D converter 82, a liquid crystal controller 83, a liquid crystal panel 84, a backlight drive circuit 85, a backlight 86, a microcomputer 87, and a gradation circuit 88. The liquid crystal panel 84 corresponds to the liquid crystal display device of the present invention, and includes: a display section including active matrix pixel arrays; and a source driver and a gate driver each for driving the display section.

In the display device 800 of the aforementioned configuration, a complex color video signal Scv as a television signal is inputted from the outside to the Y/C separation circuit 80. In the Y/C separation circuit 80, the complex color video signal Scv is separated into a luminance signal and a color signal. The luminance signal and the color signal are converted to analog RGB signals corresponding to three fundamental colors of light in the video chroma circuit 81. Further, the analog RGB signals are converted to digital RGB signals by the A/D converter 82. The digital RGB signals are inputted to the liquid crystal controller 83. Moreover, in the Y/C separation circuit 80, horizontal and vertical sync signals are extracted from the complex color video signal Scv inputted from the outside. These sync signals are also inputted to the liquid crystal controller 83 via the microcomputer 87.

The liquid crystal controller 83 outputs data signals for drivers based on the digital RGB signals (corresponding to the aforementioned digital video signals Dv) from the A/D converter 82. Further, the liquid crystal controller 83 generates, based on the sync signals, timing control signals for causing the source driver and the gate driver in the liquid crystal panel 84 to operate as in the above Embodiments, and supplies the timing control signals to the source driver and the gate driver. Further, in the gradation circuit 88, gradation voltages of three fundamental colors R, G, and B of color display are generated, and these gradation voltages are also supplied to the liquid crystal panel 84.

In the liquid crystal panel 84, drive signals (e.g., data signals and scanning signals) are generated by the source and gate drivers inside the liquid crystal panel 84 in accordance with the data signals for drivers, the timing control signals, and the gradation voltages. A color image is displayed on a display section inside the liquid crystal panel 84 in accordance with the drive signals. It should be noted that for displaying an image by the liquid crystal panel 84, light needs to be irradiated from a rear of the liquid crystal panel 84. In the display device 800, the backlight drive circuit 85 drives the backlight 86 under control by the microcomputer 87 and thereby light is irradiated on a back side of the liquid crystal panel 84.

Control of the whole system, including the aforementioned processes is carried out by the microcomputer 87. As the video signal (complex color video signal) inputted from the outside, not only a video signal in accordance with television broadcast but also a video signal picked up by a camera or supplied via the Internet line is also usable. In the display device 800, image display in accordance with various video signals can be performed.

In displaying an image by the display device 800 in accordance with television broadcast, a tuner section 90 is connected to the display device 800, as shown in FIG. 50. The tuner section 90 extracts a channel signal to be received from waves (high-frequency signals) received by an antenna (not illustrated), and converts the channel signal to an intermediate frequency signal. The tuner section 90 detects the intermediate frequency signal, thereby extracting the complex color video signal Scv as the television signal. The complex color video signal Scv is inputted to the display device 800 as described above and an image is displayed by the display device 800 in accordance with the complex color video signal Scv.

FIG. 51 is an exploded perspective view showing one example of mechanical configuration where the display device of the above configuration is used as a television receiver. In the example shown in FIG. 51, the present television receiver includes, as constituent features thereof, a first housing 801 and a second housing 806 in addition to the display device 800. The liquid crystal display device 800 is arranged such that the first and second housings 801 and 806 hold the display device 800 so as to wrap therein the display device 800. The first housing 801 has an opening 801*a* for transmitting an image displayed on a display device 800. On the other hand, the second housing 806 covers a back side of the display device 800. The second housing 806 is provided with an operating circuit 805 for operating the display device 800. The second housing 806 is further provided with a supporting member 808 therebelow.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

For convenience of explanation, data signal lines are provided so as to extend in a column direction and scanning signal lines are provided so as to extend in a row direction. It is needless to say that the present invention also encompasses a configuration in which the screen is rotated by 90 degrees.

INDUSTRIAL APPLICABILITY

The liquid crystal display device of the present invention is applicable to various display devices such as a monitor for a personal computer and a television receiver.

The invention claimed is:

1. An active-matrix liquid crystal display device, including scanning signal lines extending in a row direction, data signal lines extending in a column direction, and pixels provided so as to respectively correspond to intersections of the scanning signal lines and the data signal lines,
the liquid crystal display device comprising:
a scanning signal driving section for sequentially applying gate-on pulses on the scanning signal lines, each of the gate-on pulses causing one of the scanning signal lines to be in a selected state;
a data signal driving section for applying data signals on the data signal lines such that a polarity of at least one of the data signals is inverted with respect to a selected plural number of horizontal periods in one frame period,
the scanning signal line driving section configured to apply gate-on pulses such that a period from a moment of polarity inversion of the at least one of the data signals to a moment of an application start of the gate-on pulse nearest to the moment of the polarity inversion among the gate-on pulses applied after the polarity inversion is equal to or longer than a horizontal display period obtained by subtracting a horizontal blanking period from a horizontal period;
a display control circuit for supplying, to the data signal driving section, the at least one of the data signals and a data signal application control signal for controlling timing with which the data signal driving section applies the at least one of the data signals on one of the data signal lines,
the display control circuit being configured to receive a plurality of video data that respectively correspond to the data signal lines sequentially supplied from an external signal source with an interval between the plurality of video data, and
the display control circuit is configured to regard a certain number of video data as a set in accordance with the polarity inversion, assign one or more dummy insertion periods as well as one horizontal period to an output of a signal potential corresponding to selected video data in each set, and assign a horizontal period shorter than the interval to outputs of signal potentials respectively corresponding to individual video data other than the selected video data in each set.

2. The liquid crystal display device as set forth in claim 1, wherein the scanning signal driving section applies the gate-on pulses such that a period from the moment of the polarity inversion of the at least one of the data signals to the moment of the application start of the gate-on pulse nearest to the moment of the polarity inversion among the gate-on pulses applied after the polarity inversion is equal to or less than 0.8 msec.

3. The liquid crystal display device as set forth in claim 1, wherein the scanning signal driving section applies the gate-on pulses on all of the scanning signal lines such that each of the gate-on pulses has a same pulse width.

4. The liquid crystal display device as set forth in claim 1, wherein
the scanning signal lines are divided into one or more blocks, and scanning signal lines included in each block are divided into plural groups,
the scanning signal driving section sequentially scans blocks of the scanning signal lines and sequentially scans groups of the scanning signal lines in each block such that the scanning signal lines in each block are interlace-scanned, and
the data signal driving section applies the data signals on the data signal lines such that the polarity of one of the data signals is inverted at a moment of switching groups of the scanning signal lines to be scanned.

5. The liquid crystal display device as set forth in claim 1, wherein the scanning signal driving section provides:
a main charging period in which the scanning signal driving section causes one of the scanning signal lines to be in the selected state such that the data signal lines apply voltages on individual pixels; and
a pre-charging period in which the scanning signal driving section causes said one of the scanning signal lines to be in the selected state before the main charging period.

6. A television receiver, comprising:
liquid crystal display device as set forth in claim 1; and
a tuner section for receiving television broadcasting.

7. A method for driving an active-matrix liquid crystal display device, including scanning signal lines extending in a row direction, data signal lines extending in a column direction, and pixels provided so as to respectively correspond to intersections of the scanning signal lines and the data signal lines,
the method comprising the steps of:
(i) sequentially applying gate-on pulses on the scanning signal lines, each of the gate-on pulses causing one of the scanning signal lines to be in a selected state; and
(ii) applying data signals on the data signal lines such that a polarity of at least one of data signals is inverted with respect to a selected plural number of horizontal periods in one frame period,
in the step (i), gate-on pulses being applied such that
a period from a moment of polarity inversion of the at least one of the data signals to a moment of an application start of the gate-on pulse nearest to the moment of the polarity inversion among the gate-on pulses applied after the polarity inversion is equal to or longer than a horizontal display period obtained by subtracting a horizontal blanking period from a horizontal period,
supplying, to the data signal driving section, the at least one of the data signals and a data signal application control signal for controlling timing of the at least one of the data signals on one of the data signal lines,
receiving a plurality of video data that respectively correspond to the data signal lines with an interval between the plurality of video data, and
determining a certain number of video data as a set in accordance with the polarity inversion, assigning one or more dummy insertion periods as well as one horizontal period to an output of a signal potential corresponding to selected video data in each set, and assigning a horizontal period shorter than the interval to outputs of signal potentials respectively corresponding to individual video data other than the selected video data in each set.

* * * * *